(12) United States Patent
Sanders et al.

(10) Patent No.: US 9,960,637 B2
(45) Date of Patent: May 1, 2018

(54) RENEWABLE ENERGY INTEGRATED STORAGE AND GENERATION SYSTEMS, APPARATUS, AND METHODS WITH CLOUD DISTRIBUTED ENERGY MANAGEMENT SERVICES

(71) Applicant: SUNVERGE ENERGY, INC., San Francisco, CA (US)

(72) Inventors: Dean Sanders, Linden, CA (US); Stu Statman, San Francisco, CA (US)

(73) Assignee: SUNVERGE ENERGY, INC., San Francisco, CA (US)

( * ) Notice: Subject to any disclaimer, the term of this patent is extended or adjusted under 35 U.S.C. 154(b) by 397 days.

(21) Appl. No.: 14/791,420

(22) Filed: Jul. 4, 2015

(65) Prior Publication Data
US 2017/0005515 A1    Jan. 5, 2017

(51) Int. Cl.
G05B 15/02    (2006.01)
G05B 11/01    (2006.01)
(Continued)

(52) U.S. Cl.
CPC .............. *H02J 15/00* (2013.01); *G05B 15/02* (2013.01); *H02J 3/381* (2013.01); *H02J 3/383* (2013.01)

(58) Field of Classification Search
CPC . G05B 15/02; H02J 15/00; H02J 3/381; H02J 3/383
See application file for complete search history.

(56) References Cited

U.S. PATENT DOCUMENTS

| | | | |
|---|---|---|---|
| 8,457,797 B2 * | 6/2013 | Imes | H04L 67/42 370/338 |
| 8,855,829 B2 * | 10/2014 | Golden | G05B 15/02 700/291 |

(Continued)

FOREIGN PATENT DOCUMENTS

| | | |
|---|---|---|
| WO | 2014164976 A1 | 10/2014 |
| WO | 2015017201 A1 | 2/2015 |

OTHER PUBLICATIONS

International Search Report for PCT Application No. PCT/US2016/040530 issued by the US Searching Authority dated Sep. 14, 2016, pp. 1-2.

(Continued)

*Primary Examiner* — Abdelmoniem Elamin
(74) *Attorney, Agent, or Firm* — Haynes and Boone, LLP.

(57) ABSTRACT

A software platform in communication with networked distributed energy resource energy storage apparatus, configured to deliver various specific applications related to offset demand monitoring, methods of virtual power plant and orchestration, load shaping services, methods of reducing demand at aggregated level, prioritizing computer programs related to virtual energy pool, energy cloud controllers methods, charge discharge orchestration plans of electric vehicles, distributed energy resources, machine learning predictive algorithms, value optimizing algorithms, autonomous sensing event awareness, mode selection methods, capacity reservation monitoring, virtual power plant methods, advanced DER-ES apparatus features, energy management system for governing resources and methods, aggregated energy cloud methods, load shaping methods, marginal cost cycle-life degradation, load shaping API, forward event schedule, on demand request, and load service state request methods. Various rules, constraints of predictive algorithms for signal inputs to determine incremental (Continued)

storage cycles, cycle life degradation marginal cost, iterative and forward event schedule development, and load control.

28 Claims, 68 Drawing Sheets

(51) Int. Cl.
    *G05B 15/00* (2006.01)
    *H02J 15/00* (2006.01)
    *H02J 3/38* (2006.01)

(56) References Cited

U.S. PATENT DOCUMENTS

| | | | |
|---|---|---|---|
| 9,853,488 B2* | 12/2017 | Fincham | H02J 7/1446 |
| 2004/0024502 A1 | 2/2004 | Squires et al. | |
| 2004/0167677 A1 | 8/2004 | Weiss | |
| 2006/0158037 A1* | 7/2006 | Danley | H02J 3/32 |
| | | | 307/64 |
| 2008/0167756 A1* | 7/2008 | Golden | G05B 15/02 |
| | | | 700/297 |
| 2009/0276488 A1 | 11/2009 | Alstad | |
| 2010/0017249 A1* | 1/2010 | Fincham | B60L 3/12 |
| | | | 705/412 |
| 2011/0046800 A1* | 2/2011 | Imes | F24F 11/006 |
| | | | 700/286 |
| 2011/0106321 A1 | 5/2011 | Cherian et al. | |
| 2012/0101639 A1 | 4/2012 | Carralero et al. | |
| 2012/0310434 A1 | 12/2012 | Taft | |
| 2012/0310559 A1 | 12/2012 | Taft | |
| 2013/0015703 A1 | 1/2013 | Rouse et al. | |
| 2013/0036311 A1 | 2/2013 | Akyol et al. | |
| 2013/0041516 A1 | 2/2013 | Rockenfeller et al. | |
| 2015/0127180 A1 | 5/2015 | Oh et al. | |
| 2015/0318706 A1* | 11/2015 | Ilinca | H02J 3/14 |
| | | | 700/287 |

OTHER PUBLICATIONS

Written Opinion for PCT Application No. PCT/US2016/040530 issued by the US Searching Authority dated Sep. 14, 2016, pp. 1-10.
International Search Report for PCT Application No. PCT/US2016/040540 issued by the US Searching Authority dated Sep. 15, 2016, pp. 1-2.
Written Opinion for PCT Application No. PCT/US2016/040540 issued by the US Searching Authority dated Sep. 15, 2016, pp. 1-4.
International Search Report for PCT Application No. PCT/US2016/040545 issued by the US Searching Authority dated Sep. 26, 2016, pp. 1-2.
Written Opinion for PCT Application No. PCT/US2016/040545 issued by the US Searching Authority dated Sep. 26, 2016, pp. 1-7.
Zadeh, M.R.D., A. Hajimiragha, M. Adamiak, A. Palizban, and S. Allan, "Design and implementation of a microgrid controller," In Protective Relay Engineers, 2011 64th Annual Conference, pp. 137-145, IEEE, 2011.
Liu, Hai-xuan, "Studies on the monitoring and control platform of microgrids," In Electricity Distribution (CICED), China International Conference on, pp. 1-5, IEEE, 2012.
Gomis-Bellmunt, Oriol, Andreas Sumper, Alba Colet-Subirachs, Albert Ruiz-Alvarez, Felipe Alvarez-Cuevas-Figuerola, and Antoni Sudria-Andreu, "A utility connected microgrid based on power emulators," In Power and Energy Society General Meeting, pp. 1-6, IEEE 2011.

\* cited by examiner

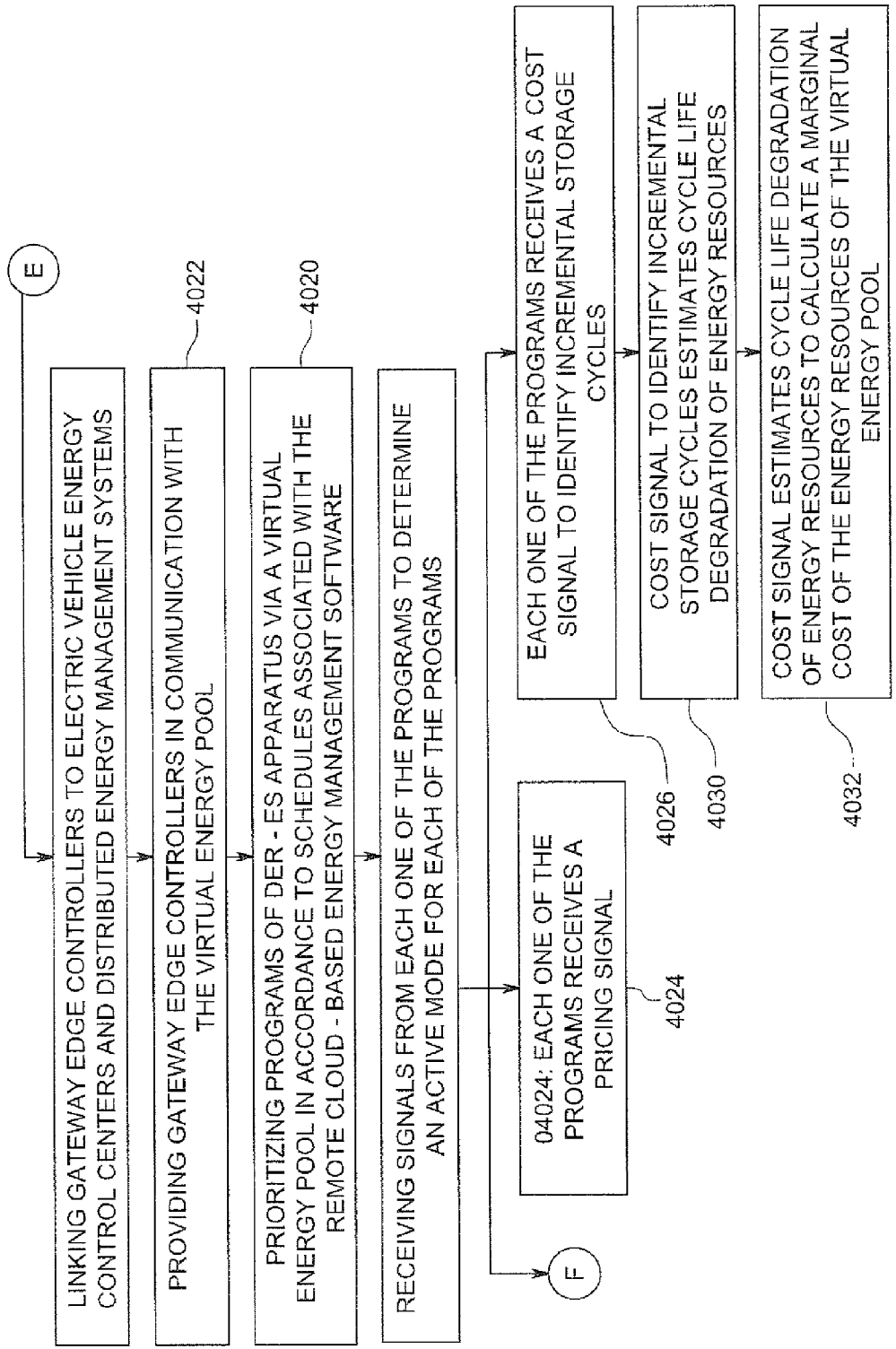

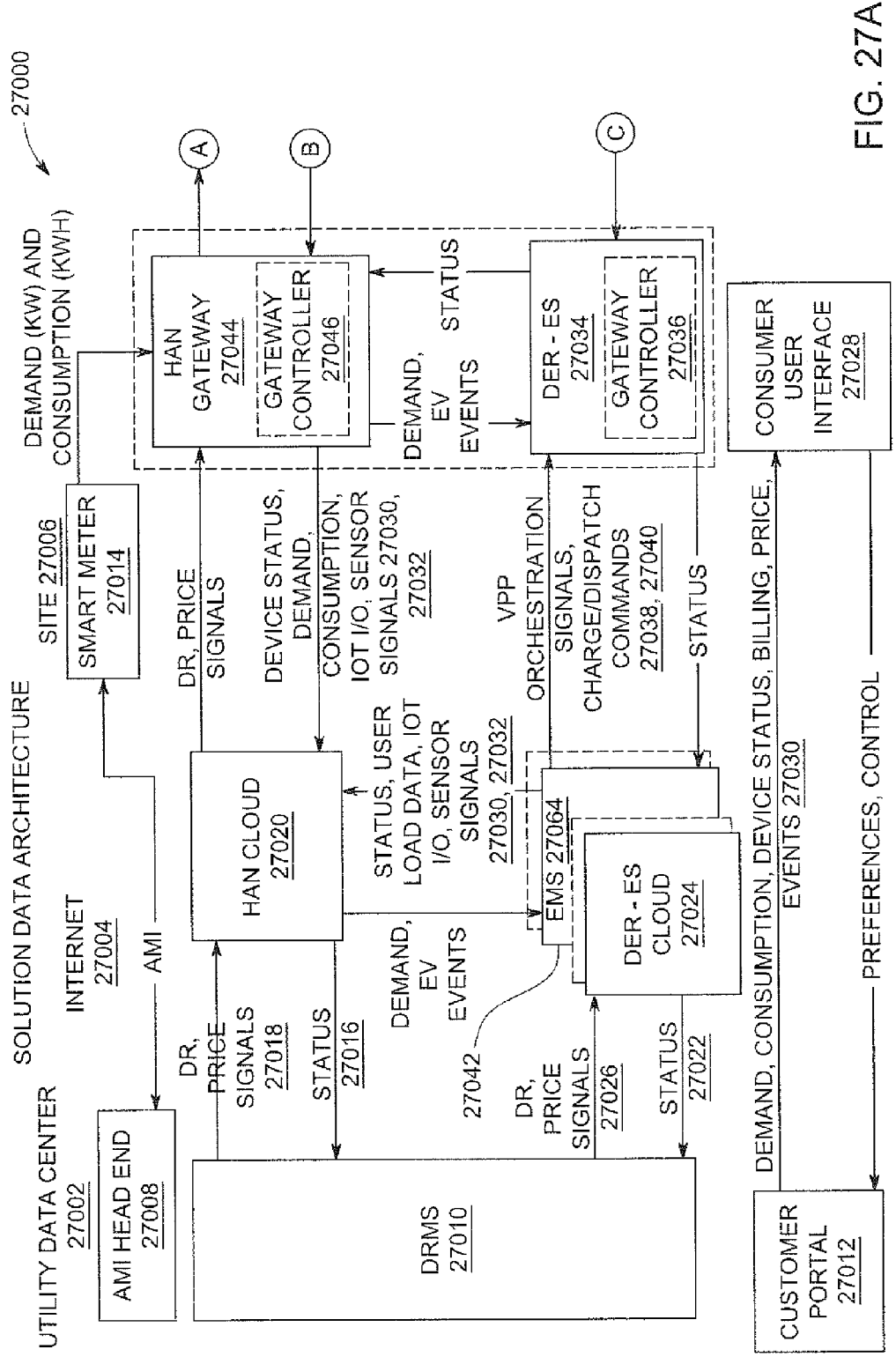

RENEWABLE ENERGY INTEGRATED STORAGE AND GENERATION SYSTEMS, APPARATUS, AND METHODS WITH CLOUD DISTRIBUTED ENERGY MANAGEMENT SERVICES

RELATED APPLICATIONS

This application is related to the commonly-owned U.S. patent Non-provisional application, Ser. No. 13/891,185, filed on May 9, 2013, still pending, U.S. patent Non-provisional application, Ser. No. 13/016,901, field on Jan. 28, 2011, now U.S. Pat. No. 8,463,449 and U.S. patent Non-provisional application, Ser. No. 13/774,531, filed on Feb. 22, 2013, now U.S. Pat. No. 9,063,525, all of which are assigned to Sunverge Energy, Inc.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2010-2013, Sunverge Energy, Inc., All Rights Reserved.

TECHNICAL FIELD

This patent document pertains generally to systems, apparatuses, methodologies, computer program products, etc. for distributed energy services management.

BACKGROUND

There exist several technologies that can produce electricity on a premises, whether a residential or commercial building. Among these are photovoltaic panels (e.g., solar panels), small scale natural gas turbines (also known as micro-turbines), small-scale wind turbines (in contrast to the large turbines used in grid connected wind farms), low pressure water turbines, high-pressure low flow water turbines, and fuel cells using hydrogen, natural gas, and potentially other hydrocarbons. These technologies are herein referred to as "distributed energy sources." Distributed energy sources have been deployed only to a very limited extent for reasons of cost, convenience, and a lack of harmonized grid inter-connection standards. Historically, power storage and supply devices typically involve the charging of batteries that store energy in the event of a power failure of a home or business' main source of electricity, which is normally provided from a utility power grid connected to the home or business and are designed to support the entire or selected electrical load of the home or business. As a result, residential and commercial power storage and supply devices are typically very large and cumbersome. Some power storage and supply devices use alternative energy sources, such as the ones listed above. The power storage and supply devices store the electric power produced by an alternative energy source and may even supply power to a utility power grid, in essence operating as a small, distributed power generation plant. Many local, state, and federal government agencies, as well as private utility companies, are encouraging this practice as evidenced by the changing regulatory environment and passage of such distributed power and energy storage policies as AB970, SB412, SB 14 and AB44. Further, rule makers such as FERC, CASIO, and the CPUC are making priority changes (e.g., CEC Integrated Energy Policy Report, CAISO implementation of FERC Order 719, etc.), which encourage or mandate the use of distributed energy storage and power generation. Unfortunately, the use of alternative energy sources in conjunction with such power storage and supply device systems has been limited primarily because of cost and convenience and communications standards.

In recent years, however, the costs associated with adopting and using alternative energy sources has decreased substantially as distributed energy power and storage technologies have been refined, sales have increased due to the creation of new markets (e.g., plug-in electric hybrid vehicles and the globalized adoption of solar technologies), and more suppliers have entered the market resulting in greater manufacturing capacity and market competitiveness for both photovoltaic and battery manufacturers. The cost barriers to distributed electrical technologies are also eroding due to factors such as real and/or perceived increases in the cost of electricity and other forms of energy, the widespread adoption of time-of-use pricing (TOU) or real-time pricing (RTP) by utilities, favorable terms for the utilities' purchase of power from such distributed sources, and government financial incentives (e.g., The federal business energy investment tax credit available under 26 USC §48 was expanded significantly by the Energy Improvement and Extension Act of 2008 (H.R. 1424), enacted in October 2008, etc.) which encourage investment in distributed and environmentally more benign electrical technologies.

Adoption of distributed energy power and storage technologies is also increasing due to the widespread implementation of an Advanced Metering Infrastructure; commonly referred to as AMI. Advanced metering systems are comprised of state-of-the-art electronic/digital hardware and software, which combine interval data measurement with continuously available remote communications. These systems enable measurement of detailed, time-based information and frequent collection and transmittal of such information to various parties. AMI typically refers to the full measurement and collection system that includes meters at the customer site, communication networks between the customer and a service provider, such as an electric, gas, or water utility, and data reception and management systems that make the information available to the service provider. With AMI utilities are now better able to manage installed devices within the homes of participating consumers that, under utility control, selectively disable energy-consuming devices (e.g., hot water heaters or air conditioning units) in response to peak loading conditions. Furthermore, utilities are now able in certain cases to remotely activate and aggregate distributed power and energy supplies to increase the supply of electricity to constrained parts of the electricity grid.

There has been an increasing emphasis in recent years on energy conservation. Electric utilities have also come under increasing pressure to reduce the need to fire up polluting power plants to serve peak demands, such as during hot summer days. With the enactment of current legislation and rulemaking (e.g., AB970, AB32, and FERC Order 719, etc.), electric utilities also have an incentive to "smooth out" energy demand to minimize the need to install new power transmission and distribution lines; further negating environmental and land use issues. Examples of a few of the ways in which utilities can perform these tasks are referred to as "demand side management" and "supply side management." Demand side management refers to the selective reduction of energy demand in response to peak loading conditions. For example, utilities have for years installed devices in the homes of participating consumers that, under utility control, selectively disable energy-consuming devices (e.g., hot water heaters or air conditioning units) in response to peak loading conditions. As another example, utilities are able in certain cases to remotely activate energy supplies to increase the supply of electricity to parts of the electricity grid. It would be advantageous to provide more sophisticated control mechanisms to permit electric utilities and others to effectively monitor and control distributed energy resources, such as storage units capable of storing electricity and reselling it to the grid on command. It would also be advantageous to provide more sophisticated demand side management tasks using aggregated resources to manage localized constraints on the utility grid (e.g., substation, feeder-line, residence, etc.).

Conventional systems do not configure an energy management system that is placed in part behind the meter (e.g., between the meter and site loads) at a particular site, e.g. a user site, wherein the energy usage and generation at the site can be aggregated, pooled, and dispatched through multiple applications that can be delivered simultaneously to both the utility or grid operator and the site owner or customer. The unique combination of elements in the various embodiments disclosed herein, enable distributed, localized, aggregated, and virtualized control of energy for the electricity industry. The system can deliver power to utilities and energy consumers in ways that maximize avoided costs, ensure energy reliability, and accelerate the integration of renewable energies and electric vehicles.

The remaining barriers to market adoption of distributed power storage and supply devices are convenience. At present there are significant challenges to an individual's or building owner's installation of renewable energy technologies. In typical installations the component parts must be purchased from multiple vendors and integrated in a custom installation. Moreover, buying the component parts requires knowledge of the market for and the technical aspects of the different energy technologies, the construction required to install the technologies in accord with local codes, regulatory requirements, and guidelines imposed by homeowner's association and insurance companies. In addition, if the power generated in excess of requirements on the premise is to be resold, utilities impose additional requirements for connection of such systems to the utility's power grid. Another hindrance to implementing the use of distributed power storage and supply devices is that many local electricians do not yet know how to install the disparate components and frequently make errors in doing so, as much of this technology is new or not widely used. As a result of such errors and/or lack of know-how by the installer, the attendant wiring can be unattractive and intimidating to the buyer and lead to concerns and possibly actual issues regarding safety and reliability in addition to aesthetics. Further, the typical homeowner or business owner is not qualified or certified, and the associated expense too high, to provide adequate battery maintenance or battery replacement. This adds cost to the upkeep of any distributed power storage and supply devices.

The Sunverge Site Integration System ("SIS") combines battery or other storage components in a storage appliance, power electronics, and generation into a highly-optimized appliance apparatus that is remotely managed and controlled by an energy cloud controller, software-as-a-service platform or may be controlled locally by a gateway controller resident in the appliance apparatus or gateway edge controller, depending on network configuration. Appliance apparatus can be deployed anywhere on the grid where needed. Each solar integration system is sized and engineered into a pre-designed apparatus of one or more appliances that may be mechanically coupled into a single site management system, according to the needs of the customer and the site, minimizing the need for expensive custom design of components from multiple vendors.

A software platform controls one or more solar integrated systems to form a site management system for real-time energy and information to the system. The software platform also aggregates systems together in a real-time network for the delivery of aggregated energy and information. Software services pool and dynamically scale energy resources across the grid upon demand. Multiple applications are delivered to multiple customer segments from this single platform. The Renewable Energy Cloud platform, in conjunction with the site management solar integration system enable utilities, energy consumers, and third parties to buy and sell energy each according to their interest. Customers are served by adopting a cloud-services delivery model for energy. Each Sunverge Site Integration System ("SIS") unit provides power generation, power storage, and energy services (via a gateway controller and the Renewable Energy Cloud software platform, Sunverge Site Cloud) at the site where it is deployed. In the physical sense, energy services specific to the customer reside at the local deployment site but in a virtual aspect, the customer's energy services data are partitioned in a customer specific instance of the Sunverge Site Cloud. At the same time, reserve energy from each and every SIS unit under management is pooled in the cloud. From this virtualized pool, customers can reserve energy in advance, and can also request energy in real-time. Remaining available energy reserves, both to third-party aggregators and into open markets for ancillary services.

An energy management system with integrated solar and storage applicable to a home in certain aspects, but it will be appreciated by those of ordinary skill in the art that the energy management system is equally applicable to office buildings and other structures such as warehouses, manufacturing facilities, factories, small-businesses, storefronts, department stores, shopping centers, restaurants, malls, single family or one or more multi-family dwellings and the like. In one configuration, one or more alternate energy sources are connected to a power storage and supply device which is integrated into a pre-existing residential power system. The pre-existing residential power system is connected to a utility power grid, as is common with most residential homes. In another configuration of the system, the alternate energy sources are arrays of photovoltaic cells, which convert sunlight into electricity, which is then sent as DC (direct current) voltage to the power storage and supply device; more specifically, the charge controller.

The photovoltaic cells may be an array manufactured by exemplary manufactures such as BP Solar (a subsidiary of British Petroleum, p.l.c.), Kyocera, Corp., Shell Transport and Trading Company, p.l.c., or SolarWorld USA, and operating normally at 90 VDC with a maximum output capacity at 2.5 kWp. Those skilled in the art will recognize that other multi-voltages, output capacities, and photovoltaic array sizes are contemplated. Other photovoltaic cells produced by other manufacturers and operating at various currents, voltages, and power output capacities may also be used as alternate energy sources. Suitable forms of photovoltaic cells as well as other alternate energy sources (e.g., wind or water-based systems) may also be used. The power storage and supply device also includes energy storage modules such as batteries, fuel cells, or any other suitable type of independent energy storage medium as appreciated by one of ordinary skill in the art.

Further, the power storage and supply device includes a charge controller; one or more energy storage modules; one or more inverters; a electromechanical isolation breaker; a local data processing gateway with data logging capabilities; a home area network (HAN); is Internet compatible; contains a web portal and optionally communicates through an advanced meter infrastructure (AMI), all of which are preferably connected to or contained therein with a single enclosed cabinet, such as the one discussed in more detail below. Furthermore, an Independent service operator and/or Utility Enterprise System may communicate with the energy storage and supply device via the internet user interface. In an embodiment of the present invention each array of photovoltaic cells (acting as the alternate energy source) has a dedicated charge controller, though it is recognized that the charge controllers can be configured in a number of ways appreciable by one of ordinary skill in the art. The charge controller routes the electricity generated by the alternate energy source to one or any number/size of the energy storage modules and the inverters. Alternatively, the charge controller may be controlled by another device, such as the local data processing gateway, which makes this determination. In an embodiment of the present invention, the inverter is a grid tied hybrid PV Schneider Electric XW4548-12/240-60, the charge controller is & Schneider Electric charge controller XW-MPPT60-150, but other suitable charge controllers and inverters may also be used.

Each energy storage model preferably contain a number of batteries, which in turn each contain a number of cells for storing the DC voltage being generated by the alternate energy sources and power from the utility power grid. In an embodiment of the present invention, each energy storage module includes one or more modules and make up what is referred to as a string. However, one of ordinary skill in the art will appreciate various amounts of cells may be included in a module, various amounts of modules may be included in a string and other allocations and configurations of energy storage devices may be utilized in accordance with the present invention. The batteries may be nickel metal hydride (NiMh), nickel-cadmium (NiCd), lithium (Li), lead, pure proton or any other suitable type of battery appreciable by one of ordinary skill in the art. However, other forms of energy storage other than batteries, such as capacitors and flywheels may also be used as energy storage modules.

The inverters separate the DC output voltage into time varying segments to produce an AC (alternating current) power signal, such as a 120/240 split-phase load current, which is typically the current supplied to a house. In an exemplary embodiment of the present invention, one inverter is used hybrid PV Schneider Electric XW4548-12/240-60, but other suitable inverters can also be used.

The electromechanical isolation breaker preferably includes one or more automated switches for dynamically directing the AC power signal from the inverters to a desired load. For example, in the embodiment, the power storage and supply device may be configured to send and receive power from the alternate energy sources or to/from the utility power grid only.

The local data processing gateway monitors and controls most of the processes conducted by the power storage and supply device. The local data processing gateway is a computer-implemented device that may include, for example, one or more processors, a clock, memory, I/O interfaces, analog to digital converters, digital to analog converters, and operating system software. In addition, the local data processing gateway includes a number of software modules for implementing the functionality discussed below. The local data processing gateway can be configured to monitor and control the processes and measurements conducted by the power storage and supply device in either a local or remote mode configuration and can be aggregated by a third party (e.g., independent service operator, etc.) or utility for purposes of dispatching and controlling distributed power or stored energy.

For the communications within a residence or commercial site, the local data processing gateway can further aggregate, monitor and control the processes and measurements via the home area network associated with devices within the home using open standard communication methods at the transport, transport, application and object levels (e.g., ZigBee, HomePlug, Intranet, Web Services, XML-Based, SEP, MMS, and IEC 61850) for user process, measurement, control, and conservation of on premise power generated, the resale of power to a utility via the utility power grid 1516 or advanced meter infrastructure, power generated from energy storage modules, alternate energy sources and devices capable of energy management (HVAC Thermostats, water heaters, pool pumps, etc.) via the home are network or consumer web portal. Further, the local data processing gateway uses open standard communication methods at the transport, application, and object levels (e.g., Internet, GPRS, AMI Network, Web Services, XML-Based, DNP3, IEC 61850) for a utility, aggregator, or independent service operator to broadcast to a residence or commercial building site the processes and measurements relating to the control, management, and conservation of power generated on the premise, the resale of power to a utility, power generated from the energy storage modules and alternate energy sources.

The data collected by the utility console may be used to provide customers with on demand information regarding the consumer's energy usage. Via the SIS consumer webportal utilities may enable individual customer to monitor electrical consumption, alternate energy sources and power storage devices, their estimated savings, and associated environmental impact. Access to the website can be limited to customer having power storage and supply devices. Statistics can be compiled and presented using a web-accessible local data processing gateway controller and Internet to the consumer or utility, visa-a-versus.

For example, a homeowner who wants to ensure that his or her batteries are fully charged before offering any excess capacity to the grid can select a mode via the consumer web portal that prevents diversion by a utility until such charging has been completed. The consumer web portal may reflect this fact by not showing capacity for such units until a future time-for example, an estimated time after which the batteries would be fully charged. If the consumer changes a mode setting, that potential capacity can be promptly reflected back to the utility enterprise system. A homeowner may also prevent the utility from reducing the thermostat beyond a certain point if a certain mode on the consumer web portal has been selected.

In certain arrangements, a computer implemented method including computer-usable readable storage medium having computer-readable program code embodied therein causes a computer system to perform a method of storing excess energy generated in an energy management device in an application platform for performing steps for securing one or more energy storage modules in an energy storage module enclosure that may be provided wherein the energy storage module enclosure is coupled to the inside of a Solar Energy Grid Integrated System with Energy Storage (SUNVERGE SITE SIS) Appliance, and the Solar Energy Grid Integrated System with Energy Storage comprises one or more hybrid inverter/converters, one or more data processing gateways, one or more charge controllers, one or more intelligent battery management systems, and one or more energy management devices in a compact footprint, in some cases suitable for a utility metering infrastructure location with a depth no deeper than what is allowed by an electric utility, to implement steps for connecting one or more energy storage modules to a SIS Site Integration System/Distributed Energy Resource Energy Storage (DER-ES) Apparatus isolation switch panel board, wherein the SIS (DER-ES) isolation switch panel board provides a common integration point for components coupled to the SIS Site Integration System/Distributed Energy Resource Energy Storage (DER-ES) Apparatus appliance; configuring, by the computer system, a local data processing gateway to monitor and control processes and measurements conducted by said energy management device; monitoring, by the computer system, the amount of power generated by one or more distributed energy sources; monitoring, by the computer system, the rate of power generated by the one or more distributed energy sources; controlling, by the computer system, the rate of power stored in said one or more energy storage modules; controlling, by the computer system, the amount of power stored in said one or more energy storage modules; monitoring, by the computer system, the health of one or more energy storage modules; and operating, by the computer system, one or more devices capable of energy management.

In other variations, a method for selling energy back to a utility power grid, comprises steps for providing one or more hybrid inverter/converters; providing one or more data processing gateways; providing one or more charge controllers; providing one or more intelligent battery management systems; providing one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; calculating the amount of available energy storage capacity based upon the current or expected price of power; and implementing the one or more set of rules.

In another arrangement, a computer readable medium for selling energy back to a utility power grid, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for processing the one or more set of rules on an Intelligent Energy Storage Module Management System; program code for managing the one or more set of rules via a multiprotocol data processing communication gateway device communicably coupled to the Energy Storage Module Management System; program code for monitoring the one or more set of rules via a multiprotocol data processing communication gateway device communicably coupled to the Energy Storage Module Management System; and program code for modifying the one or more set of rules via a multiprotocol data processing communication gateway device communicably coupled to the Energy Storage Module Management System, said multiprotocol data processing communication gateway device further communicably coupled to a consumer web portal.

In another configuration, a system for selling energy back to a utility power grid comprises one or more hybrid inverter/converters coupled to an energy storage management system and charge controller module via a data processing gateway such that the data processing gateway implements one or more rule sets for selling energy back to a utility power grid to maximize the selling price of said energy; one or more data processing gateways receiving signals from the energy storage management system and charge controller and sending instructions via processor readable code to implement one or more algorithms; one or more charge controllers electrically coupled to the energy management storage management system to determine requirements for charging and discharging; one or more intelligent battery management systems; one or more energy management devices in a compact footprint not to exceed a depth to fit in a utility workspace in some embodiments and as small as 18" in depth in some arrangements, but larger in other embodiments; one or more memories for storing data; one or more processors capable of executing processor readable code; one or more communications means to send and receive instructions from the data processing gateway, one or more hybrid inverter/converters, charge controllers, energy storage management system, and intelligent battery management system; one or more operating system software systems and related databases; one or more query processing modules; one or more aggregation engines; one or more execution engines; one or more reference generating modules; one or more user interfaces; and one or more algorithm rules.

In yet a further arrangement, a computer implemented method including computer usable readable storage medium having computer readable program code for causing a computer system to perform a method of selling energy back to a utility power grid by sending instructions to implement steps including interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining, by the computer system, price points of power obtained from a utility power grid at which a user will discharge energy stored in an energy storage module; defining, by the computer system, a percentage of maximum capacity of stored energy in one or more energy storage modules that may be discharged in a single cycle; correlating, by the computer system, said price points of power with said percentage of maximum capacity; configuring, by the computer system, said price points and said percentage of maximum capacity into one or more sets of rules; and implementing, by the computer system, the one or more set of rules.

In a further apparatus configuration, a computer implemented apparatus for selling energy back to a utility power grid, is an apparatus that comprises a processor; an input device coupled to said processor; a memory coupled to said processor; an output device; and an execution engine including a method for peak shaving to implement steps for interfacing with one or more Solar Energy Grid integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; and implementing the one or more set of rules.

In another variation of method sets, steps for peak load reduction and energy shaving may be provided, whereby the SIS may reduce incremental transmission and distribution investments for a utility or an independent service operator. For example, the SIS may help relieve localized distribution issues by identifying an overstressed substation or feeder line. Deploying units to 5% of the affected areas may substantially increase reliability of the network. By controlling which loads reconnect to the grid, the utility can stagger the reconnecting loads after brief and extended outages to aSISt with outage recovery management. In addition, units with energy storage capacity can be instructed to discharge immediately after reconnecting the grid to less the impact of loads reconnecting.

Another aspect of one or more of the previous arrangements relates generally to a system for distributed energy storage and power management, and more particularly to a fully integrated system, method, and device for the controlling, monitoring, measuring, and conserving of distributed power generated on the premise, the resale of distributed power to a utility, and power generated from distributed energy storage (e.g., batteries) and other distributed renewable energy sources (e.g., solar panels, wind turbines, renewable energy generation sources, etc.). Moreover, the invention is minimally invasive, modular, and retains power-generating capacity, which is combined with load management and energy storage to provide energy at or near the point of consumption that can be aggregated with other renewable energy integrated systems to form an energy cloud via a centralized software-as-a-service.

Systems and methods for distributed energy services management are also disclosed. An edge gateway system includes a programming platform or environment for receiving command and control data and configuration data from a variety of sources and for dynamically controlling actions and state in a plurality of physical devices connected to the platform via a data communications interface. In a particular embodiment, the data communications interface can be implemented as a Controller Area Network (CAN) bus, Web services, ModBus, or other conventional data communications interface and/or protocol.

In certain aspects, an ecosystem includes a distributed energy storage system (DESS), which includes a site gateway. The DESS represents a system, such as the distributed energy storage and power management system disclosed in the above-referenced previously filed U.S. patent application. In particular, the DESS includes energy storage components module, an inverter, and a charge controller. The gateway can include a system controller. The energy storage components module of DESS represents a battery system for electrical energy storage in some applications but other energy storage components are contemplated in other designs. In one aspect, lithium-ion batteries plus a battery management system may be used. The inverter and charge controller of a DESS can be conventional units, such as the Schneider XW model or other similar equipment. The system controller of the gateway can represent, for example, a standard Linux or proprietary code server that has been extended with a custom input/output (I/O) controller board that allows multiple smart energy components to be plugged in or otherwise electrically connected. One such smart energy component is a CT Sensor system that monitors site energy demand in real-time. The multiple smart energy components can use data communication technologies and protocols, such as WiFi, cellular, Zigbee, etc. Plugging in multiple communication technologies allows each component to integrate and control other distributed energy resources (e.g. electric vehicles, batteries, or other loads) at the site. The DESS components (e.g., the energy storage module, the inverter, and the charge controller) and the gateway (e.g., the system controller) can all be connected via a CAN (Controller Area Network) Bus network or other well-known data communication technologies. Direct integrations with both the inverter/charge controller and the energy storage module give the gateway fine-grained control over those components. The inverter/charge controller and the energy storage module are wired on a common DC bus within the DESS. This enables direct control of energy generation that can be both stored in the batteries (directly as DC, without the efficiency loss of converting to AC) and converted to AC and dispatched to the grid. In certain aspects, the DESS may be designed for ease of installation. Energy generation systems (e.g., solar arrays or other renewable energy generation devices) can be connected to the DESS through a single or multiple DC inputs. The energy grid can be connected to the DESS through a single or multiple AC inputs. This configuration reduces the costs and complexity of the installation process, even in comparison to the installation of a traditional energy generation system.

In other various aspects, an ecosystem includes the site gateway within the DESS. In other aspects, the site gateway can be housed separately from the DES S. The site gateway provides power and energy services at the site where it is deployed. At the same time, reserve energy from the site where the site gateway is deployed and may be pooled in the network cloud. From this 'virtualized' energy pool, customers can reserve energy in advance, and can also request energy in real-time. Operators within the ecosystem can bid any remaining available energy reserves, both to third-party aggregators and into open markets for ancillary services. The site gateway of an example embodiment provides cloud energy services that are constantly working to balance demands by shifting resources to where they are needed most and to optimize how energy is captured and delivered. The ecosystem in certain designs, enables utilities, energy consumers, and third parties to buy and sell energy each according to their unique economic interest. In other aspects, the ecosystem delivers multiple energy services on demand to multiple customers in real time. The site gateway of an example embodiment and its cloud-resident services provider, the site management system, are described in more detail below.

In other various configurations, the site gateway can operate in concert with a site management system, which is accessible to the site gateway via the network cloud. The site gateway is designed to be flexible, and to provide interoperability across and within various technologies and protocols. As described in more detail below, the site gateway automatically discovers local devices, and virtualizes those devices without the use of agents. This configuration lowers the cost and complexity of integrating with other components within the ecosystem. In other aspects, the site gateway is integrated with the DESS. This integration enables the site gateway to directly monitor and control the inverter/charge controller and the energy storage module of the DESS. The combination of the site gateway and the DESS provides a site resident energy management system that is empowered to make intelligent decisions at the local (site) level, yet is controllable via devices through the network cloud as described in more detail below.

A site management system may also be designed as flexible and scalable from the ground up. The site management system may variously provide a base set of services, including: 1) remote management and upgrades of local software running in each site gateway. System health is monitored, and adverse events are captured and reported; 2) remote monitoring of the operational state of the components (physical devices) at the site, and remote metering of the power flows and stored energy at each site. Each site gateway reports its complete set of operational data to the site management system at periodic intervals (e.g., every four seconds, a setting that can be configured); 3) fine-grained control of the charge and dispatch of power at each site. The site gateway receives commands from the site management system at periodic intervals (e.g., every 500 milliseconds, a setting that can be configured) utilizing a pull model; 4) scheduled control of charge and dispatch based on time of day and state of charge in the battery. These site management system services allow the ecosystem to aggregate the power and energy capacity in each and every site gateway at a variety of sites in a distributed community.

The services provided by the site management system and the site gateway enable the ecosystem to maximize the value of each unit of energy dispatched from each site gateway by means of intelligent decision-making at the local (site) level. Unlike conventional centrally-controlled systems, the site management system can delegate many of these intelligent decision-making responsibilities and related site-specific policy implementations to the site gateway. The site gateway can use its own local resources to implement many of the decisions, services, and policies for managing energy consumption and generation both locally and in the ecosystem based upon at least the following inputs: the current cost of energy; the efficiency of internal components (the inverter, the charge controller, the battery, etc.); maximum and minimum charge and discharge rates; energy reserved by other applications; available battery capacity; the marginal cost of each battery cycle, which can change over time and is a complex calculation; load and generation profiles unique to each site; energy demand tariffs at the site; current and forecast weather conditions; historical analysis, predictive modeling, and real-time networked awareness of the entire system; retail and wholesale prices for energy; values for delivery of specific applications such as Demand Response, Regulation, or Power Quality (Volt/VAR); flexible integration of data from multiple channels: direct metered sensor input, utilities and third party systems, integrations with partner applications; and data for capacity pooling, scheduling, and bidding to automate the market interfaces for the site management system services.

In certain aspects, a consumer user interface is provided as a site resource to enable a user to interact with the consumer user interface at the site via a consumer portal and the network. The consumer portal provides a web-enabled presence for monitoring or controlling operational parameters at the site from a consumer device via the network.

In certain various implementations of a platform system, much of the energy management intelligence (in the form of various applications and services) is maintained at the site management system. In other configurations, the site management system may be configured as a central controller for managing a plurality of site gateways. Although the central control architecture may be suitable in some circumstances, many other situations require a more distributed decision-making capability. In some designs, much of the energy management intelligence (in the form of various applications and services) is maintained at the site gateway as a site resident system. In a more distributed architecture, the site management system can push much of the software and rule logic implementing the various applications and services to the site gateway for execution locally at the site. In this distributed system architecture, the site management system acts more as a monitor and command dispatcher, rather than a central controller. Other alternative system architectures can also be implemented wherein the software and rule logic implementing the various applications and services can be split between the site management system and the site gateway. In this alternative system architecture, the site management system implements a portion of each application or service and the site gateway implements the remaining portion of each application or service.

In other aspects, a site gateway, in combination with a site management system, provides a set of Smart Grid applications on top of a software platform. As described generally, these Smart Grid applications can be implemented primarily on a site management system or implemented primarily on a site gateway in other configurations. In other various aspects, these Smart Grid applications may include: Peak Load Shifting, Demand Response, Frequency Regulation, Uninterruptible Power Supply (UPS) Management, Voltage Support and Optimization, Analytics, Demand Charge Reduction, Regulation, Photovoltaic (PV) Smoothing, Reliability, and a variety of other applications. These applications are described in more detail herein. In a particular embodiment, each application can be delivered as a software-as-a-service (SAAS). Each application integrates with utility and third-party systems by means of open, web-based standards, such as Extended Markup-Language (XML) and Web Services and one or more DER-ES apparatus that function as site integration systems. Additionally, all of the monitoring, control, and reporting functions available in the platform can be exposed as a web-services application programming interface (API) available either or both at the site management system and at the site gateway locations. This system configuration has at least two advantages: first, the system configuration provides flexibility and agility to integrate with the broadest possible range of external applications and systems. Secondly, the system configuration allows partners (and customers) to build their own services and applications on top of the platform provided by the various embodiments described herein. Moreover, application-specific protocols, such as OpenADR and DNP3, can be quickly built into platform applications and exposed through one or more platform API's. Additionally, application end-user interfaces can be delivered over conventional Hypertext Transport Protocol (HTTP) and can be viewed on any web-enabled device.

The Smart Grid applications provided by the site management system and the site gateway are deployed to solve real-world problems and deliver value streams to at least two sets of parties: 1) load-serving entities such as utilities, and 2) energy consumers, such as businesses and residential homeowners. Note that one of the advantages of the various embodiments described herein is that multiple applications can be delivered to multiple parties out of the same system. In practice, therefore, deployments of site integration systems and distributed energy storage systems will likely combine two or more applications during standard operations.

The Smart Grid applications can be divided into three categories: 1) applications that generally benefit load-serving entities, 2) applications that generally benefit energy consumers, and 3) applications that generally benefit both sets of parties. The Smart Grid applications listed above are described in more detail below in the context of the benefits provided by the particular applications. For example, applications that generally benefit load-serving entities include the following:

Demand Response. The system responds to Demand Response events with guaranteed dispatch of power to the grid. In cooperation with a Demand-Response Management System (DRMS), site resident systems (e.g., a DESS including a site gateway) can be aggregated as capacity, and that capacity can be dispatched by schedule or real-time command on a per need basis.

Ancillary Services. Through the network cloud, systems are connected to a regional independent service operator (ISO), and the site resident systems respond to regulation signals on a per-second basis. Requests for frequency regulation or up/down ramping are translated into precise charge and dispatch commands by the site gateway.

Voltage optimization. Site resident systems respond to needs for voltage and reactive power control by injecting or absorbing power at the place where it is needed most: nearest to the load. This is one example of why the distributed architecture described above can be so beneficial in managing energy at the local level. Moreover, aggregated systems act as a fleet to provide orchestrated voltage optimization on a given circuit or feeder.

Renewable Generation Smoothing/Firming. Co-location and integration with renewable generation sources—solar, wind, or other—gives site resident systems direct control over the energy produced. By supplementing the intermittent nature of renewable generation with the stored energy in its battery, each site resident system can smooth the energy provided to the grid, making the site and the grid more reliable, more predictable, and more stable. In turn, the negative effects of this intermittency on the grid—thermal overload, voltage swings, and increased emissions due to increase regulation demand—are entirely avoided.

The applications that generally benefit energy consuming entities include the following: Uninterruptible Power Supply. In the event of a loss of power, the site resident system can automatically isolate itself from the grid, and then deliver its own power to the site without any interruption in service or loss in power quality. Site resident systems can be wired to directly support priority loads, thereby providing energy reliability for critical services (e.g., heating, cooling, electronics, etc.).

The applications that generally benefit both load-serving entities and energy consuming entities include the following: Peak Load Reduction, Electric Vehicle Charging Management, Demand Charge Reduction, and Analytics.

Peak Load Reduction. Site resident systems can time-shift energy generated from renewable energy generators and/or drawn from the grid to maximize peak load reduction for a home or business. Through the intelligent processes provided by the various embodiments described herein, over time the system can learn about the specific features and characteristics of the site (e.g., weather patterns, load profiles, etc.) and can make adjustments on its own. If the residence or business is on a time-of-use rate, the system will know how to minimize the cost of energy for that customer by charging batteries when prices are low and dispatching energy when prices are high.

Electric vehicle (EV) Charging Management. Co-Located at the particular site with EV charging stations, the site resident system can dispatch energy to offset demand spikes while EVs are charging, acting as a buffer to the grid. With direct integration to the EV charging platform, the site resident system can determine the optimum charge time while minimizing the cost of electricity to the site. An additional hardware component can enable EV "fast charging" by plugging in directly to the battery within the DESS 116, thereby reducing the total charge time from hours to minutes.

Demand Charge Reduction. For commercial customers that are subject to demand charges, wherein costs are pegged to the maximum amount of power consumption on a monthly basis, the site resident system can monitor real-time demand and dispatch power to ensure the site load does not exceed the specified thresholds.

Analytics. Each site resident system can serve as a supervisory control and data acquisition (SCADA) or sensing node for its site location. Discrete and aggregated data delivered to utilities and grid operators can be used to aSISt with optimizing the operation of the grid to minimize power losses and maximize efficiency and quality across such areas as outage management, system modeling, power quality optimization, advanced distribution management, and other real-time applications. Data delivered to energy consumers show system performance, efficiency, and energy savings.

The site management system or the site gateway can support a set of services on the software platform. In a particular embodiment, these services can include: remote command and control, scheduling, visualization, aggregation, remote management, monitoring, and reporting. The site gateway can include additional services, such as: power control, energy control, system monitoring, command processing, device virtualization, protocol translation, and other services. These additional services can also be provided at the site gateway in the distributed system architecture discussed above. The software environment in which these applications and services are executed on the site gateway is described in more detail below.

The applications and services provided on the site management system and the site gateway may represent an energy management system. This energy management system has some powerful capabilities. For example, the energy management system can monitor the operation of the power electronics inside of each DESS and its corresponding site gateway to ensure the energy system at a particular site is running smoothly. Secondly, the energy management system can report on the power and energy being used and/or generated at the particular site. The reporting can include information indicative of: how much power the renewable power generators are generating, how much energy is stored in each battery, how much power is being provided to the grid and to the loads at the site. This reporting happens in real-time and can be viewed on any network-connected information or communication device from any place in the world. The energy management system can also control the operation of each DESS and its corresponding site gateway, also in real-time. If one unit needs to charge, the energy management system can command that unit to charge. If five units on a certain circuit need to discharge, the energy management system can command those units to discharge. The energy management system of an example embodiment can mix and match these commands in any order, for any combination of devices installed throughout locations on the grid. The energy management system runs a value-optimizing process that makes charge and discharge decisions, for each unit and across multiple units, which exploit the cost and price of energy in and out of the system. The energy management system integrates with existing utility and partner applications and systems by means of open and flexible web services protocols. These remote control capabilities enable the system to have an immediate and powerful impact on the grid. As the number of distributed DESS and corresponding site gateway systems grow, so does the aggregated potential of the entire system.

The Smart Grid applications and services provided by the site management system and the site gateway as described above are deployed to manage energy usage and value given a number of factors in the operating environment. These factors can include the following:

Costs and constraints. The current cost of energy, whether from the grid or from other generation sources, is a starting point. Constraints such as the efficiency of internal components (e.g., the inverter, the charge controller, the battery, etc.), maximum and minimum charge and discharge rates, energy reserved by other applications, and available battery capacity are also factored. Most importantly, the marginal cost of each battery cycle is calculated. Given that battery cycle life changes over time under the influence of usage scenarios and environmental factors, this calculation is complex, yet is required in order to extract the maximum economic value of each cycle throughout the overall life of the battery.

Optimizing factors. Load and generation profiles are each uniquely associated to a specific location. Understanding of the dynamics of these two profiles, combined with the energy tariff at the site (e.g., the variable rates of energy and demand charges levied by the energy provider), determines the exact times when dispatched energy has the most potential value. Historical analysis, predictive modeling, and real-time networked awareness of the entire system contribute to this dynamic understanding.

Prices. Retail and wholesale prices represent the current market value for energy. Values for delivery of specific applications such as Demand Response, Regulation, or Power Quality (Volt/VAR), either drawn from the open market or through negotiated contracts with purchasers, can also be available and represent the highest price paid for energy dispatch. The site resident systems can receive these inputs from multiple channels, direct metered sensor input, process data from utilities and third parties, and integrate with partner applications to configure the operation of a particular site at a particular time depending on the specifics of the site deployment and the current market conditions.

The Smart Grid applications and services provided by the various embodiments described herein can perform a detailed analysis of these and other factors to determine: when, how much, how long, and to or from which resources the site resident system should charge or dispatch energy. The result is that the value of each unit of energy dispatched is maximized, ensuring the maximum possible return on investment over time. In particular, the various embodiments provide several advantages over existing systems. These advantages include the following:

Optimization. The various embodiments enable a user to size and scale the battery, inverter, and power generation system according to the needs of the site in a utility-grade form-factor.

Localization. The site resident system units are strategically placed at the site on the grid where power and energy are most needed.

Aggregation. The capacity of multiple site resident system units is combined and managed as one resource to provide grid-scale impact.

Automation. The software platform in an example embodiment maximizes the value of energy and power services by intelligent and automated charge and dispatch.

Virtualization. The various embodiments can pool available battery capacity into energy resources that can be reserved, allocated, and scaled to meet demand.

Integration. Applications and data are delivered over the web and integrated with external systems by means of open standards.

In other various aspects, the input received by a site gateway of a DESS in some configurations, the site resident system, including site gateway, is an important part of the ecosystem for supporting the applications and services described above. In support of these applications and services, the site gateway may be configured to receive and process command and control, management and configuration data from a variety of sources via the network cloud. In some aspects, these command and control, management and configuration data sources can include the site management system, the DRMS, and third party sources, such as energy monitoring or control systems using browsers or mobile devices. Each of these command and control, management and configuration data sources may need to monitor or control the operation of the energy consumption or generation at a particular site. The DESS and its corresponding site gateway, located at the site, are needed to provide this site-resident support for effecting the monitoring and control commands sent by any of the network-resident command/control and configuration data sources. As described in more detail below, each of these command/control and configuration data commands are received and processed by the site gateway in cooperation with the corresponding DESS.

In other configurations, the DRMS and the third party sources can issue command and control, management and configuration data commands for a particular site via the site management system. The site management system can use a command queue to store and marshal the commands for a particular site and forward the commands to the site gateway at the particular site.

In certain aspects, at periodic intervals (e.g., every four seconds, the interval being a configurable parameter), the site gateway at each site gathers configuration and status data for each of the energy devices at the site. This configuration and status data can be used internally by the site gateway to generate trending data, to assess the operation of the energy devices at the site, to compare the energy consumption and generation at the site with desired thresholds, and to produce a new command set for driving the energy consumption and generation at the site toward desired thresholds. In this manner, the site or device status report provides a feedback loop for enabling the site gateway to manage energy consumption and generation at the local level. In addition, the site gateway can generate a site or device status report that can be sent to the site management system via the network cloud. The site management system can use the site or device status report from each site to generate aggregated trending data, to assess the operation of the energy devices at a community of sites, to compare the energy consumption and generation at the community of sites with desired thresholds, and to produce new command sets for driving the energy consumption and generation at particular sites toward desired thresholds. In this manner, the site or device status report provides a feedback loop for conveying site status to the site management system. In response to this feedback, the site management system may issue a new set of command and control, management and configuration data commands to the site gateway at the site. Note also that the feedback received by the site management system from the site via the site or device status report may include a new site device configuration or status driven by commands issued by the DRMS or third party sources. In this manner, the site management system can monitor the operation of the site as controlled by a third party command source. Thus, in a variety of ways and from a variety of sources, the site gateway can receive command and control, management and configuration data command sets via the network. The processing of these command sets at the site gateway is described next.

In some aspects, the internal processing structure of a site gateway includes a programming platform or environment for receiving command and control data and configuration data commands from a variety of sources and for dynamically controlling actions and state in a plurality of physical devices at a particular site and connected to the platform via a data communications interface. In some configurations, the data communications interface connecting one or more physical devices to the site gateway can be implemented as a Controller Area Network (CAN) bus, Web services, ModBus, or other conventional data communications interface and/or protocol.

The site gateway in some configurations can process the received command sets in at least two different ways or using at least two different processing paths. In a first processing path, the site gateway can use one or more executor modules of a set of executor modules running at a command virtualization layer to activate one or more virtual device(s) at a device virtualization layer. The activated virtual device(s) can control corresponding physical devices. In a second processing path, the site gateway can use one or more executor modules of the set of executor modules running at the command virtualization layer to activate one of a plurality of programs or platform application (apps). The programs can each implement a mode or policy in the set of virtual devices at the device virtualization layer. The activated program can then activate the one or more virtual device(s), which can control corresponding physical devices.

In the first processing path described above, a set of command channels is provided on the site gateway platform to receive command and control, management and configuration data command sets from third party command sources via the network. The command sets contain commands for driving modes, actions, and device state in one or more physical devices represented by a plurality of corresponding virtual device modules or virtual devices. The command channels can provide an input port for commands in a particular format or protocol. As such, in some aspects, different command channels can handle different formats or protocols. One or more command channels are processed by one or more command translators or command drivers that convert the various formats or protocols to a virtualized command in a common command format. The common command format can be used by one or more executor modules of a set of executor modules running at the command virtualization layer. The executor modules, operating in response to an input command, can cause execution of one or more virtual device(s) at the device virtualization layer. The one or more virtual device(s) at the device virtualization layer correspond to the physical devices at the particular site under control of the site gateway. Thus, commands that are received by the site gateway can be processed by the platform of site gateway to cause the execution of one or more virtual devices at the device virtualization layer to drive a corresponding physical device to a desired state, to query the state of a corresponding physical device, or to set configuration parameters in a corresponding physical device. In some configurations, there can be multiple executor modules at the command virtualization layer. The executor modules are typically command specific; however, a single command can be handled by multiple executor modules.

In other aspects, the virtual devices at the device virtualization layer can use corresponding device drivers and a physical device layer to translate common format commands to control signals for driving a particular type of physical device to a desired state. The virtual device can also collect status information from the physical device via corresponding device drivers for transfer to the network cloud as part of a site or device report as described above. The virtual device(s) can communicate with the corresponding physical devices via the physical device layer and a data communications interface (e.g., the CAN bus, Web service, ModBus, or equivalent). In a particular embodiment, each virtual device at the device virtualization layer can execute other virtual devices. As a result, the set of virtual devices at the device virtualization layer can be executed in a hierarchical fashion.

In other aspects of a second processing path as described above, the set of command channels is provided on the site gateway platform to receive command and control, management and configuration data command sets from third party command sources via the network. As described above, one or more command channels are processed by one or more command translators or command drivers that convert the various formats or protocols to a virtualized command in a common command format. The common command format can be used by one or more executor modules of a set of executor modules running at the command virtualization layer. The executor modules, operating in response to an input command, can cause execution of one or more programs or platform application (apps). In other various aspects of the platform of site gateway, configurations may include a plurality of programs or platform application (apps), which are installable and configurable on the platform of a site gateway. The programs can each implement a mode or policy in the set of virtual devices at the device virtualization layer. Programs can interact directly with the virtual devices. Each program can cause one or more corresponding virtual device(s) to implement the corresponding mode. The execution of a particular executor module in response to an input command can trigger the activation of a corresponding program. Similarly, the activation of a virtual device can trigger the activation of a corresponding program. The activation or deactivation of particular programs can also be configured to occur on a periodic, timed, or scheduled basis. As a result, programs can be used on the platform to implement particular modes or policies in one or more virtual devices. The programs can each be assigned a configurable unique priority relative to other programs. As a result, an action by a lower priority program can be preempted by a higher priority program. In general, however, one or more programs is scheduled for execution in priority order. By providing a prioritized set of programs on the platform, some configurations can conveniently and dynamically change the operation of the energy management system at the site gateway. For example, particular programs can be used to configure the physical devices to operate in an energy-conserving manner during a time when grid power costs are high. When grid power costs decrease below a configured threshold, a new set of programs can be dynamically activated to configure the physical devices to operate in an energy-storage or energy-generation mode.

In addition, in other aspects, each program can also be associated with a particular external entity, or a combination thereof. For example, a program can be associated with a consumer, a site owner, a unit operator, a utility, a component supplier, or other external entity or a combination thereof. As a result, the set of programs operating on the platform of site gateway, and the collective operational activity of these programs, can be grouped by the associated external entities. Thus, modes or policies can be applied to the operation of the physical devices based on an associated external entity.

Each program can implement a mode or policy in the set of virtual devices using any of a variety of available program models. For example, one or more available program models can include: an override process, a sequence, a timeline, a schedule, or other program model. It will be apparent to those of ordinary skill in the art that many other program models can be provided and used. In an example embodiment, the override process sends control commands to the corresponding set of virtual devices for commanding the virtual devices to transition immediately to the specified state. The sequence process initiates a serial set of actions based on a relative time from an initial starting point in time. The set of actions include commanding the virtual devices to transition to specified states. The timeline process initiates a set of actions based on a clock/calendar time. The schedule process can include a rules engine for executing a set of conditional actions based on the state of the platform and the virtual devices at the time of execution. Each program can obtain information on the configuration and actions of other programs on the platform. As a result, overlapping, duplicative, or conflicting actions can be avoided.

Each virtual device can report state parameters, operational history, errors, configuration parameters, and the like to the site gateway and the site management system via the device or status report and the network cloud. The data from each virtual device can be aggregated in the device/status report, which can be delivered or requested periodically (e.g., every five minutes) from the site gateway platform. The site gateway and the site management system can include a user interface (UI) to interact with authorized users who can manipulate the configuration of virtual devices and/or programs on the site gateway via the user interface. Alternatively, a network-accessible consumer portal can be provided and used with a consumer user interface or mobile device to enable authorized users to manipulate the configuration of virtual devices and/or programs on the site gateway. The site management system can also include an application programming interface (API) server to receive API requests from other network systems. The commands received from the UI or the API can be queued in a server command queue. The site management system can deliver commands to the site gateway platform via the command input mechanism described above. The site management system can also update the data shown via the UI based on current data received from the site gateway platform in the site or device reports.

In an alternative example of a distributed energy services management system, a host site includes the site management system as described above. In a particular configuration, the host site may also include a web server having a web interface with which users may interact with the host site via a user interface or web interface. The host site may also include an application programming interface (API) with which the host site may interact with other network entities on a programmatic or automated data transfer level. The API and web interface may be configured to interact with the site management system either directly or via an interface. The site management system may also be configured to access and use a data storage device either directly or via the interface.

In an another example, the system of one embodiment is configured to: receive a command stream from a network-based energy management system; perform command virtualization on the received command stream; identify one or more devices corresponding to the virtualized command stream; activate one or more platform apps (e.g., programs) corresponding to the identified devices; and use the one or more platform apps (e.g., programs) to virtualize the identified devices, to identify corresponding device drivers, and to configure physical devices corresponding to the virtualized devices.

In certain aspects, a machine in the example form of a computer system within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital ASIStant (PDA), a cellular telephone, a web appliance, a Home Network consumer appliance with an embedded logic on a chip or software, or any such device implemented via the Internet-of-Things technology (IoT), a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

An exemplary computer system may include a data processor (e.g., a central processing unit (CPU), a graphics processing unit (GPU), or both), a main memory and a static memory, which communicate with each other via a bus. The computer system may further include a video display unit (e.g., a liquid crystal display (LCD) or a cathode ray tube (CRT)). The computer system may also include one or more input devices (e.g., a keyboard), a cursor control device (e.g., a mouse), a disk drive unit, a signal generation device (e.g., a speaker) and a network interface device.

An exemplary disk drive unit may include a non-transitory machine-readable medium on which is stored one or more sets of instructions (e.g., software) embodying any one or more of the methodologies or functions described herein. The instructions may also reside, completely or at least partially, within the main memory, the static memory, and/or within the processor during execution thereof by the computer system. The main memory and the processor also may constitute machine-readable media. The instructions may further be transmitted or received over a network via the network interface device. While the machine-readable medium is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In certain aspects of one or more configurations, a set of command channels is provided on an Energy Cloud software platform to receive commands for driving modes, actions, and device state in one or more physical devices represented by a plurality of corresponding virtual device modules or virtual devices. The command channels can provide an input port for commands in a particular format or protocol. Different command channels can handle different formats or protocols. One or more command channels are processed by one or more command translators that convert the various formats/protocols to a common format that can be used by one or more executor modules of a set of executor modules to cause execution of one or more corresponding virtual device(s). In an example embodiment, there are multiple executor modules. The executor modules are typically command specific; however, a single command can be handled by multiple executor modules.

In other various aspects of one or more of the configurations previously described previously, a virtual device acts like a device driver to translate common format commands to control signals for driving a particular type of physical device to a desired state. The virtual device also collects status information from the physical device for transfer to the network cloud as part of a device report. The virtual device(s) can communicate with the corresponding physical devices via the data communications interface (e.g., the CAN bus, Web service, ModBus, or equivalent). Each virtual device can execute other virtual devices. As a result, the set of virtual devices can be executed in a hierarchical fashion.

In certain aspects, a Sunverge Site Energy Cloud software platform can include one or more programs, which are installable and configurable on the platform. The programs can each implement a mode or policy in the set of virtual devices. Programs interact directly with the virtual devices. Each program can cause one or more corresponding virtual device(s) to implement the corresponding mode. The programs are each assigned a unique priority relative to other programs. An action by a lower priority program can be pre-empted by a higher priority program. One or more programs are scheduled for execution in priority order.

Each program associated with a Sunverge Site Energy Cloud software platform can be assigned to a specified portion of a resource, such as a battery. For example, a program (e.g., Program A) can be assigned to a 40% portion of a battery. Given this assignment, the actions of other programs cannot affect the 40% of the battery assigned to Program A. If a resource is not fully allocated (e.g., 40% is assigned to Program A and 10% is assigned to Program B), any program can use the unallocated capacity of the resource. As a result, if Program A is assigned 40% of the battery and Program B is assigned 10% of the battery, Program A can affect 90% of the battery (e.g., 40% assigned to Program A plus the unassigned 50%), Program B can affect 60% of the battery (e.g., 10% assigned to Program B plus the unassigned 50%), and other programs can only affect the unassigned 50% of the battery. Moreover, a particular embodiment is further configured to enable assignment or reservation of the individual capacities of a resource. For example, a particular resource, such as a battery, may have a charge capacity and a discharge capacity. An example embodiment can be configured to enable a particular program, such as Program A, to reserve a portion (e.g., 40%) of the discharge capacity of the resource, but separately none (or some, or all) of the charge capacity of the resource. This feature of the example embodiment allows for a program to reserve a portion of the discharge capacity of a resource, while allowing other programs to separately reserve a portion of the charge capacity of the resource. The interaction between programs with resource capacity reservations is implemented in the same manner as the interaction between programs with resource reservations as described above. The partial resource and resource capacity allocation feature of an example embodiment enables the scope of program operation to be configurable and controllable.

Each program of the Sunverge Site Energy Cloud software platform can also be associated with a particular external entity, or a combination thereof. For example, a program can be associated with a consumer, a site owner, a unit operator, a utility, a component supplier, or other external entity or a combination thereof. As a result, the set of programs on the platform, and their collective operational activity, can be grouped by the associated external entities.

Each program of the Sunverge Site Energy Cloud software platform can implement a mode or policy in the set of virtual devices using any of a variety of available program models. For example, one or more available program models can include: an override process, a sequence, a timeline, or a schedule. It will be apparent to those of ordinary skill in the art that many other program models can be provided and used. In the example embodiment, the override process sends control commands to the corresponding set of virtual devices for commanding the virtual devices to transition immediately to the specified state. The sequence process initiates a serial set of actions based on a relative time from an initial starting point in time. The set of actions include commanding the virtual devices to transition to specified states. The timeline process initiates a set of actions based on a clock, calendar time. The schedule process can include a rules engine for executing a set of conditional actions based on the state of the platform and the virtual devices at the time of execution. Each program can obtain information on the configuration and actions of other programs on the platform. As a result, overlapping, duplicative, or conflicting actions can be avoided.

In other aspects, each virtual device can report state parameters, operational history, errors, configuration parameters, and the like to a server via the platform and a network cloud. The data from each virtual device can be aggregated in a device report delivered or requested periodically (e.g., every five mins.) from an edge gateway platform. The server can include a user interface (UI) to interact with users who can manipulate the configuration of virtual devices via the user interface. The server can also include an application programming interface (API) server to receive API requests from other network systems. The commands received from the UI or the API can be queued in a server command queue. The server delivers commands to the edge gateway platform via the command queue described above. The server also updates the data shown via the UI based on current data received from the edge gateway platform in the device reports.

By virtue of the processing power made available at the edge gateway, the embodiments disclosed herein provide a system that can move a high degree of the system intelligence and decision-making to the remote sites where the energy is being used and generated. As a result, the various embodiments can rely less on a central control architecture and can react more quickly and efficiently to real-time changes and events at the remote site.

In certain aspects, an energy ecosystem represents a cloud-services delivery model for energy. The ecosystem in which the example embodiments are implemented includes a site including a set of site resources. The site can correspond to a residential or commercial location at which various site loads are provided. Site loads correspond to various devices or systems at the site that consume or store electrical energy at various levels. For example, site loads can correspond to electrical heating devices, air conditioners, computing or communications equipment that consumes electrical energy, washers/dryers, pool filtering equipment, electrical vehicle chargers, manufacturing equipment, and other electrical system loads at a particular site. The site resources also include a conventional smart meter that tracks and wirelessly transmits electrical energy usage information to a utility having various utility resources. A conventional smart meter is typically an electrical meter that records consumption of electric energy in intervals of an hour or less and communicates that information at least daily back to the utility for monitoring and billing purposes. Smart meters enable two-way communication between the meter and the central system at the utility. Such two-way communication can be enabled by an advanced metering infrastructure (AMI) that differs from traditional automatic meter reading (AMR) in that it enables two-way communications with the meter. One utility resource is an AMI head end that receives and processes the electrical energy usage information received from the smart meter at the site. Another utility resource is a demand/response management system (DRMS) that can provide a centralized mechanism for managing the demand and supply of electrical energy to a community of sites, such as the site with site resources.

The SIS site integration system/Distributed Energy Resource Energy Storage (DER-ES) Apparatus is designed in such a way as to be located outside of a residence or commercial structure and to be of a form factor that coincides with electric and gas utility working space (siting) requirements. In some embodiments, the utility working space is a compact footprint of less than 42 inches in depth when the SIS site integration system/Distributed Energy Resource Energy Storage (DER-ES) Apparatus door is open, and less than 18 inches in depth when the door is closed. Furthermore, in some further embodiments the enclosure is no wider than 24 inches. Additionally, in other embodiments, multiple enclosures being 18 inches deep and 24 inches wide can be mechanically, electrically and digitally coupled together. The enclosure door, when in the open position, is made to be removable without the necessity of any tools. In other aspects, a tamper-resistant design is additionally provided to restrict non-authorized personnel from opening the enclosure. In other aspects, the SIS site integration system/Distributed Energy Resource Energy Storage (DER-ES) Apparatus provides means of convection and forced cooling via the strategic placement of covered/louvered vents on the rear of the enclosure in one aspect or forced air cooling methods, such as fans, in other designs. In some aspects, the vent locations are designed to coincide with the forced air exhaust ports on the inverter/converter and charge controller. The inverter/converter (or hybrid inverter/converter) has the capability of converting DC to AC and AC to DC). The strategic placement and air tunneling and channeling provided by the isolation breaker panel, inverter mounting offset from the back of the enclosure and the enclosure, inverter, and converter vertical airflow channels provide additional exothermic cooling of the electronic and energy storage equipment. In other aspects, the enclosure may be fan cooled.

In another configuration, the SIS site integration system/Distributed Energy Resource Energy Storage (DER-ES) Apparatus is free-standing. The SIS site integration system/Distributed Energy Resource Energy Storage (DER-ES) Apparatus is not required to be fastened to the side (vertical plane) of the residential or commercial structure. In some embodiments, the enclosure additionally provides a connection ambidextrous conductor termination point which can be located on either side of the enclosure via watertight escutcheon plates containing electrical connections to renewable energy generation sources, including but not limited to photovoltaic solar panel power sources, wind turbines and utility electricity provided by the grid or the Sunverge Cloud renewable energy pooled resources, the Sunverge Cloud Controller, one or more customer loads, and one or more electric vehicle charging stations. The SIS site integration system/Distributed Energy Resource Energy Storage (DER-ES) Apparatus top is uniquely sloped to prevent the accumulation of water or other liquids thereby extending the enclosure life and facilitating cooling. In other aspects, the enclosure includes a weather resistant design which prevents liquids and dust from entering the enclosure. In certain aspects the enclosure may include a unique enclosure rain gutter interface with a weather-stripping material, designed such that the contact surface area between the weather strip material and the rain gutter is minimal that helps to prevent weather strip failure caused by adhesion to the mating surface.

The SIS site integration system/Distributed Energy Resource Energy Storage (DER-ES) Apparatus includes a separate battery enclosure housed within the SIS site integration system/Distributed Energy Resource Energy Storage (DER-ES) Apparatus which utilizes security fastening means to prevent removal of the battery enclosure from non-authorized personnel. The battery enclosure is designed so that most battery chemistry and energy storage means can be accommodated. Energy storage means such as flooded lead-acid, AGM lead-acid, Lithium ion chemistries, pure proton, and nickel cadmium chemistry batteries and storage means can be accommodated and additionally contained in the fire resistant explosion protective energy storage assembly sub-enclosure. In certain aspects, the SIS site integration system/Distributed Energy Resource Energy Storage (DER-ES) Apparatus energy storage enclosure provides means for connecting the battery to the inverter via a bus bulkhead means which provides electrical insulation means to isolate the high current bus from personnel. In other aspects, the battery sub-enclosure further provides a battery management intelligent electronics module and telemetry equipment while providing means to isolate battery disconnecting switches and associated conductors. In other various aspects, the battery sub-enclosure additionally includes communications connection bulkhead means allowing a battery management system to communicate to the site data processing gateway, inverter and charge controller. The battery sub-enclosure also provides means for cross ventilation and convection cooling of the battery. In one aspect, the cooling means is venting grid ports. In other aspects, cooling means may be provided by louvers or fans. In certain aspects, the battery enclosure may be removed via a removal dolly tool that interacts with louvers integrated into the battery enclosure to install or remove the battery enclosure as needed.

The SIS SITE Integration System/Distributed Energy Resource Energy Storage (DER-ES) Apparatus and isolation switch panel board is uniquely designed to provide a common integration point for the inverter, utility grid, photovoltaic power, battery isolation switches and electric overload breaker conductors, charge controller and communications data processing gateway as a single subassembly which facilitates ease of assembly while utilizing solid copper bus to reduce space requirements need for flexible, insulated conductors. The isolation switch panel board additionally protects and inhibits authorized personnel from contacting electrically energized components.

The SIS Site Integration System/Distributed Energy Resource Energy Storage (DER-ES) Apparatus appliance provides a multiprotocol data processing communication gateway device which receives and logs a plurality of telemetry data from the intelligent battery management system, intelligent charge controller, intelligent inverter/converter, and Home Are Network (HAN) appliances and electrical loads and corresponds locally stored control algorithms and remotely received control parameters to the individual or aggregated SIS Site Integration System/Distributed Energy Resource Energy Storage (DER-ES) Apparatus devices.

The inverter/converter is installed into the SIS site integration system/Distributed Energy Resource Energy Storage (DER-ES) Apparatus by means of pre-inserted studs and a specially design mounting rail attached to the SIS site integration system/Distributed Energy Resource Energy Storage (DER-ES) Apparatus which allows the inverter to be easily assembled or removed as may be required for repairs. The Sis Site Integration System/Distributed Energy Resource Energy Storage (DER-ES) Apparatus appliance is designed to allow additional battery modules and or SIS Site Integration System/Distributed Energy Resource Energy Storage (DER-ES) Apparatus devices to be connected in series or in parallel.

The initial focus on this technology is directed towards systems, methods, and devices for integrating distributed energy sources, energy storage, and balance of system components into a single integrated apparatus with general overall systems and control for monitoring, measuring, and conserving power generated on the premise, the resale of power to a utility, power generated from distributed energy storage (e.g., batteries such as flooded lead-acid, AGM lead-acid, Lithium ion chemistries, sodium-sulfur, sodium/nickel-chloride, pure proton, nickel metal hydride, and nickel cadmium chemistry batteries, capacitors and flywheels) and distributed energy sources (e.g., solar panels or wind or water-based systems). Moreover, the device is minimally invasive, modular, and retains power-generating capacity, which is combined with load management and energy storage to provide energy at or near the point of consumption. In some aspects, the single integrated apparatus may be in a common enclosure designed to be located in a utility working space. In other aspects, the integrated apparatus may include multiple enclosures and communications means for one or more remote network nodes.

In another aspect, a local data processing gateway device is located inside the cabinet and is configured to monitor and control the processes and measurements conducted by the power storage and supply device in either a local or remote mode configuration and can be aggregated by a third party (e.g., independent service operator, etc.) or utility for purposes of dispatching and controlling distributed power or stored energy. Further, the local data processing gateway uses open standard communication methods at the transport, application, and object levels (e.g., Internet, GPRS, AMI Network, Web Services, XML-Based, DNP3, IEC 61850) for a utility, aggregator, or independent service operator to broadcast to a residence or commercial building site the processes and measurements relating to the control, management, and conservation of power generated on the premise, the resale of power to a utility, power generated from energy storage (e.g., batteries such as flooded lead-acid, AGM lead-acid, Lithium ion chemistries, sodium-sulfur, sodium/nickel-chloride, pure proton, nickel metal hydride, and nickel cadmium chemistry batteries, capacitors and flywheels), and distributed energy sources (e.g., solar panels or wind or water-based systems). For the communications within a residence or commercial site, the local data processing gateway can further aggregate, monitor and control the processes and measurements associated with devices within the home using open standard communication methods at the transport, application and object levels (e.g., ZigBee, HomePlug, Intranet, Web Services, XML-Based, SEP, MMS, and IEC 61850) for user process, measurement, control, and conservation of on premise power generated, the resale of power to a utility, power generated from energy storage (e.g., batteries such as flooded lead-acid, AGM lead-acid, Lithium ion chemistries, sodium-sulfur, sodium/nickel-chloride, pure proton, nickel metal hydride, and nickel cadmium chemistry batteries, capacitors and flywheels), distributed energy sources (e.g., solar panels or wind or water-based systems), and devices capable of energy management (HVAC Thermostats, water heaters, pool pumps, etc.). In other aspects, the local gateway controller may communicate with an edge gateway controller. In other various aspects, the local gateway controller may be networked with one or more other gateway controllers, one or more edge gateway controllers, and one or more energy resources in a virtual energy pool.

In another configuration, a solar integrated energy management apparatus is made of a power storage supply apparatus enclosure, a power storage and supply device coupled to an electromechanical isolation breaker that is integrated to one or more alternate energy sources and one or more energy storage modules, one or more inverters coupled to a charge controller, a charge controller coupled to one or more inverters and to one or more energy storage modules, a local data processing gateway coupled to the charge controller, and one or more energy storage modules coupled to an energy storage module storage enclosure containing a battery management system and electrical bus that is connected to one or more battery cable terminals to a main bus and in which the main bus is coupled to the charge controller.

In another arrangement, an integrated energy management apparatus includes a power storage and supply device coupled to an electromechanical isolation breaker that is integrated to one or more alternate energy sources and one or more energy storage modules and that the electromechanical isolation breaker is capable of communicating with one or more alternate energy sources; one or more inverters coupled to a charge controller; a charge controller coupled to the one or more inverters and to one or more energy storage modules; a local data processing gateway coupled to the charge controller; one or more energy storage modules coupled to an energy storage module storage enclosure containing a battery management system and electrical bus where the electrical bus is connected to one or more battery cable terminals to a main bus coupled to the charge controller; a consumer web portal; an Internet user interface including an application programming interface coupled to a database repository, a display, and a utility enterprise database application; and an energy area network that couples the Internet user interface and utility enterprise database application to one or more user devices and appliances.

In another aspect, an Intelligent Energy Storage Module Management System includes a tamper resistant energy storage enclosure housed within an intelligent energy storage module management enclosure with security fastening means, in which the tamper resistant energy storage enclosure includes means for connecting one or more energy storage devices to a hybrid inverter/converter via a solid copper bus bulkhead apparatus which further includes an electrically insulated escutcheon means and associated cover to isolate a high current bus conductor from service personnel; a means to house one or more energy storage module management intelligent electronics and telemetry equipment within the intelligent energy storage module management enclosure while simultaneously isolating one or more energy storage disconnecting switches and associated conductors; a communications connection bulkhead means housed within the intelligent energy storage module management enclosure that allows the Intelligent Energy Storage Module Management System to communicate to a data processing gateway, hybrid inverter/converter and charge controller; one or more venting grid ports located on the intelligent energy storage module management enclosure adjacent to one or more energy storage modules, in which the one or more venting grid ports cross ventilate and convection cool one or more of the one or more energy storage modules; one or more components of the energy storage module management intelligent electronics and telemetry equipment communicably coupled to a multiprotocol data processing communication gateway device to provide telemetry data to implement one or more processes to integrate with an Energy Area Network (EAN); and the Energy Area Network (EAN) communicably coupled to one or more appliances and electrical loads to aggregate locally stored control algorithms and remotely received control parameters.

In another aspect, a method for monitoring energy consumption, comprises steps for providing one or more hybrid inverter/converters, wherein the one or more hybrid inverter/converters are communicably coupled to one or more charge controllers and wherein the one or more hybrid inverter/converters are further electronically coupled to an electrical bus; providing one or more data processing gateways, wherein the one or more data processing gateways are communicably coupled to one or more charge controllers and to one or more intelligent battery management systems; providing one or more charge controllers; providing one or more intelligent battery management systems coupled to one or more energy management devices; providing one or more energy management devices in a compact footprint; associating an energy management device with a consumer unit, said energy management device having a local data processing gateway device communicably coupled to the energy management device; configuring said local data processing gateway to monitor and control processes and measurements conducted by said energy management device; receiving and logging a plurality of telemetry data from one or more intelligent battery management systems; receiving and logging a plurality of telemetry data from one or more intelligent inverter/converters; receiving and logging a plurality of telemetry data from one or more energy storage modules; receiving and logging a plurality of telemetry data from a charge controller; and viewing one or more telemetry data by accessing a consumer web portal.

In another aspect, a method for providing wholesale energy services, comprises steps for providing one or more solar integrated energy management apparatus; retrieving telemetry data from one or more energy storage modules to calculate an amount of available stored energy; applying the amount of available stored energy to offset a need to purchase and install one or more new electricity generating means; using the amount of available stored energy to reduce generation marginal cost, wherein said generation marginal cost comprises a cost of fuel and a cost for variable maintenance; using the amount of available stored energy to reduce generation capacity cost, wherein said generation capacity cost comprises one or more costs incurred in increasing generation capacity; using the amount of available stored energy to provide one or more rapid response energy storage modules; wherein the rapid response energy storage modules can provide regulation of the amount of available stored energy while charging and while discharging; using the amount of available stored energy to provide one or more electric supply reserve capacities, wherein the one or more electric supply reserve capacities reduce the need and cost for one or more other electric reserves; using the amount of available stored energy to reduce one or more users' electricity time-of-use (TOU) costs; using the amount of available stored energy to reduce one or more users' electricity real-time-price (RTP) energy costs; using the amount of available stored energy to reduce one or more end users' power draw on one or more utilities during times when electricity use is high; and reducing one or more demand charges from one or more utilities by storing energy in one or more energy storage modules at one or more times when low or no demand charges apply. In certain aspects, a load shaping service may include steps to include load shaping schedule requests from one or more external applications. In other aspects, the method for wholesale energy services may include one or more steps for virtual power plant orchestration, load shaping services and steps for accepting emergency, on-demand load control requests. In other aspects, the method for providing wholesale energy services may include steps wherein providing a virtual power plant orchestration load shaping service corresponds to one or more event awareness services in an energy resources cloud. In other aspects, the method may include steps wherein providing the virtual power plant orchestration includes iterative scheduling of one or more distributed demand sources that correspond to one or more wholesale energy services in a user partitioned virtual energy resources cloud.

In another configuration, a computer readable medium for peak shaving, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for connecting an energy management system with integrated alternate energy source and energy module storage to a utility grid; program code for monitoring energy demand on said utility grid; program code for calculating an amount of maximum energy that said energy grid can deliver; program code for determining a threshold energy demand on the grid, wherein said threshold energy demand begins to stress one or more components of said utility grid; program code for identifying one or more time periods when the threshold energy demand is met, whereupon identification said energy management system with integrated alternate energy source and energy module storage sends power generated by one or more alternate energy sources to the utility grid; and program code for sending energy to the utility grid until said energy demand falls below said threshold energy demand.

In another arrangement, a site integration system apparatus for energy management services comprises a tamper resistant enclosure housing one or more devices for performing localized and remote control energy management, one or more energy storage modules in one or more intelligent storage appliances for storing and dispatching locally generated renewable energy, one or more distributed energy management systems to control one or more user site loads and to orchestrate one or more distributed resources to simultaneously monitor user site and grid requirements, one or more intelligent edge gateway controllers aggregating the site and grid requirements of the one or more distributed resources, an energy cloud software platform communicating with the one or more intelligent edge gateway controllers to send and receive the site and grid requirements of the one or more distributed resources, one or more predictive analytic software modules to improve performance of the one or more distributed resources, one or more intelligent battery charge controller providing multi-point solar panel tracking ability, an isolation switch panel board, one or more termination points for solar array energy input and electric utility interconnection, one or more virtual power plant modules to provide a best mix selection from demand and supply data simultaneously communicated by the grid and user site, and one or more user interfaces to provide a local user grid access interface and a consumer portal.

In one arrangement, a method for providing home energy management, comprises steps for providing one or more solar integrated energy management apparatus; using a plurality of telemetry data from one or more energy storage modules to calculate an amount of available stored energy; making one or more electric energy buy-low/sell-high transactions, wherein energy from a utility is purchased at a low price and stored in said one or more energy storage modules and wherein the available stored energy is sold back to the utility at a price higher than the low price; increasing the amount of available stored energy via one or more renewable energy sources; using an amount of available stored energy provided by one or more renewable energy sources at a later time when the cost of energy sold by one or more utilities is more expensive than the cost of said available stored energy provided by one or more renewable energy sources; using the amount of available stored energy to improve electric service reliability associated with one or more power outages such that one or more end users have reduced losses associated with the one or more power outages; and using the amount of available stored energy to reduce financial losses associated with one or more power anomalies.

In another arrangement, a method for providing home backup, comprising steps for providing one or more solar integrated energy management apparatus; using a plurality of telemetry data from one or more energy storage modules to calculate an amount of available stored energy; making one or more electric energy buy-low/sell-high transactions, wherein energy from a utility is purchased at a low price and stored in said one or more energy storage modules and wherein the available stored energy is sold back to the utility at a price higher than the low price; using the amount of available stored energy to improve electric service reliability associated with one or more power outages such that one or more end users have reduced losses associated with the one or more power outages; and using the amount of available stored energy to reduce financial losses associated with one or more power anomalies.

In another configuration, a system for monitoring energy consumption, comprises one or more hybrid inverter/converters; one or more data processing gateways; one or more charge controllers; one or more intelligent battery management systems; one or more energy management devices in a compact footprint; one or more memories for storing data; one or more processors capable of executing processor readable code; one or more communications means; one or more databases; one or more query processing modules; one or more aggregation engines; one or more execution engines; one or more reference generating modules; one or more user interfaces; and one or more algorithm rules.

In another arrangement, a computer implemented method including computer usable readable storage medium having computer readable program code embodied therein for causing a computer system to perform a method of monitoring energy consumption, comprises steps for interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; associating an energy management device with a consumer unit, said energy management device having a local data processing gateway device communicably coupled thereto; configuring said local data processing gateway to monitor and control processes and measurements conducted by said energy management device; receiving and logging a plurality of telemetry data from one or more intelligent battery management systems; receiving and logging a plurality of telemetry data from one or more intelligent inverter/converters; receiving and logging a plurality of telemetry data from one or more energy storage modules; receiving and logging a plurality of telemetry data from a charge controller; and viewing the plurality of telemetry data by accessing a consumer web portal.

In another configuration, a computer implemented apparatus for providing a method for monitoring energy consumption, is an apparatus that comprises a processor; an input device coupled to said processor; a memory coupled to said processor; an output device; and an execution engine including a method for monitoring energy consumption to perform steps for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; associating an energy management device with a consumer unit, said energy management device having a local data processing gateway device communicably coupled thereto; configuring said local data processing gateway to monitor and control processes and measurements conducted by said energy management device; receiving and logging a plurality of telemetry data from one or more intelligent battery management systems; receiving and logging a plurality of telemetry data from one or more intelligent inverter/converters; receiving and logging a plurality of telemetry data from one or more energy storage modules; receiving and logging a plurality of telemetry data from a charge controller; and viewing the plurality of telemetry data by accessing a consumer web portal.

In another aspect, a computer readable medium for monitoring energy consumption, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for associating an energy management device with a consumer unit, said energy management device having a local data processing gateway device communicably coupled thereto; program code for configuring said local data processing gateway to monitor and control processes and measurements conducted by said energy management device; program code for receiving and logging a plurality of telemetry data from one or more intelligent battery management systems; program code for receiving and logging a plurality of telemetry data from one or more intelligent inverter/converters; program code for receiving and logging a plurality of telemetry data from one or more energy storage modules; program code for receiving and logging a plurality of telemetry data from a charge controller; and program code for viewing the plurality of telemetry data by accessing a consumer web portal.

In another aspect, a computer implemented method including computer-usable readable storage medium having computer-readable program code embodied therein for causing a computer system to perform a method of storing excess energy generated in an energy management device in an application platform for performing steps for securing one or more energy storage modules in an energy storage module enclosure, said energy storage module enclosure coupled to the inside of a Solar Energy Grid Integrated System with Energy Storage (SEGIS-ESTM) Appliance, wherein said Solar Energy Grid Integrated System with Energy Storage comprises one or more hybrid inverter/converters, one or more data processing gateways, one or more charge controllers, one or more intelligent battery management systems, and one or more energy management devices in a compact footprint; connecting said one or more energy storage modules to a SEGIS-ESTM isolation switch panel board, wherein said SEGIS-ESTM isolation switch panel board provides a common integration point for components coupled to said SEGIS-ESTM appliance; configuring, by the computer system, a local data processing gateway to monitor and control processes and measurements conducted by said energy management device; monitoring, by the computer system, the amount of power generated by one or more distributed energy sources; monitoring, by the computer system, the rate of power generated by the one or more distributed energy sources; controlling, by the computer system, the rate of power stored in said one or more energy storage modules; controlling, by the computer system, the amount of power stored in said one or more energy storage modules; monitoring, by the computer system, the health of one or more energy storage modules; and operating, by the computer system, one or more devices capable of energy management.

In another arrangement, a method for selling energy back to a utility power grid, comprises steps for providing one or more hybrid inverter/converters; providing one or more data processing gateways; providing one or more charge controllers; providing one or more intelligent battery management systems; providing one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; calculating the amount of available energy storage capacity based upon the current or expected price of power; and implementing the one or more set of rules.

In another arrangement, a computer readable medium for selling energy back to a utility power grid, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for processing the one or more set of rules on an Intelligent Energy Storage Module Management System; program code for managing the one or more set of rules via a multiprotocol data processing communication gateway device communicably coupled to the Energy Storage Module Management System; program code for monitoring the one or more set of rules via a multiprotocol data processing communication gateway device communicably coupled to the Energy Storage Module Management System; and program code for modifying the one or more set of rules via a multiprotocol data processing communication gateway device communicably coupled to the Energy Storage Module Management System, said multiprotocol data processing communication gateway device further communicably coupled to a consumer web portal.

In another configuration, a system for selling energy back to a utility power grid, comprises one or more hybrid inverter/converters coupled to an energy storage management system and charge controller module via a data processing gateway such that the data processing gateway implements one or more rule sets for selling energy back to a utility power grid to maximize the selling price of said energy; one or more data processing gateways receiving signals from the energy storage management system and charge controller and sending instructions via processor readable code to implement one or more algorithms; one or more charge controllers electrically coupled to the energy management storage management system to determine requirements for charging and discharging; one or more intelligent battery management systems; one or more energy management devices in a compact footprint not to exceed 18" in depth in some embodiments but deeper in other configurations; one or more memories for storing data; one or more processors capable of executing processor readable code; one or more communications means; one or more databases; one or more query processing modules; one or more aggregation engines; one or more execution engines; one or more reference generating modules; one or more user interfaces; and one or more algorithm rules.

In yet a further arrangement, a computer implemented method including computer usable readable storage medium having computer readable program code for causing a computer system to perform a method of selling energy back to a utility power grid by sending instructions to implement steps including interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining, by the computer system, price points of power obtained from a utility power grid at which a user will discharge energy stored in an energy storage module; defining, by the computer system, a percentage of maximum capacity of stored energy in one or more energy storage modules that may be discharged in a single cycle; correlating, by the computer system, said price points of power with said percentage of maximum capacity; configuring, by the computer system, said price points and said percentage of maximum capacity into one or more sets of rules; and implementing, by the computer system, the one or more set of rules.

In a further configuration, a computer implemented apparatus for selling energy back to a utility power grid, is an apparatus that comprises a processor; an input device coupled to said processor; a memory coupled to said processor; an output device; and an execution engine including a method for peak shaving to implement steps for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; and implementing the one or more set of rules.

In another arrangement, a method of peak shaving, comprises providing one or more hybrid inverter/converters; providing one or more data processing gateways; providing one or more charge controllers; providing one or more intelligent battery management systems; providing one or more energy management devices in a compact footprint; connecting an energy management system with one or more integrated alternate energy sources and one or more energy modules storage to a utility grid; monitoring energy demand on said utility grid; calculating an amount of maximum energy that said energy grid can deliver; determining a threshold energy demand on the grid, wherein said threshold energy demand begins to stress one or more components of said utility grid; identifying one or more time periods when the threshold energy demand is met, whereupon identification said energy management system with integrated alternate energy source and energy module storage sends power generated by one or more alternate energy sources to the utility grid; and sending energy to the utility grid until said energy demand falls below said threshold energy demand.

In another configuration, a system for peak shaving, comprises one or more hybrid inverter/converters; one or more data processing gateways; one or more charge controllers; one or more intelligent battery management systems; one or more energy management devices in a compact footprint; one or more memories for storing data; one or more processors capable of executing processor readable code; one or more communications means; one or more databases; one or more query processing modules; one or more aggregation engines; one or more execution engines; one or more reference generating modules; one or more user interfaces; and one or more algorithm rules.

In another arrangement, a computer implemented method including computer usable readable storage medium having computer readable program code embodied therein for causing a computer system to perform a method of peak shaving, comprises interfacing, by the computer system, with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining, by the computer system, price points of power obtained from a utility power grid at which a user will discharge energy stored in an energy storage module; defining, by the computer system, a percentage of maximum capacity of stored energy in one or more energy storage modules that may be discharged in a single cycle; correlating, by the computer system, said price points of power with said percentage of maximum capacity; configuring, by the computer system, said price points and said percentage of maximum capacity into one or more sets of rules; and implementing, by the computer system, the one or more sets of rules or algorithms.

In another aspect, a computer implemented apparatus for providing a method for peak shaving, comprises a processor; an input device coupled to said processor; a memory coupled to said processor; an output device; and an execution engine including steps for implementing a method for peak shaving including interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; defining price points of power obtained from a utility power grid at which a user will discharge energy stored in an energy storage module; defining a percentage of maximum capacity of stored energy in one or more energy storage modules that may be discharged in a single cycle; correlating said price points of power with said percentage of maximum capacity; configuring said price points and said percentage of maximum capacity into one or more sets of rules; and implementing the one or more set of rules In another aspect, a computer readable medium for peak shaving, comprises program code for interfacing with one or more Solar Energy Grid Integrated Systems with Energy Storage, the one or more Solar Energy Grid Integrated Systems with Energy Storage comprising one or more hybrid inverter/converters, one or more data processing gateways, one or more charge controllers, one or more intelligent battery management systems, and one or more energy management devices in a compact footprint; program code for connecting an energy management system with integrated alternate energy source and energy module storage to a utility grid; program code for monitoring energy demand on said utility grid; program code for calculating an amount of maximum energy that said energy grid can deliver; program code for determining a threshold energy demand on the grid, wherein said threshold energy demand begins to stress one or more components of said utility grid; program code for identifying one or more time periods when the threshold energy demand is met, whereupon identification said energy management system with integrated alternate energy source and energy module storage sends power generated by one or more alternate energy sources to the utility grid; and program code for sending energy to the utility grid until said energy demand falls below said threshold energy demand.

The various embodiments previously disclosed provide general solutions for cost-effective grid-scale energy storage, generation, and management. The various embodiments combine batteries, power electronics, and generation into a highly-optimized form factor that is remotely managed and controlled by a software-as-a-service (SAAS) platform. The software platform of an example embodiment aggregates systems together in a real-time network for the delivery of both energy and information. The resulting "energy cloud" pools and dynamically scales energy resources across the grid upon demand. Multiple applications can be delivered to multiple customer segments from this single platform. Generation and storage are controlled by a value-optimizing process that determines when and where energy should be delivered. Systems can be deployed anywhere on the grid where needed. Each system is sized according to the specific needs of the customer and the site, minimizing component and installation costs. The services provided by the various embodiments deliver value by enabling utilities, energy consumers, and third parties to buy and sell energy, each according to their unique economic interest.

However, the previous aspects of site integration systems and Sunverge Site Energy Cloud software as a service do not deliver specific applications related to offset demand monitoring, methods of virtual power plant orchestration, load shaping services, methods of reducing demand on an aggregated level, methods of prioritizing programs related to site integration systems and a virtual energy pool, energy cloud controllers in communication with networked site integration systems, methods to orchestrate charge and discharge plans of electric vehicles and distributed energy resources that include at least a portion of the resources that are locally generated and/or locally stored at a user site location.

SUMMARY OF THE INVENTION

In certain aspects, the Sunverge Site Integrated Energy Management System SIS or sometimes referred to as an SIS, Site Integration System has two key components. The first component is an appliance, or apparatus, that packages a pre-engineered, single vendor system comprising an inverter, a computer gateway controller, and an optional source of renewable energy generation, into a compact physical enclosure or a multiple enclosure, mechanically, electrically, and digitally coupled, pre-engineered Sunverge Site apparatus, a Distributed Energy Resource Energy Storage (DER-ES) apparatus. The apparatus is designed for installation in some aspects, at a place of residence, place of business, sub-station, multi-tenant residence, commercial building, campus, or at any location on the distribution grid. The job of the apparatus, or appliance, if you will (used interchangeably herein), is to generate and store electrical power, and to dispatch power when needed. The components of the apparatus communicate with intelligent control modules inside each component and the apparatus itself that allow the SIS site integration system/Distributed Energy Resource Energy Storage (DER-ES) Apparatus to manage, monitor, and control electrical power to and from the grid as well as customer load and demand information along with various additional information that can be collected at a customer site location. Each SIS has a gateway computer insider of each DER-ES apparatus that communicates in one aspect with each of the various components in the SIS and in another aspect with an Energy Cloud software platform, software-as-a-service. The Sunverge Energy Cloud software platform in communication with networked Sunverge Site Integration Systems containing one or more DER-ES apparatus may be configured in various aspects to deliver specific applications not previously engineered related to offset demand monitoring, methods of virtual power plant orchestration, load shaping services, methods of reducing demand on an aggregated level, methods of prioritizing programs related to site integration systems and a virtual energy pool, energy cloud controllers in communication with networked site integration systems, methods to orchestrate charge and discharge plans of electric vehicles and distributed energy resources that include at least a portion of the resources that are locally generated and/or locally stored at a user site location, machine learning predictive algorithms, value optimizing algorithms, autonomous sensing modules, mode selection methods, capacity reservation monitoring methods, virtual power plant orchestration methods, advanced features in the Distributed Energy Resource Energy Storage apparatus, energy management system for governing energy management resources and related methods, methods for controlling network in an aggregated energy cloud, load shaping method, renewable energy management marginal cost cycle life degradation methods, a load shaping application programming interface, forward event schedule methods, on demand request methods, and load service state request methods.

Another aspect of one or more of the previous arrangements relates generally to a system for distributed energy storage and power management, and more particularly to a fully integrated system, method, and device for the controlling, monitoring, measuring, and conserving of distributed power generated on the premise, the resale of distributed power to a utility, and power generated from distributed energy storage (e.g., batteries) and other distributed renewable energy sources (e.g., solar panels, wind turbines, renewable energy generation sources, etc.). Moreover, the invention is minimally invasive, modular, and retains power-generating capacity, which is combined with load management and energy storage to provide energy at or near the point of consumption that can be aggregated with other renewable energy integrated systems to form an energy cloud via a centralized software-as-a-service. In some applications, one or more gateway controllers will communicate with one or more common domain energy cloud controllers and one or more edge controllers in communication with an energy cloud software application to deliver systems and methods for mode selection, mode management, offset demand management and various aspects of orchestration and virtual power plant systems and methods.

The result is an energy cloud software platform that in certain aspects is configured as an energy cloud controller including a distributed energy management system and an electric vehicle energy management system by linking one or more gateway controllers and edge controllers with one or more site integration systems that monitors the operation of the power electronics inside of each apparatus, or appliance to ensure smooth operation; seamlessly upgrades and manages the software running on each appliance; reports on the power and energy being used in the system: how much power the PV/solar panels or renewable energy generating source is generating, how much energy is stored in each battery or other energy storage component, how much power is being provided to the grid and to the home. This reporting happens in real-time and the data is stored for analytics; controls what each apparatus is doing, also in real-time for providing specific applications of the system including methods for monitoring the operation of one or more power electronic components of one or more site integration system apparatus, upgrading and managing software running on each storage appliance of the one or more site integration system apparatus, managing and reporting in real-time the energy generated in one or more renewable energy generating sources linked to one or more site integration system apparatus to provide offset demand and peak reduction solutions, responding to one or more pricing, demand, and ancillary services signals for input to load shaping services, orchestrating one or more distributed resources to simultaneously serve site and grid needs in a virtual power plant, and using one or more predictive analytic algorithms to improve performance of distributed resources. In certain configurations, an energy cloud controller may be linked with a grid control system to provide orchestration and virtual power plant schedule and load shaping services instructions to a network of one or more of the energy cloud controllers. If one unit needs to charge, it tells that unit to charge. If five units on a certain circuit need to discharge, it tells those units to discharge. The software can mix and match these commands in any order, for any combination of apparatus installed throughout locations on the grid; runs multiple applications simultaneously, in response to site conditions, grid conditions, prices, and customer preferences; dynamically changes the configurations of individual apparatus, shifting resources from application to application, from specific location to specific location; enables individual apparatus to run autonomously in the case of communication outages; and integrates with existing utility and partner applications and systems by means of open and flexible web service protocols.

In another aspect, an apparatus, or appliance, in certain aspects described herein includes a tamper and weather resistant enclosure which houses a plurality of devices for accomplishing localized and remote control electrical energy management for locally stored and generated renewable energy and electrical loads sited at the appliance location and for aggregation with an Energy Cloud software platform in communication with one or more energy cloud controllers linked to one or more edge controllers and one or more gateway controllers. Additionally, the devices may be configured in certain aspects to provide voltage support to a utility grid in those cases where the grid needs additional voltage supplied to improve voltage shortages. In other aspects, the apparatus includes voltage control capabilities and is configured with properly sized inverters and converters that are controllable, intelligent battery charge controllers, and software to provide orchestrated voltage optimization. In some aspects, the SIS site integration system/Distributed Energy Resource Energy Storage (DER-ES) Apparatus appliance variously includes some or all of the following devices: DC/AC and AC/DC intelligent controllable inverter/converter (also called a hybrid inverter/converter), intelligent Battery charge controller with Multi Point solar panel Power Tracking ability, electrical energy storage means, Intelligent battery management system, isolation switch panel board, Intelligent data processing communications gateway and termination points for solar array electricity input and electric utility interconnection to provide fast charging for an electric vehicle energy control center to provide rapid charging for one or more electric vehicle resources and distributed energy management system components to provide offset and peak demand monitoring services. In certain aspects, the one or more gateway controllers send and receive instructions with one or more distributed energy, battery, and electric vehicle resources via one or more device abstraction layers. The one or more gateway controllers send the one or more instructions received by the device abstraction layer to one or more program layers which further sends the adapted instructions to one or more command layers to communicate with the one or more edge controllers and the one or more energy cloud controllers to provide aggregation, command queuing, communication queuing, monitoring and reporting, tools, analytics, web services, and user interface functions.

In other aspects, a site integration system apparatus for energy management services comprises further steps for providing one or more virtual power plants wherein one or more devices dispatches energy to the grid to satisfy a grid control system requirements for voltage support. In other various aspects, the step for the site integration system apparatus for energy management services may alternately include providing one or more electric vehicle energy control centers in communication with one or more edge gateway controllers and one or more electric vehicle resources.

In other various aspects, the step for providing one or more electric vehicle energy control centers may alternately include a site integration system cloud controller aggregating one or more electric vehicle energy control centers in communication with one or more edge gateway controllers and one or more electric vehicle resources and aggregating one or more distributed energy management systems in communication with one or more distributed resources. In other various aspects, the step for one or more virtual power plants may alternately include the one or more virtual power plants provide voltage support in response to a grid control system requirement responds to one or more demand response events with guaranteed dispatch of power to the grid.

In other various aspects, the step for providing one or more electric vehicle energy control centers may alternately include a site integration system apparatus for energy management services may alternately include one or more energy cloud software platforms communicating with the one or more intelligent edge gateway controllers to send and receive the site and grid requirements of the one or more distributed resources, is electrically and communicably connected to one or more site integration system apparatus to form a network, wherein the network is connected to one or more regional independent service operators (ISO), and responds to signals on a per-second basis. In other various aspects, the step for providing one or more electric vehicle energy control centers may alternately include a translation software module to convert requests for frequency regulation and up/down ramping into precise charge and dispatch commands.

In other various aspects, the step for providing one or more electric vehicle energy control centers may alternately include an uninterruptible power supply (UPS) to automatically isolate the apparatus for energy management services from the grid in the event of a loss of power, and then automatically delivers locally generated site power to the user site without an interruption in service and without a loss in power quality. In other various aspects, the step for one or more electric vehicle energy control centers may alternately include a site integration system apparatus for energy management services, wherein the apparatus is wired directly to one or more priority loads and wherein the apparatus communicates via one or more energy cloud software platforms communicating with the one or more intelligent edge gateway controllers to send and receive the site and grid requirements of the one or more distributed resources, and is electrically and communicably connected to one or more site integration system apparatus to form a network to provide energy reliability for one or more critical service loads.

In other various aspects, the step for providing one or more electric vehicle energy control centers may alternately include the apparatus is wired directly to one or more priority loads and wherein the apparatus communicates via one or more energy cloud software platforms communicating with the one or more intelligent edge gateway controllers to send and receive the site and grid requirements of the one or more distributed resources, and is electrically and communicably connected to one or more site integration system apparatus to form a network to provide energy reliability for one or more critical service loads.

In other aspects, the SIS site integration system/Distributed Energy Resource Energy Storage (DER-ES) Apparatus can be deployed in various applications for load-serving entities, such as energy and gas utilities. In one aspect, the SIS site integration system/Distributed Energy Resource Energy Storage (DER-ES) Apparatus responds to Demand Response events with guaranteed dispatch of power to the grid. In cooperation with a Demand Response Management System (DRMS), remote apparatus are aggregated as capacity, and that capacity is dispatched by schedule or real-time command on a per need basis. In another aspect, one or more networked SIS apparatus, through the cloud, are connected to the regional ISO, and respond to regulation signals on a per-second basis. Requests for frequency regulation or up/down ramping are translated into precise charge and dispatch commands. In other aspects, the SIS time-shifts energy generated from PV/solar panels or other renewable energy generation sources and/or energy drawn from the grid to maximize peak load reduction for a home or business. Using one or more rule sets or algorithms, over time each SIS machine learns about the specific features of the site, including but not limited to, weather patterns, load profiles, customer and consumer site preferences and attributes. The SIS along with the Sunverge Site Cloud Edge gateway software platform and the Sunverge Site Cloud Aggregated Software Platform, makes adjustments on its own. In one aspect, if the resident or business is on a time-of-use rate plan, the SIS and software platform will know how to minimize the cost of energy for that customer by charging when prices are low and dispatching when prices are high by machine learning adaptations of one or more rule sets comparing an expected output to an actual output, measuring the error, and making revisions to one or more rules to minimize the error by updating the expected output using in certain aspects an artificial intelligence component.

In other aspects, methods for voltage control allow the SIS site integration system/Distributed Energy Resource Energy Storage (DER-ES) Apparatus to respond to needs for voltage control by injecting or absorbing power at the place where it is needed most: nearest the load. Aggregated apparatus act as a fleet to provide orchestrated voltage optimization on a given circuit or feeder. In some respects, voltage control provides voltage support where the voltage provided to the grid is too low or in those rare cases where the voltage received from the grid is too low. In other aspects, co-location and integration with renewable generation sources, such as solar, wind, or other, gives the SIS site integration system/Distributed Energy Resource Energy Storage (DER-ES) Apparatus direct control over the energy produced. By supplementing the intermittent nature of renewable generation with the stored energy in the battery or other energy storage component, each SIS can smooth the energy provided to the grid, making it more reliable, more predictable, and more stable. In turn, the negative effects of this intermittency on the grid, including thermal overload, voltage swings, and increased emissions due to increased regulatory demands, may be avoided.

In another embodiment, the SIS automatically isolates itself from the grid in the event of a loss of power, and then delivers its own power to the site without any interruption in service or loss in power quality. In one configuration, the system may alternately include uninterruptible power supply (UPS) devices or in other designs may include one or more automatic transfer switches. In yet other configurations, the system may be couple to an emergency power generator or a diesel generator set and related controls. The SIS apparatus can be wired to directly support priority loads, thereby providing energy reliability for critical services, including but not limited to, heating, cooling, and electronics. In certain aspects, an energy cloud controller in communication with one or more distributed energy management systems and one or more electric vehicle energy control centers can aggregate one or more storage and solar resources, making the storage and solar resources available as capacity, and the energy cloud controller can orchestrate charge and discharge plans in response to a virtual power plant or other guidance from a grid control system.

In another embodiment, a Sunverge Site Cloud Controller includes a Distributed Energy Management System and an Electric Vehicle Energy Control Center and is co-located with one or more electric vehicle charging stations. The SIS and Sunverge Site Cloud Controller dispatches energy to offset demand spikes while electric vehicles are charging, acting as a buffer to the grid. With direct integration to the electric vehicle charging platform, the SIS and Sunverge Site Cloud Controller can determine the optimum charge time while minimizing the cost of electricity to the site. In other aspects, an addition hardware component can enable electric vehicle "fast-charging" by plugging in directly to the battery within the SIS, reducing the total charge time from hours to minutes.

In other embodiments, the DER-ES apparatus functioning as an SIS in communication with an energy cloud software platform monitors real-time demand and dispatches power to ensure the site load does not exceed a specified threshold that might subject a commercial customer to demand charges pegged to maximum amounts of power on a monthly basis. In other aspects, each SIS serves as a SCADA-sensing node for its location, providing supervisory control and data acquisition for both the SunvergeEdge Gateway Controller and SunvergeCloud Software Controller. Discrete and aggregated data is delivered to utilities, and grid operators at the SIS with optimizing the operating of the grid to minimize power losses and maximize efficiency and quality across areas including but not limited to outage management, system modeling, power quality optimization, advanced distribution managed. Data delivered to customers and consumers may include, but is not limited to, system performance, site performance, efficiency, load profiles, energy consumption, renewable energy site generation profiles, energy savings, and third-party generated renewable energy available from the SunvergeCloud pooled energy resources.

In some respects, systems and methods related to a load shaping service. A load shaping service application programming interface (API) should support two activities. First, it should accept load shaping schedule requests from external applications. The load shaping service should process/modify the requested load shaping schedule based on its capacities and capabilities, return the modified schedule, and also (optionally) execute that schedule. It should also accept emergency load control requests, which will override whatever current load shaping schedule current exists. Note that all requests to the load shaping service are in the context of a group identifier. Each resource behind a load shaping service will belong to a single group. This allows for finer control over the behavior of the entire load shaping service, without requiring that the calling application address each resource individually. The management and configuration of groups is independent of this API, and load service implementation independent. REST Protocol Usage refers to one or more RESTful API calls that can be made to manage the load shaping service, and pointers to instructions, for example XML, that can be sent or received from the service. There are some key points to note, in order to use this API. As noted in a Security section, the load shaping API uses the same security model as partner service, external third party APIs. Before any call can be used, a session must be established by POSTing a sessionStartRequest, and receiving a sessionStartResponse in turn. Once a session has been established, the session key passed back in the sessionStartResponse should be included in all requests as a header with the name "spash". All requests to the load shaping service (and the Sunverge Partner Services in general) should be done over HTTPS. The server cert should be authenticated by the client, to prevent man-in-the-middle attacks. All requests to the load shaping service should provide an Accept header with a value of either application/xml or application/json. Both xml and j son are supported by the Sunverge Partner Services. The external, third party and supplier interfaces return several kinds of errors, including a failed session start request that will receive a sessionStartResponse with a success flag of false and an HTTP status code. Any request that uses an invalid or expired session header will result in a response with an HTTP status code.

In other various aspects of a load shaping service, any request that is malformed in some way . . . XML that does not validate to the XSDs or a missing header . . . will result in a response with an HTTP status code. Requests that are validly constructed and have a valid authentication token but still fail will return a response with an HTTP status code.

A load shaping schedule is a day of load shaping activities. Each day is divided into a series of time blocks of equal duration. By default, each time block is 30 minutes, though other durations could be selected (as long as that duration divides evenly into 24 hours). A load shaping schedule also specifies power and energy capacities that should be reserved for other service-wide needs, such as Emergency Load Control. There are two kinds of load shaping activities. Mandatory load shaping activities are directives to the load shaping service that must be followed. It is possible that a service can't execute a mandatory activity, but the service must do everything it can to minimize that possibility. Current mandatory activities include CHARGE: the load shaping service must take power from the grid at the specified kW, DISCHARGE: the load shaping service must dispatch power to the grid and/or other loads at specified kW, and NO_ACTION: the load shaping service must not have a net charge to or discharge from the grid.

In other respects, limit load shaping activities are opportunities for the load shaping service to ready itself for future mandatory activities. They are called "limit" activities because these activities are typically expressed with a limiting rate that should not be exceeded. The current limit load shaping activities includes a CHARGE_LIMIT where the load shaping service may take power from the grid up to the specified kW. The load shaping service must not have a net discharge to the grid, a DISCHARGE_LIMIT where the load shaping service may discharge power to the grid or other loads up to the specified kW. The load shaping service must not have a net charge from the grid, and ANY_ACTION where the load shaping service may charge or discharge as it needs to. Usually, this activity is only used when an application is trying to set a load shaping schedule? the load shaping service will replace ANY_ACTION activities with either NO_ACTION activities or one of the other limit activities.

A sample schedule includes some common XML elements to note, including a schedule that is divided into 12 two hour blocks by setting an entryDuration of 120 (minutes). If no duration is specified, a default of 30 minutes will be assigned. The smallest entryDuration allowed is 1 minute, and the longest is 1440 minutes. Each entry for the schedule has an index (starting with 0), and an load shaping activity. Based on the activity, there may be an optional rate (in kW). If an entry is not present, the activity is assumed to be ANY_ACTION. Each entry for the schedule can also (optionally) reserve capacity for on-demand functions. This reservation specifies both a peak power (in kW) and the total amount of energy (kWh). Reservations for the whole day, under the dayReservations block, may be specified. To request the current load shaping schedule for a given day, you would do a GET at /[groupId]/LoadShapingSchedule.xml?day=[day].

When an external application attempts to set a load shaping schedule, it may not be possible for the load shaping service to match that schedule. To manage this issue, there is an iterative process where the calling application composes a request schedule. This schedule could have a mix of mandatory and limit load shaping activities. The calling application submits the request schedule to the load shaping service. The load shaping service creates a response schedule based on the request schedule. If the load shaping service can't satisfy all mandatory activities in a schedule, it will create a "best fit" response schedule that is as close to the request schedule as it can. This is called a downgrade. If the load shaping service can satisfy all mandatory activities in a schedule, and can replace limit activities with either NO_ACTION or activities with lower rates, it will do so. This is called an upgrade. If the load shaping service can satisfy all mandatory activities in a schedule and does not replace any limit activities, this is called a match. The load shaping service stores the response schedule for later execution, and returns it to the calling application. If the response schedule does not match the calling application's requirements, it should submit a new request schedule with different values. To make this process more manageable, the calling application can set some useful commands and directives where the calling application can specify a set command that determines if the load shaping service will actually store the response schedule for later execution. Set commands include SET_ALWAYS: The load shaping service should store the response schedule for later execution, SET_NEVER: The load shaping service should not store the response schedule for later execution. This is especially useful if the calling application wants to run multiple schedule scenarios, to select the best possible response schedule, SET_IF_NO_DOWNGRADE: The load shaping service should store the response schedule for later execution if the load shaping service can execute all requested mandatory activities, and SET_IF_NO_CHANGE: Acts just like SET_IF_NO_DOWNGRADE, but also provides a hint to the load shaping service to not do any schedule upgrades.

Individual entries in the schedule can be marked with a HIGH, MEDIUM, or LOW priority, so that the load shaping service can prioritize which entries will get downgraded. The calling application can specify a best fit algorithm to use if the load shaping service can't execute all mandatory activities including TRUNCATE: Remove mandatory activities from the schedule, in LOW to HIGH priority order, until the schedule can execute all remaining mandatory activities, DISTRIBUTE: Satisfy all mandatory activities with a HIGH priority. If not all activities can be satisfied, distribute the available capacity between all the HIGH priority activities, weighted by the requested rate of each activity. Repeat for MEDIUM and LOW priority tasks, and CONVERT: Change all LOW priority activities to ANY_ACTION. If the schedule still can't be fully executed, repeat with all MEDIUM priority activities, and then all HIGH priority activities.

Combining these features together, the iterative process could become one where the calling application puts together several possible load shaping schedules, with the most restrictive priorities and best fit algorithm. It submits each of these schedules to the load shaping service with a set command of SET_NEVER. The load shaping service returns a response schedule for each requested schedule, but does not store any of them for future execution. The calling application examines the response schedules, and loops back to step 1 with iterative changes, to look for response schedules that match its needs. When the calling application is satisfied with one of the response schedules, it submits it to the load shaping service with a set command of SET_ALWAYS.

The load shaping XML schema includes various aspects of iteration, including setLoadShapingSchedule where includes an initial request to set a load shaping schedule. If the set command is SET_NEVER, the load shaving service would not store it for later execution, even if it could execute all mandatory activities. In other aspects, a setLoadShapingSchedule may include a reply from the load shaping service indicating that the service could not execute the entire schedule. In such a case, a <response> block would show entries that were marked as downgraded.

In another configuration, setLoadShapingSchedule includes a second request (modified from the first) with some adaptations so that the load shaping service could execute the entire schedule where setLoadShapingSchedule.xml shows a reply from the load shaping service indicating that the service could execute the entire new schedule. This result schedule can be upgraded, if the schedule did not need the entirety of the CHARGE_LIMIT activities it had been given, and so gave some back. If the request had been made with SET_IF_NO_CHANGE, the upgrade would not have been made. To set the current load shaping schedule for a given day, you would do a POST at /[groupId]/LoadShapingSchedule.xml. On Demand Request. Sometimes, the calling application will need to immediately override the current schedule and request that power be dispatched or pulled from the grid. An on-demand request will do this. Power and energy can be reserved in advance for on-demand requests, using the reservations blocks of a load shaping schedule. Additional power and energy may be available beyond the reservations, but there is no guarantee of this, and no guarantee that any load shaping schedule for the current or next day will be able to execute as originally planned. An on-demand request has some key elements including an on-demand type, such as emergency load request. Currently, this is the only on-demand type supported. An load shaping activity. These activities to the ones documented under the load shaping schedule section of this document. A duration. If duration is 0, this on-demand request should stay in effect until it's cleared. A rate in kW, if the load shaping activity calls for one. A best fit algorithm. Valid values include REJECT: If the load shaping service can't exactly execute the request, it should ignore the request (and return a response with a FAIL code). Note that if the best fit algorithm is REJECT and the duration is 0, the request must be rejected, as the load shaping service can't guarantee execution, REDUCE_DURATION: If the load shaping service can't exactly execute the request, it can reduce the duration of the request until it can, and REDUCE_RATE: If the load shaping service can't exactly execute the request, it can reduce the rate of the request until it can.

A response to an on-demand request has three key elements. The request itself is included for reference and a result that indicates the success of the request includes FAIL: The load shaping service was unable to execute the request. This is typically a result of specifying REJECT as the best fit algorithm, OK: The load shaping service was able to execute the request, and is now overriding the current load shaping schedule, OK_ON_DEMAND_OVERRIDE: The load shaping service was able to execute the request, and is now overriding the current load shaping schedule. There was also a previous on-demand request that has now been removed, BEST_FIT: The load shaping service was not able to execute the request, but was given permission to do as best it could (via REDUCE_DURATION and REDUCE_RATE best fit algorithms). The load shaping service is now overriding the current load shaping schedule, and BEST_FIT_ON_DEMAND_OVERRIDE: The load shaping service was not able to execute the request, but was given permission to do as best it could (via REDUCE_DURATION and REDUCE_RATE best fit algorithms). The load shaping service is now overriding the current load shaping schedule, as well as a previous on-demand request that has now been removed. The activity, rate, and duration that the load shaping service is executing for this command. Note that these will not be present if the request has failed. It is also possible to issue a command to clear the current on-demand request.

All of the load shaping XML includes on demand requests as follows. setOnDemandRequest includes a calling application for an immediate emergency discharge. The best fit algorithm is REJECT, so the load shaping service would respond with a failure if it could not execute this request. In another configuration, setOnDemandRequest.xml may be configured for a response for a previous request, indicating that the load shaping service could execute it. setOnDemandRequest.xml can also include a response that modified a request that did provide a best fit algorithm. To set an on-demand request, you would do a POST at /[groupId]/OnDemand.xml. To clear the current on-demand request, you would do a DELETE at /[groupId]/OnDemand.xml.

Requesting The Load Service State. There are two kinds of information the calling application can request. The current status of the load shaping service, is an energy report providing aggregated energy usage in different categories, for a specific period of time. The other is a status reporting that returns three kinds of information about the load shaping service, including health indicator information, power and energy available for on-demand operations, power readings further including power offset: The amount of power (in kW) being output by the load shaping service, including power that does not reach the grid because of local consumption, power stored from the grid and the amount of power (in kW) being taken from the grid and placed into storage, power generated, the amount of power (in kW) being generated by resources associated with the load shaping service, power stored as the amount of power (in kW) being stored, both from generation resources and the grid, power discharged as the amount of power (in kW) being discharged from storage, and power passed through as the amount of power (in kW) passing through load shaping service subunits. For example, load shaping service subsystems that have critical load panels that are ordinarily powered from the grid.

When a client requests an energy report from the load shaping service, it provides a start and end time. The load shaping service then provides a summary of energy transferred during that period. Energy offset is the amount of energy (in kWh) output by the load shaping service during the requested time period, including energy that did not reach the grid because of local consumption, energy stored from the grid is the amount of energy (in kWh) taken from the grid and placed into storage during the requested time period, energy generated is the amount of energy (in kWh) generated by resources associated with the load shaping service during the requested time period, energy stored is the amount of energy (in kWh) stored, both from generation resources and the grid, during the requested time period, energy discharged is the amount of energy (in kWh) discharged from storage during the requested time period, and energy passed through is the amount of energy (in kWh) that passed through load shaping service subunits during the requested time period. In some respects, load shaping service subsystems that have critical load panels that are ordinarily powered from the grid.

Load shaping XML is defined as loadShaping.xsd schema where in certain aspects, includes a response to a status request, and a report request and response where status_01.xml is a response to a status request, energyReport.xml is a request for an energy report, and energyReport.xml is a response to the above energy report request. To get the status of the load shaping service for a specific group, you would do a GET to /[groupId]/Status.xml. To get the status of the entire load shaping service, you would do a GET to /Status.xml. To get the energy report for a specific group, you would do a POST to /[groupId]/Report.xml. To get the energy report for the entire load shaping service, you would do a POST to /Report.xml.

The load shaping service uses a security model similar to third party external supplier services. There are two key elements to this model. First, all requests to the load shaping service must be made via HTTPS. The third party external supplier services all have a valid SSL certificate, and the client is required to validate this certificate. All requests to the load shaping service should be executed within a "partner API session". The client establishes a session with the service, executes one or more calls in the context of this session, and then (optionally) closes the session. The service may, at any time, close a session. When this is done, the client should re-establish the session, and then continue making its calls. When a client establishes a session, it must provide three key pieces of data. A tenant ID token identifying which tenant the connection is for. This token is provided by making a request to an apparatus product team. A logon, associated with the above tenant, that has the partner API role. If the session creation is successful, the client will be provided with a session token. This session token must be included in every following request. Session Management XML is defined as part of the external third party partner API in a base.xsd XML schema. A session create request will be responded with a confirmation and session token. To establish a session you would do a POST to/session/[tenantId]. To end a session, you would do a DELETE to/session.

In other configurations, systems and methods for peak load reduction are provided. The goal of a peak load reduction application is to reduce a site's load on the grid during a "diurnal peak load" period defined by a utility company. Peak load periods vary greatly reflecting differing geographies, seasonal weather patterns, load profiles, regulatory frameworks, and business models across various utility providers. The systems and methods related to peak load reduction applications defines the operations of a storage system where a daily peak load period is defined by an applicable utility provider, a residential time-of-use (TOU) tariff is in place that assigns a higher cost for energy consumption during peak load periods, a solar feed-in-tariff (FIT) is in place that assigns a price paid by the utility for residential solar generation that is fed back into the grid. This rate is assumed to be lower that the TOU rate during the peak load period and is in some instances lower than the normal retail electricity rate. Tariff information is communicated to the energy storage system, one or more DER-ES apparatus and site integration systems, and energy cloud software application via a data repository sent by the applicable utility provider. The functions of each network of DER-ES apparatus and site integration systems are to optimize the load reduced during the peak load period by dispatching energy, effectively offsetting energy consumption at the site and to dispatch all available solar or renewable energy generation in the peak load period to offset demand under certain conditions. Another function of the one or more DER-ES apparatus and site integration systems is to supplement solar or renewable energy generation on site with locally stored energy to maximize energy dispatch over the course of the peak load period while ensuring a predictable rate of dispatch, thereby flattening or shaping the resulting load profile throughout the period. An additional function is to "time-shift" solar or renewable energy generation by storing it during off-peak periods and dispatching it during on-peak periods. Finally, a function of the site integration system in peak load reduction is to limit the export of solar generation to the grid by storing local renewable generation that is produced in excess of site demand. In various configurations, the one or more DER-ES apparatus and one or more site integration systems may have differing combinations of intervals and packet size. In one example, one or more site integration systems have a command polling interval of 500 ms, a data sampling interval of less than 100 ms, a reporting interval of 4 s, a user selected storage interval, and an average packet size of 20 kB, compressible down to less than 3 kB. Other combinations of specifications will yield differing performance results to achieve various design applications.

In an arrangement for a demand response application, one or more DER-ES and site integration systems responds to demand response (DR) events with guaranteed dispatch of power to the grid. In cooperation with a Demand Response Management System (DRMS), individual DER-ES apparatus and site integration systems (SIS), are aggregated as capacity, and that capacity is dispatched by schedule or in real-time by command on a per need basis. In the demand response applications, the functions of the one or more DER-ES apparatus and SIS appliances include enrolling the one or more DER-ES apparatus and one or more SIS appliances in Demand Response programs defined and managed in the DRMS and responding to DR signals sent from the DRMS and dispatching energy in response. DR events can either be scheduled in advance or sent in real-time. Another function of the DER-ES or SIS in a demand response application is to monitor the status of each DR event and broadcast it to the DRMS, monitor the current and projected energy capacity for each DER-ES apparatus and SIS appliance and to communicate to the DRMS to be represented in its rolling 48 hour forecast. SIS appliances and DER-ES apparatus respond to pricing signals, both absolute dollar value or relative, with charging and discharging commands that maximize cost-savings for the system owner (resident, business, utility, or other party). SIS appliances and DER-ES apparatus provide ancillary services, such as fast regulation, and those services are exposed to third parties (utilities, ISO) for integration. SIS appliances and DER-ES apparatus deliver real-time and historical analytics for performance, operations, and value optimization.

In another configuration, an uninterruptible power supply (UPS) application may be provided by one or more SIS appliances and DER-ES apparatus. In the event of a loss of power, the SIS/DER-ES units each automatically isolates itself from the grid, and then delivers its own power to the site without any interruption in service or loss in power quality. The appliances and apparatus can be wired to directly support priority loads, thereby providing energy reliability for critical services. The functions of the SIS/DER-ES units in a UPS application are as follows. A specified amount of energy is held in reserve to be dispatched in case of a loss of grid power. Upon loss of grid power, the SIS and DER-ES units disconnects from the grid in accordance to at least a performance to comply with UL 1741 and IEEE 1547 anti-islanding, and critical loads are immediately powered by a combination of PV or other renewable energy generation sources and battery or other energy storage devices. During a daytime event, both user site generation sources and user site renewable energy storage devices are used to power loads. During a night-time event, just renewable energy storage devices are used to power loads. During an outage, based upon current demand, current available renewable energy from local generation sources, and the amount of energy available in the renewable energy storage devices of the one or more SIS/DER-ES units, a consumer is given an estimate of how much backup power is available at a given time. Once grid power resumes, the SIS/DER-ES units reconnects and resumes scheduled operations. The SIS/DER-ES units look for the next best opportunity to return the renewable energy local stored energy capacity reserve for UPS. Throughout normal operations, the SIS/DER-ES units maintain the capacity reserve for UPS.

In one arrangement, one or more distributed energy resource energy storage (DER-ES) apparatus, when networked with one or more edge gateway controllers and a cloud computing energy software application, provide systems and methods to provide mode selection and mode selection management. When each of the one or more DER-ES apparatus and its respective gateway controllers are coupled to one or more edge gateway controllers and a cloud computing energy software application, each of the one or more DER-ES apparatus may function as a Site Integration System (SIS). What is a Mode? A mode is a general description of a current operating state for an SIS. Modes can be static ("send XX watts of power") or somewhat dynamic ("send XX watts of power, but watch the site demand and keep the output under that, in order to not export power to the grid"). A critical feature of modes is that each mode defines a specific "in the moment" behavior. They do not attempt to be predictive, nor do they invoke other modes. They "live in the moment", monitoring the state of the overall system and changing the behavior of the system in various, well defined ways. The word "mode" is shorthand for communicating a complete SIS state. An SIS state consists of a mode and any other configuration associated with that mode: the rate of power, whether to enable the load panel, what program was used to select that mode, and so on. "Mode" is used in this way throughout this document, only distinguishing between the static and dynamic when required to differentiate the application of modes in a particular method or system.

How is an Active Mode Selected? An SIS unit is provided with multiple means for identifying what the current mode should be. A schedule can be set, an override can be set, one or more capacity reservations can be provided, and so on. Modes do not, themselves attempt to negotiate between these competing priorities. Instead, every few seconds, we go through a three step process to identify what the current mode should be. First, each program is polled for what it wants the current mode to be. Next, the program with the highest priority "wins". Finally, the current state of storage and the capacity reservations are checked, and if there is a capacity reservation failure, a capacity reservation failure mode is selected.

Programs. There are many programs that are (or could be) running on an SIS at any given time. However, each program has the option, when queried, to provide its vote (in the form of an SIS state, not simply a mode) for what it wants the SIS to do. A program need not specify a mode. For example, if the battery voltage is above a configured threshold, the Low Voltage Defense Program can indicate that it's perfectly happy to allow other programs to do whatever they want. On the other hand, if the voltage is below that threshold, it can examine what the other programs want to do, and either issue a mode of its own ("charge the battery at 50%") or not.

Program Prioritization. Once each program has selected a mode, we use a simple prioritization model to select the "winning" mode. The two voltage defense programs are the highest priority, followed by the UPS program, the override programs, the various rule based programs (sequences, timelines, and scheduled), and the recharger program. There is also a catch-all program (called "default") that always votes to put the system into Standby. It is the lowest priority program in the system, so its vote is only taken into account if no other program specifies a mode.

Capacity Reservations. After program prioritization is used to pick a mode, a second check is made against capacity reservations. Each mode either discharges, charges, or has no effect on the battery's state of charge. That knowledge is used to decide whether there is charge or discharge capacity available. If capacity is available, then the mode picked by program prioritization will become the current mode. If capacity is not available, then either the charge capacity reservation failure mode or the discharge capacity reservation failure mode (as appropriate) will be selected as the current mode.

Special Cases. The standby mode never triggers charge or discharge capacity reservation checking. Instead, it manages its own capacity reservation, disabling battery charging when the charge capacity runs out. The UPS program also manages capacity reservation checking itself, switching to UPS Off when discharge capacity runs out.

What Do The Modes Do? Modes are selected every few seconds. As a program can tune a mode each time it is asked for a mode vote, it is possible for a substantial amount of system behavior to be managed by the program. However, the primary moment to moment response is managed by the modes themselves. There are 6 general classes of modes. Send To Grid Modes are designed to send power out the SIS's grid connection, without regard to site demand or demand on the critical load panel. Charge Battery Modes are designed to charge the battery. At any given time, the batteries can only be charged from either the photo-voltaic panels or a site solar charge controller (PV/SCC) or from the grid. Offset Demand Modes are designed to intelligently react to demand conditions from both the critical load panel and general site demand, in order to reduce the demand on the grid, while never exporting power to the grid. UPS Modes are triggered when the grid connection fails. They are designed to satisfy demand on the critical load panel, until there is no energy storage available. Capacity Reservation Modes are triggered when the mode selected by program prioritization would cause a violation of the configured capacities. They are designed to avoid exacerbating the failure. Other Modes is a catch-all bucket for the remaining modes. Standby is the most commonly used mode in this category. Send To Grid Modes are designed to send a targeted amount of power from the DC sources (PV and battery) out the SIS's grid connection, without regard to site demand or demand on the critical load panel. When an SIS is single phase, it will also support all demand placed on the load panel (which could lead to a dramatically higher drain on the battery than the target power could indicate). In split phase, it will allow the grid to continue to support that load so you may see the PV supporting the load sometimes and other times the grid will support the load. If PV is generating more power than is needed to satisfy the targeted power (or the target power plus the load panel, in the case of single phase systems), the battery will be charged with the additional power, unless it is full. If the battery is full, the excess power will be lost. Send To Grid. In the standard Send To Grid mode, the targeted output power is specified by the user, via the ROPO percentage. Send To Grid PV Only. In the PV Only version of Send To Grid, the targeted power is set to be equal to the PV power, as reported by the solar charge controller. Note that this can slowly drain the battery, as there is some "vampiric" loss. The minimum power output in this mode is 10% of the inverter maximum size, in order to protect the inverter from frequent on and off switching due to low PV power. Send To Grid PV Only allows for a smoothing percentage to be applied. This smoothing percentage prevents dramatic spikes or dips in the amount of power sent to the grid, by providing a maximum change per minute of output that is allowed. As an example, if the smoothing percentage is 20% and the max output rate on the unit was 4500 watts, the maximum change allowed in power output (up or down) would be 0.20*4500, or 900 watts in any given minute. This maximum change is actually more finely divided than this, to a maximum change per second, so the resulting output curve is quite smooth. The difference between the actual PV and the smoothed curve is supplemented by the battery if the smoothed curve results in a higher power output, then the battery provides the excess power. If the smoothed curve results in a lower power output than the actual PV, the battery will absorb the excess power. Charge Battery Modes are designed to charge the battery. At any given time, the batteries can only be charged from either the PV/Solar Charge Controller (SCC) or from the grid. When the battery is full (or the available charge capacity is reached), these modes will get overridden by a charge capacity failure mode. In all cases, demand on the load panel will be supported from the grid, if the load support flag is set to true. Charge Battery PV Only. This mode charges the battery from the PV at the current rate of PV power. No inverting is done to the grid. As with other charge modes, if there is no charge capacity remaining, the unit will go into Charge Capacity Reservation Failure mode, which means power will be sent to grid. Charge Battery Grid Only. This mode charges the battery from the grid at the specified charge rate. Charge Battery (Hybrid Mode). The hybrid charging mode is designed to charge the battery, ideally from PV, but if there is not enough PV to charge the battery, then from the grid. This ensures the battery will get charged even if PV is insufficient. At first, the SIS will attempt to charge the battery from the PV. As long as, in any given minute, the PV generated is above a minimum configured threshold (100 watts by default), the system will continue to use PV to charge. The charge rate is ignored and all power from PV is sent to the battery. If a load is present the load is covered by the grid. If, in any given minute, the PV does not manage to exceed the minimum configured PV threshold, the unit will charge from the grid for 10 minutes at the charge rate specified in the override or rule based program entry. At the end of this 10 minute period, the SIS will return to attempting to charge from PV. If a load is present the load is covered by the grid.

In another set of configurations, systems and methods implement Offset Demand Modes. Offset Demand modes are designed to intelligently react to demand conditions on both the critical load panel and the general site demand, in order to reduce the demand on the grid, while avoiding power export to the grid. The system will not attempt to match site demand exactly, because this leads to chasing spikes, causing grid export. Instead, it will work to stay below site demand. Some concepts are necessary to understanding how Offset Demand works. Every offset demand mode has a target output wattage. This value is a guide for the maximum AC power the SIS should send out. Note that the actual output wattage may be lower (to prevent exporting power to the grid) or higher (if the critical load panel is pulling more power than the target). The SIS controls its output using an internal InvertToAc function. This function takes a number of watts, which acts as a guide for how many watts should be inverted from the DC bus to the AC outputs. Note that the SIS will not invert less than (approximately) the demand on the critical load panel, so if InvertToAc is less than the critical load, it will invert at (again approximately) the critical load. As an example, if the critical load is 1100 watts, InvertToAc(0) will have the DC bus support the critical load at (approximately) 1100 watts. This will be true for all values from 0 to 1100. At InvertToAc(1101), the SIS will begin sending AC power out the grid side. To increase the performance and lifespan of the inverter, we will only increment the InvertToAc amount by a regular amount called MinimumChange. Initially, this value will be 500 watts, though the final amount may be given in a range exceeding 1000 watts depending on the user site application. The general form of all offset demand modes are as follows. The mode is started with an InvertToAC call of 0, followed by waiting 30 seconds for the SIS to "settle". As noted above, this means that the critical load panel will be supported from the DC bus. For a user selected period of time, for example 30 seconds, the SIS will measure demand. If, during this period, it is determined that the SIS is sending power to the grid, measurement is immediately halted and the SIS moves on to the next step. In the case where a site meter is placed, we determine that the SIS is sending power to the grid if that meter reports a measurement less than 0.

In the case where a main load meter is placed, we assume that the SIS is not sending power to the grid. In the case where no meters are placed, we assume that the SIS is not sending power to the grid. If the measurement step was terminated because the SIS sent power to the grid, the SIS calls InvertToAc at 0 watts, waits 5 seconds, and then starts measuring (step 2) again. If the SIS is not sending power to the grid, then the SIS will look at the amount of power that is being consumed at the site that is being supplied by the grid (aka the site demand measurement). In the case where a site meter is placed, the site demand measurement is calculated by taking the minimum reading on that meter during the measurement period. In the case where a main load meter is placed, we subtract the maximum power sent out the grid side of the SIS from the minimum reading of the main load meter to get a worst case site demand measurement. In the case where no meters are placed, we assume that the site demand measurement is 0.

Based on the site demand measurement, one of three actions will be taken. If the site demand measurement is less than zero, the SIS calls InvertToAc at 0 watts, waits 5 seconds, and then start measuring (step 2) again. If the site demand measurement is equal to or more than zero, but less than twice the MinimumChange, no action will be taken and we immediately return to the measurement step (step 2). If the site demand measurement is more than twice the MinimumChange, we call InvertToAc with MinimumChange more watts than the last call. The SIS will then wait for 5 seconds, and then return to the measurement step (step 2).

Offset Demand. In the standard Offset Demand mode, the target output wattage is set via user configuration. Offset Demand PV Only. In the PV Only version of Offset Demand, the target output wattage is set to the minimum amount of PV power generated, as reported by the SCC during the measurement phase. As with Send To Grid PV Only, this can slowly drain the battery, as there is some vampiric loss.

In other configurations, UPS modes are specifically designed to handle the special circumstances around grid outages. Note that these modes are not available via overrides or the rule based programs (schedules, sequences, timelines), but are only available if the UPS feature is enabled in the SIS configuration. If the UPS feature is enabled, the UPS program will invoke the UPS modes automatically, whenever the SIS detects that the grid has disconnected. Anti-islanding features will also engage as part of this process. The UPS program has one additional critical feature: It will automatically steal reserved discharge capacity from any lower priority program (everything but the two voltage defense programs). While this is a violation of our standard capacity reservation model, it is clear that UPS is of such critical importance that this is an appropriate behavior. If the UPS feature is not enabled, the SIS will engage in certain UPS-like functions. The PV and battery will support the load panel, if the current mode allows for load panel support, and "anti-islanding" will engage. However, automated capacity shifting and explicit UPS oriented logging and reporting will not be used. UPS On is the mode enforced by the UPS program if there is sufficient discharge capacity in order to allow the load panel to be supported, without compromising the higher priority voltage defense programs. PV and battery are used to support all demand on the load panel. If that demand is less than PV, then the battery will be charged with the excess. If the battery is full (very unlikely), then the excess power will be discarded. UPS Off is the mode enforced by the UPS program if there is insufficient discharge capacity. PV will continue to charge the battery, but the critical load panel will be disabled.

In other arrangements, Capacity Reservation Modes are provided. The capacity reservation modes are designed to handle circumstances in which the highest priority program that wishes to enforce a mode no longer has sufficient capacity reserved (charge or discharge) to actually support that mode. These modes cannot be selected for an override or one of the rule based programs (schedules, sequences, timelines).

Further arrangements provide for Charge Capacity Reservation Failure modes. When one of the charge oriented modes (Standby excepted) uses up the reserved charge capacity for the invoking program, this mode is engaged. It is, essentially, identical to the Send To Grid PV Only mode, with a smoothing rate of 100% (meaning, no smoothing). In certain aspects, this mode will behave in accordance to the Send To Grid Modes.

Other arrangements may provide Discharge Capacity Reservation Failure modes. When one of the discharge oriented modes uses up the reserved discharge capacity for the invoking program, this mode is engaged. It is identical to Standby, with the exception that the load panel is supported if the originally invoked mode was configured to support it.

Yet other arrangements provide for other modes, including a Standby mode. Standby is designed to put the unit into an efficient state that allows for charging the battery from PV, if present, and supporting demand on the load panel, if present. The general rule in this mode is that we do not invert and the load panel is not supported from the DC bus. If the battery is full, we will disable the solar charge controller, discarding any excess PV generated. The sleep mode is, currently, only for use in development environments but may be useful in certain user environments and applications. It turns off core pieces of the SIS environment, disabling the load panel completely. As the SIS gateway is currently powered from the same wiring as the critical load panel, the sleep mode will also disable the gateway, essentially shutting the system off. In other configurations, the gateway will be powered directly from the DC bus. This will make sleep a more valuable "low power consumption" mode.

In one embodiment of the present disclosure, a method of mode selection management in a distributed energy resource energy storage apparatus comprises steps for providing one or more distributed energy resource energy storage apparatus each having a housing at each of the one or more site meters at a site location, each distributed energy resource energy storage apparatus further having one or more energy storage devices in an intelligent energy storage compartment, one or more inverters, one or more charge controllers, one or more gateway controllers, a common DC bus, and an integrated, engineered power and signal processing system; automatically setting one or more distributed energy resource energy storage apparatus to charge one or more renewable energy storage devices; providing one or more gateway controllers having one or more programs controlling one or more distributed energy resources associated with a user site; automatically polling each of the one or more programs for a requested mode at a reporting interval; assigning a ranking identifier to the requested mode of each of the one or more programs; and determining a highest priority set of programs from among the requested mode of each of the one or more programs.

In other aspects of the embodiment, the method may further include steps for implementing one or more rule sets to further assign a second ranking identifier to each of the requested modes of the set of the highest priority programs; monitoring a current state of storage and a current state of capacity reservations to identify whether a capacity reservation failure is present; and selecting an active mode corresponding to the requested mode of the highest priority program. In other various aspects of the embodiment in the paragraph above, further steps may include overriding the requested mode of the highest priority program with a capacity reservation failure mode whenever a capacity reservation failure is present. In another configuration, the embodiment of previous paragraph may further include steps for reacting to demand conditions on a critical load panel and a user site demand requirement thereby reducing grid demand and avoiding grid power export from a user site location. The method from the previous paragraph may also include a configuration providing steps for calculating a site demand measurement, in a main load panel configuration, by identifying a minimum reading on the user site meter during a measurement period and may also in an another configuration also include steps for calculating a site demand measurement, in a main load panel configuration, by subtracting a maximum power dispatched from the grid side of a renewable energy site integration system from a minimum reading of the main load meter.

In another configuration of mode selection methods, steps may further include measuring a user site demand by reading one or more site loads; selecting an active mode corresponding to the requested mode of the highest priority program; implementing the active mode of the highest priority program to coordinate one or more energy resources in one or more local events; housing an inverter in a common enclosure within the distributed energy resource energy storage apparatus; reacting to demand conditions to match the site demand measurement with an inverter power output; and controlling the inverter to dispatch the matching power output. This configuration may further include steps for calculating one or more offset demand amounts associated with reducing one or more grid demand amounts; calculating one or more offset demand amounts associated with avoiding one or more grid power export amounts; and selecting one or more offset energy demand amounts via a consumer web portal. In other certain aspects, the method may also further include steps for providing the one or more offset energy demand amounts to an Internet user interface including one or more application programming interfaces coupled to a database repository, a display, a utility enterprise database application; communicating the one or more offset energy demand amounts with an energy area network that further connects the Internet user interface and utility enterprise database application to one or more user devices and appliances; and aggregating one or more offset demand amounts of one or more distributed energy resource energy storage apparatus in a virtual energy pool. Further steps may also include negotiating one or more programs of the one or more distributed energy resource energy storage apparatus to provide integrated demand management at one or more individual user sites; and coordinating one or more energy resources with one or more local events. Another configuration of the embodiment in this paragraph may include steps for providing one or more distributed energy resource energy storage apparatus each having a housing at each of the one or more site meters at a site location, each distributed energy resource energy storage apparatus further having one or more energy storage devices in an intelligent energy storage compartment, one or more inverters, one or more charge controllers, one or more gateway controllers, a common DC bus, and an integrated, engineered power and signal processing system; automatically setting one or more distributed energy resource energy storage apparatus to charge one or more renewable energy storage devices; providing one or more gateway controllers having one or more programs controlling one or more distributed energy resources associated with a user site; automatically polling each of the one or more programs for a requested mode at a reporting interval; assigning a ranking identifier to the requested mode of each of the one or more programs; determining a highest priority set of programs from among the requested mode of each of the one or more program; measuring a user site demand by reading one or more site loads; selecting an active mode corresponding to the requested mode of the highest priority program; implementing the active mode of the highest priority program to coordinate one or more energy resources in one or more local events; housing an inverter in a common enclosure within the distributed energy resource energy storage apparatus; reacting to demand conditions to match the site demand measurement with an inverter power output; controlling the inverter to dispatch the matching power output; calculating one or more offset demand amounts associated with reducing one or more grid demand amounts; calculating one or more offset demand amounts associated with avoiding one or more grid power export amounts; selecting one or more offset energy demand amounts via a consumer web portal; providing the one or more offset energy demand amounts to an Internet user interface including one or more application programming interfaces coupled to a database repository, a display, a utility enterprise database application; communicating the one or more offset energy demand amounts with an energy area network that further connects the Internet user interface and utility enterprise database application to one or more user devices and appliances; aggregating one or more offset demand amounts of one or more distributed energy resource energy storage apparatus in a virtual energy pool; reading one or more site loads from one or more site meters wherein the site configuration is selected from one of a group consisting of a site with a main load panel only, a site with a main load panel plus a critical load panel, and a site with neither a load panel or a critical load panel; and managing one or more offset demand amounts related to one or more distributed energy resources.

In another configuration of the method in the previous paragraph, steps may further include one or more distributed energy resources of the one or more distributed energy resource energy storage apparatus wherein the one or more distributed energy resources are one or more user loads that are controlled by one or more sets of instructions from a remote central server; selecting one or more executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices; receiving one or more command and control data command sets via one or more command channels from the remote central server or a third party external source API, wherein the one or more command sets control modes, actions, and device state in the one or more physical devices, to convert one or more formats and one or more protocols to one or more virtualized commands in a common command format; utilizing the one or more virtualized commands by one or more executor modules running at a command virtualization layer to cause the execution of one or more virtual devices at the device virtualization layer to drive a corresponding physical device to a desired state; and executing one or more virtual devices at the device virtualization layer with one or more other virtual devices in a hierarchical relationship. This method in another configuration may also include one or more user loads wherein the one or more user loads are controlled by one or more sets of instructions from a distributed network database. In another configuration, the methods in this paragraph may further include steps for providing one or more CANBUS protocols to allow one or more components to communicate with each other without one or more host computers. Other configurations may alternately include steps for providing at least one NIST approved CIM model. Another configuration includes the methods of this paragraph with steps for alternately communicating via at least one SE2 compliant platform.

In another embodiment, methods for offset demand monitoring are provided, including steps for providing one or more CANBUS protocols to allow one or more components to communicate with each other without one or more host computers; implementing one or more steps for one or more mode selection management methods via a gateway controller computer system; charging one or more storage devices in a storage appliance from a renewable energy source charge controller, wherein the storage appliance and charge controller are integral to the distributed energy resource energy storage apparatus, and wherein charging the one or more storage devices continues until each of the one or more storage devices are fully charged, unless an amount of renewable energy power generated at the user site location is less than the required amount to charge the one or more storage devices, at which time the one or more storage devices receive power from the grid until fully charged; measuring demand on one or more load panels to determine a DC bus support load power requirement and an AC inverter grid side power requirement, wherein the difference in power requirements determines an amount of offset energy demand, and wherein limiting the export of renewable energy generation to the grid by measuring and storing renewable energy power generated in the DER-ES apparatus; dispatching the renewable energy power in excess of site demand when the site demand measurement is more than or equal to a desired change amount; and calling an internal InvertToAC function in a gateway controller associated with the DER-ES apparatus to increment power output of an inverter housed within the DER-ES apparatus. The previous configuration may also include steps for controlling AC power output of the DER-ES apparatus by a minimum change amount to increase a DC to AC inverter lifespan. The increment power output method described above may further include steps for dispatching the renewable energy power in excess of site demand when the site demand measurement is more than or equal to twice a minimum change amount.

In other various aspects of the methods in the previous paragraph, steps may be further provided for calculating an offset demand amount value by selecting a step function above the measured load value of a load demand curve to determine an offset demand output wattage for the distributed energy resource energy storage apparatus. In another aspect, steps are provided for calculating an offset demand amount value by selecting a step function below the measured load value of a load demand curve to determine an offset demand output wattage for the distributed energy resource energy storage apparatus. Another variation includes steps for calculating an offset demand amount value by monitoring the measured load values in real time to determine a load demand curve; and selecting an offset demand output wattage for the distributed energy resource energy storage apparatus. Another aspect of the methods above include calculating an offset demand amount value by selecting a step function above the measured load value of a load demand curve and adding a translation delta to shift the entire step function upward from the load demand curve values in order to determine an offset demand output wattage for the distributed energy resource storage apparatus. In other aspects, steps include calculating an offset demand amount value by selecting a step function below the measured load value of a load demand curve and adding a translation delta to shift the entire step function downward from the load demand curve values in order to determine an offset demand output wattage for the distributed energy resource energy storage apparatus. The previous steps may also include instructing an inverter to invert an amount of output wattage equivalent to the offset demand amount. In other various aspects, steps include providing one or more CANBUS protocols to allow one or more components to communicate with each other without one or more host computers. In another configuration, communication protocols may be provided wherein the protocols to allow one or more components to communicate with each other without one or more host computers is selected from a group consisting of PLC and ModBus. The methods above may further include steps for establishing that a critical load panel is present at the site; measuring an energy demand and taking a site demand measurement where the site meter is placed, wherein a renewable energy module in the distributed energy resource energy storage apparatus converts an amount of DC power equal to demand on the critical load panel for the site as true 0 AC; starting offset demand monitoring with true 0 AC, wherein the critical load panel is supported by DC power in the distributed energy resource energy storage apparatus; measuring demand for approximately 30 seconds to determine if power is being sent to the grid, if so the distributed energy resource energy storage apparatus returns to true 0 AC; determining whether the distributed energy resource energy storage apparatus is sending to the grid, power being consumed at the site, or is equal to demand at the site meter; and determining site demand measurement by taking minimum reading on meter during a measurement period to determine offset demand for the site. The prior configuration may further include steps for implementing one or more steps for demand management modes selection; providing the distributed energy resource energy storage apparatus in some embodiments having a compact footprint equal to a depth not to exceed a utility workspace at a site meter at a site but in a larger enclosure in other embodiments; and configuring a target offset demand mode via a user preference. In yet another configuration, this variation may further include additional steps for implementing one or more steps for demand management modes selection; providing the distributed energy resource energy storage apparatus at a site meter at a site; and configuring a target offset demand mode via a user preference configuring the target offset demand mode in the distributed energy resource energy storage apparatus via a virtual network; and coupling the target offset demand mode in the distributed energy resource energy storage apparatus via a user interface to the virtual network. In other various aspects, the offset demand monitoring methods may further include steps providing a plurality of renewable energy site integration systems that include one or more DER-ES apparatus at a plurality of site meters at a site location; providing a main load meter edge device virtually networked to each of the plurality of distributed energy resource energy storage apparatus at the one or more site meters, wherein the edge device can be located at the site location or at another location; establishing that a critical load panel is present at the site location; measuring an energy demand and taking one or more site demand measurements where the one or more site meters is placed, wherein the one or more distributed energy resource energy storage apparatus each convert DC power equal to a site demand measurement on the critical load panel for the site location as true 0; starting offset demand monitoring with true 0, wherein the critical load panel is supported by DC power in each of the one or distributed energy resource energy storage apparatus; and taking the site demand measurement via each of the one or more distributed energy resource energy storage apparatus at the one or more site meters, wherein taking the site demand measurement comprises subtracting the maximum power sent out to a grid side of the one or more distributed energy resource energy storage apparatus from the reading of the main load meter edge device to provide a "worst case" site demand measurement for the plurality of site meters. In another aspect, the method may further include steps for inverting to AC at 0 watts if the site demand measurement on any of the one or more site meters is less than zero; and waiting five seconds and start measuring the site demand measurement at the one or more site meters again. Yet another aspect includes steps for taking no action if, the site demand measurement is equal to or more than 0, but less than twice a minimum change; and taking the site demand measurement via the one or more distributed energy resource energy storage apparatus at the one or more site meters. Another configuration includes further steps for inverting to AC with minimum change more watts than last site measurement when the site demand measurement is more than twice the minimum change. Another variation alternately includes steps for configuring the offset demand via the virtual network, and coupling a main load meter edge device via a user interface coupled to the virtual network.

In other certain aspects of the embodiments for offset demand monitoring in a DER-ES apparatus further includes steps for providing one or more distributed energy resource energy storage apparatus at one or more site meters at a site location;

Another variation includes further steps for providing a main load meter edge device virtually networked to each of the one or more distributed energy resource energy storage apparatus at the one or more site meters, wherein the edge device can be located at the site location or at another location;

Other variations includes further steps for measuring an energy demand and taking one or more site demand measurements where the one or more site meters are placed; and taking the site demand measurement via the one or more distributed energy resource energy storage apparatus at the one or more site meters, wherein taking the site demand measurement comprises subtracting the maximum power sent out to a grid side of the one or more distributed energy resource energy storage apparatus from the reading of the main load meter edge device to provide a "worst case" site demand measurement for the one or more site meters. In other various aspects, steps further include inverting to AC at 0 watts if the site demand measurement on any of the one or more site meters is less than zero; and waiting five seconds and start measuring the site demand measurement at the one or more site meters again. Another method further include steps for taking no action if, the site demand measurement is equal to or more than 0, but less than twice a minimum change; and taking the site demand measurement via the one or more distributed energy resource energy storage apparatus at the one or more site meters. Another arrangement further includes steps for inverting to AC with minimum change more watts than last site measurement when the site demand measurement is more than twice the minimum change.

In another configuration of offset demand monitoring methods in one or more DER-ES apparatus, comprises further steps for linking one or more DNP3 platforms to facilitate communication between one or more data processing gateways and one or more components. In other various aspects, further steps include reducing aggregate demand on one or more network connected distributed energy resource energy storage apparatus by calling one or more offset demand modes associated with each one of the one or more network connected apparatus; communicating with one or more network connected distributed energy resource energy storage apparatus via an energy cloud software platform; creating one or more forward energy resource demand reservations for one or more of the distributed energy resource energy storage apparatus; and retrieving one or more forecasting data elements from the energy cloud software platform or an external third party provider via an external API. In an alternate arrangement, the prior method may further include steps for implementing a load shaping service model to reduce aggregate demand of one or more network connected apparatus to monitor offset demand on an aggregate basis. Another configuration further includes additional steps from the prior method for reducing demand on an aggregated level of one or more network connected distributed energy resource energy storage apparatus; and providing one or more gateway controllers in communication with an energy cloud controller linked to an electric vehicle energy control center (EV/ECC) linked to one or more electric vehicle resources and a distributed energy management system (DEMS) lined to one or more distributed energy resources and one or more energy storage objects.

In another embodiment, a method of capacity reservation monitoring in a distributed energy resource energy storage apparatus, includes steps for providing one or more distributed energy resource energy storage apparatus each having a housing at each of the one or more site meters at a site location, each distributed energy resource energy storage apparatus each further having one or more energy storage devices in an intelligent energy storage compartment, one or more inverters, one or more charge controllers, one or more gateway controllers, a common DC bus, and an integrated, engineered power and signal processing system; automatically setting one or more distributed energy resource energy storage apparatus to charge one or more renewable energy storage devices; monitoring a current state of storage and a current state of capacity reservations to identify whether a capacity reservation failure is present in the one or more renewable energy storage devices; and overriding all programs and/or modes when capacity reservation failure is present in the one or more renewable energy storage devices. In certain aspects, the method may further include steps for charging at least one of the one or more renewable energy storage devices from a renewable energy site integration system solar charge controller. In another configuration, the method of capacity reservation monitoring may alternately include further steps for charging at least one of the one or more renewable energy storage devices from the grid. In another configuration, the method may variously include steps for charging the one or more renewable energy storage devices from a renewable energy site integration system solar charge controller; and minimally charging the one or more renewable energy storage devices from the grid, wherein charging the one or more renewable energy storage devices from the grid is only activated when attempts to charge the one or more renewable energy storage devices from a renewable energy site integration system solar charge controller fail, after a minimum time period the renewable energy site integration system reverts to charging the one or more renewable energy storage devices from the renewable energy site integration system solar charge controller.

In an embodiment for providing steps for virtual power plant (VPP) orchestration in a network of one or more distributed energy resource energy storage apparatus, methods include steps for orchestrating one or more distributed energy resources and one or more energy storage objects each associated with an integrated device apparatus that together behave as a single energy entity when programmed and controlled by one or more common elements of one or more energy management software applications. In certain aspects, the method further comprises steps for coordinating one or more energy resource local events each associated with a distributed energy resource energy storage apparatus (DER-ES) such that the one or more energy resource local events, when controlled by a common, remote cloud-based energy management software to program one or more processors to send instructions to a gateway controller in the DER-ES apparatus to perform virtual power plant orchestration steps that the one or more energy resource local events together, behave as a single energy entity, wherein each of the DER-ES apparatus encloses a system comprising an inverter-controller, storage appliance, and gateway controller that functions as a site integration system. In various aspects, the method may include a network of one or more distributed energy resource energy storage apparatus wherein each of the integrated DER-ES apparatus is provided in a commonly integrated designed enclosure having a compact footprint. In certain respects, the one or more DER-ES apparatus are each a site integration system (SIS). In other aspects, the method may further include steps for coordinating one or more energy resource local events wherein a portion of the energy resource local events are associated with an electric vehicle energy resource. In other aspects, steps for forward scheduling of one or more energy resource local events may be provided. In other certain aspects, the one or more steps for providing one or more VPP orchestration methods includes at least one step for providing a load shaping service. In other configurations, the load shaping service steps corresponds to one or more steps for providing event awareness services in an energy resources cloud. In a further configuration, steps are provided wherein providing the virtual power plant orchestration includes iterative scheduling of one or more distributed demand sources that corresponds to one or more energy services in an energy resources cloud.

In other variations of the method, steps are provided for prioritizing one or more programs of one or more DER-ES apparatus via a virtual energy pool in accordance to one or more schedules associated with the common, remote cloud-based energy management software; receiving signals from each one of the one or more programs to determine an active mode for each of the one or more programs; and providing one or more gateway edge controllers in communication with the virtual energy pool and linked to an electric vehicle energy control center and a distributed energy management system. In another aspect, the prior method one or more programs each receives a pricing signal. Alternately, in the prior method, at least one of the one or more programs may receive a cost signal to identify one or more incremental storage cycles. In other applications, each one or the one or more programs of the method above may receive a cost signal to identify one or more incremental storage cycles. In another arrangement, the one or more cost signals are provided wherein the cost signals to identify one or more incremental storage cycles are used to estimate cycle life degradation of one or more energy resources. In yet another arrangement, the cost signals are provided wherein the cost signal estimates cycle life degradation of one or more energy resources to calculate a marginal cost of the one or more energy resources of the virtual energy pool. A further variation of the method includes further steps for receiving one or more load shaping schedule requests; accepting one or more load shaping schedule requests that each coordinate one or more energy resource local events each associated with a distributed energy resource energy storage apparatus (DER-ES) such that the one or more load shaping schedule requests coordinating the one or more energy resource local events, when controlled by the common, remote cloud-based energy management software, behave as a single energy entity in accordance to one or more orchestrated schedules associated with the common, remote cloud-based energy management software; processing one or more accepted load shaping schedule requests; rejecting one or more load shaping schedule requests; modifying one or more rejected load shaping schedules; accepting one or more emergency load control requests; returning one or more modified schedules; executing one or more of the one or more modified schedules that are also accepted in an acceptance update identifier; and associating one or more renewable energy resources with one or more programs to one or more modified load shaping schedules in an energy cloud software platform. Another arrangement further comprises steps for providing an energy cloud controller to receive one or more load shaping request calls; linking one or more networked, site integration systems capable of local storage of locally generated renewable energy to one or more requested schedules comprising any mix of mandatory and limit load shaping activities; identifying the one or more requested schedules; creating a response schedule upon comparison to the request schedule; storing the one or more response schedules for scheduled execution in a data repository; sending one or more returned response schedules; creating a returned response schedule acceptance status identifier; and updating an execution response schedule upon acceptance of the one or more returned response schedules. Yet another arrangement of the VPP orchestration methods further includes steps for monitoring a current stage of storage and a current state of capacity reservations to identify whether to identify whether a capacity reservation failure is present; and updating the execution response schedule before sending the one or more returned response schedules. In other configurations, the method further comprises steps for immediately overriding a current schedule in response to an on-demand event; accepting one or more emergency load requests; determining whether the load shaping service can execute the one or more emergency load requests; modifying a load shaping service schedule if the current schedule cannot execute the requests; and associating one or more renewable energy resources with one or more programs to one or more modified load shaping schedules in an energy cloud software platform. Another configuration includes further steps for retrieving one or more load requests; comparing the one or more load requests with one or more current load shaping service schedules; creating a new schedule that takes into account the requested schedule, capabilities of the load shaping service, current capacity of the load shaping service, and other scheduled requests on the load shaping service; setting the schedule for the appropriate time frame to the new schedule; and returning a new schedule, although the new schedule may not match the requested schedule in all ways, wherein if the load shaping service cannot meet the entire schedule's requirements, the load shaping schedule will return a schedule that is a best fit, using the specified best fit algorithm indicated using the request; requesting a status confirmation of the returned new schedule that identifies whether the returned new schedule is accepted; receiving an alternative schedule request if the previously returned new schedule is rejected and creating an iterative new schedule based on the alternative schedule request; repeating the alternative schedule request and iterative new schedule process until a match exists within a defined differential between the alternative schedule request and the iterative new schedule process.

In another variation of the VPP orchestration method embodiment, the one or more energy resource local events are each associated with a distributed energy resource energy storage apparatus (DER-ES) such that the one or more energy resource local events, when controlled by a common cloud-based energy management software, behave as a single energy entity, wherein each of the DER-ES apparatus encloses an inverter-controller, storage appliance, and gateway controller that together function as a site integration system, and are collectively configured as a micro-grid. In another variation of the micro-grid variation, the micro-grid is remotely controlled by an energy cloud software application that does not require a central server, to form a remote community coordination model. In another micro-grid method variation, the remote community coordination model can be independently controlled by one or more devices dispatching power when the grid is down so that the micro-grid remote community coordination model allows the micro-grid related one or more energy resource to behave as a single entity independently from its related utility provider.

In an embodiment, a solar integrated energy management system (SI-EMS) executes computer implemented methods for monitoring energy including computer-usable readable storage medium having computer-readable program code embodied therein for causing a computer system to perform methods for one or more programs of one or more networked distributed energy resource energy storage apparatus that each function as a renewable energy site integration system accessed via a virtual energy pool, comprising hardware and software components, including one or more processors associated with one or more networked distributed energy resource energy storage (DER-ES) apparatus, each having a common enclosure housing at least one power storage supply device coupled to at least one isolation breaker and integrated with one or more renewable energy generation sources, one or more inverters, one or more charge controllers, one or more energy storage appliances, and one or more gateway controllers; a virtual energy pool in remote communication with the one or more gateway controllers of the one or more DER-ES apparatus; one or more software programs associated with an energy cloud software platform and the one or more processors associated with the one or more networked DER-ES apparatus and the virtual energy pool to monitor and manage one or more distributed energy resources; one or more gateway controllers in communication with the energy cloud software platform and the virtual energy pool to invoke one or more programs and select one or more modes for each of the one or more programs of each of the one or more DER-ES apparatus; memory associated with the one or more gateway controllers to implement monitoring of one or more network resource data objects utilizing computer-usable readable storage medium having non-transient computer-readable program code embodied therein for causing a computer system to determine an active mode for each of the one or more software programs and method steps to prioritize the one or more software programs for programming and controlling one or more distributed energy resources associated with a user site; a requested mode dialog box with one or more objects to indicate results for each one of one or more programs that are each automatically polled for a requested mode at a selected reporting interval and an assigned ranking identifier; an execution module to calculate and display the priority of each requested mode of each set of programs and one or more objects to select one or more rule sets and a second ranking identifier; a dashboard indicator coupling one or more objects to monitor and display a current state of storage, a current state of capacity reservations, and a capacity reservation failure status; an active mode module associated with one or more objects indicating the requested mode of the highest priority program; one or more processors of the one or more gateway controllers sending one or more signals to the one or more DER-ES apparatus to allow at least one inverter, charger, and energy storage device to react to demand conditions on a critical load panel and a user site demand requirement thereby reducing grid demand and avoiding grid power export from a user site location, a site demand measurement module that calculates and displays a site demand measure by subtracting a maximum power dispatched from the grid side of a DER-ES apparatus from a minimum reading of one or more load meters; a user site demand direct measurement module resulting from directly measuring and displaying one or more actual, present site loads; an active mode module to display the requested mode of the highest priority program; an execution engine to implement the active mode of the highest priority program to coordinate one or more energy resources in one or more local events; a common enclosure associated with the distributed energy resource energy storage apparatus to house one or more inverters, energy storage devices, gateway controllers, and chargers, wherein the one or more inverters react to demand conditions to match the site demand measurement with each of the one or more inverters power output, and control the one or more inverters to dispatch the matching power output; an offset demand module to calculate one or more offset demand amounts associated with reducing one or more grid demand amounts and avoiding one or more grid power export amounts; a consumer web portal for selecting one or more offset energy demand amounts; one or more analog to digital interfaces to link one or more sets of instructions with one or more components of each of the one or more DER-ES apparatus; and one or more database application software programs linked to one or more renewable energy resources so that each one of the one or more DER-ES apparatus can monitor and control an associated user site power system. In certain aspects, the system may further include one or more electric vehicle energy control centers and one or more distributed energy management systems coupled to one or more energy controllers. In another variation, the system one or more software programs are associated with an energy cloud software platform and the one or more processors associated with the one or more networked DER-ES apparatus and the virtual energy pool, wherein the SI-EMS monitors and manages one or more distributed energy resources, one or more electric vehicle energy resources and makes one or more static energy reservations. In further configurations, the SI-EMS further comprises one or more renewable energy sources coupled to a user site power system; one or more user site power systems coupled to a utility power grid to distribute power; a user power monitoring control management console wherein the solar integrated energy management system monitors user site user power consumption and demand with the user power monitoring control management console and stores excess alternate energy source power created at a local user generation site associated with each one of the one or more networked distributed energy resource energy storage apparatus, wherein the monitoring control management console sends instructions to each one of the one or more DER-ES apparatus via communication with the remote virtual energy pool and stores the excess alternate energy generated power into one or more energy storage modules in communication with the virtual energy pool to create a virtual energy pool of excess alternate energy generated power available to a common domain; one or more selected executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices; one or more command and control data command sets received via one or more command channels from the remote central server or a third party external source API, wherein the one or more command sets control modes, actions, and device state in the one or more physical devices, to convert one or more formats and one or more protocols to one or more virtualized commands in a common command format; one or more virtualized commands utilized by one or more executor modules running at a command virtualization layer to cause the execution of one or more virtual devices at the device virtualization layer to drive a corresponding physical device to a desired state; and one or more virtual devices executed at the device virtualization layer with one or more other virtual devices in a hierarchical relationship. In another configuration, the SI-EMS virtual excess alternate energy source of power is the difference between power provided by an alternate energy source prior generated power amount available in the virtual energy pool, a user site offset demand amount, a user site renewable energy generation amount, a consumer's energy power consumption loads, and a user site storage capacity. In yet another arrangement, the SI-EMS further comprises system components including a consumer web portal to view data related to one or more user sites associated with each one of the one or more networked DER-ES apparatus; an Internet user interface including one or more application programming interfaces to link to one or more programs associated with one or more users of the one or more grid site management systems and one or more user user site management system associated with the one or more gateway controllers; an advanced meter infrastructure (AMI) coupled to said internet user interface and at least one utility power grid; an energy area network (EAN) coupled to one or more local data processing gateways to monitor and control one or more distributed energy resources or one or more electric vehicle resources; at least one utility power grid to dispatch power to the one or more user sites associated with each of the one or more DER-ES apparatus; one or more independent service operators to dispatch requested power to the one or more user sites associated with each of the one or more DER-ES apparatus upon at least one user site invoking one or more user defined monitoring or one or more user defined control methods; and a utility enterprise relational database application in communication with one or more consumer web portals, one or more Internet user interfaces, one or more advanced meter infrastructures associated with at least one grid, and one or more energy area networks.

In another embodiment, An energy management system for governing energy management resources, comprises a distributed energy resource energy storage tamper resistant enclosure housing; one or more power storage and energy generation storage devices for dispatching and storing locally generated energy wherein one or more termination points associated with the one or more energy storage modules such that the one or more termination points may facilitate solar array energy input and electric utility interconnection, in one or more intelligent storage appliances for storing and dispatching locally generated renewable energy in the housing; one or more alternative energy generation sources coupled to a user power system having a DC bus, an inverter charger controller, one or more intelligent battery charge controllers providing multi-point solar panel tracking ability coupled to the one or more energy storage modules, an isolation switch panel board to protect the power electronics components from a fault or failure of any one of the other power electronics components, wherein the user power system is further coupled to a utility power grid to distribute the required consumer power needed, one or more gateway controllers having one or more processors for performing localized and remote control, storage and generation energy management wherein a portion of the one or more processors provide instructions to one or more computer programs having one or more networked distributed energy management systems to control one or more user site loads and to orchestrate one or more distributed resources to simultaneously negotiate user site and grid requirements; one or more user interfaces to provide a local user grid access interface and a consumer portal, wherein the local user grid access interface provides access to a best mix selection from demand and supply data simultaneously communicated by the user site and grid requirements of the one or more distributed resources; a network of one or more aggregated apparatus acting as a fleet to behave as a single entity to automatically provide orchestrated plans in response to one or more commands; one or more virtual power plant software modules to provide a best mix selection from demand and supply data simultaneously communicated by the user site and grid requirements of the one or more distributed resources, and one or more user interfaces to provide a local user grid access interface and a consumer portal, wherein the local user grid access interface provides access to a best mix selection from demand and supply data simultaneously communicated by the user site and grid requirements of the one or more distributed resources.

In further aspects, the energy management system for governing energy management resources further comprises an energy cloud software platform communicating with the one or more intelligent edge gateway controllers to send and receive the user site and grid requirements of the one or more distributed resources; one or more predictive analytic software modules to improve performance of the one or more distributed resources; a consumer web portal to view data related to one or more user sites associated with each one of the one or more networked DER-ES apparatus; an Internet user interface including one or more application programming interfaces to link to one or more programs associated with one or more users of the one or more grid site management systems and one or more user user site management system associated with the one or more gateway controllers; and a network of one or more aggregated apparatus acting as a fleet wherein the network of one or more aggregated apparatus automatically provide orchestrated voltage control on a specified feeder or a specified circuit in response to one or more commands.

In further aspects, the energy management system for governing energy management resources further comprises one or more removable energy storage components coupled to a shunt switch for physically isolating remaining energy storage modules and further coupled to an isolation switch panel assembly via at least one unique safety connector mechanism and an electrical bus connecting the energy storage module terminals to a main bus which connects to a charge controller and one or more inverters through a unitized system in a common enclosure; and one or more software module sending commands to one or more devices of one or more DER-ES/SIS apparatus that are co-located and directly control the power produced of the one or more renewable energy generating sources wherein the one or more site integration system apparatus time-shifts energy generated from one or more renewable energy generating sources and from the grid to maximize peak load reduction on a specified network location in accordance to one or more plans and the related commands from a remote central server.

In further aspects, the energy management system for governing energy management resources further comprises a utility enterprise relational database application in communication with one or more consumer web portals, one or more Internet user interfaces, one or more advanced meter infrastructures associated with at least one grid, and one or more energy area networks; one or more networked distributed energy resource energy storage apparatus accessed via a virtual energy pool, receiving signals for one or more orchestration plans from each one of one or more programs to determine an active mode for each of the one or more programs; and one or more gateway controllers in communication with the virtual energy pool and linked to an electric vehicle energy control center and a distributed energy management telemetry system embodying one or more sets of rules and one or more sets of constraints to provide a predictive analytics module and an orchestration module wherein said one or more sets of rules and said one or more sets of constraints allow a user to implement multiple sets of rules and constraints which govern various resources selected from the group consisting of power generation, power storage, power use, pricing signals, cost signals to identify one or more incremental storage cycles, marginal cost management of cycle life degradation, virtual power plant orchestration, iterative schedule development, forward event scheduling, event awareness, and load control.

In further aspects, the energy management system for governing energy management resources further comprises one or more sets of rules and said one or more sets of constraints that allow a user to implement one or more algorithms which dictate that if a price of power from a utility power grid reaches one or more price points then a pre-defined percentage of a maximum capacity of stored energy in one or more energy storage modules may be discharged in a single cycle, said pre-defined percentage of a maximum capacity corresponding to the one or more price points. In another configuration, the energy management system for governing energy management resources includes a distributed energy management system comprising one or more processors to further execute a computer implemented method for governing energy management resources; a calculation engine that calculates a marginal cost management of cycle life degradation, a comparator engine to compare a price of power from a utility power grid to one or more price points; and a rules engine to execute one or more rule sets corresponding to the one or more price points. In another configuration, the energy management system for governing energy management resources includes an advanced meter infrastructure (AMI) coupled to said internet user interface and at least one utility power grid; one or more user site energy area networks (EAN) that are coupled to one or more local data processing gateways to monitor and control one or more distributed energy resources; at least one utility power grid to dispatch power to the one or more user sites associated with each of the one or more DER-ES apparatus; and one or more independent service operators to dispatch requested power to the one or more user sites associated with each of the one or more DER-ES apparatus upon at least one user site invoking one or more user defined monitoring or one or more user defined control methods.

In an embodiment, a distributed energy resource energy storage (DER-ES) apparatus for energy management services, comprises a distributed energy resource energy storage tamper resistant enclosure housing having at least one security feature, and an autonomous sensing module; one or more power storage and energy generation storage devices for dispatching and storing locally generated energy wherein one or more termination points associated with the one or more energy storage modules such that the one or more termination points may facilitate solar array energy input and electric utility interconnection, in one or more intelligent storage appliances for storing and dispatching locally generated renewable energy in the housing; one or more alternative energy generation sources coupled to a user power system having a DC bus, an inverter charger controller, one or more intelligent battery charge controllers providing multi-point solar panel tracking ability coupled to the one or more energy storage modules, an isolation switch panel board to protect the power electronics components from a fault or failure of any one of the other power electronics components, wherein the user power system is further coupled to a utility power grid to distribute the required consumer power needed, one or more networked distributed energy management systems coupled to the DER-ES apparatus to control one or more user site loads and to manage one or more distributed resources to simultaneously monitor user site and grid requirements, one or more intelligent gateway controllers simultaneously managing the user site and grid requirements of the one or more distributed resources, wherein the one or more gateway controllers having one or more processors for performing localized and remote control, storage and generation energy management wherein a portion of the one or more processors provide instructions to one or more computer programs having one or more networked distributed energy management systems to control one or more user site loads and to monitor one or more distributed resources to simultaneously negotiate user site and grid requirements wherein each of the DER-ES apparatus encloses a system having a common housing that comprises at least one inverter-controller, at least one storage appliance, and one or more gateway controllers, that together function as a site integration system, an energy cloud software platform communicating with the one or more intelligent gateway controllers to send and receive the user site and grid requirements of the one or more distributed resources, and one or more predictive analytic software modules to improve performance of the one or more distributed resources.

In another aspect, the one or more predictive analytic software modules may each include one or more sets of rules and one or more sets of constraints to allow a user to implement multiple sets of rules and constraints which monitor or govern one or more resources selected from the group consisting of power generation, power storage, power use, pricing signals, cost signals to identify one or more incremental storage cycles, marginal cost management of cycle life degradation, virtual power plant orchestration, iterative schedule development, forward event scheduling, event awareness, and load control.

In another apparatus configuration of the DER-ES for energy management services, the apparatus further comprises one or more virtual power plant modules to provide a best mix selection from demand and supply data simultaneously communicated by the user site and grid requirements of the one or more distributed resources, and one or more user interfaces to provide a local user grid access interface and a consumer portal, wherein the local user grid access interface provides access to a best mix selection from demand and supply data simultaneously communicated by the user site and grid requirements of the one or more distributed resources.

An additional configuration of the apparatus further comprises one or more inverters and one or more charger controllers wherein one or more devices of the one or more inverters and one or more charger controllers dispatches energy to the grid to satisfy grid control system requirements for voltage support. Also, another configuration further comprises one or more electric vehicle energy control centers in communication with one or more edge gateway controllers and one or more electric vehicle resources. The apparatus may be further configured to comprise a site integration system cloud controller aggregating one or more electric vehicle energy control centers in communication with one or more gateway controllers and one or more electric vehicle resources and aggregating one or more distributed energy management systems in communication with one or more distributed resources. In the virtual power plant configuration, the one or more virtual power plants can be further configured to provide voltage support in response to a grid control system requirement responds to one or more demand response events with guaranteed dispatch of power to the grid.

In another aspect, the DER-ES apparatus is configured wherein the apparatus, via one or more energy cloud software platforms communicates with the one or more intelligent edge gateway controllers to send and receive site and grid requirements of the one or more distributed resources, and is electrically and communicably connected to one or more site integration system apparatus to form a network, wherein the network is connected to one or more regional independent service operators (ISO), and is programmed to respond to signals from a provider on a per-second basis.

In another aspect of the embodiment, the DER-ES apparatus further comprises a software module for matching a target inverter output with one or more up and down ramping step functions to convert demand requests into charge and dispatch commands. This configuration of the apparatus may further provide the software module for matching a target inverter output with one or more up and down ramping step functions to convert demand requests into charge and dispatch commands and that further comprises an additional user specified translation amount to shift the entire step function curve up or down by the additional user specified translation amount.

In another configuration of the DER-ES apparatus, an uninterruptible power supply (UPS) unit that automatically isolates the apparatus for energy management services from the grid in the event of a loss of power, and then automatically delivers locally generated site power to the user site without an interruption in service and without a loss in power quality.

In another configuration of the DER-ES apparatus, the apparatus is wired directly to one or more priority loads and communicates via one or more energy cloud software platforms communicating with the one or more intelligent edge gateway controllers to send and receive the site and grid requirements of the one or more distributed resources, and is electrically and communicably connected to one or more site integration system apparatus to form a network to provide energy reliability for one or more critical service loads.

The DER-ES apparatus may alternately be configured to comprise one or more grid power and renewable energy generation storage devices for dispatching and locally storing generated energy, include one or more batteries housed in a battery compartment within the DER-ES apparatus to facilitate draw-out removal of one or more of the one or more batteries in an un-energized position. In another configuration of the DER-ES apparatus further comprises an active cooling module having a thermocouple in an I/O device to measure one or more internal housing temperatures and linked to one or more controllable fans receiving one or more signals from the energy management system, one or more autonomous sensing modules to receive one or more signals from one or more inputs, an enclosure access module having one or more access sensors, and at least one status output with a remote alarm, an I/O module to send and receive one or more signals from an external application.

The DER-ES apparatus may alternately be configured to comprise one or more mode selection modules to prioritize one or more programs associated with each one of the one or more DER-ES apparatus resources. In another DER-ES apparatus configuration further comprises an autonomous sensing offset demand module to determine an offset demand amount according to one or more offset demand methods. In another configuration, the apparatus further comprises an autonomous sensing offset demand assembly having one or more current transformers, one or more potential transformers, one or more analog inputs, and at least one analog protocol converter device, to make one or more site demand measurements, measure the total site load associated with the DER-ES apparatus, calculate an offset demand amount value according to one or more offset demand methods, and discharge the offset demand amount.

In an alternate to the prior method, the apparatus is provided wherein the at least one analog protocol converter device converts one or more CANBUS protocol inputs to TCP/IP protocol. The CANBUS to TCP/IP protocol converter DER-ES apparatus further comprises one or more current transformers coupled with one or more site loads associated with one or more DER-ES apparatus resources to discharge one or more autonomously sensed offset demand amounts. In another configuration the apparatus further comprises one or more current transformers coupled to one or more sensors associated with one or more electric vehicle charging stations to provide rapid charging from one or more inverters housed within one or more DER-ES apparatus.

In other various aspects, the DER-ES apparatus further comprises one or more I/O device termination points coupling the A/C bus of a wind turbine or hydro turbine with one or more DER-ES apparatus.

In another embodiment, an orchestrated virtual power plant, comprises one or more distributed energy resources and one or more energy storage objects each associated with an integrated device apparatus that together behave as a single energy entity when controlled by one or more common elements of one or more energy management software applications; one or more energy resource local events each associated with a distributed energy resource energy storage apparatus (DER-ES) such that the one or more energy resource local events, when controlled by a common cloud-based energy management software, behave as a single energy entity, wherein each of the DER-ES apparatus encloses a system comprising an inverter-controller, storage appliance, and gateway controller that function as a site integration system; one or more gateway controllers having one or more processors for performing localized and remote control, storage and generation energy management wherein a portion of the one or more processors provide instructions to one or more computer programs having one or more networked distributed energy management systems to control one or more user site loads and to monitor one or more distributed resources to simultaneously negotiate user site and grid requirements; an energy cloud software platform communicating with the one or more intelligent edge gateway controllers to send and receive the user site and grid requirements of the one or more distributed resources; one or more predictive analytic software modules to improve performance of the one or more distributed resources; a consumer web portal to view data related to one or more user sites associated with each one of the one or more networked DER-ES apparatus; an Internet user interface including one or more application programming interfaces to link to one or more programs associated with one or more users of the one or more grid site management systems and one or more user site management system associated with the one or more gateway controllers; one or more virtual power plant software modules to provide a best mix selection from demand and supply data simultaneously communicated by the user site and grid requirements of the one or more distributed resources, and one or more user interfaces to provide a local user grid access interface and a consumer portal, wherein the local user grid access interface provides access to a best mix selection from demand and supply data simultaneously communicated by the user site and grid requirements of the one or more distributed resources, and a network of one or more aggregated apparatus acting as a fleet to automatically provide orchestrated voltage control on a specified feeder or a specified circuit in response to one or more commands.

In another aspect of the orchestrated virtual power plant, the orchestrated VPP further comprises a voltage control software module sending commands to one or more devices of one or more DER-ES apparatus to inject or absorb power at a location nearest the load where it is required. In another arrangement, the previous orchestrated VPP configuration of the previous paragraph further comprises a software module sending commands to one or more devices of one or more site integration system apparatus that are co-located and directly control the power produced of the one or more renewable energy generating sources. In another configuration, the orchestrated VPP is provided wherein the one or more site integration system apparatus time-shifts energy generated from one or more renewable energy generating sources and from the grid to maximize peak load reduction on a specified network location. Another configuration is provided wherein the orchestrated virtual power plant uses one or more rule sets to machine learn one or more features of one or more user sites.

The orchestrated virtual power plant may also be provided wherein the orchestrated virtual power plant uses one or more rule sets to machine learn one or more features of one or more user sites and communicates via one or more energy cloud software platforms communicating with one or more intelligent edge gateway controllers to send and receive user site and grid requirements of one or more distributed resources, and is electrically and communicably connected to one or more site integration system apparatus to form a network, wherein the one or more features of the user site of the orchestrated virtual power plant using one or more rule sets to machine learn is selected from a group of attributes consisting of weather, distributed energy device load profiles, customer preferences, grid control system preferences, vendor preferences, and consumer usage preferences.

In another configuration of the orchestrated VPP of the previous paragraph, the one or more rule sets to machine learn one or more features of one or more user sites comprises a learning element including one or more input references from a related knowledge base coupled to a data repository to produce an actual output element, an expected output element from a standard input from the orchestrated virtual power plant, and a comparator module to calculate an error equaling the differences between the actual output element and the expected output element and wherein the orchestrated virtual power plant modifies one or more of the rule sets to automatically adapt via an artificial intelligence component, one or more features of the one or more user sites. This configuration may further comprise a peak load reduction routine module including program code with instructions to cause a computer to perform steps for time shift reductions of energy generated from one or more user sites to correspond to a utility provider defined peak load time period.

In another embodiment, an energy cloud controller method comprises steps for connecting one or more distributed energy management systems to one or more site integration systems and one or more distributed energy resources; connecting one or more electric vehicle energy control centers to one or more electric vehicle resources further connected to one or more edge gateway devices; networking one or more edge controller devices connecting one or more edge devices, one or more electric vehicle energy control centers, and one or more distributed energy management systems; and providing one or communications ports to send and receive signals from one or more grid control systems, one or more demand response management systems, and an energy management system.

The energy cloud controller method may also be provided wherein the one or more electric vehicle resources includes one or more electric vehicle charging stations. In an alternate method, the energy cloud controller method is provided wherein each site integration system apparatus serves as a supervisory control and data acquisition node for its location to provide telemetry data and user preferences to one or more edge gateway controllers and one or more energy gateway devices and to provide aggregated data in one or more virtual energy pools to customers, consumers, utilities and grid operators.

In another embodiment, an energy cloud software platform comprises a remote cloud software platform communicating with the one or more intelligent gateway controllers to send and receive user site and grid requirements at least one of one or more distributed energy resources, one or more electric vehicle resources, and one or more energy storage objects; one or more predictive analytic software modules to improve performance of the one or more distributed resources and energy storage objects; a consumer web portal to view data related to one or more user sites associated with each one of one or more networked distributed energy resource energy storage DER-ES apparatus; an Internet user interface including one or more application programming interfaces to link to one or more programs associated with one or more users of the one or more grid site management systems and one or more user site management system associated with one or more gateway controllers; one or more software programs wherein each of the one or more software programs implement one or more modes and one or more policies in a set of virtual devices; one or more distributed energy resources and one or more energy storage objects each associated with an integrated device apparatus that behaves autonomously to meet user site demands but communicates and aggregates the one or more distributed energy resources, one or more electric vehicle resources and one or more energy storage objects with the remote cloud software platform to be monitored by one or more common elements of one or more energy management software applications; one or more energy resource local events each associated with a distributed energy resource energy storage apparatus (DER-ES) such that the one or more energy resource local events, when controlled by a common cloud-based energy management software, provide one or more localized energy services to the one or more distributed energy resources and energy storage objects associated with the distributed energy storage apparatus (DER-ES), wherein each of the DER-ES apparatus encloses a system comprising an inverter-controller, storage appliance, and gateway controller that function as a site integration system; and one or more gateway controllers having one or more processors for performing localized and remote control, storage and generation energy management, in communication with the cloud software platform, wherein a portion of the one or more processors provide instructions to one or more computer programs having one or more networked distributed energy management systems to aggregate one or more user site loads and to monitor one or more distributed resources to simultaneously negotiate user site and grid requirements.

In certain aspects the energy cloud software platform further comprises a cloud controller in communication with the cloud software platform and at least one of the one or more gateway controllers of each one of the one or more distributed energy resource energy storage apparatus or one or more electric vehicle energy control center gateways to aggregate distributed energy resources, energy storage, and electric vehicle resources and implement charge and discharge plans of the distributed energy, energy storage, and electric vehicle resources. In further aspects, the energy cloud software platform may additionally further include the cloud controller wherein the cloud controller is in communication with one or more gateway devices of one or more distributed energy resource energy storage apparatus implements orchestration to create charge and discharge plans of the one or more distributed energy resource energy storage apparatus and one or more electric vehicle energy control centers, wherein the one or more distributed energy storage apparatus and one or more electric vehicle energy control centers behave as a single entity, in response to one or more grid control systems. In certain aspect, the energy cloud software platform is provided wherein the orchestration implements a virtual power plant. In other aspects, the virtual power plant is a load shaping service.

In another configuration, the energy cloud software platform further comprises one or more energy storage objects each associated with an integrated device apparatus that together behave as a single energy entity when controlled by one or more common elements of one or more energy management software applications; one or more energy resource local events each associated with a distributed energy resource energy storage apparatus (DER-ES) such that the one or more energy resource local events, when controlled by a common cloud-based energy management software, behave as a single energy entity, wherein each of the DER-ES apparatus encloses a system comprising an inverter-controller, storage appliance, and gateway controller that function as a site integration system; an energy cloud software platform communicating with the one or more intelligent gateway controllers to send and receive the user site and grid requirements of the one or more distributed resources; one or more predictive analytic software modules to improve performance of the one or more distributed resources; one or more virtual power plant software modules to provide a best mix selection from demand and supply data simultaneously communicated by the user site and grid requirements of the one or more distributed resources; one or more user interfaces to provide a local user grid access interface and a consumer portal, wherein the local user grid access interface provides access to a best mix selection of demand and supply data simultaneously communicated by the user site and grid requirements of the one or more distributed resources; and a network of one or more aggregated apparatus acting as a fleet to automatically provide orchestrated services to each one of the one or more distributed energy resources energy storage (DER-ES) apparatus coupled to a distributed energy management system and electric vehicle energy control center.

In other aspects, the energy cloud software platform providing aggregation or orchestration modules may be provided for at least one of the one or more electric vehicle resources or one or more distributed energy resources, wherein the set of virtual devices are one or more device drivers to translate common format commands to control signals for driving one or more physical devices to a desired state. In other aspects, the one or more programs associated with the energy cloud software platform and one or more DER-ES apparatus gateway controllers includes the set of virtual devices that collect status information from the one or more physical devices to a desired state. In another configuration of the energy cloud software platform, the set of virtual devices collects status information from the one or more physical devices for transfer to a network cloud. In another configuration of the prior method aspect, the set of virtual devices communicate with the one or more physical devices via a data communications interface. Another aspect of the energy cloud software platform provides the set of virtual devices that can be executed in a hierarchical process. In other aspects, at least one of the one or more software programs is an override process that sends one or more control commands to the set of virtual devices to transition immediately to a specified state. In other aspects of the energy cloud software platform, the platform may be configured wherein each one of the virtual devices of the set of virtual devices can report state parameters, operational history, errors, configuration parameters, and telemetry data to a server and wherein the data from each virtual device may be aggregated in a device report delivered to a remote cloud computing platform. In another option, the energy cloud software platform is provided wherein the server includes a user interface (UI) and one or more application programming interfaces (API) to communicate one or more API messages with network system components wherein the commands associated with the one or more API messages are queued in a server command queue. In further aspects, the platform is provided wherein the storage and energy resources and electric vehicle resources are remotely managed and controlled by a software-as-a-service (SAAS) platform that aggregates one or more systems together in real-time to deliver dynamically scaled energy and information resources across the grid on demand.

In other certain aspects, the energy cloud software platform further comprises a load shaping service application programming interface having a load shaping scheduling module having one or more schedule requests and one or more schedule responses; a scheduled request execution engine to evaluate the one or more schedule requests with the one or more schedule responses to calculate an initial load shaping schedule; an emergency load control override routine module in communication with the initial load shaping schedule; one or more group identifiers associated with one or more resources corresponding to one or more load shaping services; an energy cloud software platform comprising one or more programs associated with one or more renewable energy resources; one or more virtual power plant, load shaping service software modules to provide a best mix selection from demand and supply data simultaneously communicated by the user site and grid requirements of the one or more distributed resources; an energy cloud controller; and one or more networked, distributed energy resource energy storage (DER-ES) apparatus in communication with a remote energy cloud software platform, wherein each of the DER-ES apparatus is capable of local storage of locally generated renewable energy but acts together in a network as a single entity.

The energy cloud software platform may also further comprise a prioritization module to rank each of the one or more programs of one or more networked renewable energy DER-ES apparatus accessed via a remote virtual energy pool; an evaluation engine to receive and store signals from each one of the one or more programs to determine an active mode for each of the one or more programs; and one or more communication protocols to link one or more gateway controllers with the remote virtual energy pool, with one or more electric vehicle energy control centers, and one or more distributed energy management systems for controlling one or more distributed energy resources and one or more energy storage objects, each associated with the one or more DER-ES apparatus, and for controlling one or more electric vehicle energy resources associate with one or more electric vehicle energy control centers. In certain aspects, the energy cloud software platform is provided wherein one or more gateway controllers of one or more DER-ES apparatus communicate with each other via one or more CANBUS protocols without one or more host computers. In other various aspects, the energy cloud software platform is provided wherein at least one or more of the one or more programs receives a pricing signal.

In an embodiment, an energy cloud method comprises steps for monitoring the operation of one or more power electronic components of one or more distributed energy resource energy storage (DER-ES) apparatus; upgrading and managing software running on each storage appliance of the one or more distributed energy resource energy storage (DER-ES) apparatus; managing and reporting in real-time the energy generated in one or more renewable energy generating sources linked to one or more distributed energy resource energy storage (DER-ES) apparatus; responding to one or more pricing, demand, and ancillary services signals; utilizing one or more predictive analytic algorithms to improve performance of distributed resources; reading one or more site loads from one or more site meters wherein the site configuration is selected from one of a group consisting of a site with a main load panel only, a site with a main load panel plus a critical load panel, and a site with neither a load panel or a critical load panel; managing one or more offset demand amounts related to one or more distributed energy resources; selecting one or more distributed energy resources of the one or more distributed energy resource energy storage apparatus wherein the one or more distributed energy resources are one or more user loads that are controlled by one or more sets of instructions from a remote central server; selecting one or more executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices; receiving one or more command and control data command sets via one or more command channels from the remote central server or a third party external source API, wherein the one or more command sets control modes, actions, and device state in the one or more physical devices, to convert one or more formats and one or more protocols to one or more virtualized commands in a common command format; utilizing the one or more virtualized commands by one or more executor modules running at a command virtualization layer to cause the execution of one or more virtual devices at the device virtualization layer to drive a corresponding physical device to a desired state; and executing one or more virtual devices at the device virtualization layer with one or more other virtual devices in a hierarchical relationship.

In certain aspects, the energy cloud method is provided wherein the one or more distributed resources are comprised of one or more of energy, storage, and electric vehicle resources and further comprises steps for orchestrating one or more distributed resources to simultaneously serve site and grid needs in a virtual power plant to allow the one or more energy, storage, and electric vehicle resources and objects to behave as a single entity upon controls from a central server controlling the one or more DER-ES apparatus.

In certain aspects, the energy cloud method is provided wherein at least one of the one or more predictive analytic algorithms includes a machine learning, feedback loop.

In an embodiment, a method in an energy management system comprises steps for providing real-time tracking of one or more values of at least one or more of one or more distributed energy resources or one or more energy storage objects; responding to pricing, demand, and ancillary services signals to produce one or more target outputs of one or more distributed energy resource energy storage (DER-ES) apparatus, each of the apparatus having an inverter-controller, storage appliance, and gateway controller housed in a common enclosure, that together each function as a site integration system and when networked together form an energy network; dispatching and receiving power to one or more distributed resources to simultaneously serve site needs and grid needs by measuring one or more voltages with one or more potential transformers connecting one or more signals of the distributed energy resource energy storage apparatus and measuring one or more currents of one or more signals with one or more current transformers connected to an I/O board, a service load panel, and a utility meter of each of the DER-ES apparatus to calculate and store a voltage/VAR ratio for each of the user sites associated with each of the DER-ES apparatus associated with the energy management system, measuring one or more current loads associated with the one or more signals, calculating one or more forecasted loads using one or more demand response programs and one or more historical load data sets and one or more current load data sets, measuring one or more current PV generation amounts from the one or more PV generation devices, and comparing one or more forecasted PV generation amounts to the one or more current PV generation amounts; using predictive analytics, and real-time reporting and data analysis from an energy cloud software platform in communication with each of the gateway controllers of the one or more DER-ES apparatus to improve performance of one or more distributed resources; pushing decision-making to intelligent edge devices which can optimize performance based on real-time local conditions of the one or more distributed resources and one or more energy storage objects associated with the one or more networked DER-ES apparatus; providing detailed data and analytics to a demand management system (DMS), grid control system (GCS) and associated systems; and distributing resource configuration, upgrades, monitoring, management, and support to a network of distributed resources, energy storage objects and electric vehicle resources.

The method in an energy management system in other aspects, further comprises steps for accepting pricing, demand, frequency regulation, and power quality signals from at least one system functioning as a grid control system GCS, demand management system DMS, or Micro-DMS.

In other aspects, the method in an energy management system further comprises steps for accepting capacity and scheduling guidance from one or more grid control systems GCS; directing guidance to and accepting feedback from at least one distributed energy system; delivering metrics, capacity, and operational state to a GCS through one or more energy resources, one or more electric vehicle resources, and one or more storage objects; reading one or more site loads from one or more site meters wherein the site configuration is selected from one of a group consisting of a site with a main load panel only, a site with a main load panel plus a critical load panel, and a site with neither a load panel or a critical load panel; implementing one or more steps of one or more mode selection methods; managing one or more offset demand amounts related to one or more distributed energy resources; selecting one or more distributed energy resources of the one or more distributed energy resource energy storage apparatus wherein the one or more distributed energy resources are one or more user loads that are controlled by one or more sets of instructions from a remote central server; selecting one or more executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices; receiving one or more command and control data command sets via one or more command channels from the remote central server or a third party external source API, wherein the one or more command sets control modes, actions, and device state in the one or more physical devices, to convert one or more formats and one or more protocols to one or more virtualized commands in a common command format; utilizing the one or more virtualized commands by one or more executor modules running at a command virtualization layer to cause the execution of one or more virtual devices at the device virtualization layer to drive a corresponding physical device to a desired state; and executing one or more virtual devices at the device virtualization layer with one or more other virtual devices in a hierarchical relationship.

The previous energy management system method may variously be provided wherein the steps for accepting capacity and scheduling guidance from one or more grid control systems GCS is an orchestration method so that the one or more distributed energy resources, one or more electric vehicle resources, and one or more storage objects associated with each of the one or more DER-ES apparatus, behave as a single entity upon instructions from a remote central server. In other aspects, the scheduling guidance is a load shaping schedule from one or more control systems. In further aspects, the scheduling guidance creates a virtual power plant in response to commands from one or more control systems.

The method in an energy management system providing scheduling guidance from one or more grid control systems may further comprise steps for providing real-time visibility into one or more electric vehicle, electric vehicle (EV/EVSE) energy resources; responding to one or more pricing, one or more demand, and one or more ancillary services signals; coordinating (EV/EVSE) resources to simultaneously serve site needs and grid needs; using predictive analytics, and real-time reporting and data analysis, to improve performance of one or more EV/EVSE resources; pushing decision-making to intelligent EV/EVSE resources related to one or more gateway controllers or one or more edge controllers to optimize performance of the one or more energy resources, one or more electric vehicle resources, and one or more storage objects based on real-time local conditions; providing one or more data sources and one or more analytic modules to associated DMS, GCS, and micro-grid systems; and configuring one or more EV/EVSE programs associated with the one or more electric vehicle resources to provide upgrades, monitoring, management, and support. The prior method in some aspects further comprises steps for accepting pricing, demand, frequency regulation, and power quality signals from the GCS, DMS, and Micro-DMS; accepting capacity and scheduling guidance from the GCS; directing guidance to and accepting feedback from at least one EV/EVSE system; and delivering metrics, capacity, and operational state commands to the GCS.

In other various aspects of methods in an energy management system, the method further comprises steps for providing one or more CANBUS protocols to allow one or more components to communicate with each other. In other various aspects, the method further comprises steps for providing one or more DNP3 protocols to allow one or more components to communicate with each other.

In an embodiment, an energy cloud controller comprises one or more distributed energy management systems connected to one or more site integration systems and one or more distributed energy resources; one or more edge controller devices connecting one or more edge devices and one or more distributed energy management systems, and one or communications ports to send and receive signals from one or more grid control systems, one or more demand response management systems, and an energy management system. In certain aspects, the energy cloud controller may be provided wherein each site integration system apparatus serves as a supervisory control and data acquisition (SCADA) node for its location to provide telemetry data and user preferences to one or more edge gateway controllers and one or more energy gateway devices and to provide aggregated data in one or more virtual energy pools to customers, consumers, utilities and grid operators. In other aspects, the prior method may further comprise one or more electric vehicle energy control center systems connected to one or more site integration systems and one or more distributed energy resources, one or more electric vehicle energy control centers connected to one or more electric vehicle resources connected to one or more edge gateway devices, one or more edge controller devices connecting one or more edge devices, one or more electric vehicle energy control centers, and one or communications ports to send and receive signals from one or more grid control systems, one or more demand response management systems, and an energy management system. In other various aspects, the energy cloud controller is provided wherein the one or more electric vehicle resources includes one or more electric vehicle charging stations. In another variation, the energy cloud controller is provided wherein the one or more electric vehicle energy control centers connected to the one or more electric vehicle charging stations dispatches energy to offset demand spikes while one or more electric vehicles are charging in the one or more electric vehicle charging stations to buffer grid energy requirements. In another aspect, the energy cloud controller is provided wherein the one or more electric vehicle energy control centers connected to the one or more electric vehicle charging stations further includes a fast charging electric vehicle plug-in receptacle connected to a battery of a site integration system apparatus. In another aspect, the prior configuration may further comprise one or more distributed energy management systems connected to one or more site integration systems and one or more distributed energy resources, one or more electric vehicle energy control centers connected to one or more electric vehicle resources connected to one or more edge gateway devices, one or more edge controller devices connecting one or more edge devices, one or more electric vehicle energy control centers, and one or more distributed energy management systems, and one or communications ports to send and receive signals from one or more grid control systems, one or more demand response management systems, and an energy management system.

In other various aspects, the energy cloud controller is provided wherein the one or more electric vehicle resources includes one or more electric vehicle charging stations and in another aspect the energy cloud controller is provided wherein the one or more electric vehicle energy control centers connected to the one or more electric vehicle charging stations dispatches energy to offset demand spikes while one or more electric vehicles are charging in the one or more electric vehicle charging stations to buffer grid energy requirements. In other certain aspects, the prior configuration is provided wherein the one or more electric vehicle energy control centers connected to the one or more electric vehicle charging stations further includes a fast charging electric vehicle plug-in receptacle connected to a battery of a site integration system apparatus.

In another embodiment, a method for controlling network resources in an aggregated energy cloud comprises steps for networking one or more distributed energy management systems connected to one or more site integration system apparatus that includes one or more renewable energy local storage devices and linked to one or more renewable energy local generation devices, and one or more distributed energy resources; linking one or more electric vehicle energy control centers connected to one or more electric vehicle resources connected to one or more edge gateway devices; linking one or more edge controller devices connecting one or more edge devices, one or more electric vehicle energy control centers, and one or more distributed energy management systems in a common protocol; and providing one or communications ports to send and receive signals from one or more grid control systems, one or more demand response management systems, and an energy management system wherein at least one portion of the energy management system is a cloud based virtual energy pool.

In another configuration of the method for controlling network resources in an aggregated energy cloud, the method is alternately provided wherein the one or more electric vehicle energy control centers connected to the one or more electric vehicle charging stations dispatches energy to offset demand spikes while one or more electric vehicles are charging in the one or more electric vehicle charging stations to buffer grid energy requirements.

In another configuration of the method for controlling network resources in an aggregated energy cloud, the method is alternately provided wherein the one or more electric vehicle energy control centers connected to the one or more electric vehicle charging stations further includes a fast charging electric vehicle plug-in receptacle connected to a battery of a site integration system apparatus.

In another embodiment, a renewable energy value-optimizing computer implemented method to be used in a computer-usable readable storage medium having computer-readable program code embodied therein for causing a computer system to perform one or more of the following steps in any order for prioritizing one or more programs of one or more gateway controllers associated with one or more networked distributed energy resource energy storage apparatus by assigning and storing a priority for each of the one or more programs in an energy management system linked to a remote virtual energy pool; implementing one or more mode selection methods by receiving signals from each one of the one or more programs to determine an active mode for each of the one or more programs and by identifying the particular active mode of each one of the one or more programs in the energy management system linked to the remote virtual energy pool; communicating between one or more gateway controllers with the energy management system and virtual energy pool, wherein the one or more gateway controllers are linked to at least one of the one or more electric vehicle energy control centers and one or more distributed energy management systems; receiving one or more energy output amounts and one or more energy input amounts, and determining one or more offset demand amounts of a user site associated with one or more DER-ES apparatus, at least one grid, and one or more renewable energy generation sources, to measure and store each of the amounts of the user site in the energy management system linked to the remote virtual energy pool; calculating a battery cycle marginal cost from the cost and cycle life data of the one or more batteries associated with the one or more DER-ES apparatus associated with the energy management system linked to the remote virtual energy pool; calculating an overall photo-voltaic to battery efficiency of each one of the one or more distributed energy resource energy storage (DER-ES) apparatus and an aggregated PV to battery efficiency of the networked (DER-ES) apparatus to store in the energy management system linked to the remote virtual energy pool; calculating a battery to grid efficiency by measuring relative energy amounts of each one of the DER-ES apparatus associated with the energy management system linked to the remote virtual energy pool; and calculating a photo-voltaic to grid efficiency by measuring relative energy amounts of each one of the DER-ES apparatus associated with the energy management system linked to the remote virtual energy pool.

In another configuration, the value-optimizing computer implemented method further comprises steps for measuring one or more demand response values; determining at least one demand response capacity of the one or more distributed energy resources and one or more energy storage objects associated with each of the one or more DER-ES apparatus; calculating one or more demand charges avoidance totals by measuring a user site demand by reading one or more site loads, reacting to demand conditions to match the site demand measurement with an inverter power output, controlling the inverter to dispatch the matching power output, calculating one or more offset demand amounts associated with reducing one or more grid demand amounts, calculating one or more offset demand amounts associated with avoiding one or more grid power export amounts, and applying one or more associated energy charges to the one or more offset demand amounts; implementing one or more demand charge tariff routines by selecting one or more TOU tariff routines and selecting one or more tariff schedules; receiving one or more demand response requests; determining one or more demand response amounts committed; and verifying one or more customer sites associated with one or more instances of committed demand response participation.

In another configuration, the value-optimizing computer implemented method further comprises measuring one or more voltages with one or more potential transformers connecting one or more signals of the distributed energy resource energy storage apparatus and measuring one or more currents of one or more signals with one or more current transformers connected to an I/O board, a service load panel, and a utility meter to calculate and store a voltage/VAR ratio in the energy management system; measuring one or more current loads associated with the one or more signals; calculating one or more forecasted loads using one or more demand response predictive algorithms and one or more historical load data sets and one or more current load data sets; measuring one or more current PV generation amounts from the one or more PV generation devices; comparing one or more forecasted PV generation amounts to the one or more current PV generation amounts; calculating one or more maximum rate of power outputs from one or more instances of target site output wattage from one or more inverters matched to one or more instances of offset demands, one or more instances of PV local generation, and one or more instances of grid export avoidance; calculating one or more maximum charge rates from one or more instances of site demand measurement, one or more instances of provider tariff rate schedules, and one or more instances of site offset demand in the distributed energy resource energy storage apparatus; determining one or more maximum state of charge utilizing one or more mode selection methods; and determining one or more minimum state of charge values utilizing one or more mode selection methods.

The value-optimizing computer implemented method is also provided wherein at least one of the one or more iterative processes is a machine learning process. In another aspect of the embodiment the value-optimizing computer implemented method is provided wherein one or more machine iterative processes maximizes peak load reduction for one or more renewable energy DER-ES apparatus resources and in another configuration wherein at least one of the one or more DER-ES apparatus resources is a residential load.

In a further aspect, the value-optimizing computer implemented method is provided wherein the one or more DER-ES apparatus resources and one or more EV-ECC resources are located at a commercial site and the value-optimizing computer implemented method is provided wherein at least one of the one of more DER-ES apparatus resources residential load is an appliance with one or more sensors linked to a home area network and in another configuration the method is provided wherein at least one of the one or more DER-ES apparatus resources or one of the EV-ECC resources are associated with one or more sensors linked to an energy area network.

In another aspect of the value-optimizing computer implemented method is provided further comprising steps for securing one or more energy storage devices in an intelligent energy storage compartment housed within the one or more DER-ES apparatus, wherein each of the DER-ES apparatus include one or more hybrid inverter/converters, one or more charge controllers, and one or more energy storage management systems; coupling the one or more energy storage devices to one or more DER-ES apparatus isolation switch panel; and configuring, by the computer system, one or more processors of the one or more gateway controllers to monitor and control energy management processes associated with each of the DER-ES apparatus resources. In other aspects, the method further comprises steps for selecting one or more methods to schedule time periods to sell locally stored and locally generated energy back to a utility power grid; defining price points of power obtained from a utility power grid at which a user will discharge energy stored in the one or more energy storage devices of the one or more DER-ES apparatus; defining a percentage of maximum capacity of stored energy in one or more of the energy storage devices of the one or more DER-ES apparatus that may be discharged in a single cycle; correlating the price points of power with the percentage of maximum capacity of the one or more energy storage devices of the one or more DER-ES apparatus; configuring the set of price points and maximum capacity percentages to store in the energy management system; applying one or more preferences to the set of price points and maximum capacity percentages to make one or more selections; and calculating the amount of available stored energy capacity by obtaining the product of the storage capacity and a price of power. In other aspects, the method further comprises steps for conducting at least one energy buy-low, sell-high transaction, wherein energy is purchased from a utility at a low price and stored in at least one of the one or more energy storage devices of the one or more DER-ES apparatus associated with one or more user sites, and wherein the available stored energy is sold back to the utility or a third party at a price higher than the low price by an amount greater than the transaction costs.

In other aspects, the method further comprises steps for selecting one or more steps for peak shaving at the one or more user sites; monitoring overall energy demand on the utility power grid to determine time periods correlating with maximum energy rates charged; calculating an amount of maximum energy that can be delivered by the utility power grid to one or more user sites associated with the one or more DER-ES apparatus; determining a threshold energy demand on the grid for each of the one or more user sites associated with the one or more DER-ES apparatus, wherein the threshold energy demand of each of the user sites begins to stress one or more components of the utility power grid; identifying one or more time periods when the threshold energy demand is met, wherein identification of the time period in the energy management system sends control and command instructions associated with each of the one or more energy storage devices housed in the one or more DER-ES apparatus for capable export of locally stored power to the utility power grid; and dispatching and exporting locally stored energy at one or more of the user sites associated with the one or more DER-ES apparatus by one or more of the inverters in response to one or more instructions from the energy management system until the energy demand falls below the threshold energy demand.

In other certain aspects, the computer implemented method is provided wherein implementing one or more weather forecast routines associated with one or more predictive algorithms and one or more weather data sets stored in the energy management system or retrieved from an external application includes forming a data set of historical meteorological values with historical energy demand values at one or more user sites to model future energy demand of the one or more user sites to be placed on the utility grid and to use model future energy demand to forecast when the threshold energy demand of the one or more user sites will be exceeded. In other various aspects, the method is provided wherein the one or more amounts of available stored energy and the one or more calculated battery cycle marginal costs of each of the one or more energy storage devices housed in the one or more DER-ES apparatus may be utilized to reduce local energy generation marginal cost wherein the local energy generation marginal cost of the one or more user sites each comprises a cost of fuel, a cost for variable maintenance, and a cost for increasing capacity of the one or more renewal energy generating arrays. In further various aspects of the method are provided wherein at least one of the one or more energy storage devices is a rapid response energy storage device that regulates the amount of available stored energy in the rapid response energy storage device while charging and discharging.

In another embodiment, a computer program comprising computer-usable readable storage medium for implementing one or more steps of a renewable energy value-optimizing intelligent algorithm having computer-readable program code embodied therein for causing a computer system to perform a method of prioritizing one or more programs of one or more networked renewable energy site integration systems accessed via a virtual energy pool, comprises program code for receiving signals from each one of the one or more programs to determine an active mode for each of the one or more programs; program code for providing one or more gateway edge controllers in communication with the virtual energy pool and linked to an electric vehicle energy control center and a distributed energy management system in an application platform; program code for adjusting one or more weighting constants of the one or more steps of the renewable energy value-optimizing intelligent algorithm to prioritize one or more programs of one or more networked renewable energy site integration systems accessible via a virtual energy pool, wherein each of the one or more weighting constants is determined from one or more machine learning processes applicable to one or more steps, making adjustments to the algorithm to optimize one or more renewable energy site integration systems resources.

In another embodiment, a computer program comprising computer-usable readable storage medium for implementing one or more steps of a renewable energy management intelligent algorithm having computer-readable program code embodied therein for causing a computer system to perform a method of prioritizing one or more programs of one or more networked renewable energy site integration systems accessed energy management system, comprises one or more data processors; a distributed energy management system comprising a computer implemented method for governing energy management resources, executable by the one or more data processors to provide steps to receive a calculation from a engine that calculates a marginal cost management of cycle life degradation; compare a price of power from a utility power grid using a comparator engine a with one or more price points, and execute a rules engine wherein if the price of power from the utility power grid reaches the one or more price points, then a pre-defined percentage of a maximum capacity of stored energy in one or more remaining energy storage modules may be discharged in a single cycle, said pre-defined percentage of a maximum capacity corresponding to the one or more price points.

In another embodiment, a method of load shaping management in a distributed energy resource energy storage apparatus, comprises steps for providing a calling application, wherein the calling application composes a request schedule; submitting the request schedule to a load shaping service application by the calling application; creating a response by the load shaping service application based on the request schedule. In another embodiment the method further comprises creating a "best fit" response schedule as close to the request schedule by the load shaping service application when the load shaping service application cannot satisfy all mandatory activities. Another configuration of the method further comprises steps for satisfying all mandatory activities in the load shaping service application in the request schedule when the load shaping service application can replace limit activities with either no action or activities with a lower rate. In other aspects, the method further comprises steps for satisfying all mandatory activities in the load shaping service application in the request schedule when the load shaping service application does not replace any limit activities. In other certain aspects, the method further comprises steps for storing the response schedule of the load shaping service application for execution; and submitting a new request schedule with different values to the calling application if the load shaping service application cannot satisfy all mandatory activities in the request schedule.

In an embodiment, a computer program comprising computer-usable readable storage medium for implementing one or more steps of a renewable energy algorithm having computer-readable program code embodied therein for causing a computer system to perform a method of load shaping management in one or more networked renewable energy site integration systems accessed energy management system, comprises a request schedule execution engine; a load shaping scheduling module virtually coupled to the request schedule execution engine; one or more group identifiers associated with one or more resources corresponding to one or more load shaping services, the one or more group identifiers corresponding to a request schedule processed through the request schedule engine that further comprises a virtual cloud software platform comprising one or more programs associated with one or more resources and coupled to the request schedule engine; an energy cloud controller virtually coupled to the virtual cloud platform; and one or more networked site integration systems, capable of locally storing energy and, wherein the one or more networked, site integration systems capable of local storage of locally generating renewable energy, wherein the site integration systems process the one or more group identifiers associated with one or more resources corresponding to one or more load shaping services and the request schedule via the request schedule execution engine.

In an embodiment, a method of iterative load shaping service management in a distributed energy resource energy storage apparatus, the method comprises steps for providing a calling application that assembles one or more possible load shaping schedules having restrictive priorities and best fit algorithms, wherein each of the one or more possible load shaping schedules to the load shaping service with an asset command of set never; returning one or more possible response schedules by the load shaping service of the one or more possible load shaping schedules for each requested schedules and does not store each requested schedule; re-examining the one or more possible response schedules returned by the calling application; looping back to providing the calling application that assembles one or more possible load shaping schedules having restrictive priorities and best fit algorithms making iterative changes looking for one or more schedules that match the calling applications' needs; and submitting a command of set always, when the calling application is satisfied with one of the response schedules submitted to the load shaping service. In other aspects, the method further comprises steps for specifying a set command a predetermined schedule to execute by the calling application to store for the load shaping service. In other various aspects the method is provided wherein the set command is set always and the load shaping service stores the response schedule for later execution. In further various aspects the method is provided wherein the a set command is set never and the load shaping service does not store the response schedule for later execution, wherein the calling application runs multiple schedule scenarios to select best possible response schedule. In other various aspects the method is provided wherein the a set command is set if no downgrade, wherein the load shaping service stores response schedules for later execution when all requested mandatory activities are executed by the load shaping service.

In other certain aspects the method is provided wherein the a set command is set if no change, wherein the load shaping service stores response schedules for later execution when all requested mandatory activities are executed by the load shaping service and provides a reminder to the load shaping service not to schedule upgrades. In other aspects the method is provided wherein one or more individual entries in the response schedule can be marked with a designated priority such that the load shaping service can prioritize which of one or more entries in the response schedule will get downgraded. In yet other various aspects the method is provided wherein the one or more entries in the response schedule are ranked with one of high, medium or low priority.

In another configuration, the method is provided wherein the calling application specifies a "best fit" algorithm to use when the load shaping services not able to execute all mandatory activities. Other various aspects include the method wherein truncate specifies removing mandatory activities from the response schedule in low to high priority order until the response schedule can execute all remaining mandatory activities. In other configuration, the method is provided wherein distribute specifies satisfying all mandatory activities with high priority, if not all high priority activities can be satisfied, distribute available capacity between all the high priority activities weighted by rank of activity. In another configuration, the method further comprises steps for distributing specific activities by satisfying all activities with medium priority, if not all medium priority activities can be satisfied, distribute available capacity between all the medium priority activities weighted by rank of activity; and distributing specific activities by satisfying all activities with low priority, if not all low priority activities can be satisfied, distribute available capacity between all the low priority activities weighted by rank of activity. The method in another configuration further comprises steps for changing all low priority activities to "any action"; repeating changing all medium priority activities to "any action" if schedule cannot fully execute; and repeating changing all high priority activities to "any action" if schedule cannot fully execute.

In an embodiment, an iterative load shaping service module in a distributed energy site integration systems, the apparatus comprises an input, wherein the input is integral to the iterative load shaping service module; a memory module configured to store distributed energy information on the iterative load shaping services module on an aggregate level for one or more site locations; a mechanism for receiving the input from a calling application in one or more networked, site integration systems, the calling application configured to produce a requested schedule comprising any mix of mandatory and limit load shaping activities, wherein the input is coupled to the iterative load shaping service module, the memory and one or more virtual, networked, distributed energy site integration systems; a unit for producing a response schedule created upon comparison to the request schedule, wherein the unit for producing the response schedule is coupled to the calling application; a data processing system for a data repository of one or more response schedules for scheduled response execution, wherein the data processing system is coupled to the calling application and the unit for producing a response request; an iterative load shaping scheduler rules engine coupled to the data processing system, the calling application and the unit for producing a response request, wherein if the returned response schedule conforms to a most restrictive priorities and a best fit algorithm of the calling application, then the load shaping service returns a response schedule, but does not schedule the response schedule, only those schedules that meet the most restrictive priorities and a best fit algorithm of the calling application requirements for confirmation of the calling application response schedules; an output configured to receive the output from the calling application response schedules and coupled to the iterative load shaping service module; and a programmable user interface virtually or actually coupled to the output for viewing the results of returning the calling application response schedules, a returned response schedule acceptance status identifier; and a acceptance update identifier for the scheduled response execution.

In certain aspects, the apparatus further comprises the calling application further configured to provide a calling application that assembles one or more possible load shaping schedules having restrictive priorities and best fit algorithms, wherein each of the one or more possible load shaping schedules provided to the load shaping service has an asset command of set never; return the one or more possible response schedules to the load shaping service of one or more possible load shaping schedules for each requested schedules and the load shaping service does not store each requested schedule; submit to the load shaping service to re-examine one or more possible response schedules returned by the calling application; loop back to provide the calling application to assemble one or more possible load shaping schedules having restrictive priorities and best fit algorithms to make iterative changes to look for one or more schedules that match the calling applications' needs; and submit a command of set always, when the calling application is satisfied with one of the response schedules submitted to the load shaping service. In another configuration, the module further comprises an energy cloud software platform comprising one or more programs virtually coupled to one or more virtual, networked, distributed energy site integration systems each having one or more locally generated renewable energy resources; and, one or more energy cloud edge controllers virtually coupled to one or more energy cloud platforms.

In another embodiment, a method of virtual load shaping service management in one or more distributed energy resource storage apparatus' footprint equal to a depth not to exceed a utility workspace, the method comprises steps for providing one or more network gateways; coupling a network edge device to the one or more network gateway; joining the one or more network gateways to the network edge device via a virtual network cloud; monitoring one or more units, wherein each unit has a distributed energy resource storage apparatus, capable of local storage of locally generated renewable energy, via a user portal; and providing a load shaping application programming interface virtually coupled to at least one or more main units through the distributed energy resource storage apparatus, the load shaping application programming interface virtually coupled to the network edge device. In certain aspects, the method further comprises steps for coupling one or more user interfaces to a load shaping application programming interface virtually coupled to the one or more virtual network edge device. In other aspects, the method further comprises steps for providing at least one or more main unit coupled to one or more user interface; coupling each of the one or more main unit to at least one or more subunits; and aggregating in the cloud all the resources of each of the one or more main units and the one or more subunits for each main unit through forward energy and power reservation. In another configuration, the method further comprises steps for coupling a critical load panel actually or virtually to one or more of main units a site. In another configuration, the method additionally further comprises steps for creating a result schedule from one or more request schedules requiring best fit iterations to match the load shaping service management application matching capacity reservation capabilities with capacity reservation capacity; and using the result schedules acquired from the one or more request schedules to forecast demand on an aggregate level.

In another embodiment, a computer program comprising computer-usable readable storage medium for implementing one or more steps of a renewable energy management intelligent algorithm having computer-readable program code embodied therein for causing a computer system to perform a method of prioritizing one or more programs of one or more networked renewable energy site integration systems accessed virtual power plant energy management system, comprises a mechanism for coupling a network edge device to one or more network gateways; permitting the one or more network gateways to virtually couple to the network edge device via a virtual network cloud; configured to monitor through a distributed energy resource energy storage apparatus one or more units, wherein each unit has an attached distributed energy resource energy storage apparatus, capable of local storage of locally generated renewable energy, via a user portal; a load shaping application programming interface virtually coupled to one or more units through the distributed energy resource energy storage apparatus, the load shaping application programming interface virtually coupled to the network edge device; a data processing unit for determining power preservation rule sets; and a module for memory coupled to the data processing unit and virtually coupled to the load shaping programming application interface. In another configuration, the computer program further comprises one or more user interfaces coupled to the network edge device. In other aspects, the computer program further comprises each unit that has one or more subunits; and forward energy power reservation through aggregating in the cloud all the resources of one or more units and one or more subunits for each unit. In other various aspects, the computer program further comprises a critical load panel is coupled via wire or wirelessly to one or more units a site. In another configuration, the computer program further comprises program code for creating a result schedule from one or more request schedules requiring best fit iterations to match the load shaping service management application matching capacity reservation capabilities with capacity reservation capacity; and using the result schedules acquired from one or more request schedules to forecast demand on an aggregate level.

In another embodiment, a method of providing a load shaping service in an energy site integration system comprises steps for receiving a first request to set a load shaping schedule and map a set command as set never, wherein a load shaping service would not store the request for later execution, even if the load shaping schedule could execute all mandatory activities; sending a reply from the load shaping service indicating that the service could not execute the entire schedule, wherein a final response blocks identifying entries that were marked as downgraded; modifying the first request yielding a second request, adapting the second request to allow the load shaping service to execute the entire schedule; and sending a reply from the load shaping service indicating that the service could execute a new entire schedule, and upgrading a third result schedule. In certain aspects, the method is provided wherein the load shaping service will retrieve the provided request and further comprises steps for creating a third request that takes into account the new requested schedule, capabilities of the load shaping service, current capacity of the load shaping service, and other scheduled requests on the load shaping service; setting the third request for the appropriate time frame to the new schedule; and returning a entire new second schedule, although the entire new second schedule may not match the third request in all ways, wherein if the load shaping service cannot meet the third request's requirements, the load shaping schedule will return a schedule that is a best fit, using the specified best fit algorithm indicated using the third request's requirements. In another variation, the method is provided wherein the load shaping service may not be able to handle the requested load shaping service because of inadequate PPV capacity, and a best fit algorithm identifying how the load shaping service should modify the request schedule to match its capabilities and PPV capacity with the requested schedule. In other various aspects, the method is provided wherein the load shaping schedule includes a twenty-four hour period of load shaping activities, broken into time blocks of equal duration, wherein each time block has a Load Shaping Schedule Entry that defines the activity is taken during that period and capacity reservations for non-load shaping functionality. In another aspect of the embodiment, the method is provided wherein an external application or calling service notifies the load shaping service to proceed with a load shaping schedule that includes blocks of time with to proceed with mandatory activities, blocks of time to proceed with optional activities to allow the load shaping service to manage for future needs, and blocks of time in which the load shaping service determines how proceed with discretionary activities. In other certain aspects, the method further comprises an emergency load control device supporting instant demand response, rapid response operational reserve to allow engaging additional spinning reserve, frequency response, voltage sag correction, and any other functionality that requires rapidly injecting or removing power from the grid. In other various aspects, the method further comprises steps for calculating capacity availability by taking a total current capacity and subtracting all reserved capacity reserved for one or more units and one or more subunits for each unit on-demand reserved capacity.

In another embodiment, a computer program comprising computer-usable readable storage medium for implementing one or more steps of a renewable energy algorithm having computer-readable program code embodied therein for causing a computer system to perform a method of iterative schedule development in one or more networked renewable energy site integration systems energy management system, comprises operably configuring one or more networked, site integration systems capable of local storage of one or more locally generated renewable energy resources to virtually link to one or more energy cloud edge controllers; an element for a requested schedule comprising any mix of mandatory and limit load shaping activities capable of receiving an input from a calling application in the one or more networked, site integration systems; a module for a response schedule created upon comparison to the request schedule; a data processing system for a data repository of one or more response schedules for scheduled response execution; a programmable means for a returning a response schedule, a returned response schedule acceptance status identifier; and a acceptance update identifier for the scheduled response execution; and an iterative load shaping scheduler rules engine wherein if the returned response schedule conforms to a most restrictive priorities and a best fit algorithm of the calling application, then the load shaping service returns, but does not schedule, only those schedules that.

In other aspects, the computer program further comprises configuring an energy cloud software platform comprising one or more programs to associate with one or more locally generated renewable energy resources; and operably configure one or more energy cloud edge controllers to couple one or more energy cloud platforms. In other various aspects, the computer program further comprises the calling application further configured to provide a calling application that assembles one or more possible load shaping schedules having restrictive priorities and best fit algorithms, wherein each of the one or more possible load shaping schedules provided to the load shaping service has an asset command of set never; return the one or more possible response schedules to the load shaping service of one or more possible load shaping schedules for each requested schedules and the load shaping service does not store each requested schedule; submit to the load shaping service to re-examine one or more possible response schedules returned by the calling application; loop back to provide the calling application to assemble one or more possible load shaping schedules having restrictive priorities and best fit algorithms to make iterative changes to look for one or more schedules that match the calling applications' needs; and submit a command of set always, when the calling application is satisfied with one of the response schedules submitted to the load shaping service. In other various aspects, the computer program further comprises steps for requesting a execution of one or more load scheduling activities via the calling application to call a load shaping service with a load schedule for future energy and power reservation needs; overriding a current status of one or more load scheduling activities if the load shaping service was able to execute one or more load scheduling activities; rejecting the execution of one or more load scheduling activities if the load shaping service cannot execute of one or more load scheduling activities; reducing the duration of the requested execution of one or more load scheduling activities if the load shaping service cannot execute the requested execution; and implementing, by the computer system, an iterative load shaping scheduler rules engine wherein if a scheduler conforms to an emergency load request and a best fit algorithm of the calling application, then the load shaping service returns request schedules, but does not schedule request schedules of one or more load scheduling activities, the load shaping service only implements those request schedules that meet the calling application's requirements for confirmation to the response schedules. In another variation, the computer program further comprises steps for implementing the response schedule from the request schedule in twenty-four hour periods; and evenly dividing each twenty-four hour period, if a value is not provided the load shaping service provides for thirty minute time intervals. In another configuration, the computer program further comprises steps for including time intervals with definite activities, including time intervals with optional activities, including time intervals when the load shaping service determines its own activities. In other aspects the computer program is provided wherein definite activities include charge, discharge and no action. In another configuration, the computer program is provided wherein optional activities allow the load shaping service to manage the services future energy and power reservation needs and include charge limit and discharge limit. In other aspects, the computer program is provided wherein, each load service state energy site integration system is coupled to and integral to one or more renewable energy resources. In other various aspects, the computer program is provided wherein, the load shaping service cannot execute the requested schedule due to inadequate capacity reservations of the one or more renewable energy resources. In other certain aspects, the computer program is provided wherein, the load shaping service define requested schedule and alter it based on available capacity and forward capacity planning. In another aspect, the computer program further comprises coupling one or more renewable energy resources with one or more programs to one or more requested load shaping schedules in an energy cloud software platform. In another configuration, the computer program is provided wherein transformations applied from a requested schedule to a response schedule are specified by the load shaping service's capabilities and the load shaping services algorithm specified for handling mismatches between the requested schedule and the response schedule and, specified for handling the capacity reserved for non-load shaping functions for the twenty-four hour period.

In other certain aspects, the computer program is provided wherein a charge activity requires the load shaping service request that power be pulled from the grid. In other certain aspects, the computer program is provided wherein a discharge activity requires the load shaping service request that power be dispatched to the grid and other loads. In another configuration, the computer program is provided wherein a no action activity requires the load shaping service does not have a net charge or discharge for the length of a scheduled time interval. In yet another arrangement, the computer program further comprises program for to execute steps for accepting one or more emergency load requests if the load shaping service cannot execute the request. In another arrangement, the computer program further comprises steps for reducing the rate of the requested execution of one or more load scheduling activities if the load shaping service cannot execute the request.

In an embodiment, a method for load shaping grid-scale functions in an energy site integration system comprises steps for requesting execution of one or more load scheduling activities via a calling application to call a load shaping service with a load schedule for future needs; assessing the capability of the load shaping service to execute of one or more load scheduling activities; determining a current capacity of the load shaping service prior to execution of one or more load scheduling activities; determining all current status of one or more load scheduling activities on the load shaping service; setting the requested execution of one or more load scheduling activities on the load shaping service with divided twenty-four hour time intervals to a new response schedule; and implementing, by a computer system, an iterative load shaping scheduler rules engine wherein if a scheduler conforms to an emergency load request and a best fit algorithm of the calling application, then the load shaping service returns request schedules, but does not schedule request schedules of one or more load scheduling activities, the load shaping service only implements those request schedules that meet the calling application's "best fit" requirements for confirmation to the response schedule.

In certain aspects, the method for load shaping grid-scale functions in an energy site integration system comprises steps for providing a reservation mechanism to reserve power and energy for services additional to load shaping such as other on-demand functions. In other various aspects, the prior method in this paragraph is provided wherein the reservation mechanism is an emergency load control to support reservations for aggregated grid-scale function. In further various aspects, the method for load shaping grid-scale functions in an energy site integration system is provided wherein the reservations for aggregated grid-scale function is the amount of capacity reserved for discharging to the grid and/or local loads; the amount of capacity reserved for charging from the grid for the specified reservation function; and the on-demand request that for which reservation is required. In another configuration, the methods of this paragraph are provided wherein the emergency load control supports instant demand response, rapid response operational reserve to allow additional spinning reserve, frequency response, voltage sag correction, and any other activity that requires rapidly injecting power to the grid or rapidly removing power from the grid.

In other certain aspects, the methods above for load shaping grid-scale functions in an energy site integration system further comprises steps for rejecting he requested execution of one or more load scheduling activities if the load shaping service cannot execute of one or more load scheduling activities; reducing the rate of the requested execution of one or more load scheduling activities if the load shaping service cannot execute the request; and reducing the duration of the requested execution of one or more load scheduling activities if the load shaping service cannot execute the request.

In other certain aspects, the methods above for load shaping grid-scale functions in an energy site integration system further comprises steps for implementing the response schedule from the request schedule in twenty-four hour periods; and evenly dividing each twenty-four hour period, if a value is not provided the load shaping service provides for thirty minute time intervals.

In other certain aspects, the methods above for load shaping grid-scale functions in an energy site integration system further comprises steps for including time intervals with definite activities; including time intervals with optional activities; and including time intervals when the load shaping service determines its own activities.

In another configuration, the methods above for load shaping grid-scale functions in an energy site integration system are provided wherein definite activities include charge, discharge and no action. In other aspects, these methods are provided wherein optional activities allow the load shaping service to manage the services future needs and include charge limit and discharge limit. In yet other aspects, the methods are provided wherein each site integration system has one or more renewable energy resources.

In another configuration, the methods above for load shaping grid-scale functions in an energy site integration system are provided wherein the load shaping service cannot execute the requested schedule due to inadequate capacity reservations of the one or more renewable energy resources.

In another configuration, the methods above for load shaping grid-scale functions in an energy site integration system are provided wherein the load shaping service defines requested schedule and alter it based on available capacity and forward capacity planning.

In other certain aspects, the methods above for load shaping grid-scale functions in an energy site integration system further comprises associating one or more renewable energy resources with one or more programs to one or more requested load shaping schedules in an energy cloud software platform.

In other certain aspects, the methods above for load shaping grid-scale functions in an energy site integration system further comprises providing a network edge device having an application program interface virtually coupled to the energy cloud software platform; and coupling one or more energy site integration systems to one or more renewable energy resources with one or more programs and to one or more requested load shaping schedules in an energy cloud software platform, wherein the application program interface is coupled to one or more requested load shaping schedules in the energy cloud software platform.

In other certain aspects, the methods above for load shaping grid-scale functions in an energy site integration system further comprises controlling all of the one or more energy site integration systems having one or more renewable energy resources having one or more programs with the network edge device via the application program interface.

In another configuration, the methods above for load shaping grid-scale functions in an energy site integration system are provided wherein a charge activity requires the load shaping service request that power be pulled from the grid.

In another configuration, the methods above for load shaping grid-scale functions in an energy site integration system are provided wherein a discharge activity requires the load shaping service request that power be dispatched to the grid and other loads.

In another configuration, the methods above for load shaping grid-scale functions in an energy site integration system are provided wherein a no action activity requires the load shaping service does not have a net charge or discharge for the length of a scheduled time interval.

In an embodiment, a method for providing a forward event schedule in an energy demand response system comprises overriding a current load shaping schedule request if the load shaping service was able to execute the request; requesting that power be dispatched or pulled from the grid, as needed to execute the request; accepting one or more emergency load requests, as needed to execute the request; rejecting the request if the load shaping service cannot execute the request; reducing the duration of the request if the load shaping service cannot execute the request; reducing the rate of the request if the load shaping service cannot execute the request; implementing, by a computer system, an iterative load shaping on-demand request scheduler rules engine wherein if the scheduler conforms to an emergency load request and a best fit algorithm of a calling application, then the load shaping service returns, but does not schedule the request, only those schedules requested that meet the calling application requirements for confirmation of the response to return one or more modified load shaping schedules; and associating one or more renewable energy resources with one or more programs to one or more modified load shaping schedules in an energy cloud software platform.

In certain aspects, the method for providing a forward event schedule in an energy demand response system is provided wherein the load shaping service will retrieve the provided request and include steps for creating a new request schedule that takes into account the requested schedule, capabilities of the load shaping service, current capacity of the load shaping service, and other scheduled requests on the load shaping service; setting the schedule for the appropriate time frame to the new schedule; returning a new schedule, though the new schedule may not match the requested schedule in all ways, wherein if the load shaping service cannot meet the entire schedule's requirements, the load shaping schedule will return a schedule that is a best fit, using the specified best fit algorithm indicated using the request schedule.

In other various aspects, the method for providing a forward event schedule in an energy demand response system further comprises steps for identifying one or more requested loads wherein the load shaping service includes inadequate capacity; creating a best fit algorithm to modify the request schedule to match the load shaping service's capabilities and the load shaping service's capacity with the requested schedule.

In further certain aspects, the method for providing a forward event schedule in an energy demand response system is provided wherein the load shaping schedule includes a twenty-four hour period of load shaping activities, broken into time blocks of equal duration, wherein each time block has a LoadShapingScheduleEntry routine that defines the activity that could be taken during that period, wherein the routine further defines capacity reservations for non-load shaping functionality, and other optional parameters.

In other certain aspects, the method for providing a forward event schedule in an energy demand response system further comprises steps for linking an external application or service with a load shaping service that includes a load shaping schedule with blocks of time for definite activities (CHARGE, DISCHARGE, NO_ACTION), blocks of time with optional activities to allow the load shaping service to manage for future needs (CHARGE_LIMIT, DISCHARGE_LIMIT), and blocks of time in which the load shaping service is free to decide for itself what it needs to do (ANY_ACTION).

In various aspects, the method for providing a forward event schedule in an energy demand response system is provided wherein an activity can either be mandatory (CHARGE, DISCHARGE), or can represent an activity that the load shaping service could execute in order to prepare for future load shaping activities and system functions.

In other certain aspects, the method for providing a forward event schedule in an energy demand response system further comprises steps for providing an emergency load control supporting instant demand rapid response. In other certain aspects, the method for providing a forward event schedule in an energy demand response system further comprises steps for allowing rapid response operational reserve functions to rapidly adjust power from the grid selected from the group consisting of additional spinning reserve, frequency response, and voltage sag correction. In other certain aspects, the method for providing a forward event schedule in an energy demand response system further comprises steps for rejecting any Set On Demand Request that the load shaping service cannot commit to executing fully.

In other certain aspects, the method for providing a forward event schedule in an energy demand response system further comprises steps for setting a status identifier to indicate whether the load shaping service is experiencing serious issues and blocking its ability to satisfy both load shaping and other on-demand services; setting a status identifier to indicate whether the load shaping service is experiencing issues that may block it from being able to satisfy some current or future load shaping, on-demand reservations; and setting a status identifier to indicate whether the load shaping service is healthy, although not all subsystems may be functional.

In an embodiment, a method of operating virtual energy resource software in a networking coupled to one or more networked distributed energy resource storage apparatus comprises providing one or more gateway controllers having one or more programs controlling the one or more networked a distributed energy resource energy storage apparatus; automatically polling one or more programs for a requested mode at a reporting interval; assigning a ranking identifier to the requested mode of each of the one or more programs; and determining a highest priority set of programs from among the requested mode of each of the one or more programs.

In certain aspects, the method of operating virtual energy resource software in a networking coupled to one or more networked distributed energy resource storage apparatus further comprises steps for providing an energy cloud software platform communicating with the one or more intelligent edge gateway controllers to send and receive the aggregate site and grid requirements of the one or more networked distributed energy resources; coupling one or more predictive analytic software modules to improve performance of the one or more distributed energy resources having one or more one or more removable energy storage modules; viewing data related to one or more user sites associated with each of the one or more networked distributed energy resource storage apparatus through a consumer web portal; linking one or more programs associated with one or more users of the one or more grid site management systems and aggregate-site management system associated with the one or more gateway controllers to an Internet user interface including one or more application programming interfaces.

In other certain aspects, the method of operating virtual energy resource software in a networking coupled to one or more networked distributed energy resource storage apparatus further comprises steps for coupling a shunt switch for physically isolating one or more removable energy storage modules and coupling to an isolation switch panel assembly via at least one unique safety connector mechanism and an electrical bus to the energy storage module terminals to a main bus which connects to a charge controller and one or more inverters one or more removable energy storage modules; communicating with one or more consumer web portals, one or more Internet user interfaces, one or more advanced meter infrastructures associated with at least one grid, and one or more energy area networks via a utility enterprise relational database application with at least one or more consumer web portals, one or more Internet user interfaces, one or more advanced meter infrastructures associated with at least one grid, and one or more energy area networks; accessing via a virtual energy pool to receive signals from each one of one or more programs to determine an active mode for each of the one or more programs one or more networked renewable energy site integration systems; virtually linking one or more gateway controllers to the grid control center, virtual energy pool and a distributed energy management system embodying one or more sets of rules and one or more sets of constraints to provide a fault tolerance analytics module, an virtualization module; and allowing a user via one or more sets of rules and said one or more sets of constraints to implement multiple sets of rules and constraints which govern various resources selected from the group consisting of forward power reservation, forward energy reservation, power use, pricing signals, cost signals to identify one or more incremental storage cycles, marginal cost management of cycle life degradation, virtual power plant orchestration, iterative schedule.

In further certain aspects, the method of operating virtual energy resource software in a networking coupled to one or more networked distributed energy resource storage apparatus further comprises steps for coupling an advanced meter infrastructure to the internet user interface and at least one utility power grid; coupling one or more user site energy area network's to one or more local data processing gateways to monitor and control one or more distributed energy resources; dispatching power from at least one utility power grid to the one or more user sites associated with each of the one or more distributed energy management resources apparatus; and requesting a scheduled request to dispatch power to the one or more sites associated with each of the one or more distributed energy resources apparatus upon at least one site invoking one or more defined monitoring or one or more defined control methods.

In other various aspects, the method of operating virtual energy resource software in a networking coupled to one or more networked distributed energy resource storage apparatus further comprises steps for providing one or more energy resource local events each associated with a distributed energy resource energy storage apparatus such that the one or more energy resource local events, when controlled by a common cloud-based energy management software, provide one or more localized energy services to the one or more distributed energy resources and energy storage objects associated with the distributed energy storage apparatus wherein each of the distributed energy storage apparatus encloses a system comprising an inverter-controller, storage appliance, and gateway controller that function as a site integration system; and providing one or more gateway controllers having one or more processors for performing localized and remote control, storage and generation energy management, in communication with the cloud software platform, wherein a portion of the one or more processors provide instructions to one or more computer programs having one or more networked distributed energy management systems to control one or more user site loads and to monitor one or more distributed resources to simultaneously negotiate user site and grid requirements.

In further various aspects, the method of operating virtual energy resource software in a networking coupled to one or more networked distributed energy resource storage apparatus further comprises steps for coupling a cloud controller with the cloud software platform and at least one of the one or more gateway controllers of each one of the one or more distributed energy resource energy storage apparatus or one or more electric vehicle energy control center gateways to aggregate distributed energy resources, energy storage, and electric vehicle resources and implement charge and discharge plans of the distributed energy, energy storage, and electric vehicle resources.

In other aspects, the method of operating virtual energy resource software in a networking coupled to one or more networked distributed energy resource storage apparatus is provided wherein the cloud controller coupled to one or more gateway devices of one or more distributed energy resource energy storage apparatus implements orchestration to create charge and discharge plans of the one or more distributed energy resource energy storage apparatus and one or more electric vehicle energy control centers, wherein the one or more distributed energy storage apparatus and one or more electric vehicle energy control centers behave as a single entity, in response to one or more grid control systems.

In other aspects, the method of operating virtual energy resource software in a networking coupled to one or more networked distributed energy resource storage apparatus is provided wherein the orchestration implements a virtual power plant. In other aspects, the method of operating virtual energy resource software in a networking coupled to one or more networked distributed energy resource storage apparatus is provided wherein the virtual power plant is a load shaping service.

In further various aspects, the method of operating virtual energy resource software in a networking coupled to one or more networked distributed energy resource storage apparatus further comprises steps for associating one or more energy storage objects each with an integrated device apparatus that together behave as a single energy entity when controlled by one or more common elements of one or more energy management software applications; associating one or more energy resource local events each with a distributed energy resource energy storage apparatus such that the one or more energy resource local events, when controlled by a common cloud-based energy management software, behave as a single energy entity, wherein each of the distributed energy resource energy storage apparatus encloses a system comprising an inverter-controller, storage appliance, and gateway controller that function as a site integration system; communicating one or more intelligent gateway controllers to send and receive the user site and grid requirements of the one or more distributed resources with an energy cloud software platform; improving performance of the one or more distributed resources by one or more predictive analytic software modules; providing one or more virtual power plant software modules to provide a best mix selection from demand and supply data simultaneously communicated by the user site and grid requirements of the one or more distributed resources; providing one or more user interfaces to access a local user grid interface and a consumer portal, wherein the local user grid access interface to access to a best mix selection of demand and supply data simultaneously communicated by the user site and grid requirements of the one or more distributed resources; and automatically providing a network of one or more aggregated apparatus acting as a fleet to orchestrate services to each one of the one or distributed energy resource energy storage apparatus coupled to a distributed energy management system and electric vehicle energy control center.

In other aspects, the method of operating virtual energy resource software in a networking coupled to one or more networked distributed energy resource storage apparatus is provided wherein the set of virtual devices are one or more device drivers to translate common format commands to control signals for driving one or more physical devices to a desired state. In other aspects, the method of operating virtual energy resource software in a networking coupled to one or more networked distributed energy resource storage apparatus is provided wherein the set of virtual devices collects status information from the one or more physical devices for transfer to a network cloud.

In other aspects, the method of operating virtual energy resource software in a networking coupled to one or more networked distributed energy resource storage apparatus is provided wherein the set of virtual devices communicate with the one or more physical devices via a data communications interface. In other aspects, the method of operating virtual energy resource software in a networking coupled to one or more networked distributed energy resource storage apparatus is provided wherein the set of virtual devices can be executed in a hierarchical process.

In other aspects, the method of operating virtual energy resource software in a networking coupled to one or more networked distributed energy resource storage apparatus is provided wherein at least one of the one or more software programs is an override process that sends one or more control commands to the set of virtual devices to transition immediately to a specified state.

In other aspects, the method of operating virtual energy resource software in a networking coupled to one or more networked distributed energy resource storage apparatus is provided, wherein each one of the virtual devices of the set of virtual devices can report state parameters, operational history, errors, configuration parameters, and telemetry data to a server and wherein the data from each virtual device may be aggregated in a device report delivered to a remote cloud computing platform.

In other aspects, the method of operating virtual energy resource software in a networking coupled to one or more networked distributed energy resource storage apparatus is provided wherein the server includes a user interface and one or more application programming interfaces to communicate one or more API messages with network system components wherein the commands associated with the one or more API messages are queued in a server command queue.

In other aspects, the method of operating virtual energy resource software in a networking coupled to one or more networked distributed energy resource storage apparatus is provided wherein the storage and energy resources and electric vehicle resources are remotely managed and controlled by a software-as-a-service (SAAS) platform that aggregates one or more systems together in real-time to deliver dynamically scaled energy and information resources across the grid on demand.

In further various aspects, the method of operating virtual energy resource software in a networking coupled to one or more networked distributed energy resource storage apparatus further comprises steps for providing a load shaping service application programming interface having a load shaping scheduling module having one or more schedule requests and one or more schedule responses; evaluating the one or more schedule requests via a scheduled request execution engine with the one or more schedule responses to calculate an initial load shaping schedule; coupling an emergency load control override routine module with the initial load shaping schedule; associating one or more group identifiers with one or more resources that correspond to one or more load shaping services; associating an energy cloud software platform comprising one or more programs with one or more distributed renewable energy resources; providing one or more virtual power plant, load shaping service software modules with a best mix selection from demand and supply data simultaneously communicated by the user site and grid requirements of the one or more distributed renewable energy resources; virtually coupling an energy cloud controller to the energy cloud software program; and virtually coupling one or more networked, distributed energy resource energy storage apparatus with a remote energy cloud software platform, wherein each of the distributed energy resource energy apparatus is capable of local storage of locally generated renewable energy resources but acts together in a network as a single entity.

In other aspects, the method of operating virtual energy resource software in a networking coupled to one or more networked distributed energy resource storage apparatus is provided wherein at least one or more of the one or more programs receives a pricing signal.

In further various aspects, the method of operating virtual energy resource software in a networking coupled to one or more networked distributed energy resource storage apparatus further comprises steps for ranking each of the one or more programs of one or more networked renewable energy distributed energy resource storage apparatus via a prioritization module accessed via a remote virtual energy pool; determining an active mode for each of the one or more programs via evaluation engine to receive and store signals from each one of the one or more programs; and providing one or more communication protocols to link one or more gateway controllers with the remote virtual energy pool, with one or more electric vehicle energy control centers, and one or more distributed energy management systems for controlling one or more distributed energy resources and one or more energy storage objects, each associated with the one or more distributed energy resource storage apparatus, and for controlling one or more electric vehicle energy resources associate with one or more electric vehicle energy control centers.

In another embodiment, a method for providing an on-demand request, comprises steps for overriding a current load shaping schedule if a load shaping service was able to execute the request; requesting that power be dispatched or pulled from the grid; accepting one or more emergency load requests; rejecting the request if the load shaping service cannot execute the request; reducing the duration of the request if the load shaping service cannot execute the request; reducing the rate of the request if the load shaping service cannot execute the request; associating one or more renewable energy resources with one or more programs to one or more modified load shaping schedules in an energy cloud software platform; and implementing, by a computer system, an iterative load shaping on-demand request scheduler rules engine wherein if the scheduler conforms to an emergency load request and a best fit algorithm of a calling application, then the load shaping service returns, but does not schedule, only those schedules that meet the calling application requirements for confirmation of the response.

In certain aspects the method for providing an on-demand request is provided wherein the load shaping service will retrieve the provided request and further includes steps for creating a new schedule that takes into account the requested schedule, capabilities of the load shaping service, current capacity of the load shaping service, and other scheduled requests on the load shaping service; setting the schedule for the appropriate time frame to the new schedule; returning a new schedule, although the new schedule may not match the requested schedule in all ways, wherein if the load shaping service cannot meet the entire schedule's requirements, the load shaping schedule will return a schedule that is a best fit, using the specified best fit algorithm indicated using the request.

In other certain aspects the method for providing an on-demand request is provided wherein the load shaping service may not be able to handle the requested load shaping service because of inadequate capacity, and a best fit algorithm identifying how the load shaping service should modify the request schedule to match its capabilities and capacity with the requested schedule.

In other certain aspects the method for providing an on-demand request is provided wherein the load shaping schedule includes a twenty-four hour period of load shaping activities, broken into time blocks of equal duration, wherein each time block has a LoadShapingScheduleEntry that defines the activity that could be taken during that period, capacity reservations for non-load shaping functionality, and other optional parameters.

In other certain aspects the method for providing an on-demand request is provided wherein an external application or service calling the load shaping service with a load shaping schedule that includes blocks of time with definite activities (CHARGE, DISCHARGE, NO_ACTION), blocks of time with optional activities to allow the load shaping service to manage for future needs (CHARGE_LIMIT, DISCHARGE_LIMIT), and blocks of time in which the load shaping service is free to decide for itself what it needs to do (ANY_ACTION).

In other certain aspects the method for providing an on-demand request is provided wherein an activity can either be mandatory (CHARGE, DISCHARGE), or can represent an activity that the load shaping service could execute in order to prepare for either future load shaping activities, or for other system functions.

In other certain aspects the method for providing an on-demand request is provided wherein an emergency load control supporting instant demand response, rapid response operational reserve to allow engaging additional spinning reserve, frequency response, voltage sag correction, and any other functionality that requires rapidly injecting or removing power from the grid.

In other certain aspects the method for providing an on-demand request is provided wherein setting one or more status identifiers to display a load shaping service status wherein if the load shaping service is experiencing serious issues, the load shaping service sends a signal to prevent satisfying both load shaping and other on-demand services; setting one or more status identifiers to display whether the load shaping service is experiencing issues that may block it from being able to satisfy some current or future load shaping or other on-demand reservations; and setting one or more status identifiers to display whether the load shaping service is healthy, although not all subsystems may be functional.

In another embodiment, a method for requesting a load service state, comprises steps for requesting a current status of a load shaping service, wherein the status report includes health indicator information, power and energy available for on-demand operations, and power readings including: Power offset—an amount of power (in kW) being output by the load shaping service, including power that does not reach the grid because of local consumption, Power stored from the grid—an amount of power (in kW) being taken from the grid and placed into storage, Power generated—an amount of power (in kW) being generated by resources associated with the load shaping service, Power stored—an amount of power (in kW) being stored, both from generation resources and the grid, Power discharged—an amount of power (in kW) being discharged from storage, and Power passed through—an amount of power (in kW) passing through load shaping service subunits; requesting an energy report from the load shaping service, providing aggregated energy usage in different categories, for a specific period of time, wherein the energy report includes a start and end time; a summary of energy transferred during that time including: Energy offset—an amount of energy (in kWh) output by the load shaping service during the requested time period, including energy that did not reach the grid because of local consumption, Energy stored from the grid—an amount of energy (in kWh) taken from the grid and placed into storage during the requested time period, Energy generated—an amount of energy (in kWh) generated by resources associated with the load shaping service during the requested time period, Energy stored—an amount of energy (in kWh) stored, both from generation resources and the grid, during the requested time period, Energy discharged—an amount of energy (in kWh) discharged from storage during the requested time period, Energy passed through—an amount of energy (in kWh) that passed through load shaping service subunits during the requested time period; implementing, by a computer system, an iterative load service state request rules engine retrieving the load shaping service for a specific group, retrieving the status of the entire load shaping service, retrieving the energy report for a specific group, or retrieving the energy report for the entire load shaping service.

In certain aspects, the method for requesting a load service state comprises steps for requesting a current status of a load shaping service wherein the load shaping service will retrieve the provided request and includes steps for creating a new schedule that takes into account the requested schedule, capabilities of the load shaping service, current capacity of the load shaping service, and other scheduled requests on the load shaping service; setting the schedule for the appropriate time frame to the new schedule; returning a new schedule, although the new schedule may not match the requested schedule in all ways, wherein if the load shaping service cannot meet the entire schedule's requirements, the load shaping schedule will return a schedule that is a best fit, using the specified best fit algorithm indicated using the request.

In other certain aspects, the method for requesting a load service state comprises steps for requesting a current status of a load shaping service wherein the load shaping service may not be able to handle the requested load shaping service because of inadequate capacity, and a best fit algorithm identifying how the load shaping service should modify the request schedule to match its capabilities and capacity with the requested schedule.

In other certain aspects, the method for requesting a load service state comprises steps for requesting a current status of a load shaping service wherein the load shaping schedule includes a twenty-four hour period of load shaping activities, broken into time blocks of equal duration, wherein each time block has a LoadShapingScheduleEntry that defines the activity that could be taken during that period, capacity reservations for non-load shaping functionality, and other optional parameters.

In other certain aspects, the method for requesting a load service state comprises steps for requesting a current status of a load shaping service wherein an external application or service calling the load shaping service with a load shaping schedule that includes blocks of time with definite activities (CHARGE, DISCHARGE, NO_ACTION), blocks of time with optional activities to allow the load shaping service to manage for future needs (CHARGE_LIMIT, DISCHARGE_ LIMIT), and blocks of time in which the load shaping service is free to decide for itself what it needs to do (ANY_ACTION).

In other certain aspects, the method for requesting a load service state comprises steps for requesting a current status of a load shaping service wherein an activity can either be mandatory (CHARGE, DISCHARGE), or can represent an activity that the load shaping service could execute in order to prepare for either future load shaping activities, or for other system functions.

In other certain aspects, the method for requesting a load service state comprises steps for requesting a current status of a load shaping service wherein an emergency load control supporting instant demand response, rapid response operational reserve to allow engaging additional spinning reserve, frequency response, voltage sag correction, and any other functionality that requires rapidly injecting or removing power from the grid. In other certain aspects, the method for requesting a load service state comprises steps for requesting a current status of a load shaping service wherein the load shaping service rejecting any SetOnDemandRequest that the load shaping service cannot commit to executing fully.

In other certain aspects, the method for requesting a load service state comprises steps for requesting a current status of a load shaping service further comprises setting one or more status identifiers if the load shaping service is experiencing serious issues, blocking its ability to satisfy both load shaping and other on-demand services; setting one or more status identifiers if the load shaping service is experiencing issues that may block it from being able to satisfy some current or future load shaping or other on-demand reservations; and setting one or more status identifiers if the load shaping service is healthy, although not all subsystems may be functional.

BRIEF DESCRIPTION OF THE DRAWINGS

Figure 1:
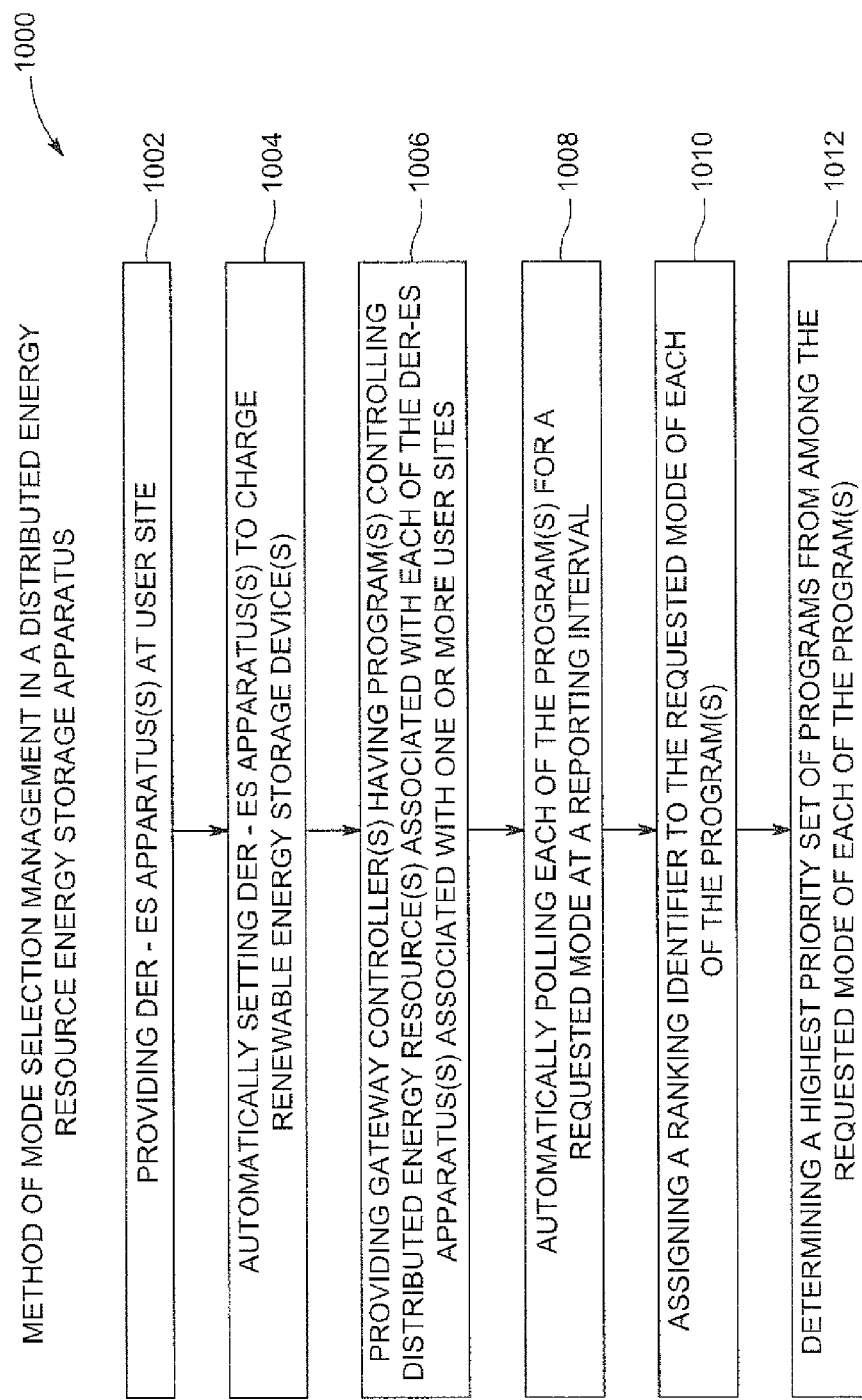

Having thus described the invention in general terms, reference will now be made to the accompanying drawings, which are not necessarily drawn to scale, and wherein:

FIG. 1 is a flow chart for a method of mode selection in a distributed energy resource energy storage apparatus.

Figure 2A:
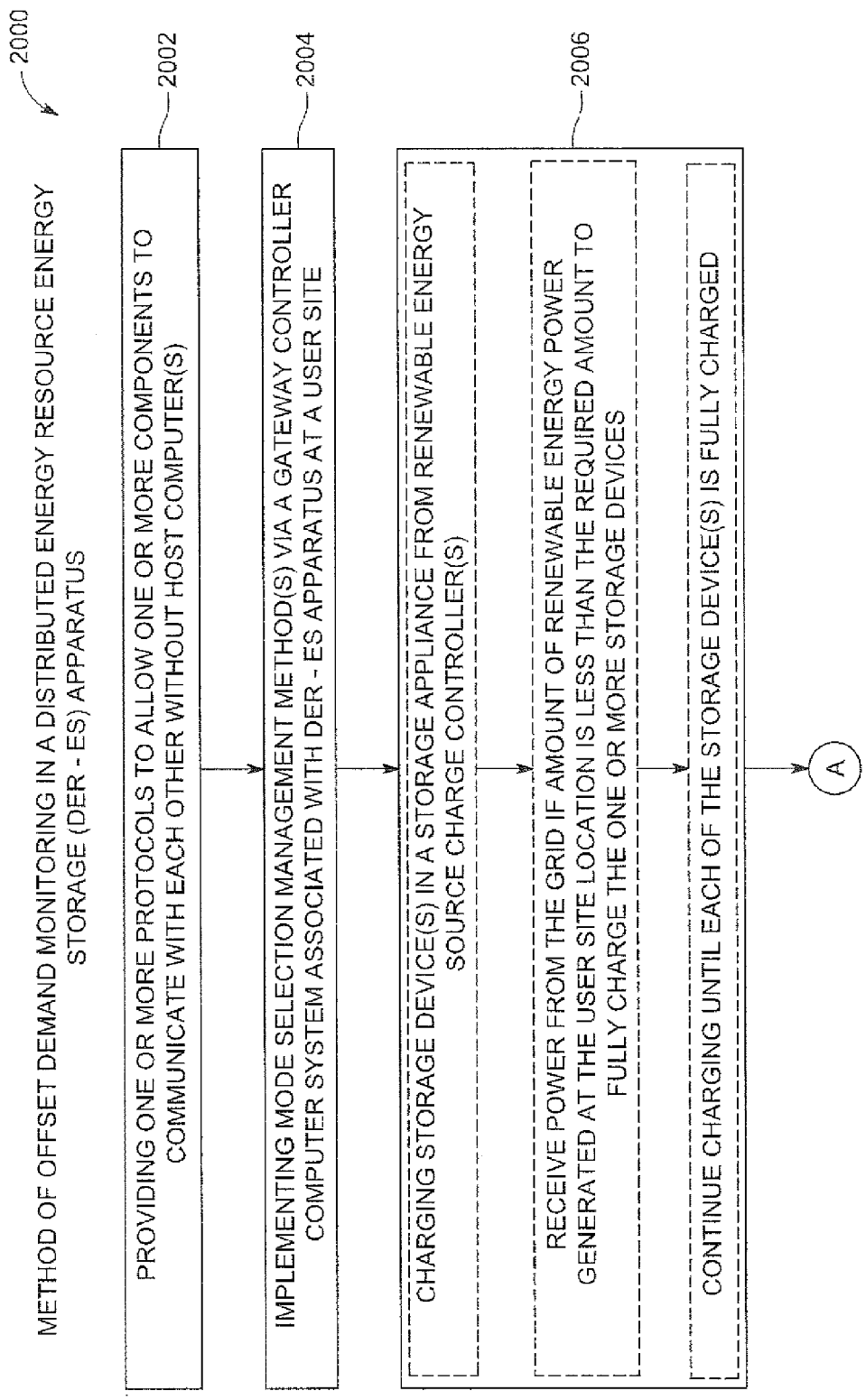
Figure 2B:
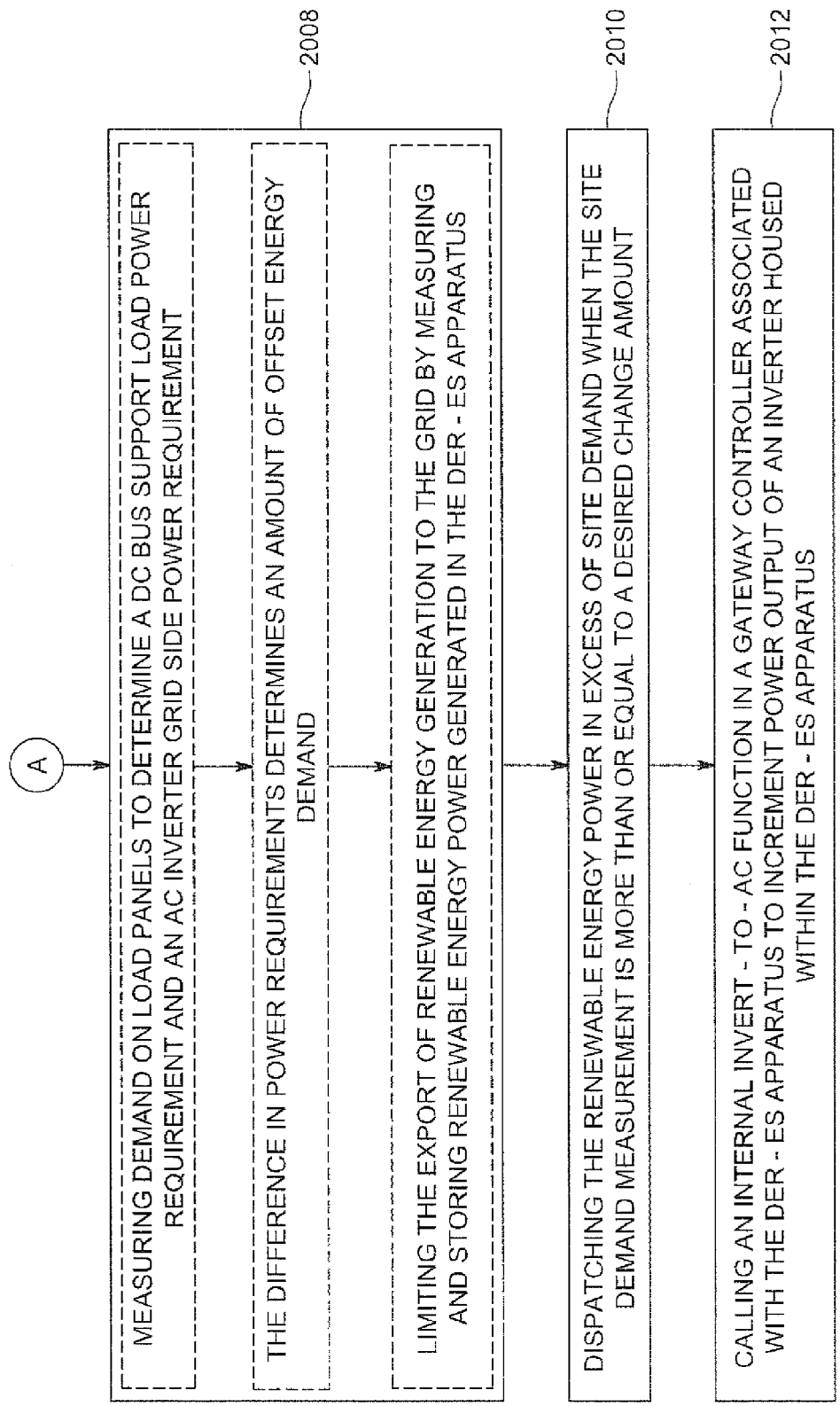

FIGS. 2A and 2B are flow charts for methods of offset demand monitoring in a distributed energy resource energy storage apparatus.

Figure 3:
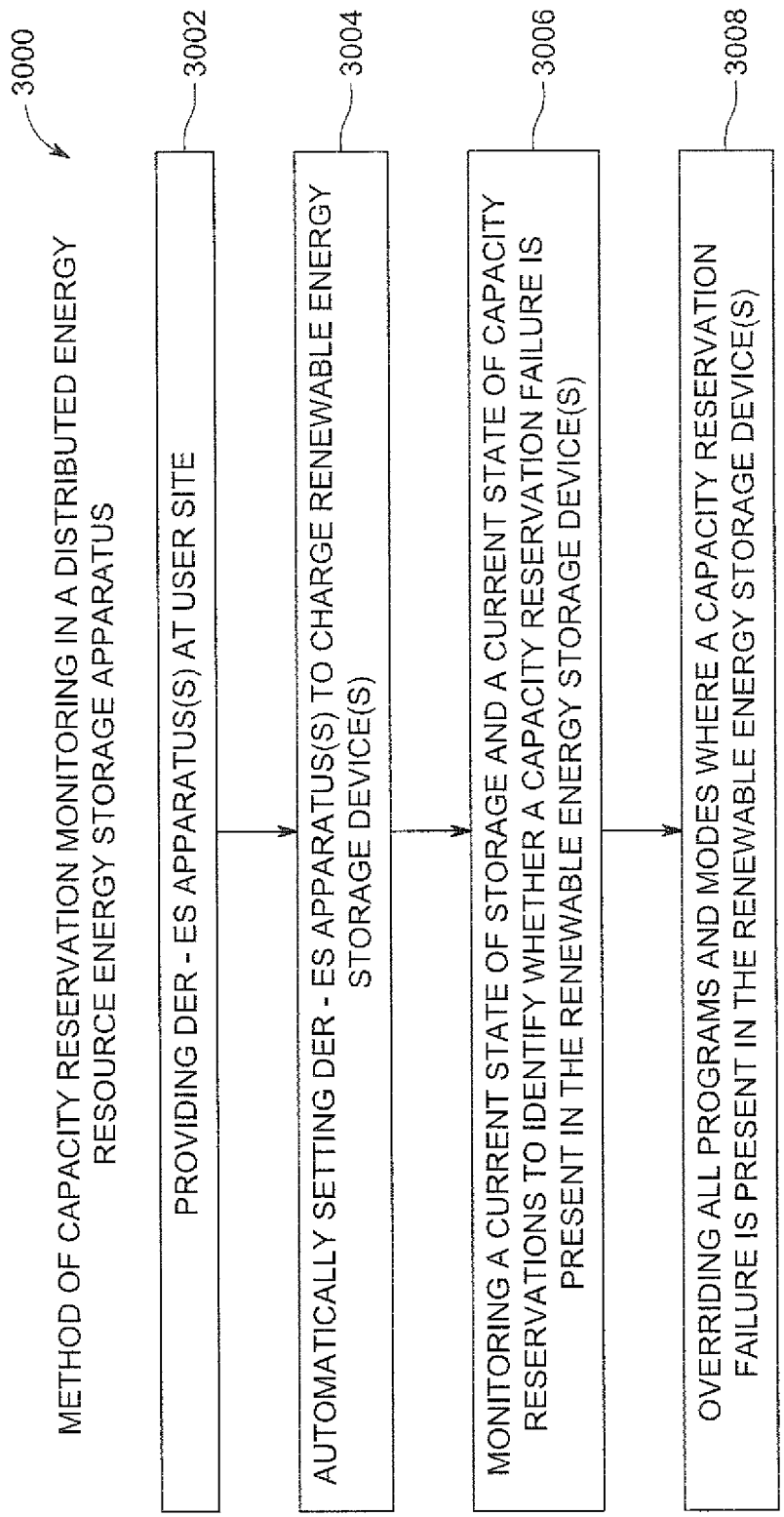
Figure 4A:
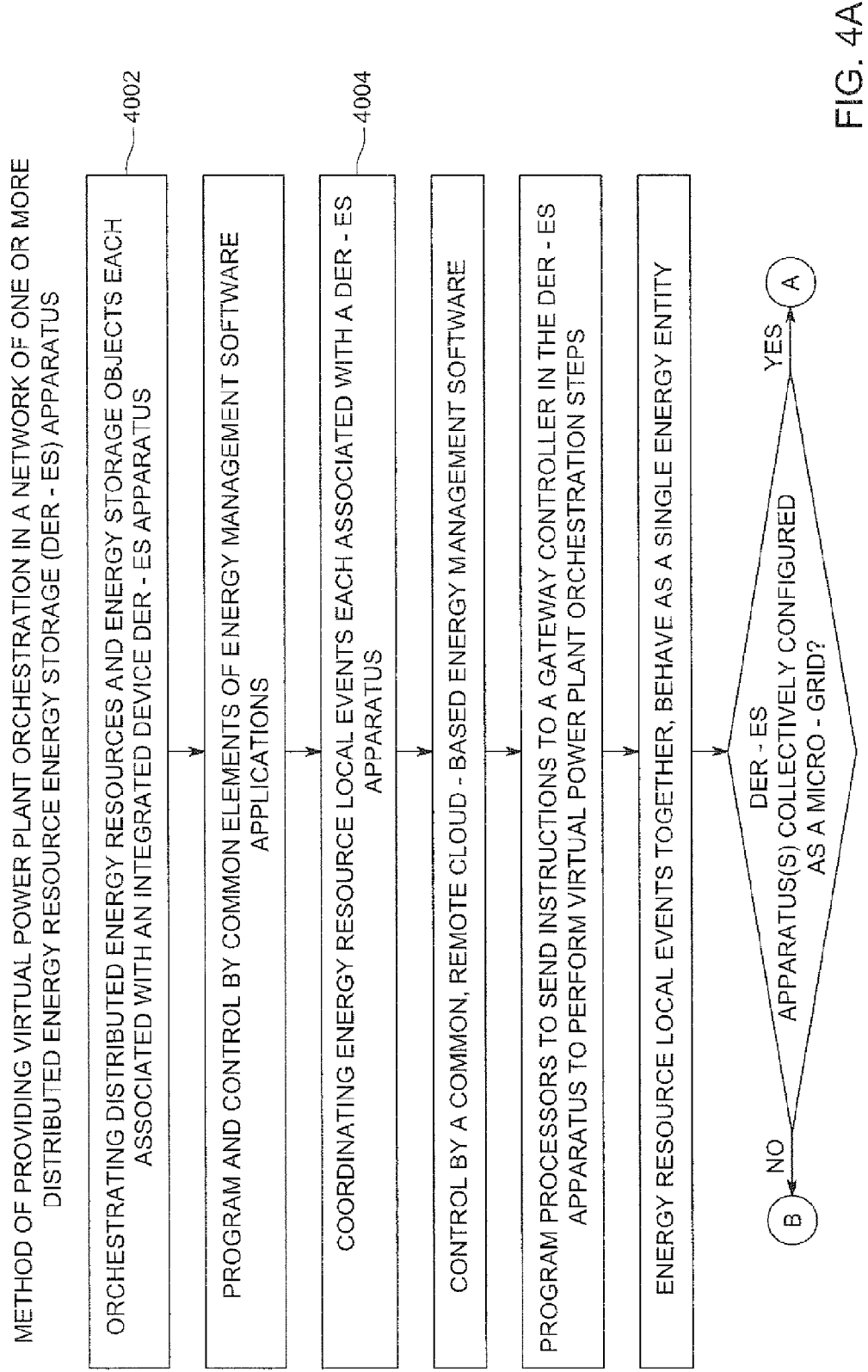
Figure 4B:
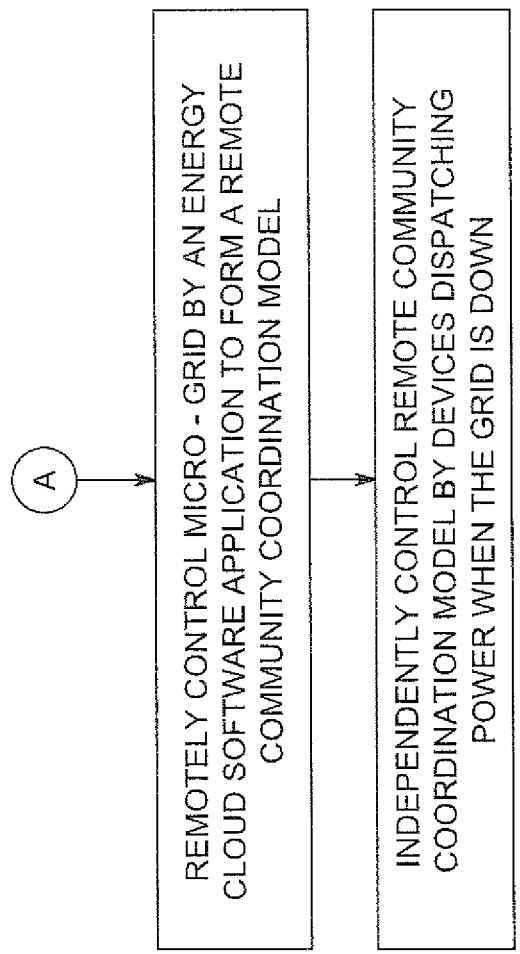
Figure 4C:
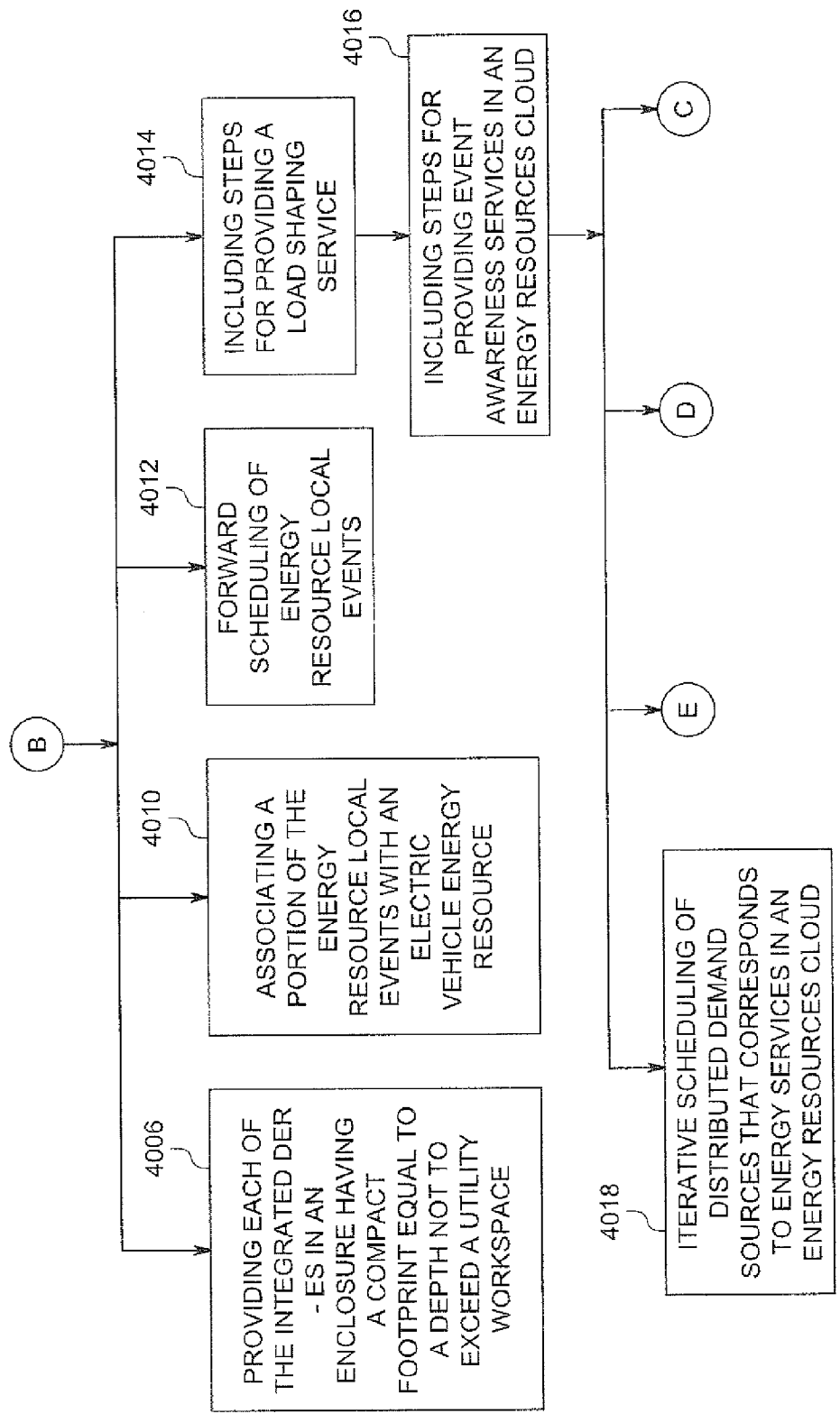
Figure 4D:
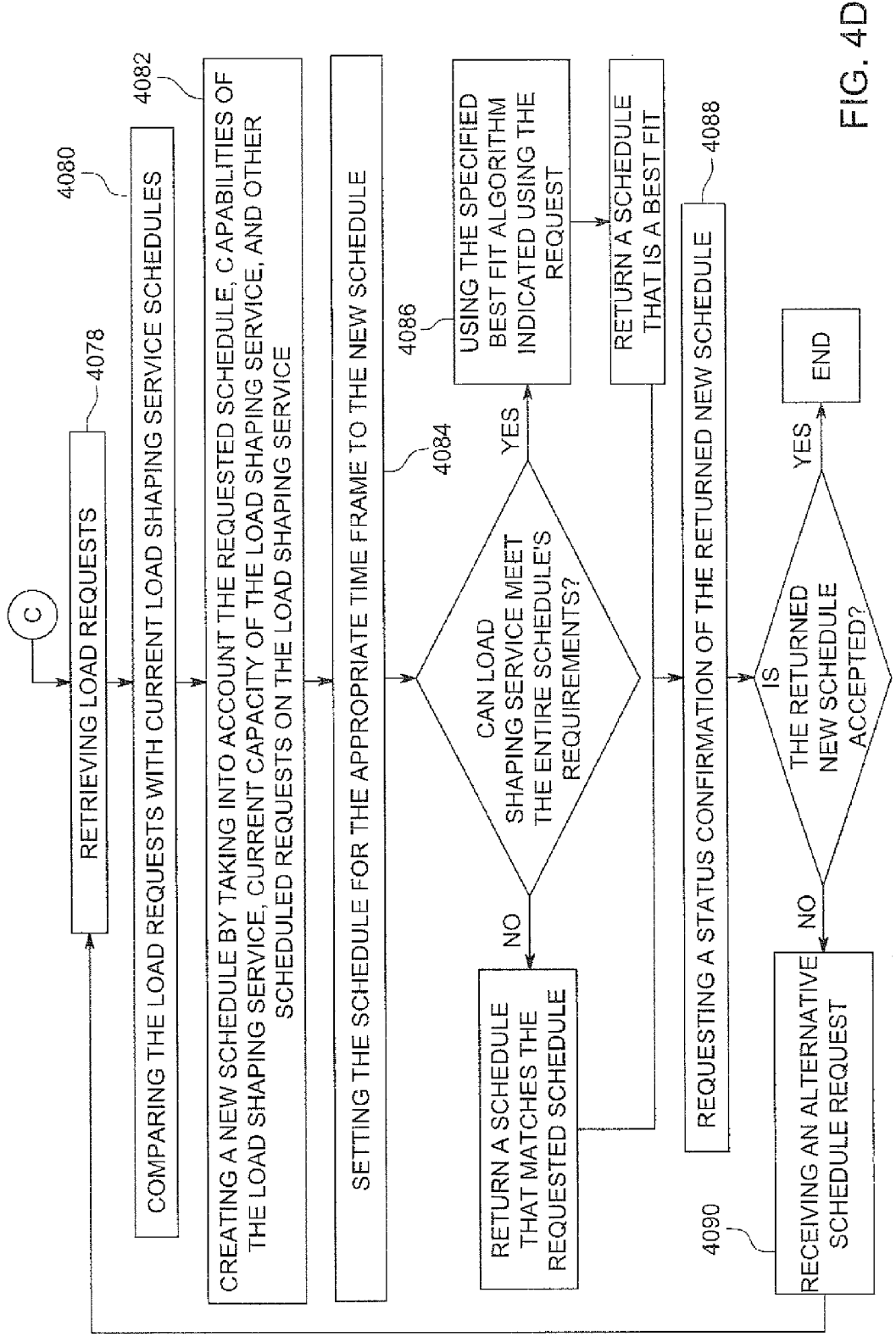
Figure 4E:
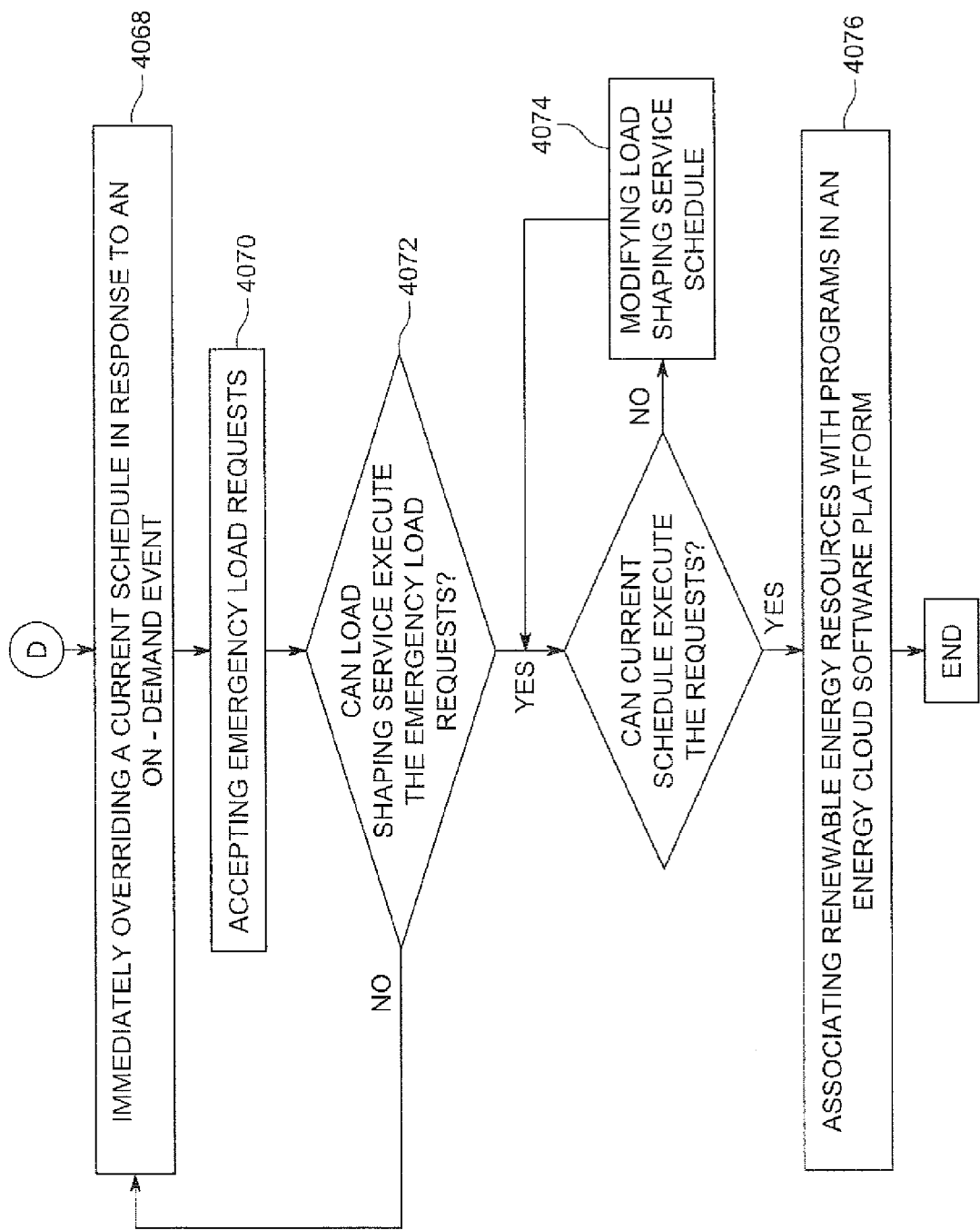
Figure 4G:
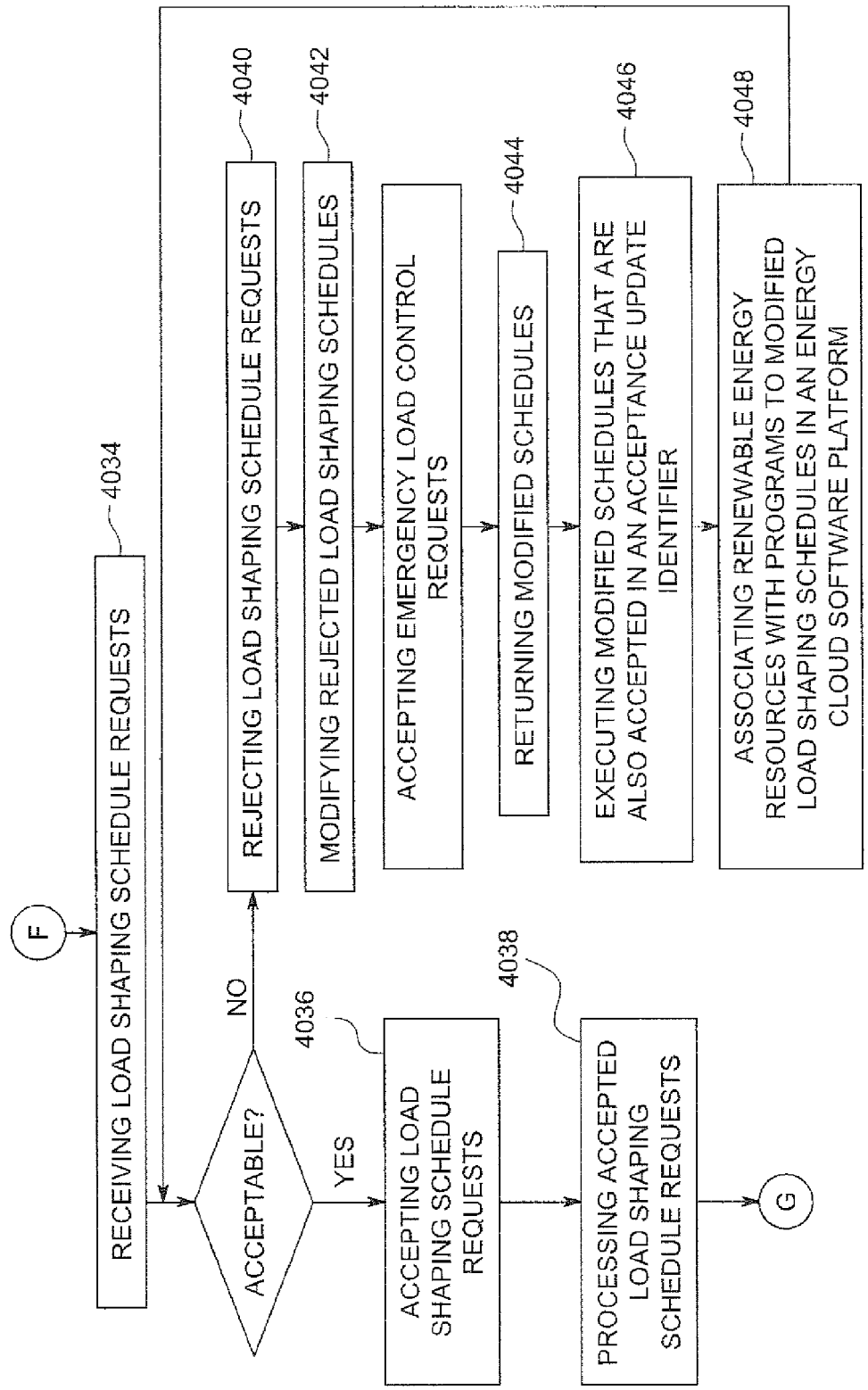
Figure 4H:
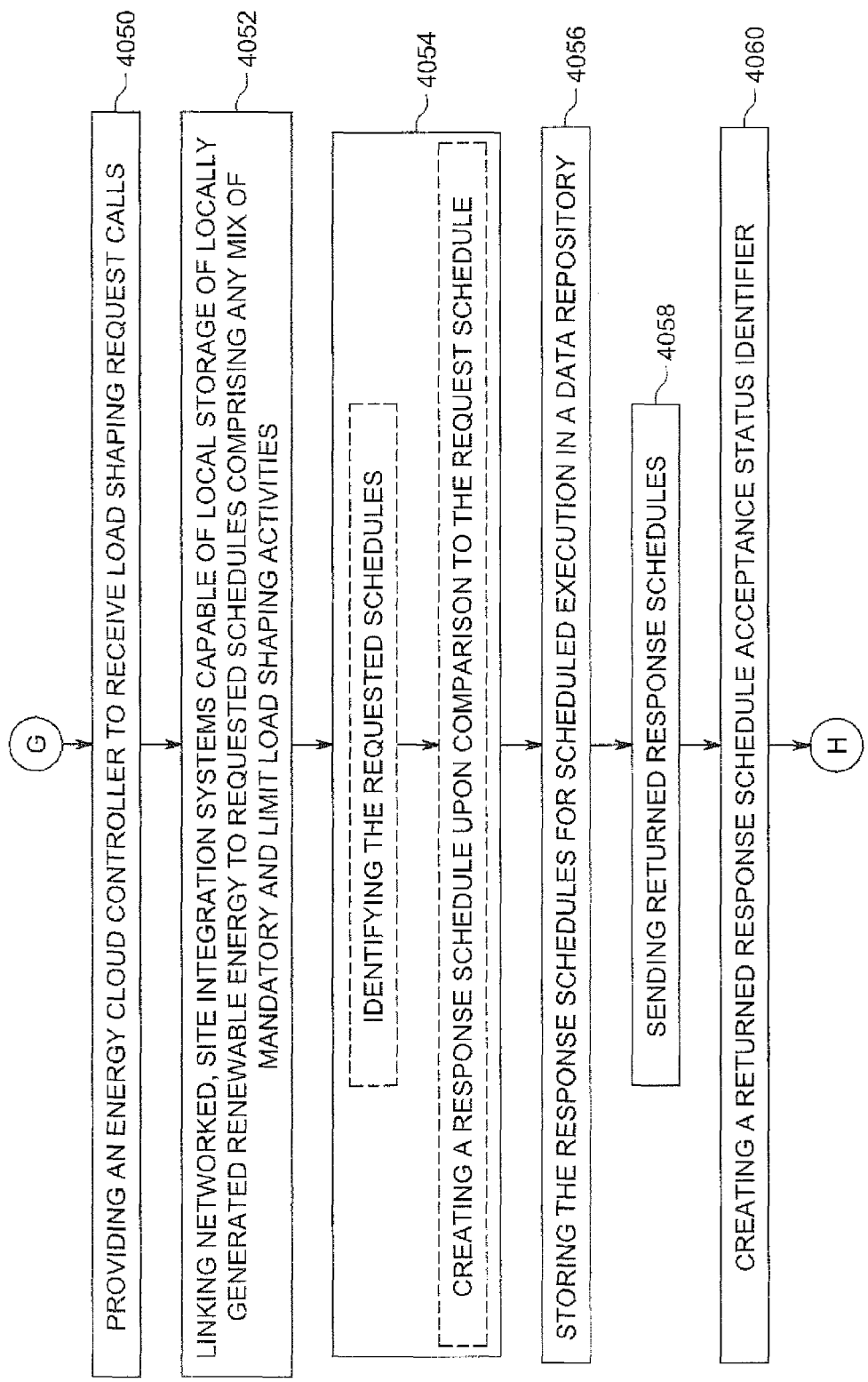
Figure 4I:
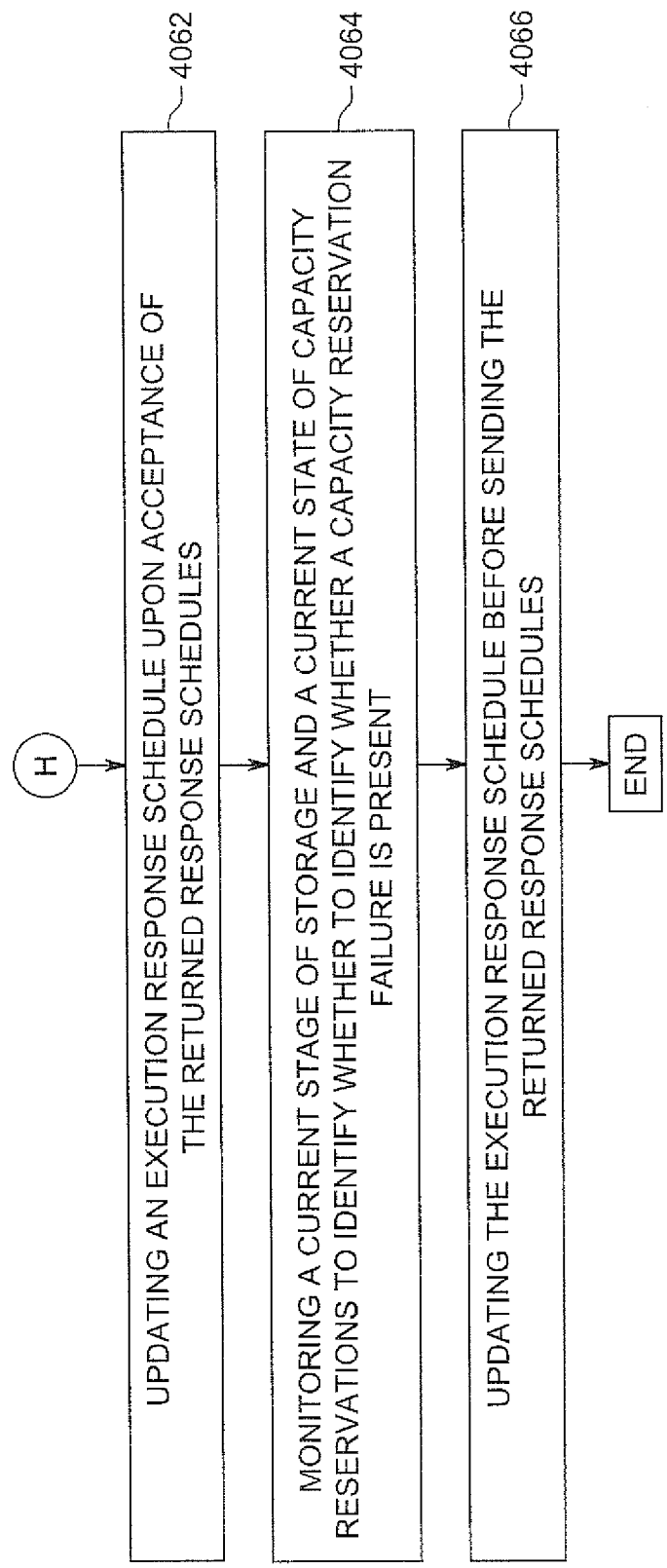

FIG. 3 is a flow chart for a method of capacity reservation monitoring in a distributed energy resource energy storage apparatus.

FIGS. 4A-4I are flow charts for methods of providing virtual power plant orchestration in a network of one or more distributed energy resource energy storage apparatus.

FIGS. 4A-4I are method logic diagrams for aspects of providing virtual power plant orchestration in a network of one or more distributed energy resource energy storage apparatus.

Figure 5A:
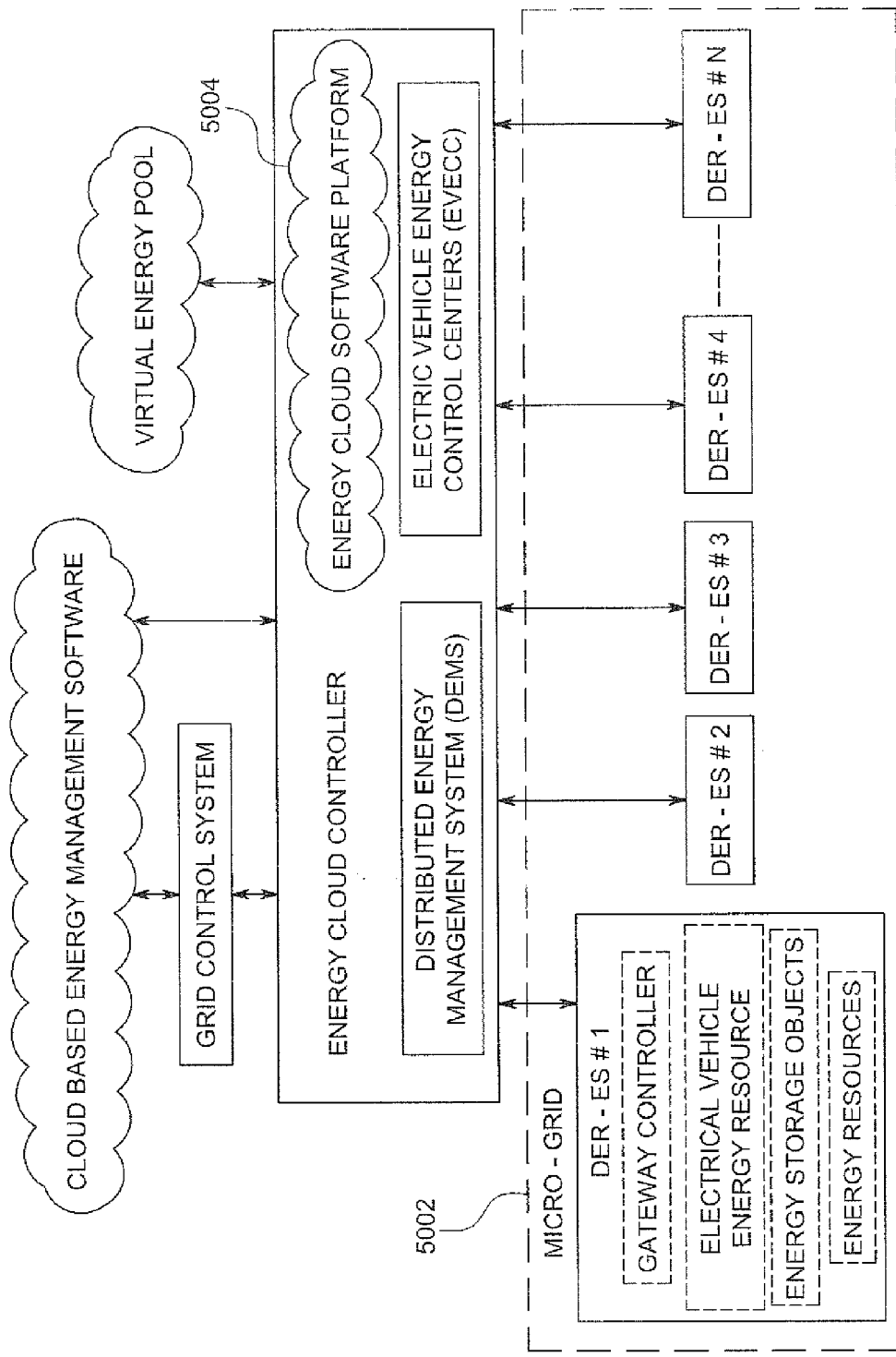
Figure 5B:
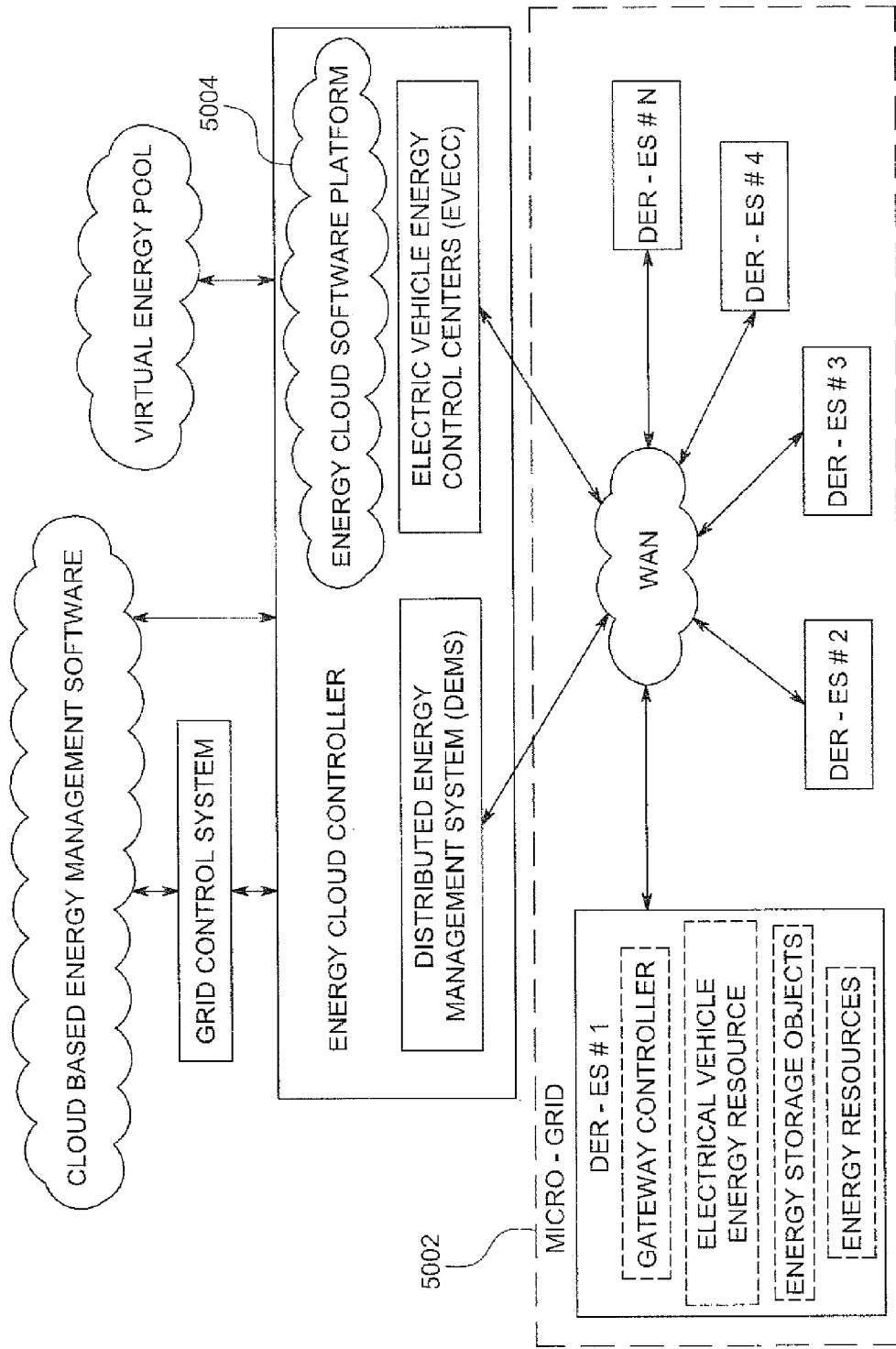
Figure 5C:
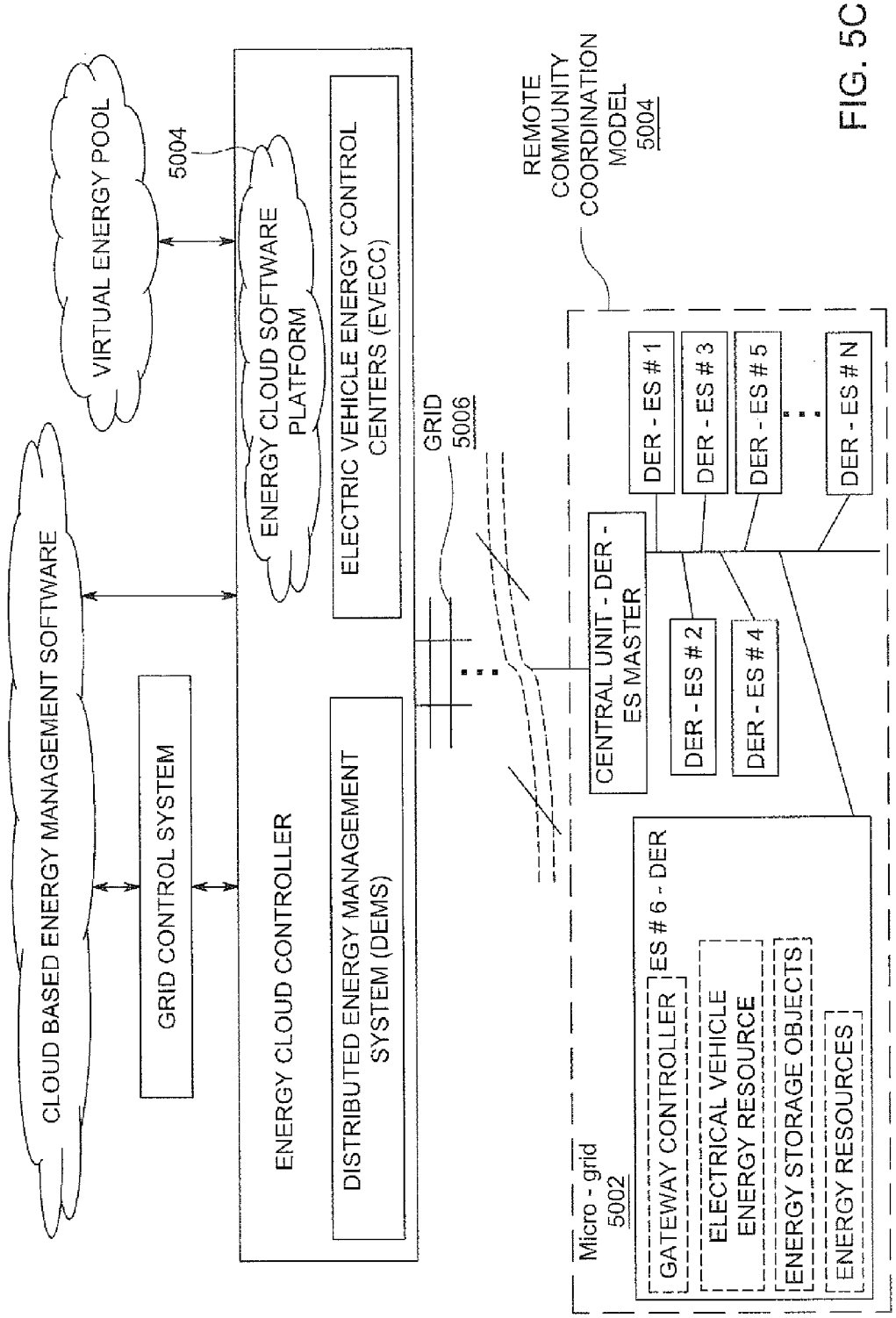

FIGS. 5A-5C are various aspects of network diagrams comprising a method of providing virtual power plant orchestration in a micro-grid that is remotely controlled by an energy cloud software application to form a remote community coordination utility network model.

Figure 6A:
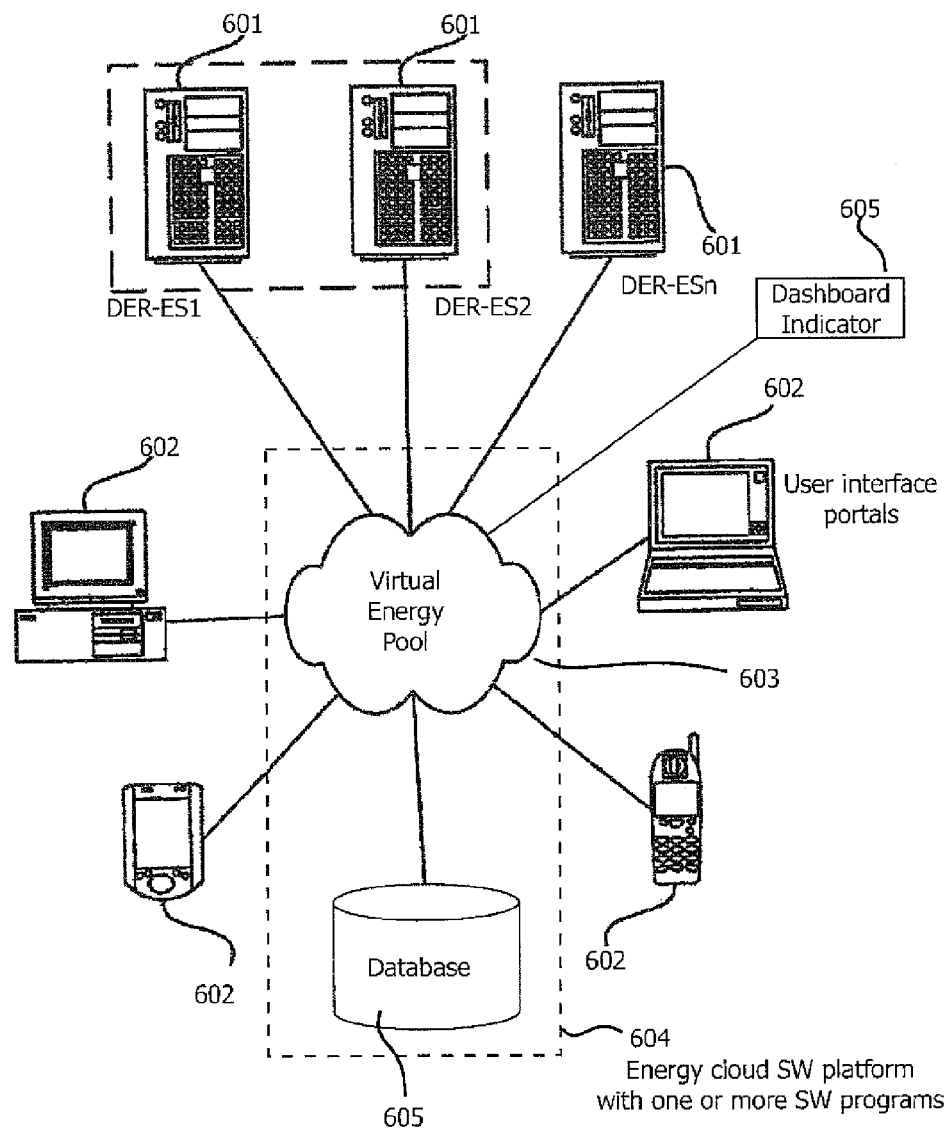
Figure 6B:
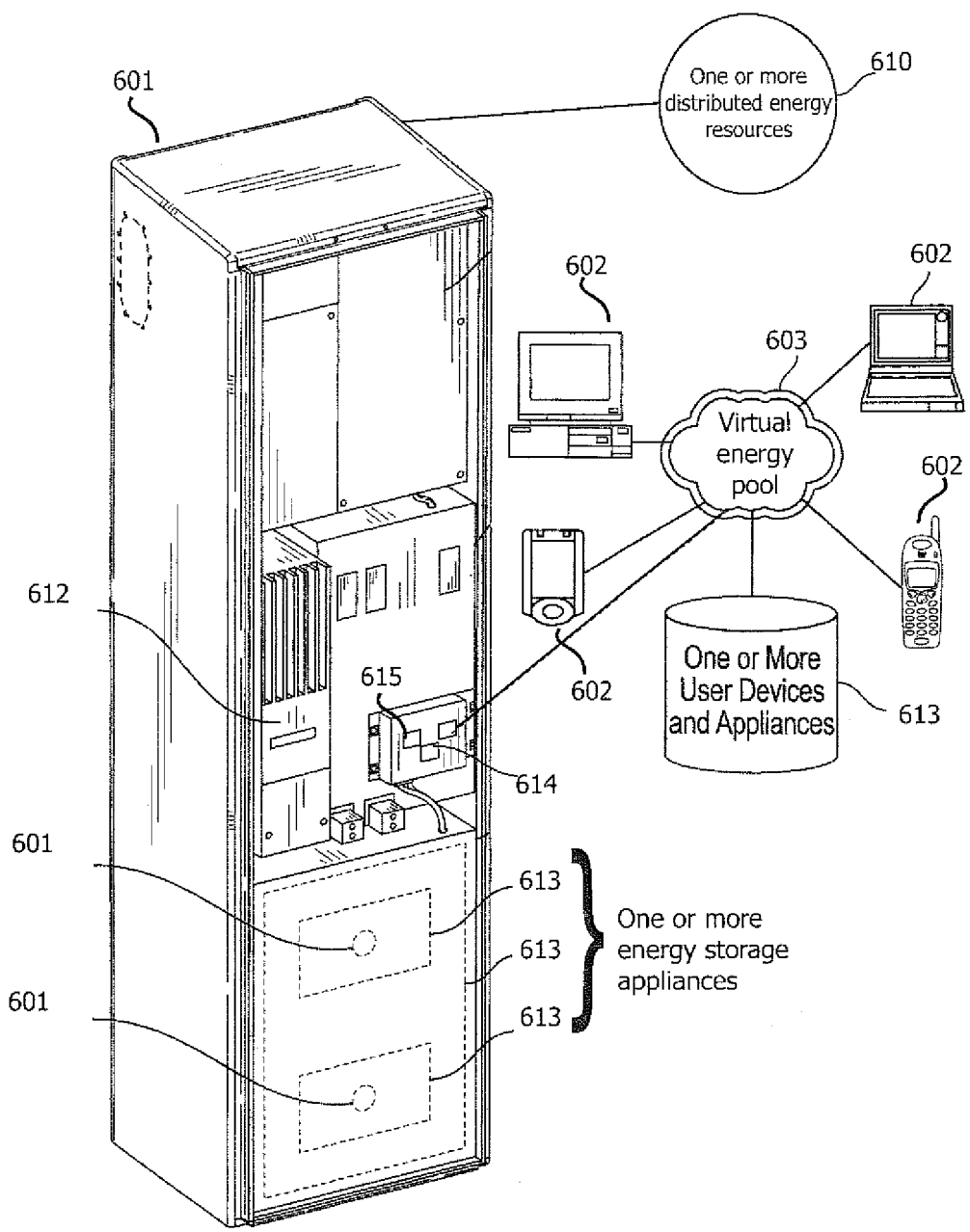
Figure 6C:
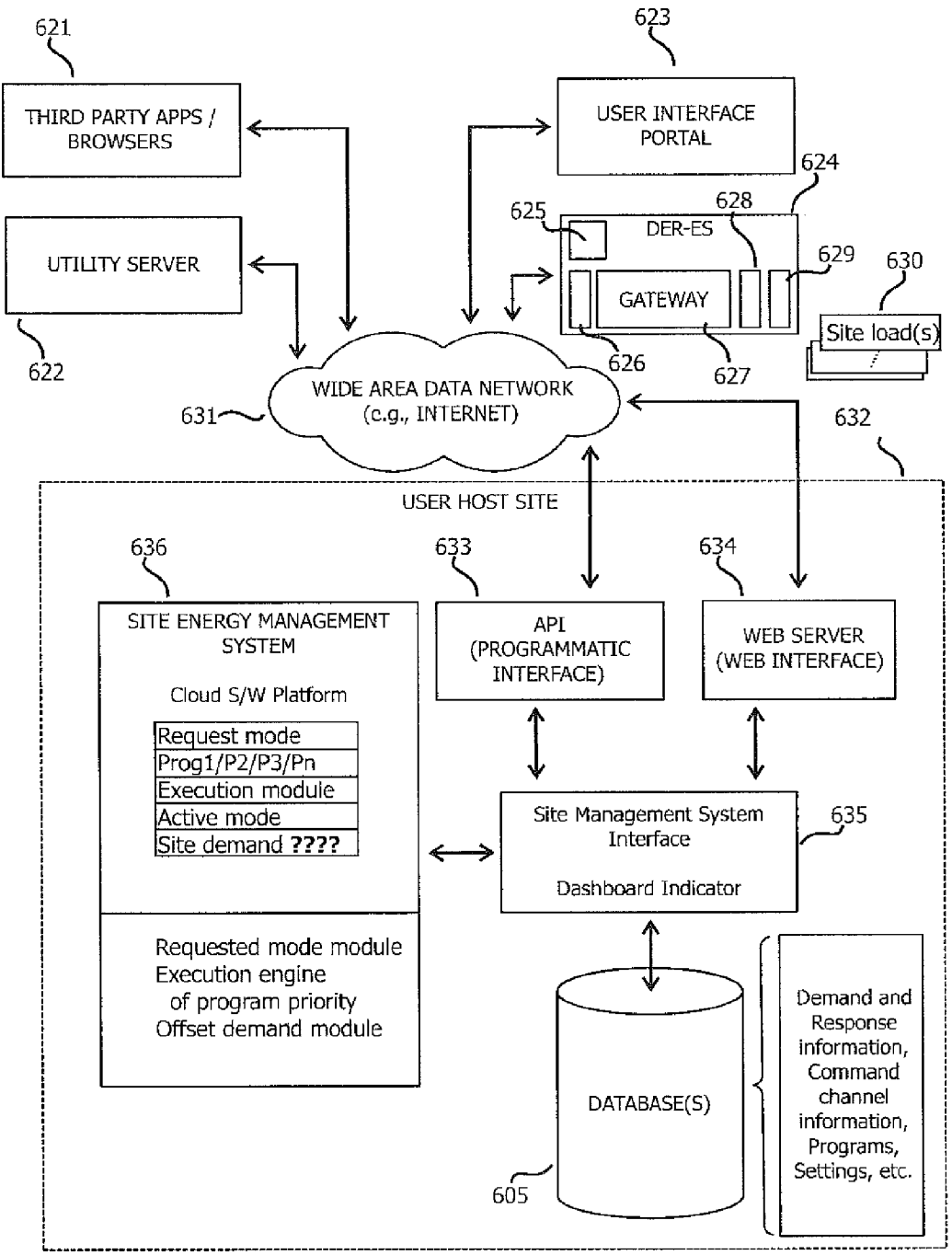

FIG. 6C is a block diagram showing aspects of system components of a solar integrated energy management system that provides steps for one or more computer-implemented methods for monitoring energy to perform methods for one or more programs of one or more networked distributed energy resource energy storage apparatus that each function as an energy site integration system accessed via a virtual energy pool.

FIG. 6A is a network diagram showing a solar integrated energy management system to provide a computer-implemented method for monitoring energy to perform methods for one or more programs of one or more networked distributed energy resource energy storage apparatus that each function as an energy site integration system accessed via a virtual energy pool.

FIG. 6B is a perspective view of various aspects of a distributed energy resource energy storage (DER-ES) apparatus to perform one or more functions within a solar integrated energy management system.

Figure 7A:
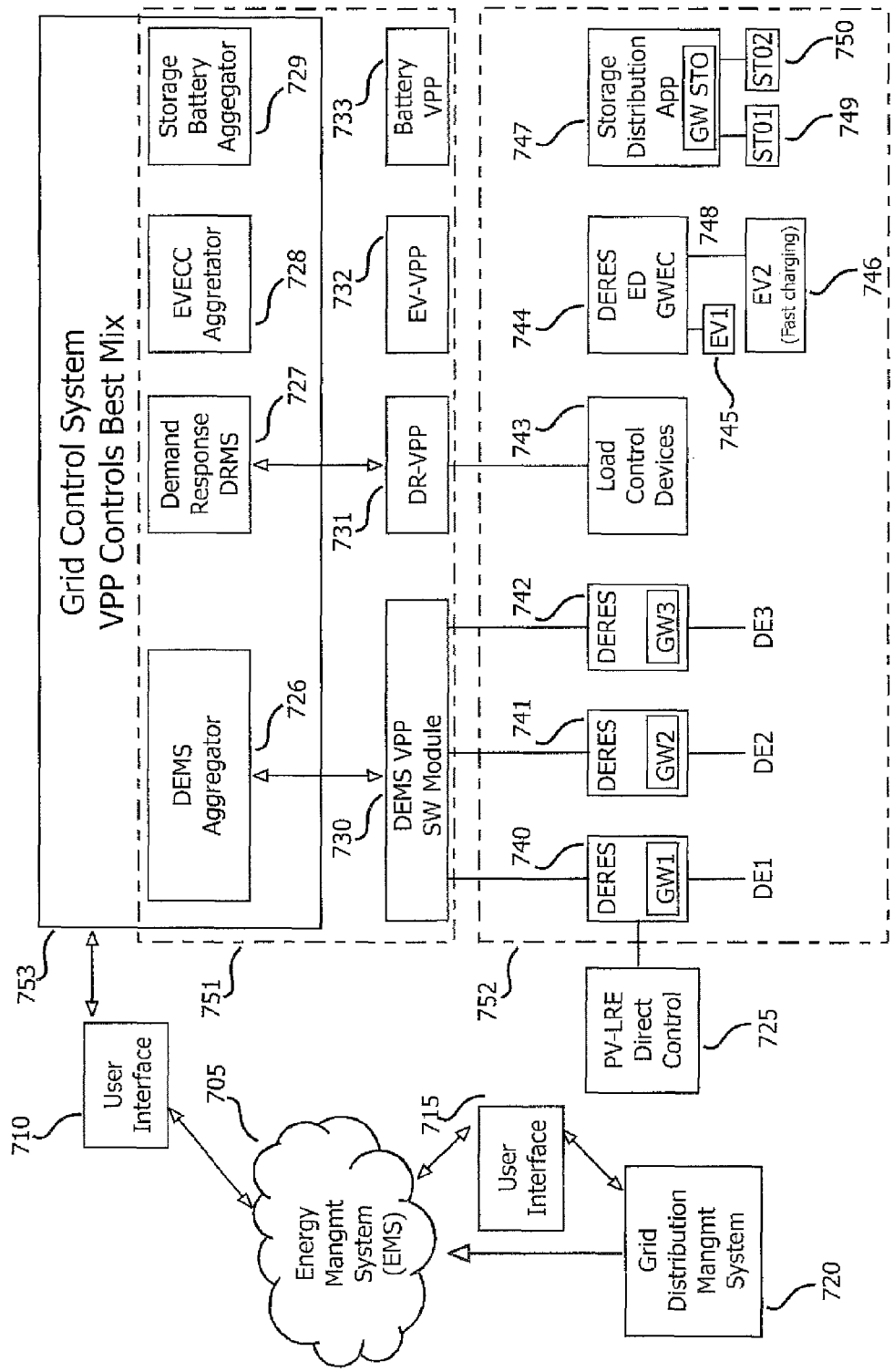

FIG. 7A is a system diagram for an energy management system for governing energy management resources.

Figure 7B:
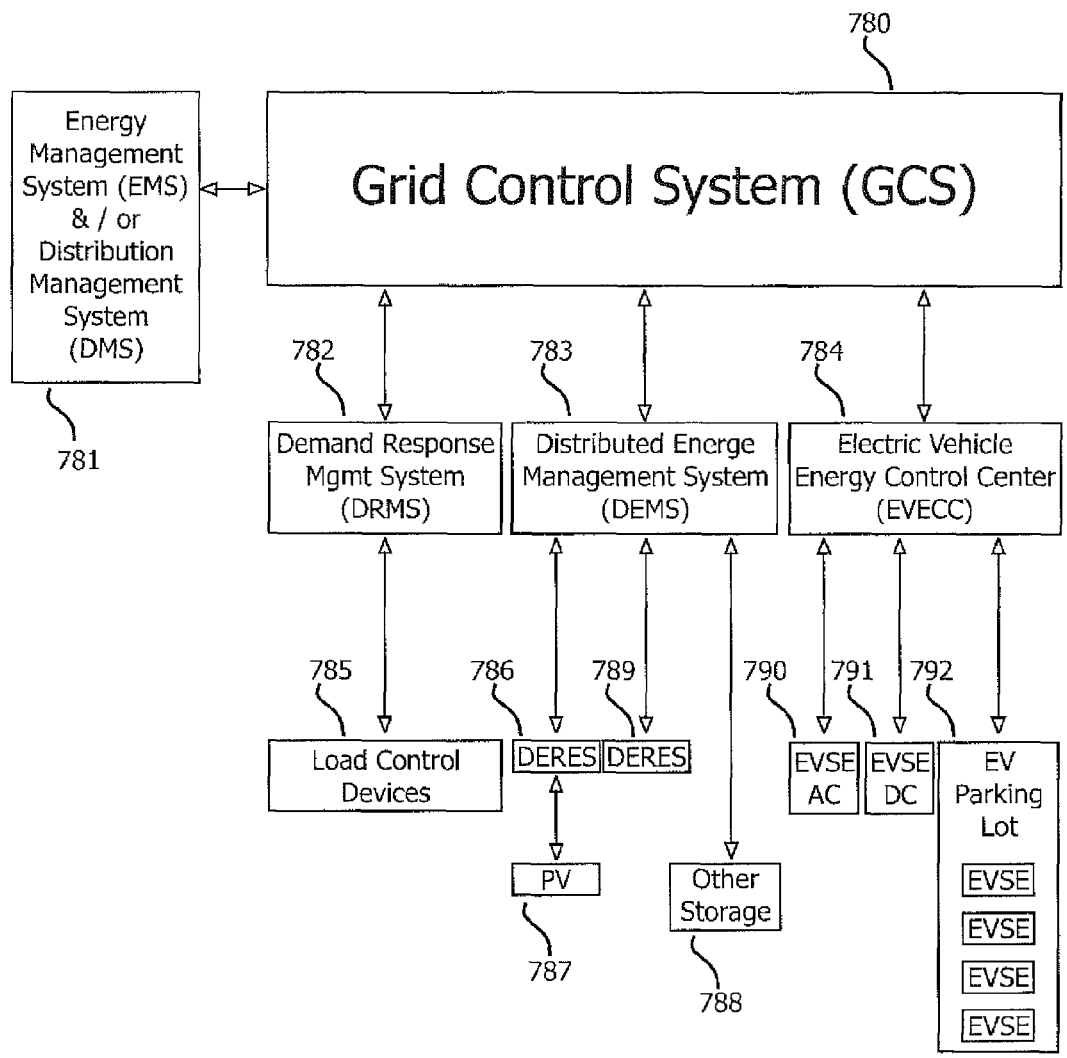

FIG. 7B is a high level architecture showing the energy management system for governing energy management resources and implementing a grid control system.

Figure 8A:
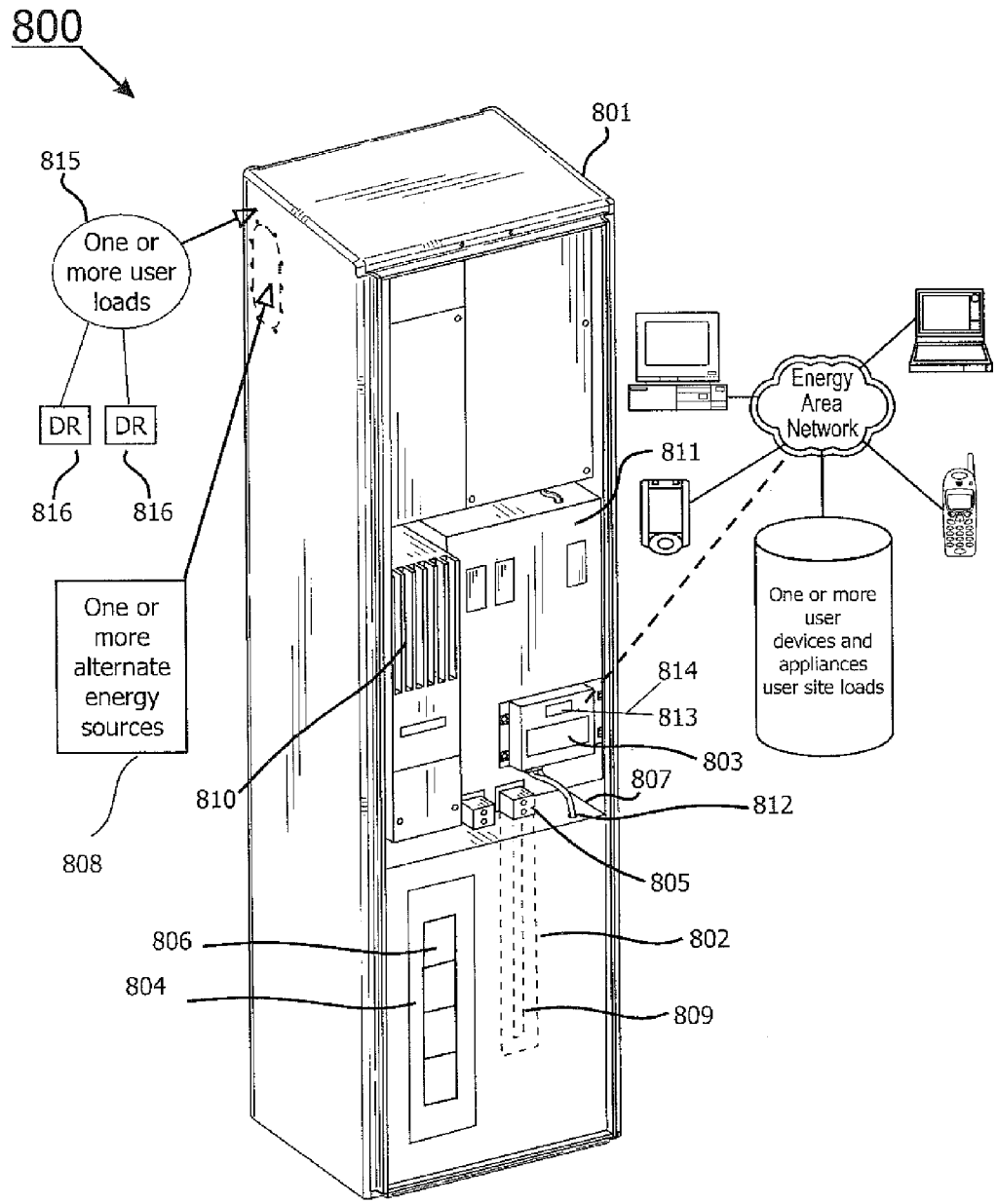
Figure 8B:
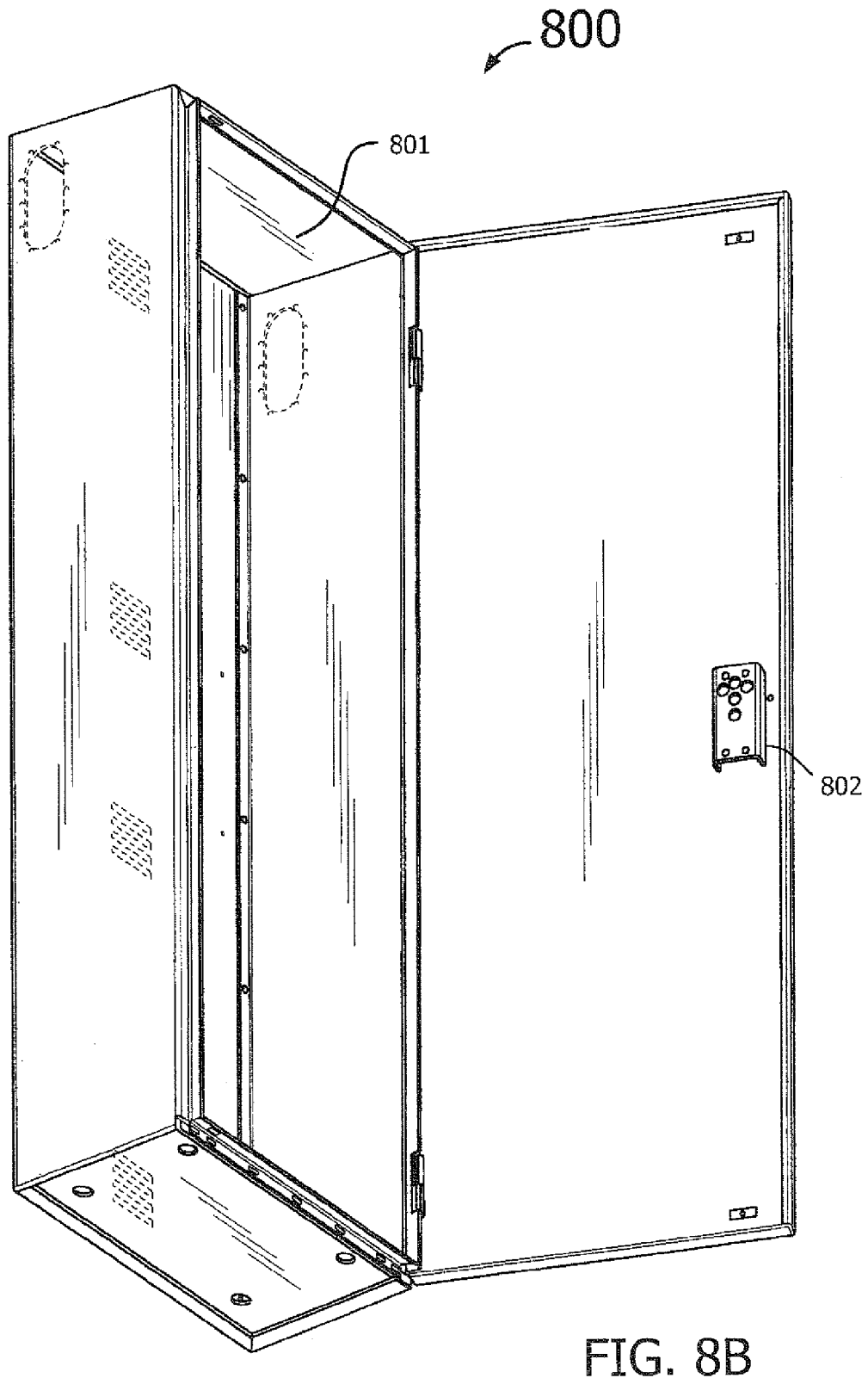
Figure 8C:
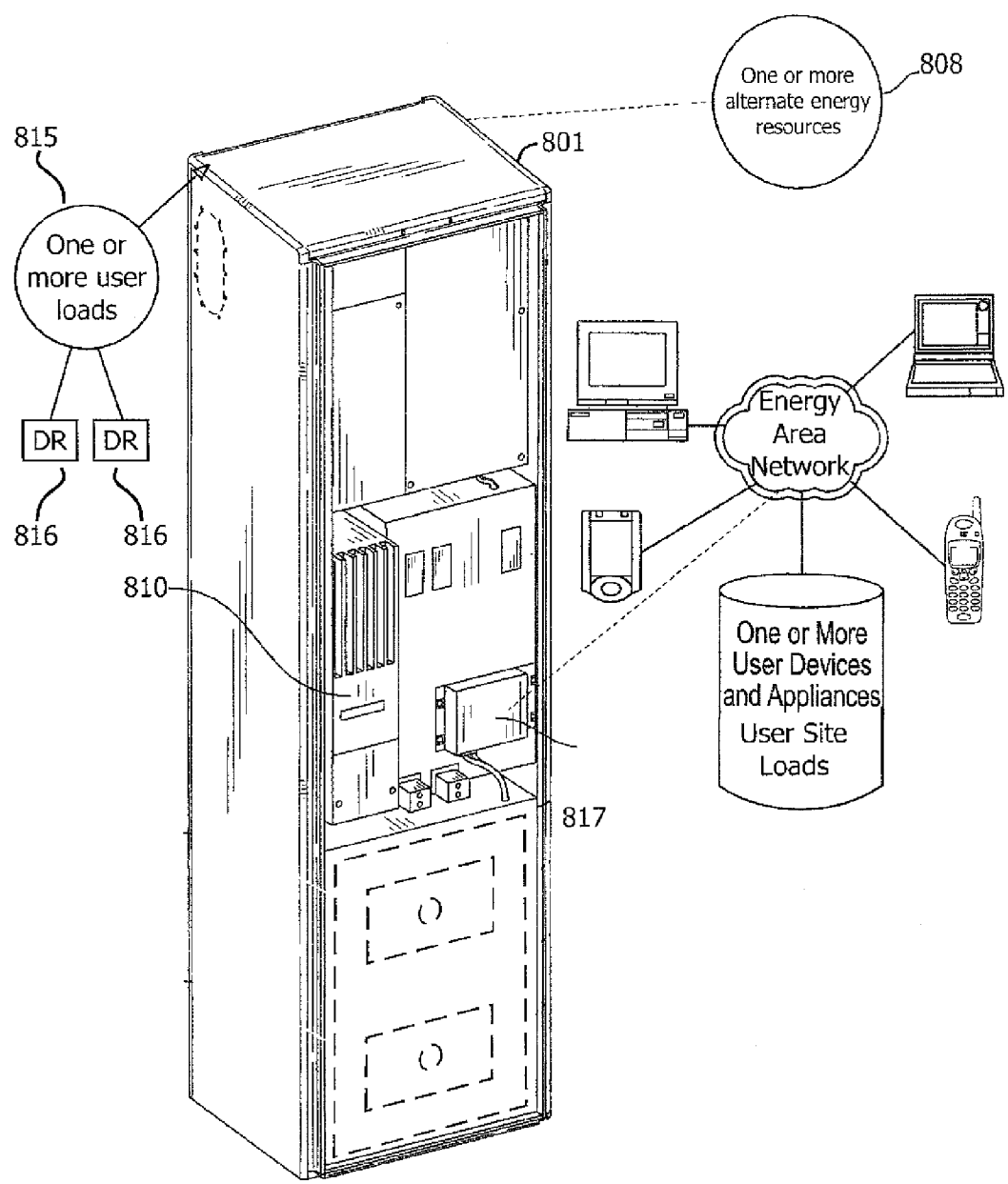

FIGS. 8A-8C show front/side and perspective views and an enclosure door of a distributed energy resource energy storage (DER-ES) apparatus with various network connections. FIG. 8A shows the DER-ES apparatus without an enclosure door with various network connections. FIG. 8B shows the DER-ES apparatus enclosure with a hinged door. FIG. 8C shows the DER-ES apparatus without an enclosure door with various network connections.

Figure 9A:
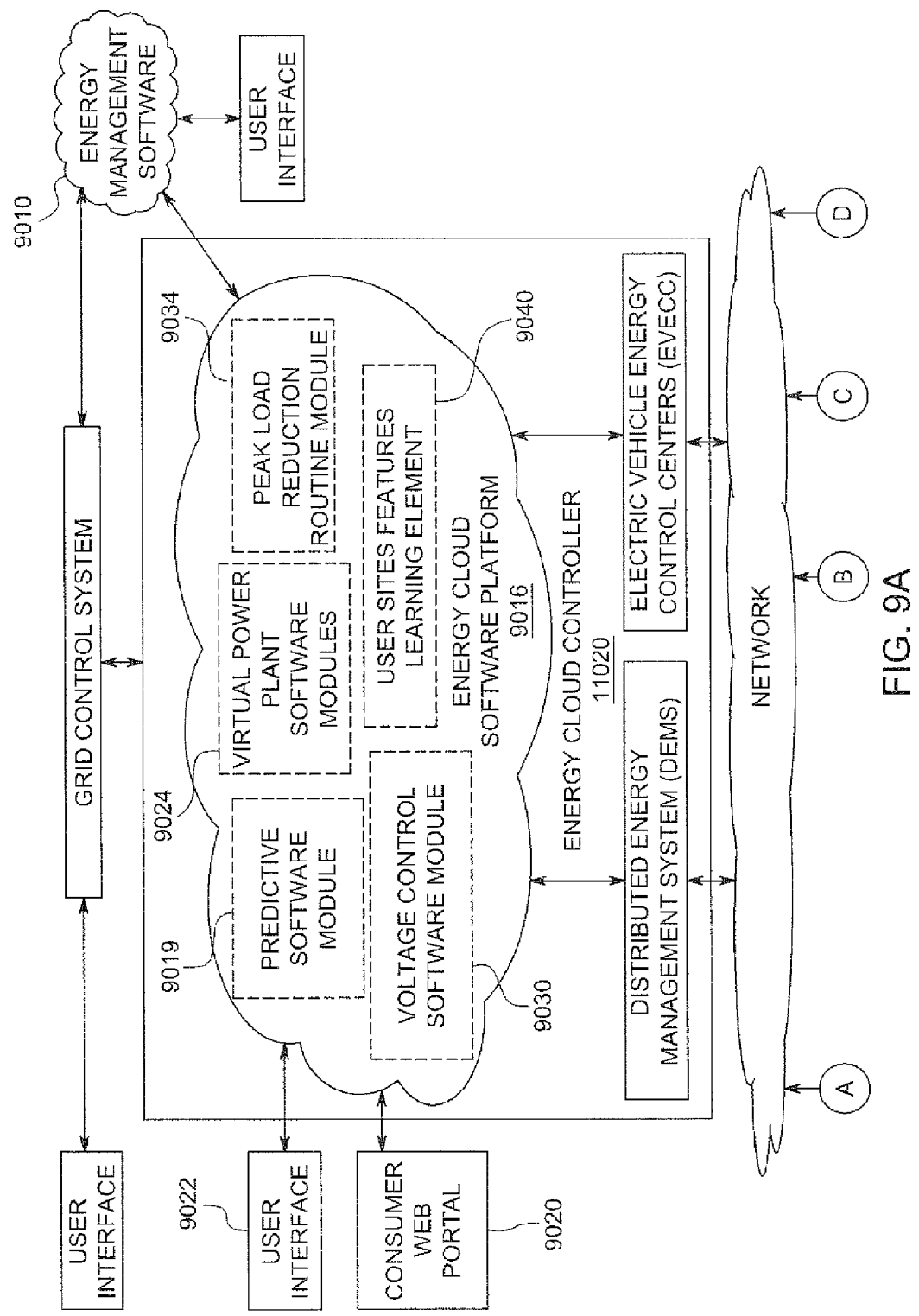
Figure 9B:
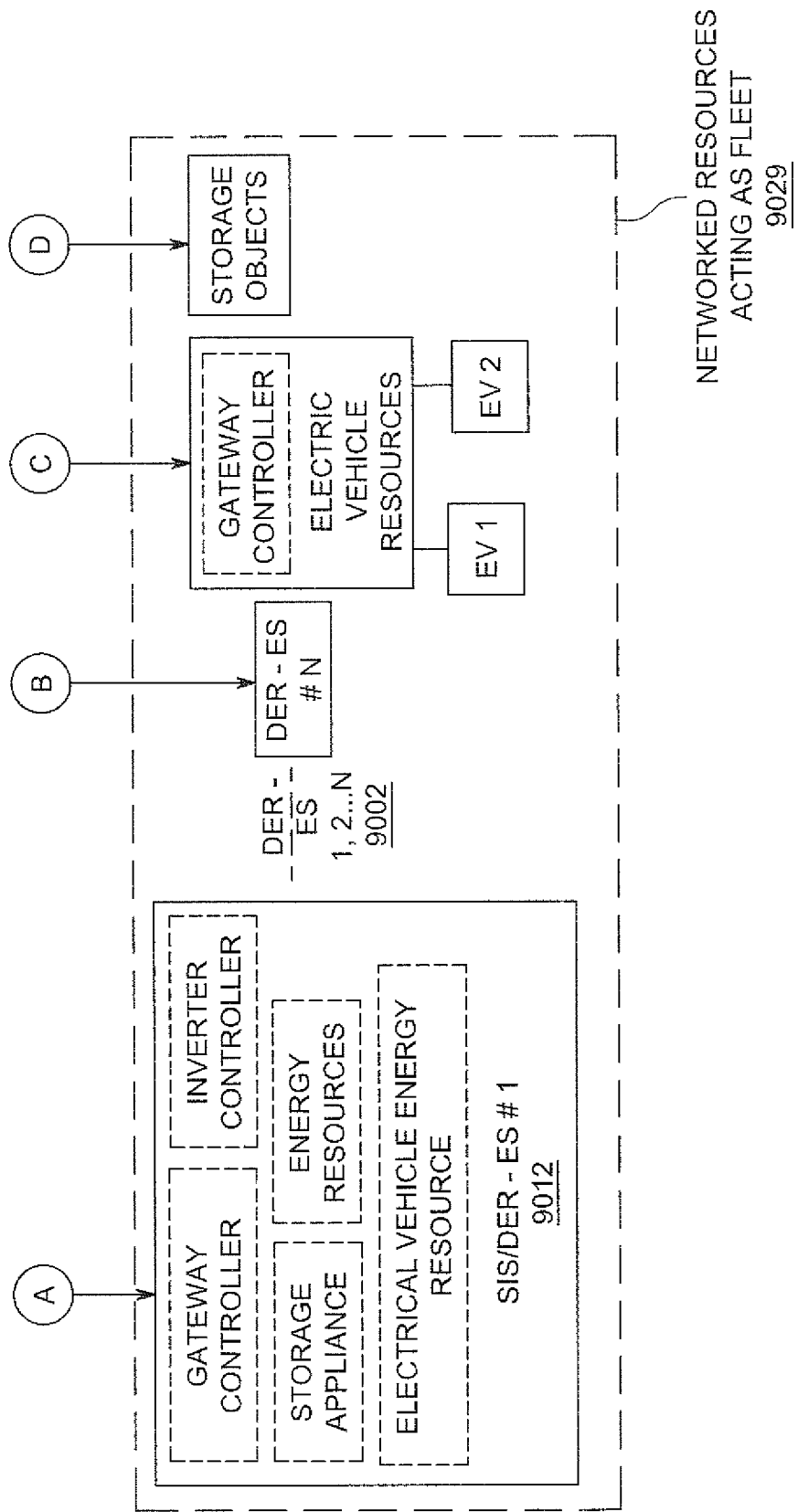

FIGS. 9A and 9B are system block diagrams showing aspects of an orchestrated virtual power plant system and various networked resources.

Figure 10A:
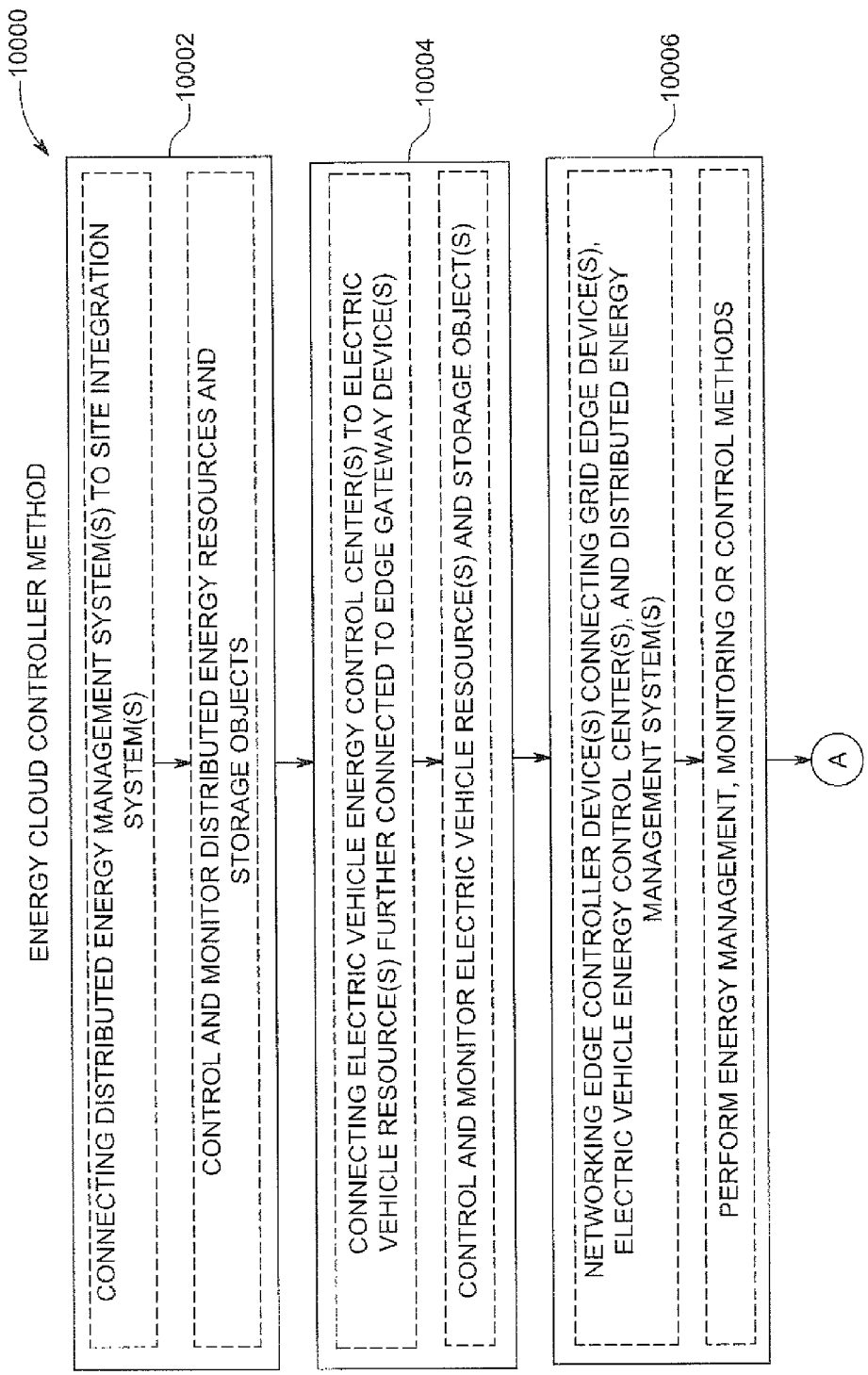
Figure 10B:
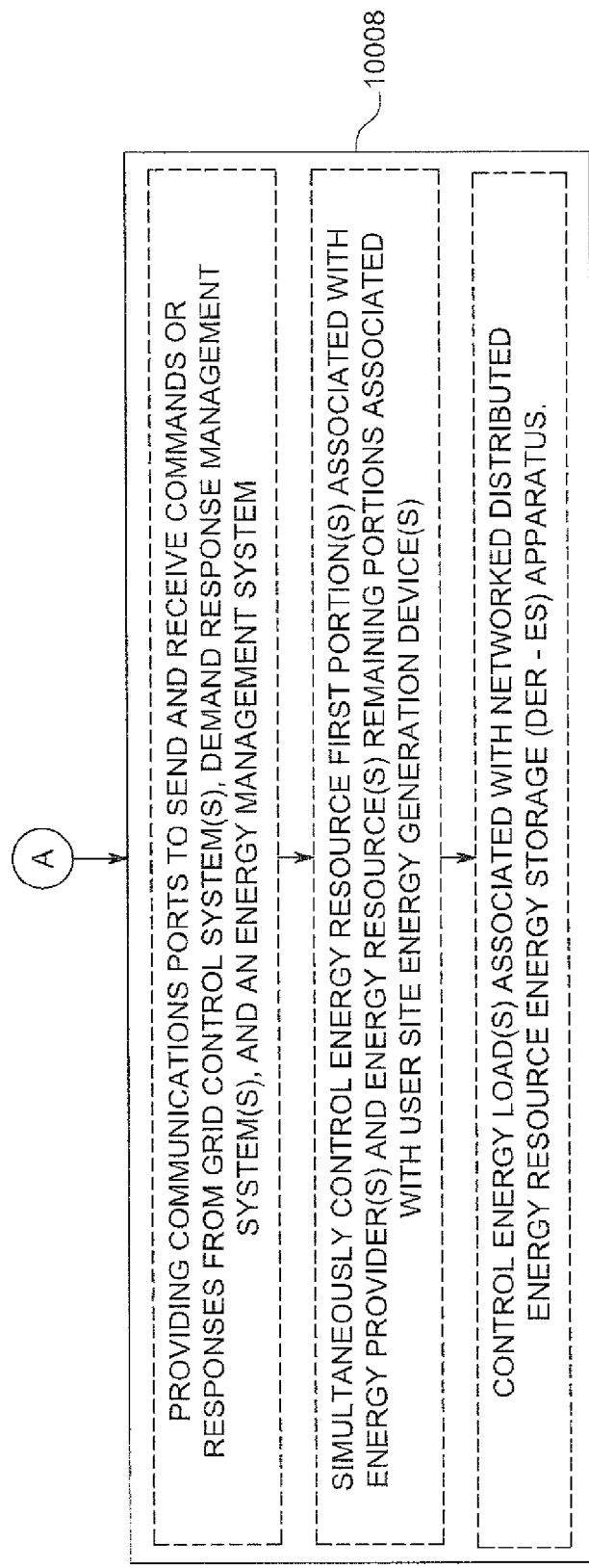

FIGS. 10A and 10B are flow charts for steps in energy cloud controller methods.

Figure 11A:
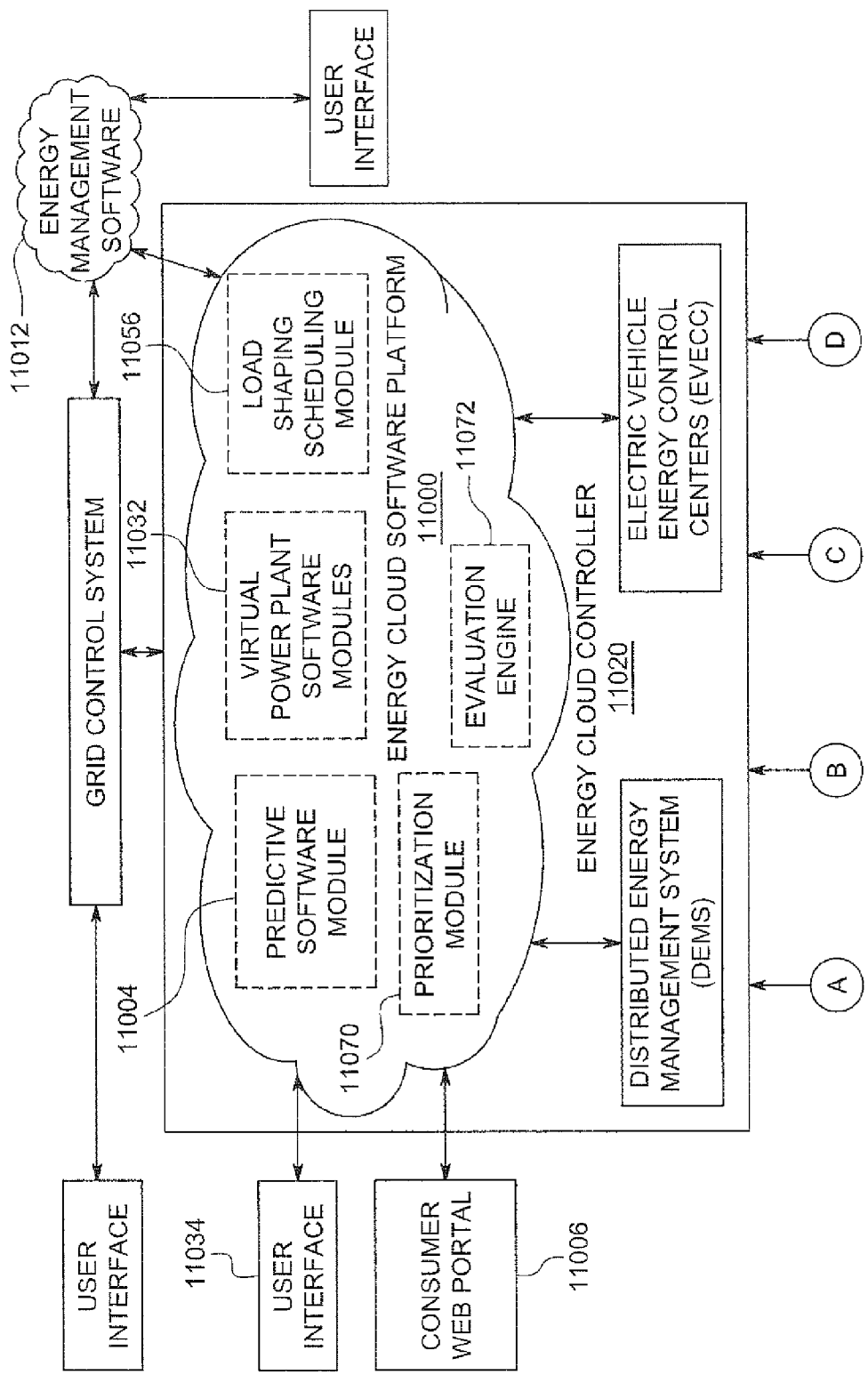
Figure 11B:
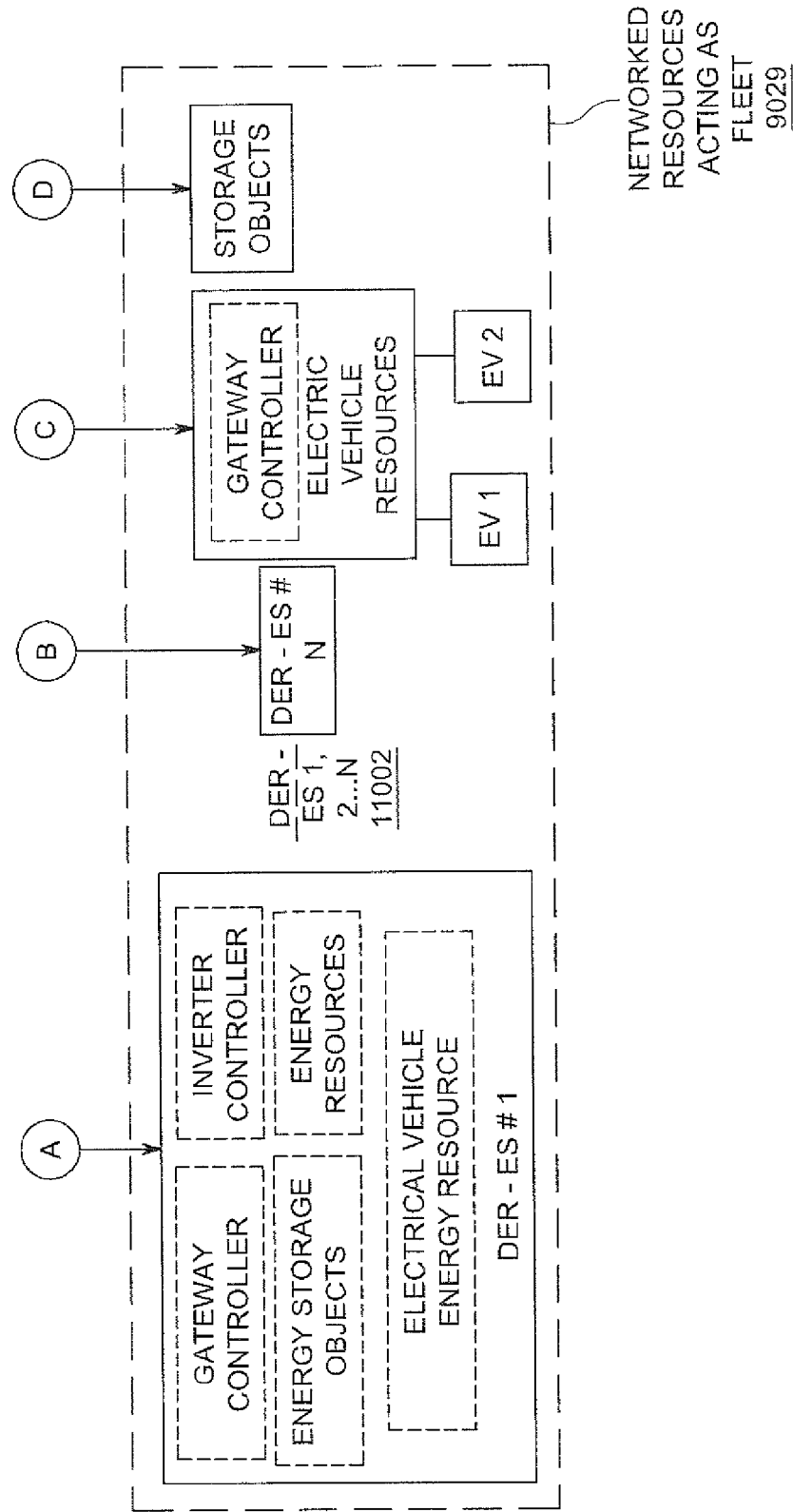

FIGS. 11A and 11B are system block diagrams for an energy cloud software platform.

FIG. 11A is a system block diagram showing aspects of an energy cloud software platform with various network connections.

FIG. 11B is a system block diagram showing details of the various networked resources connected to the energy cloud software platform.

Figure 11C:
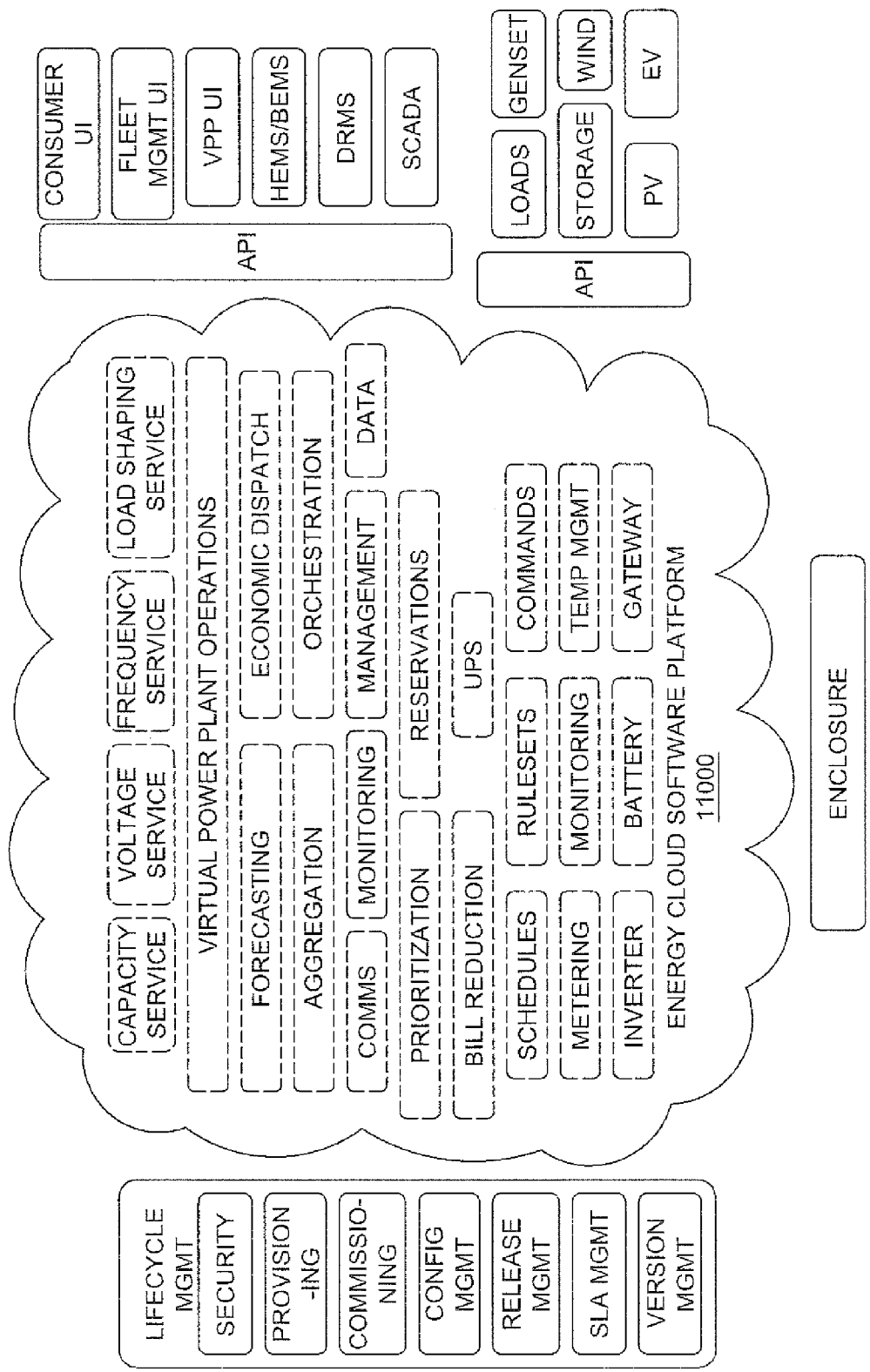

FIG. 11C is a block diagram showing various software module aspects of a remote energy cloud software platform architecture and various application programming interfaces connected to one or more computer medium devices.

Figure 12A:
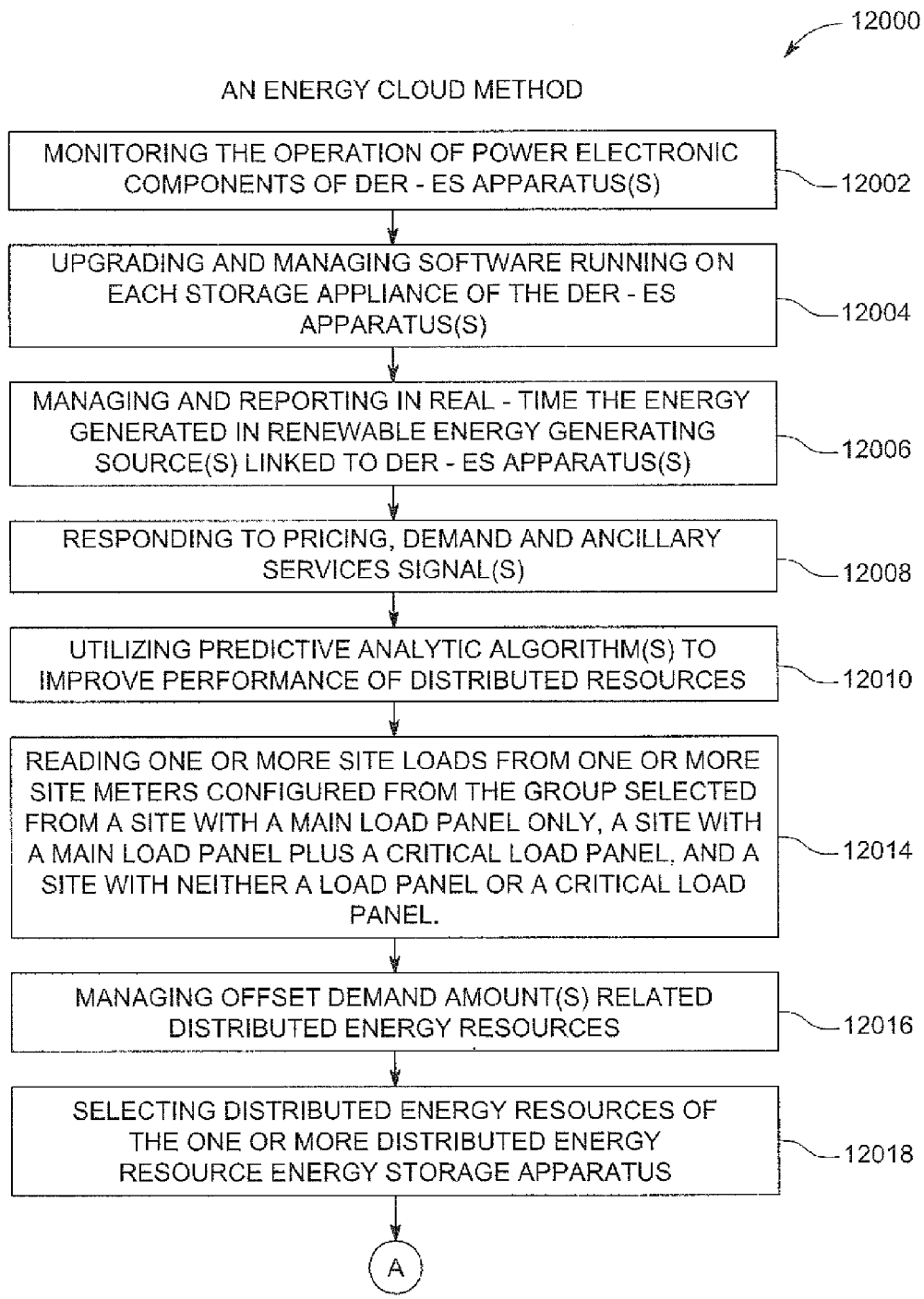
Figure 12B:
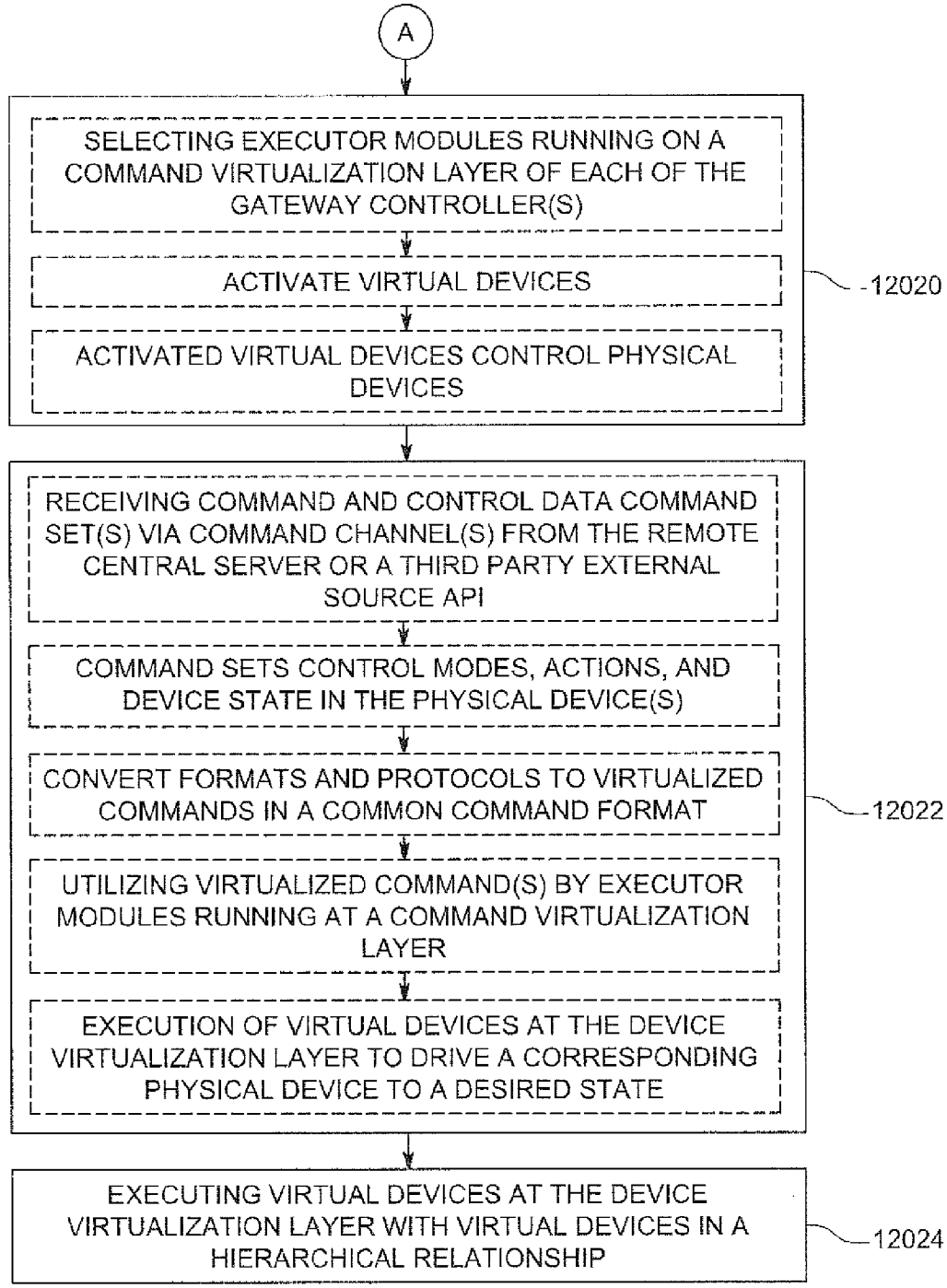

FIGS. 12A and 12B are flow charts showing steps for energy cloud methods.

Figure 13A:
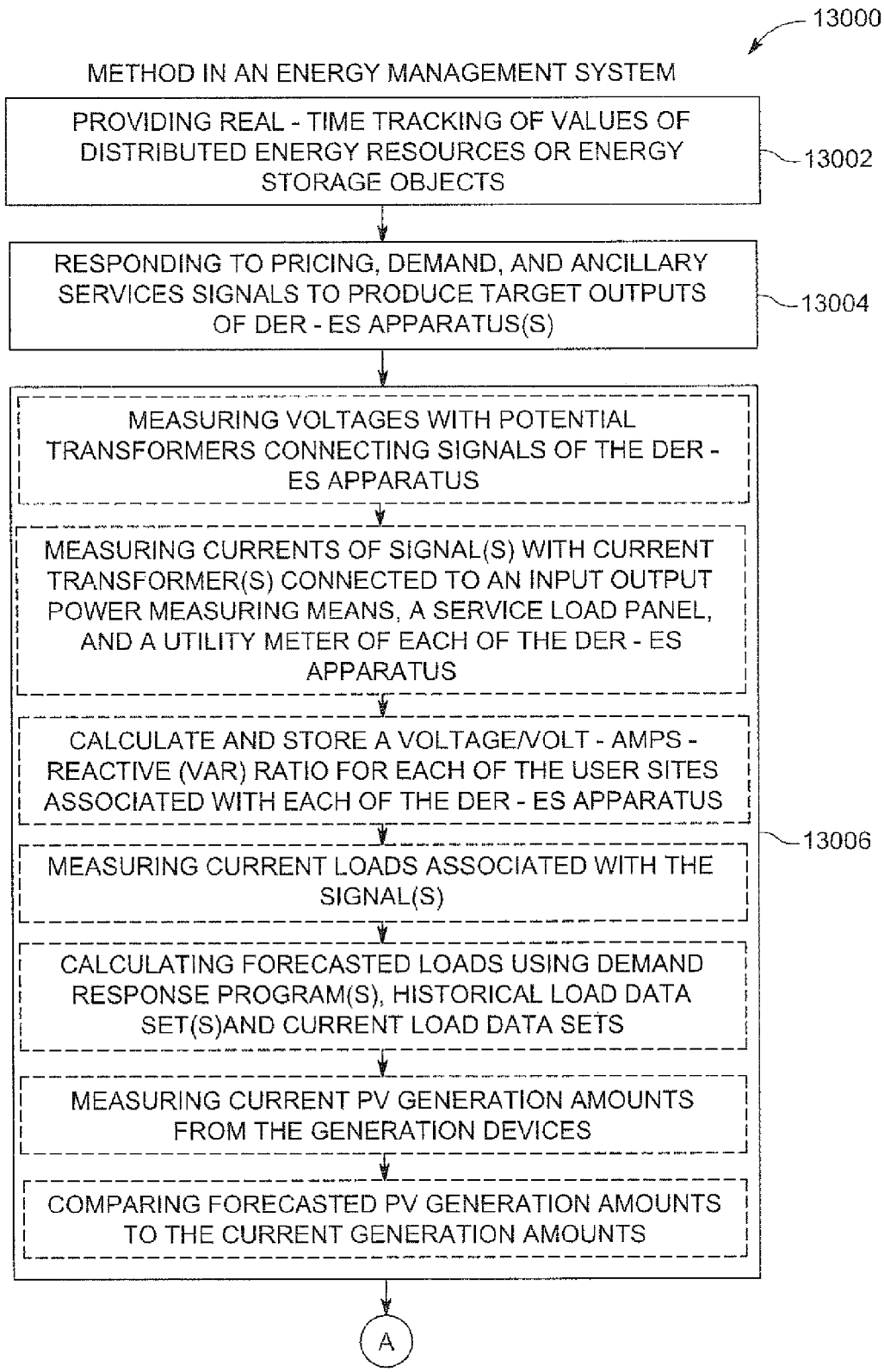
Figure 13B:
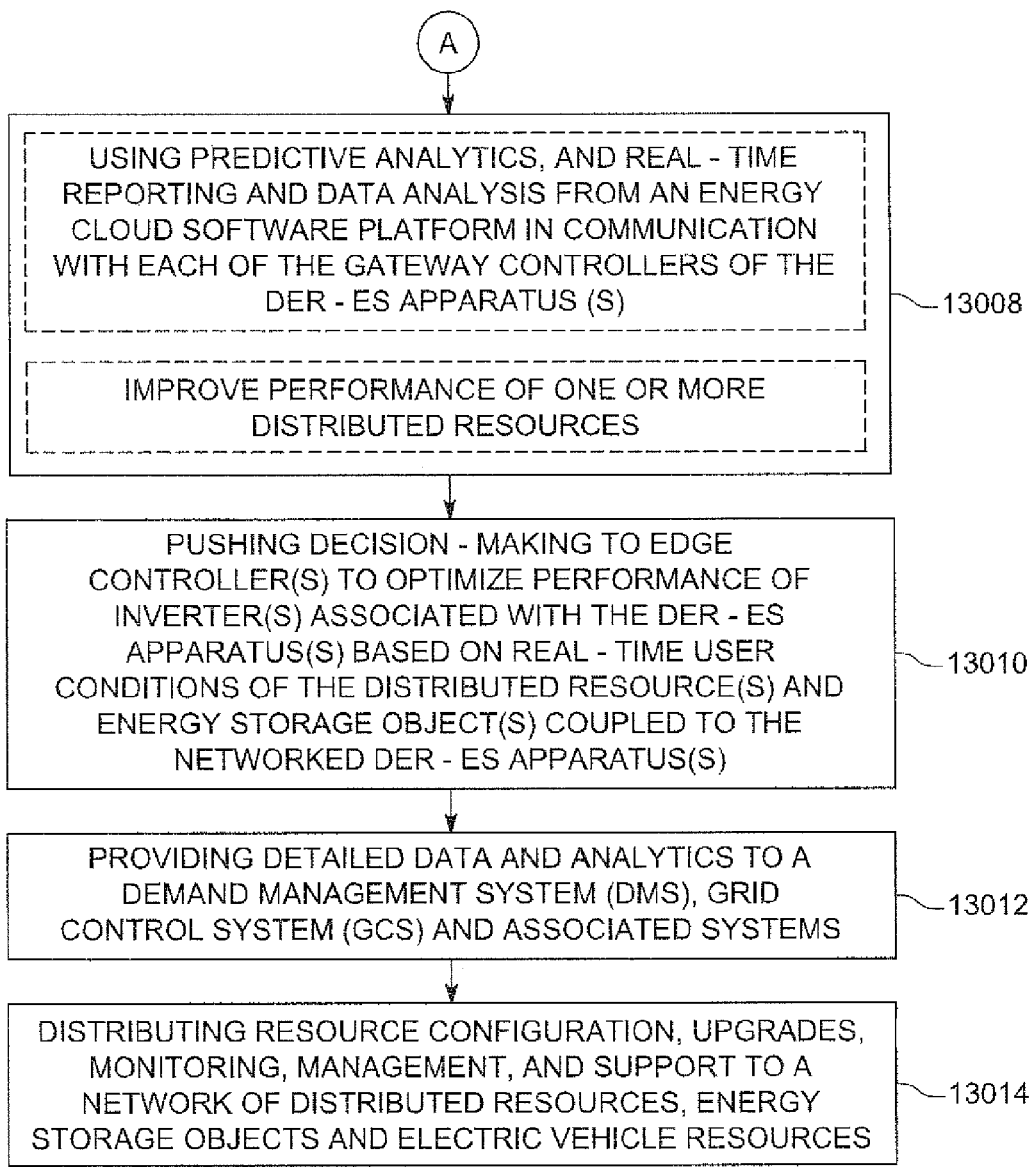

FIGS. 13A and 13B are flow charts showing steps for methods of governing energy management resources in an energy management system.

Figure 14A:
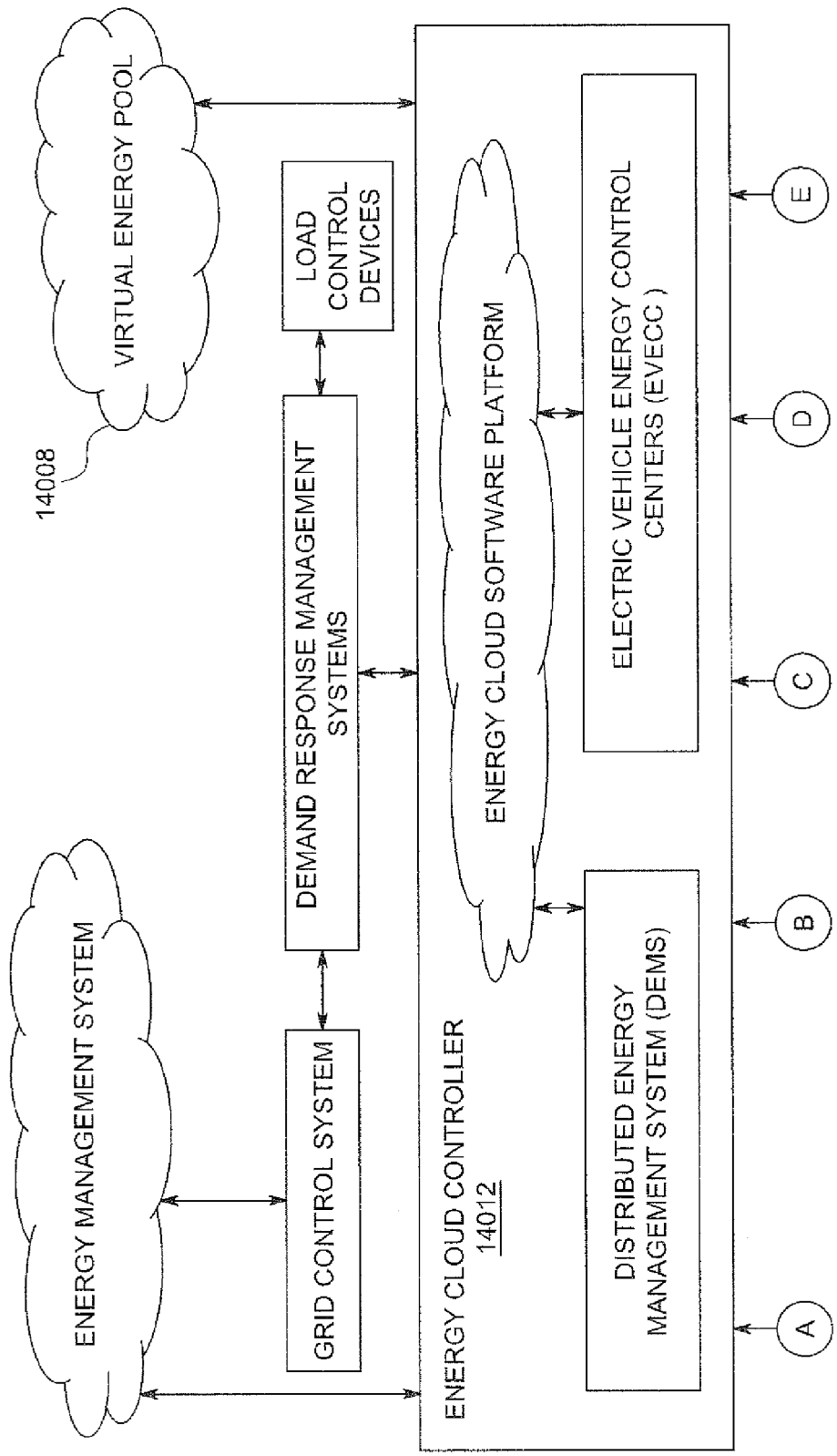
Figure 14B:
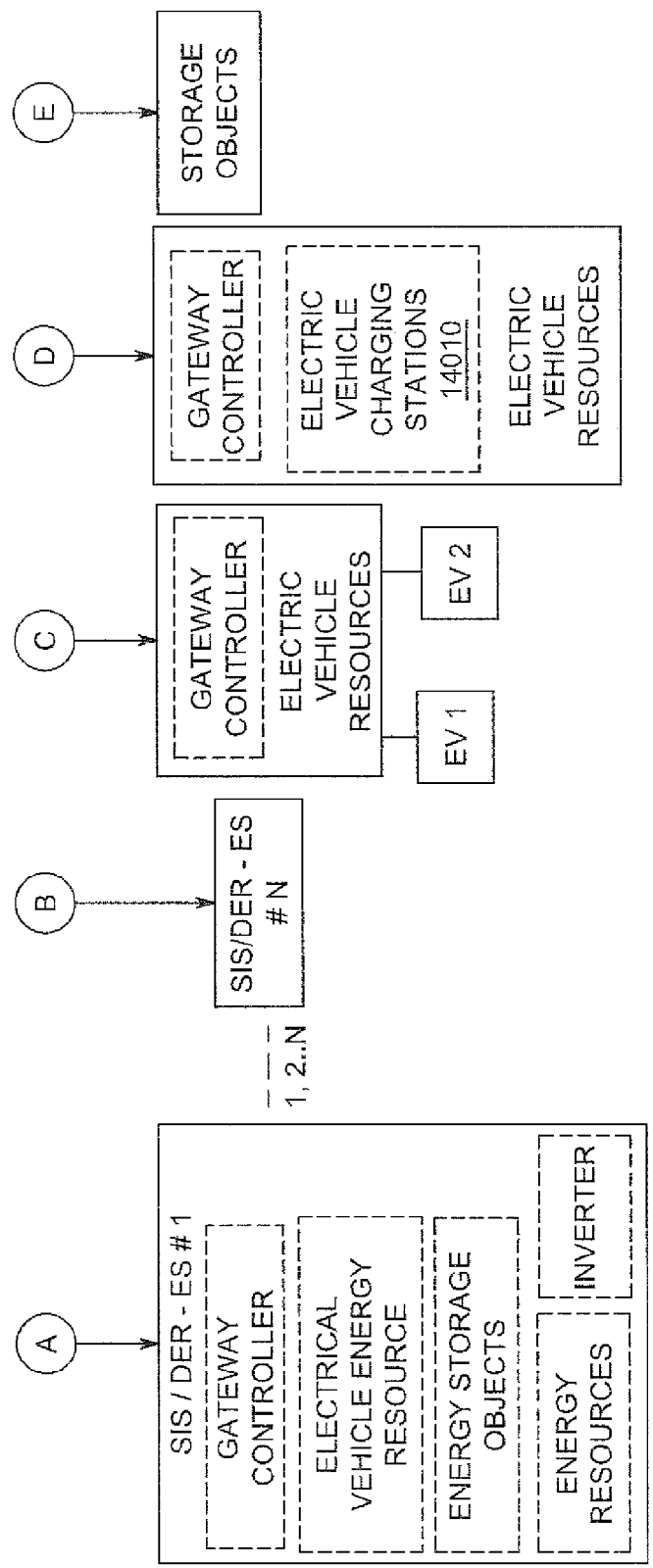

FIGS. 14A and 14B are system block diagrams for an energy cloud controller.

Figure 14C:
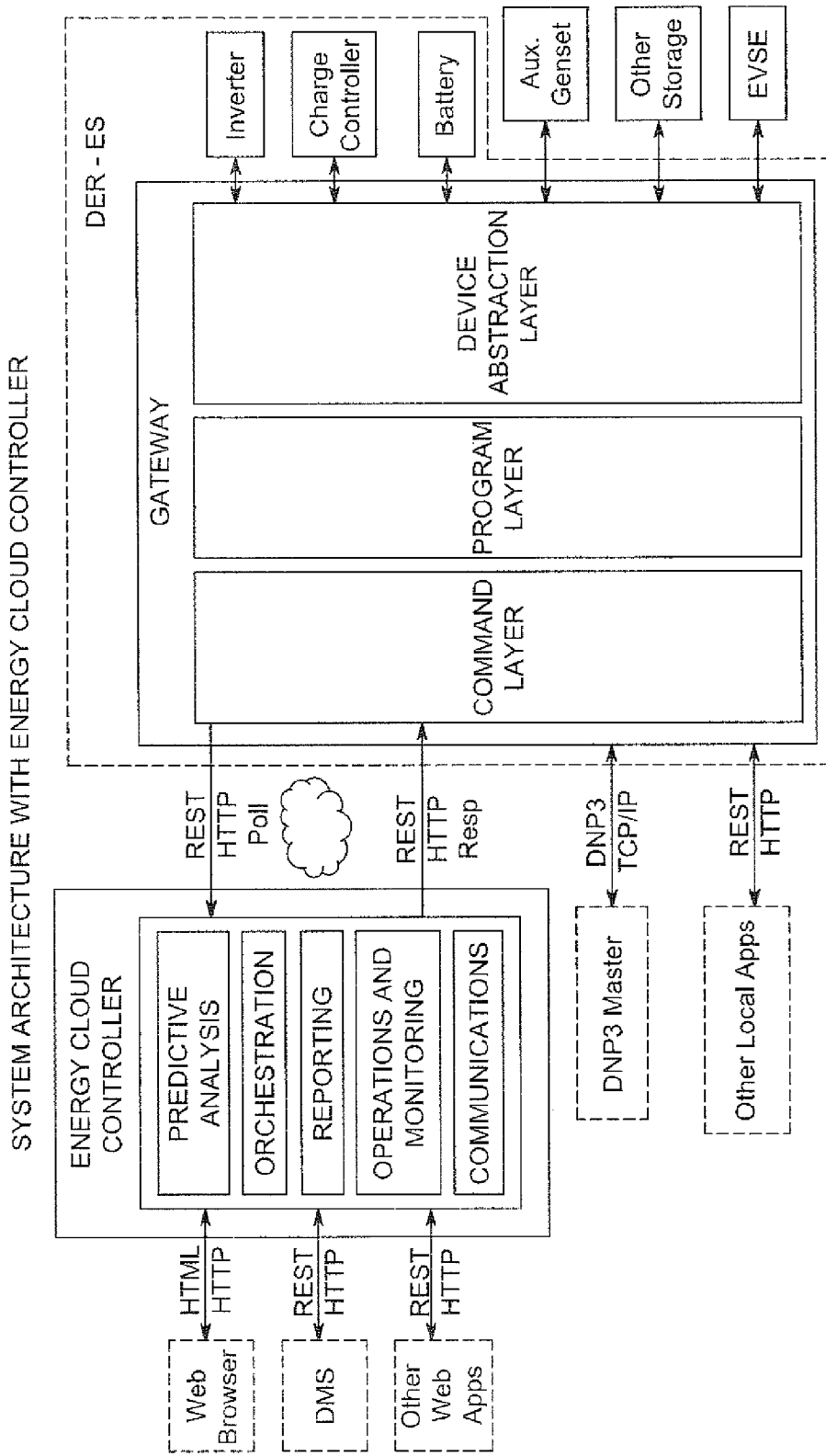

FIG. 14C is a system architecture for an energy cloud controller configuration.

Figure 15:
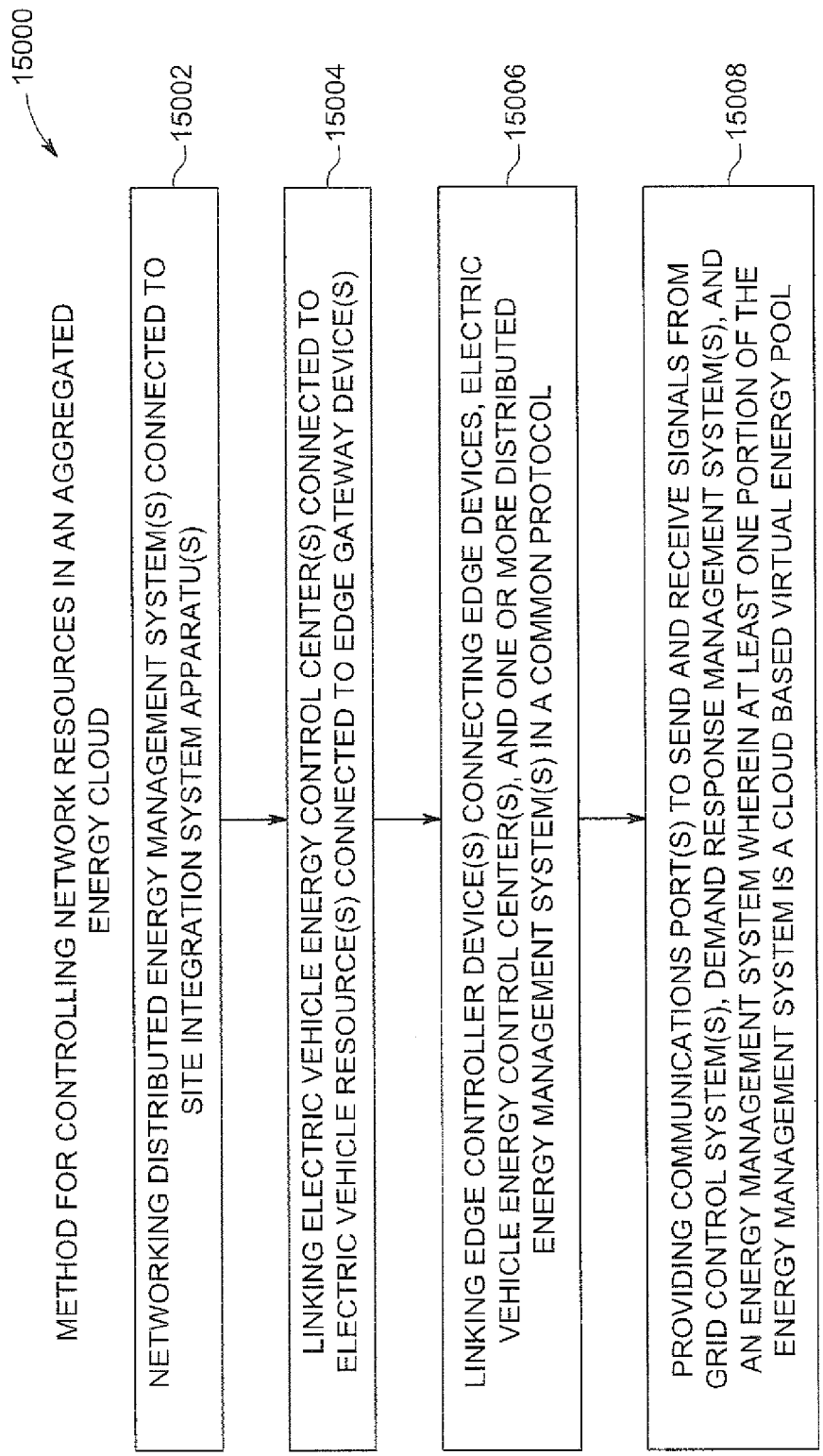

FIG. 15 is a flow chart showing steps for methods of controlling network resources in an aggregated energy cloud.

Figure 16A:
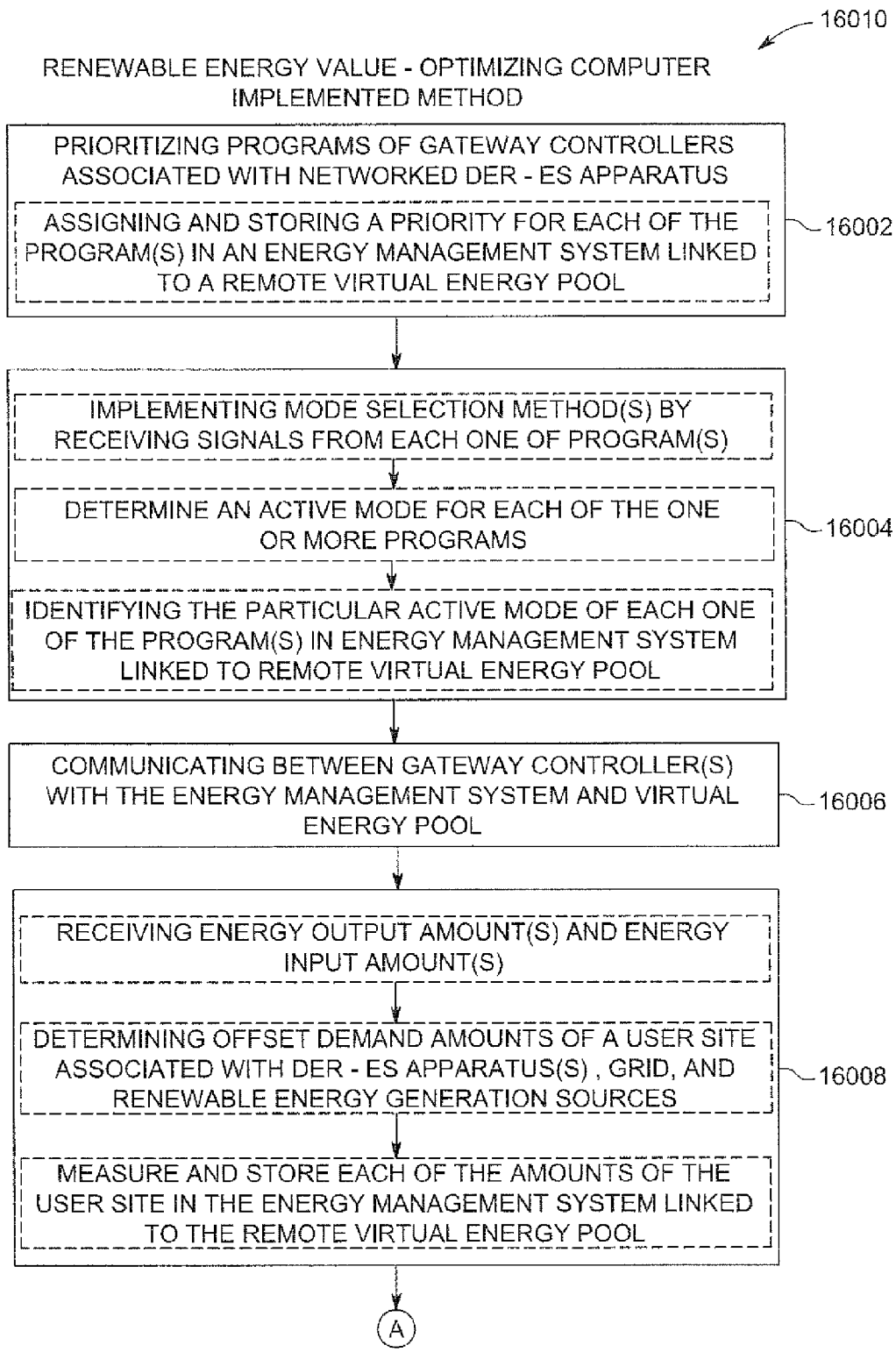
Figure 16B:
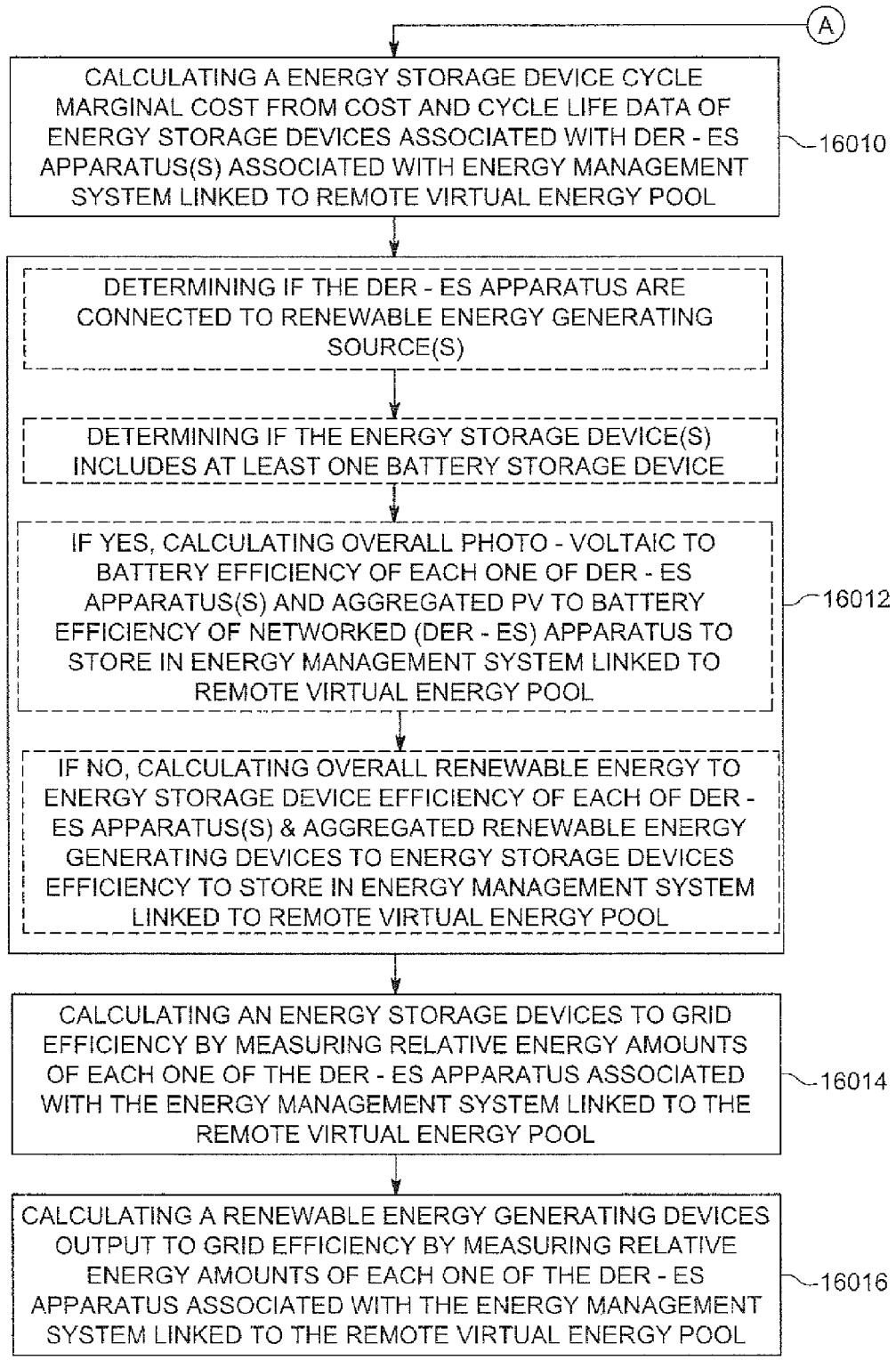

FIGS. 16A and 16B are flow charts showing steps for providing energy value optimizing computer-implemented methods for prioritizing one or more programs of one or more gateway controllers associated with one or more DER-ES apparatus.

Figure 17:
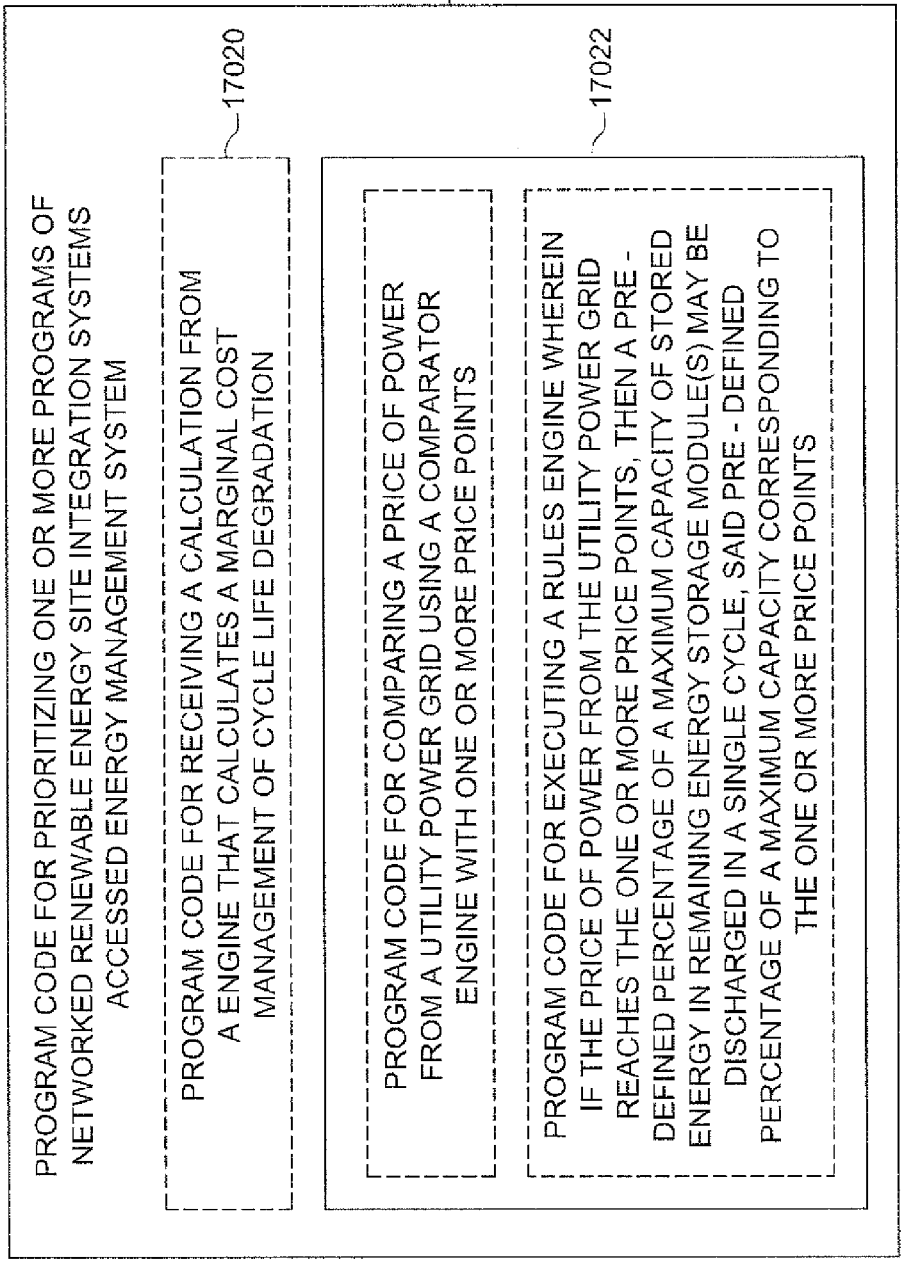

FIG. 17 is a functional block diagram showing program code for computer-readable medium to program system components to provide instructions to one or more computer programs to implement steps for providing energy value optimizing computer-implemented methods for prioritizing one or more programs of one or more gateway controllers associated with one or more DER-ES apparatus.

Figure 18A:
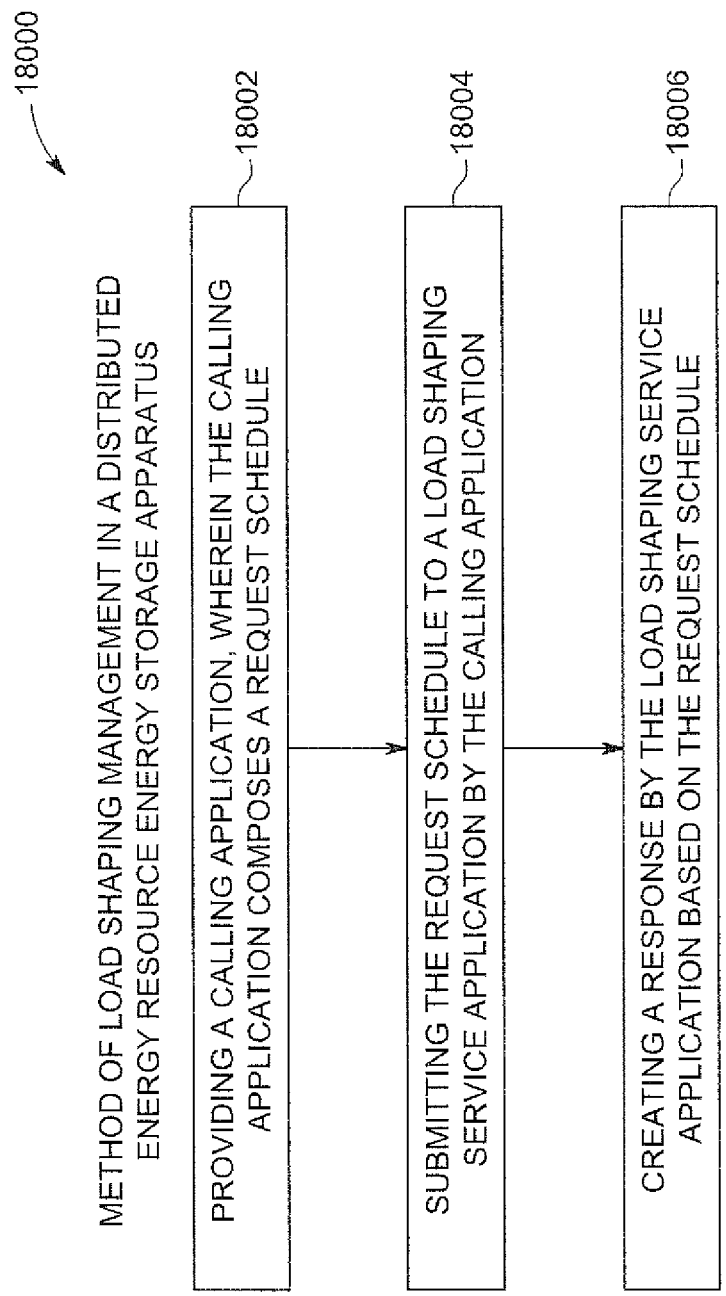
Figure 18B:
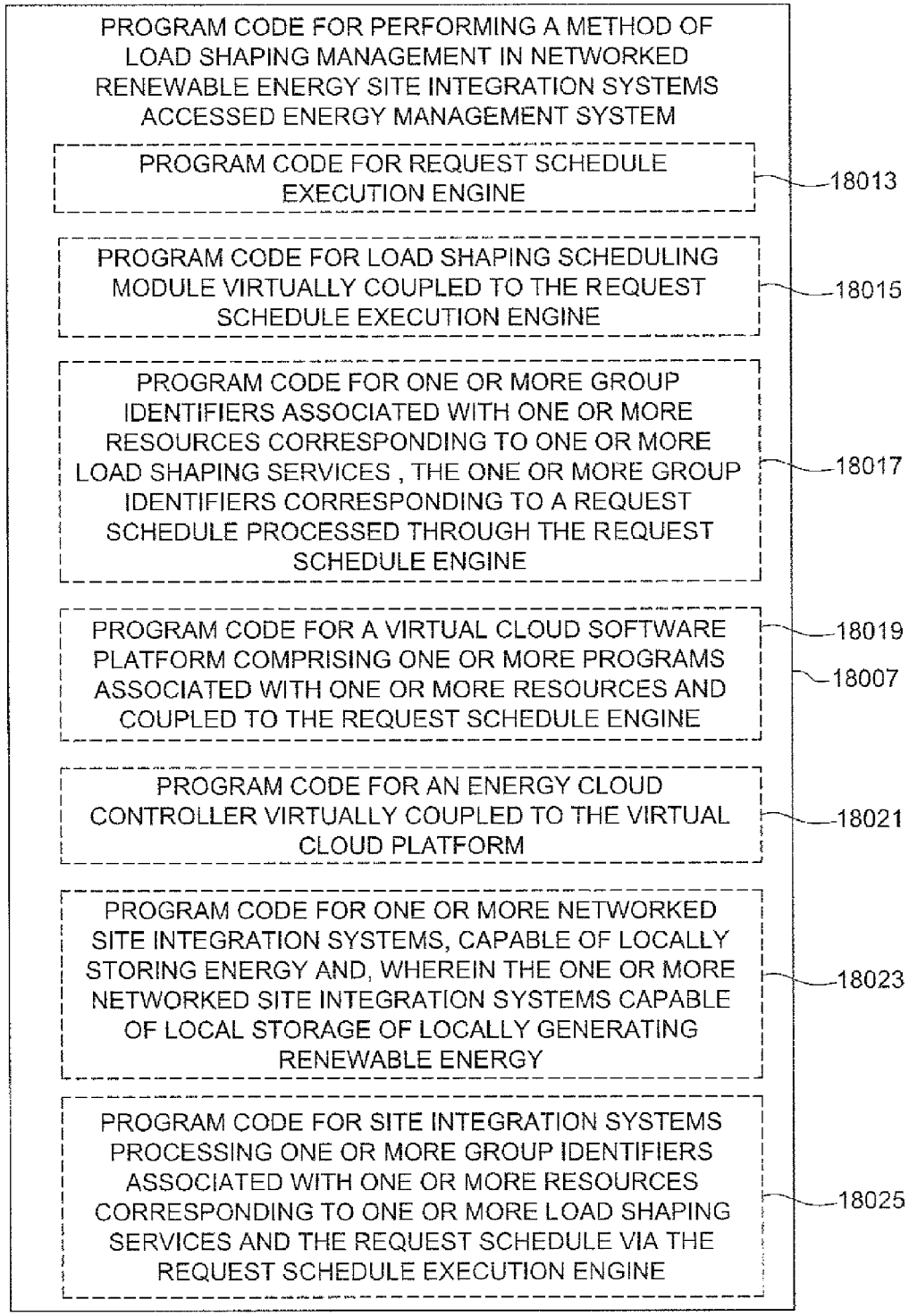

FIGS. 18A and 18B are flow charts and program code block diagrams for steps to implement one or more aspects of methods of load shaping management in one or more DER-ES apparatus.

Figure 19A:
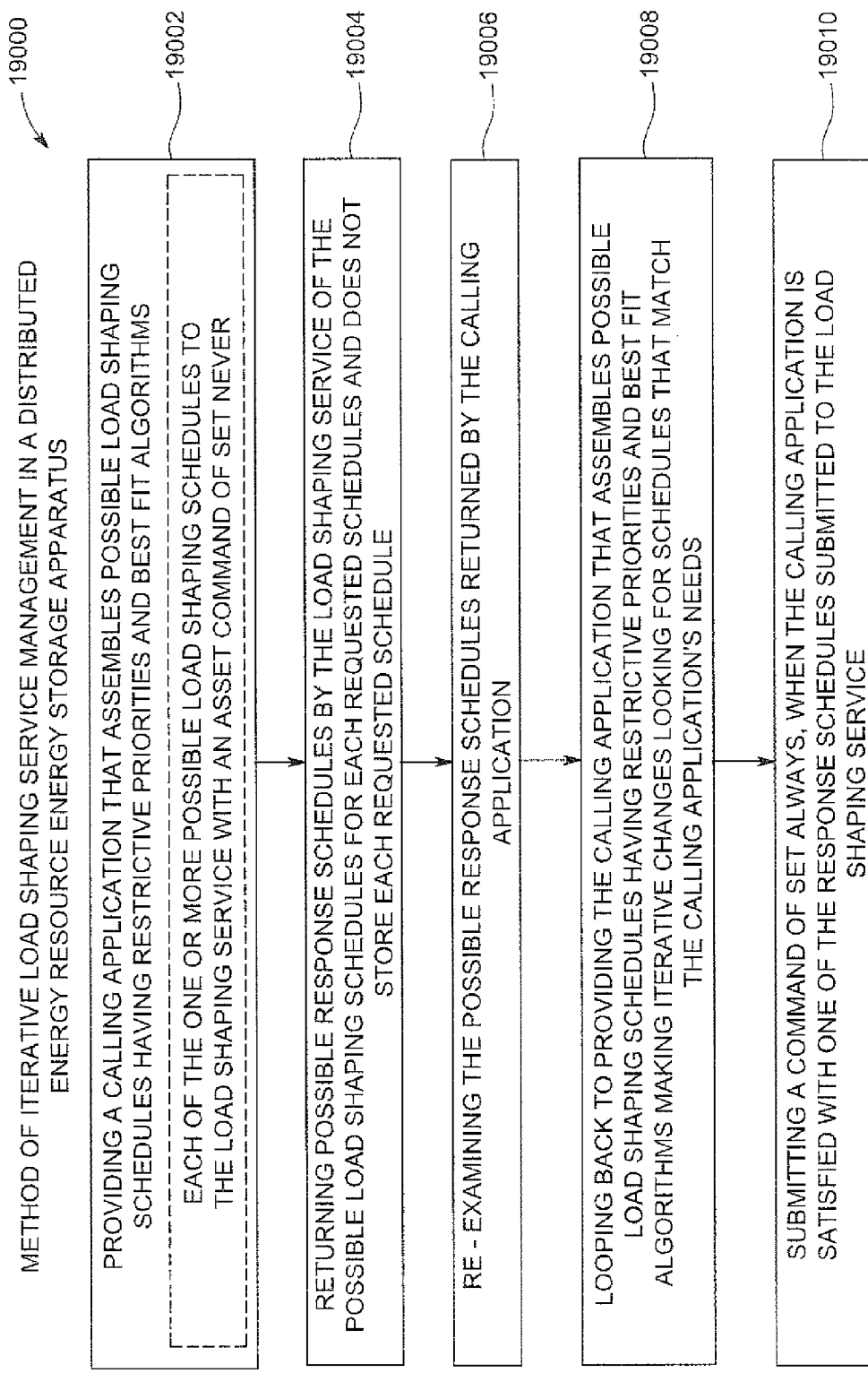

FIG. 19A is a flow chart for steps in iterative load shaping service management methods in one or more DER-ES apparatus.

Figure 19B:
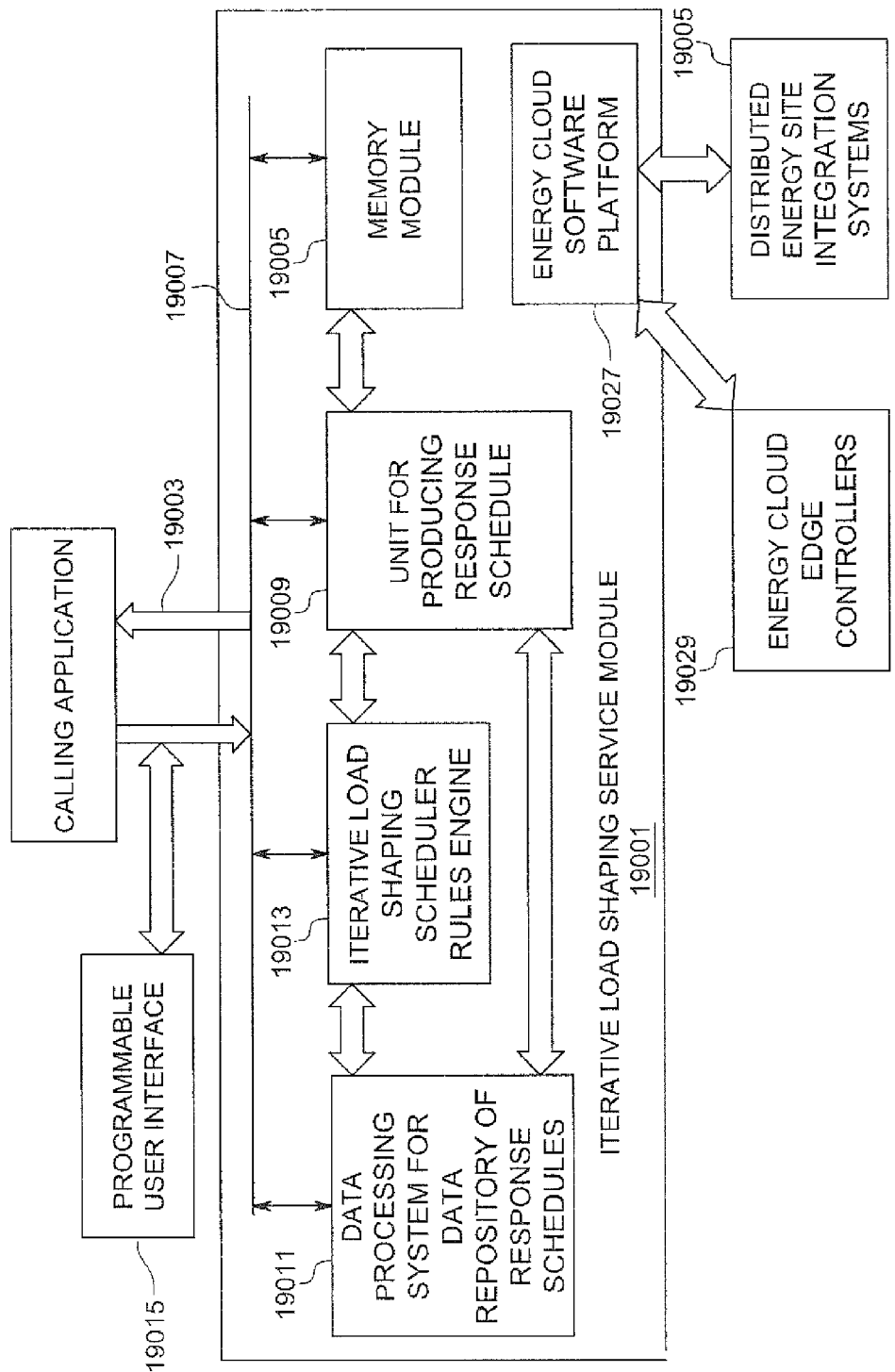

FIG. 19B is a block diagram for one or more aspects of an iterative load shaping service software module in a distributed energy site integration system comprising one or more DER-ES apparatus.

Figure 20A:
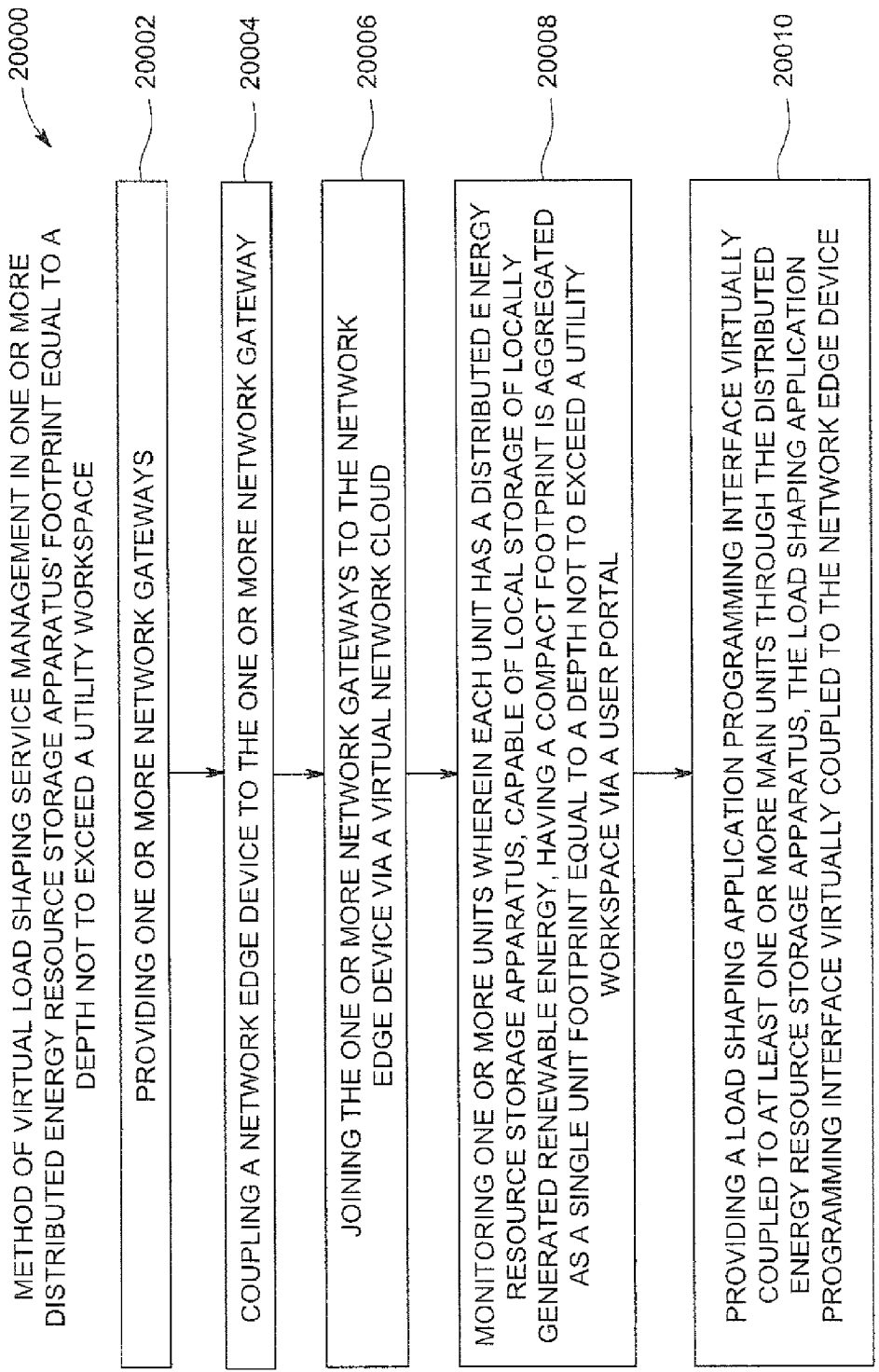

FIG. 20A is a flow chart for methods of virtual load shaping service management.

Figure 20B:
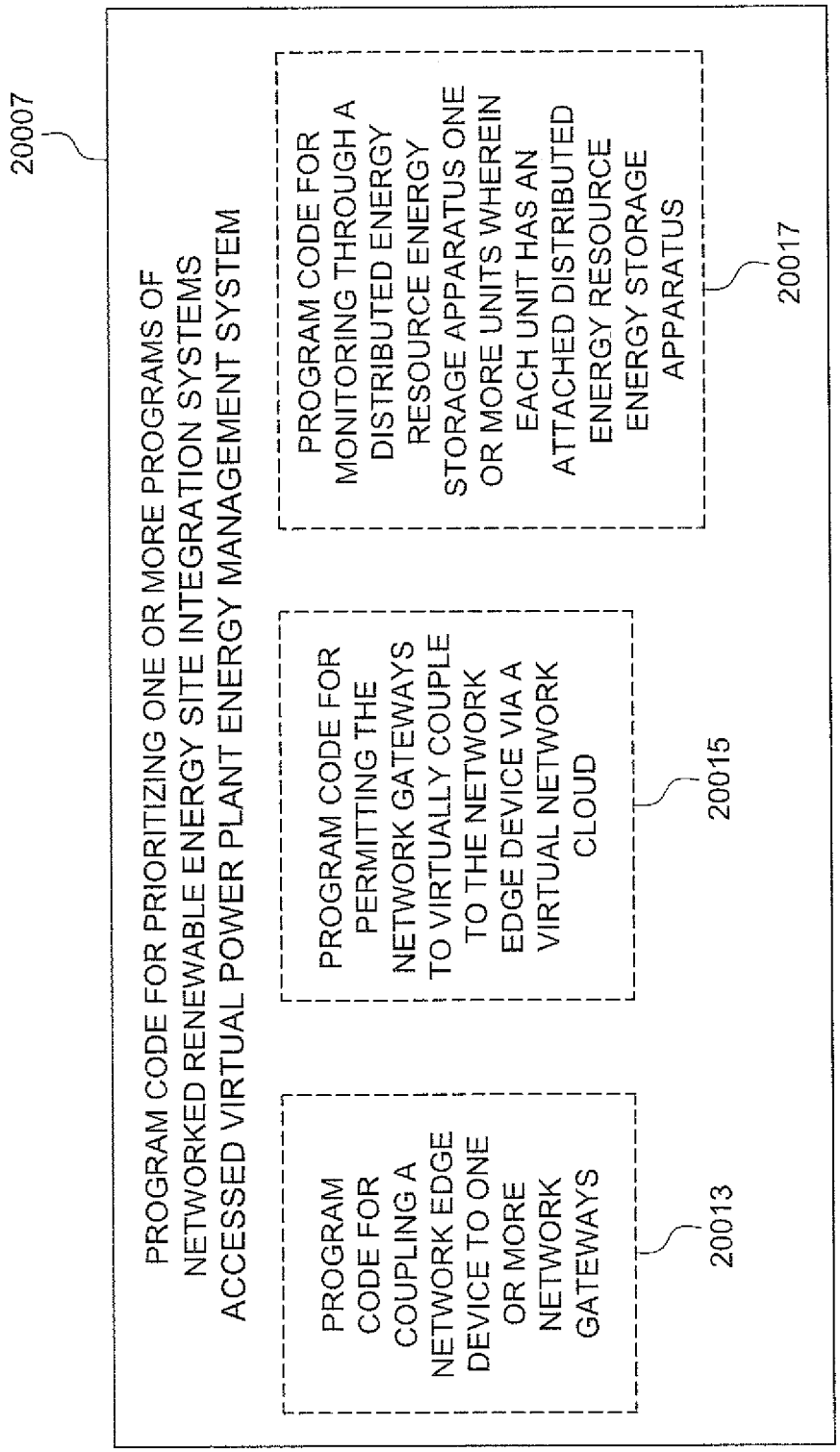
Figure 20C:
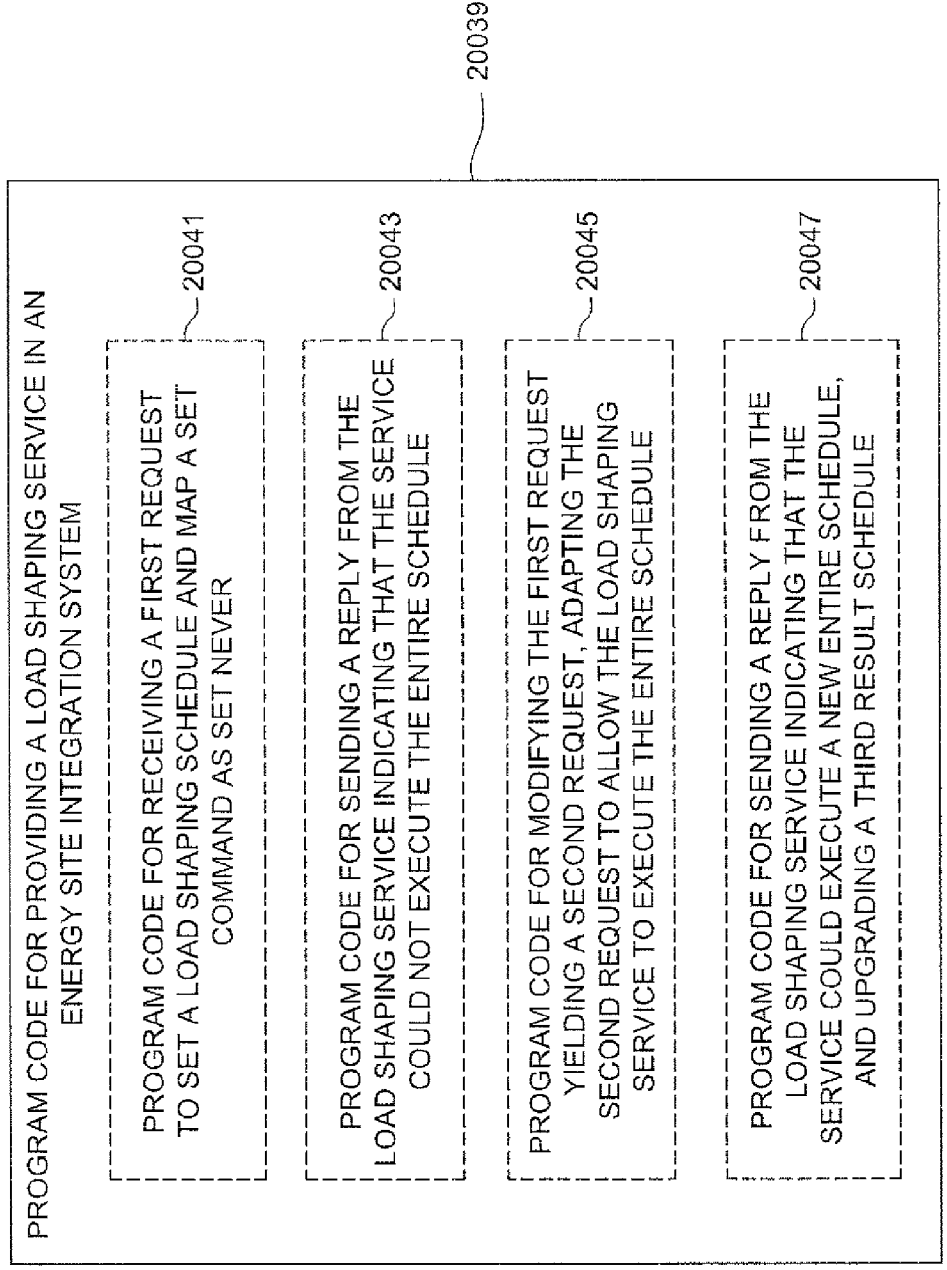
Figure 20D:
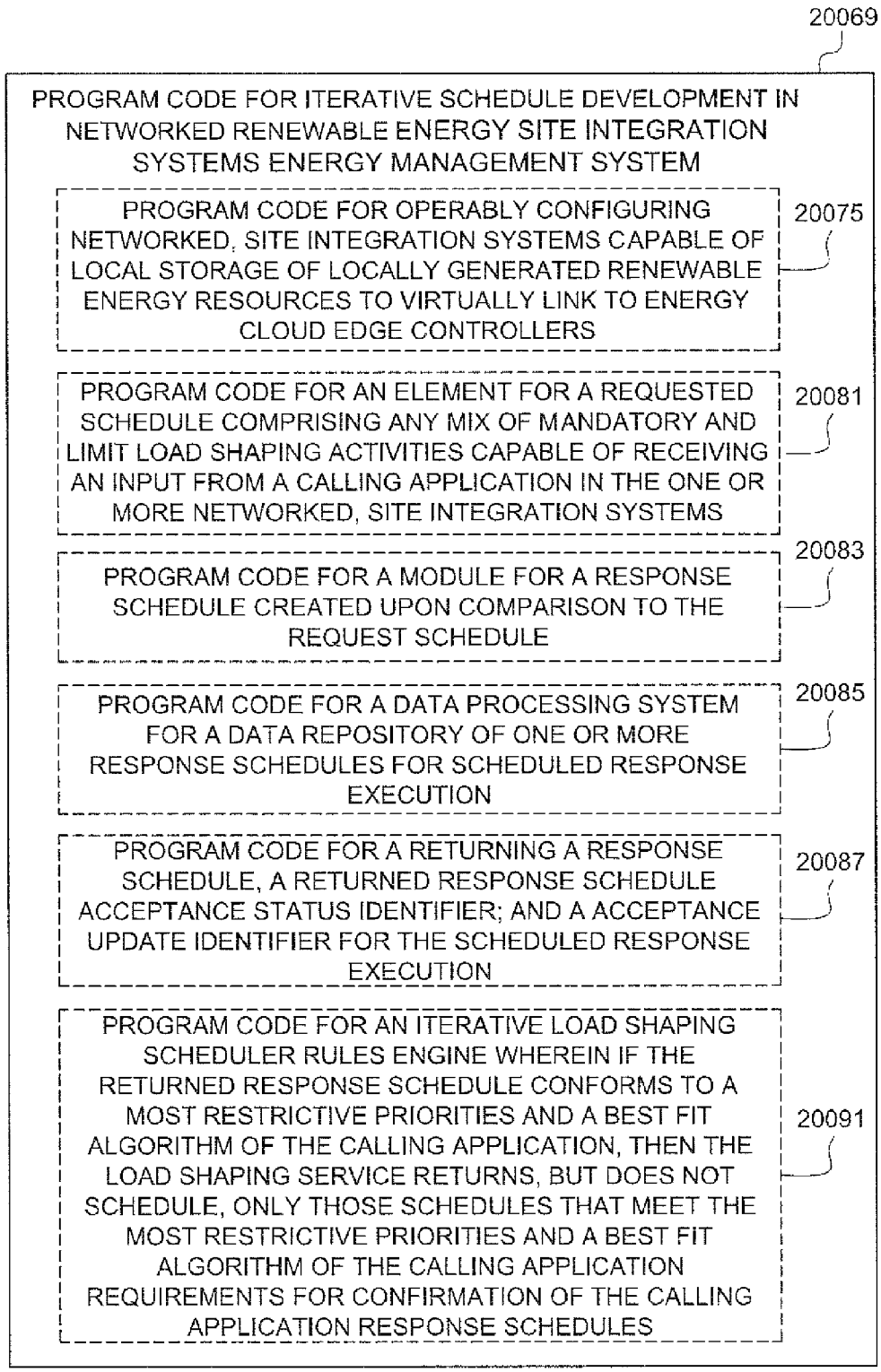

FIGS. 20B-D are block diagrams for program code to implement steps in a computer program comprising computer-usable readable storage medium for methods of virtual load shaping service management.

Figure 21:
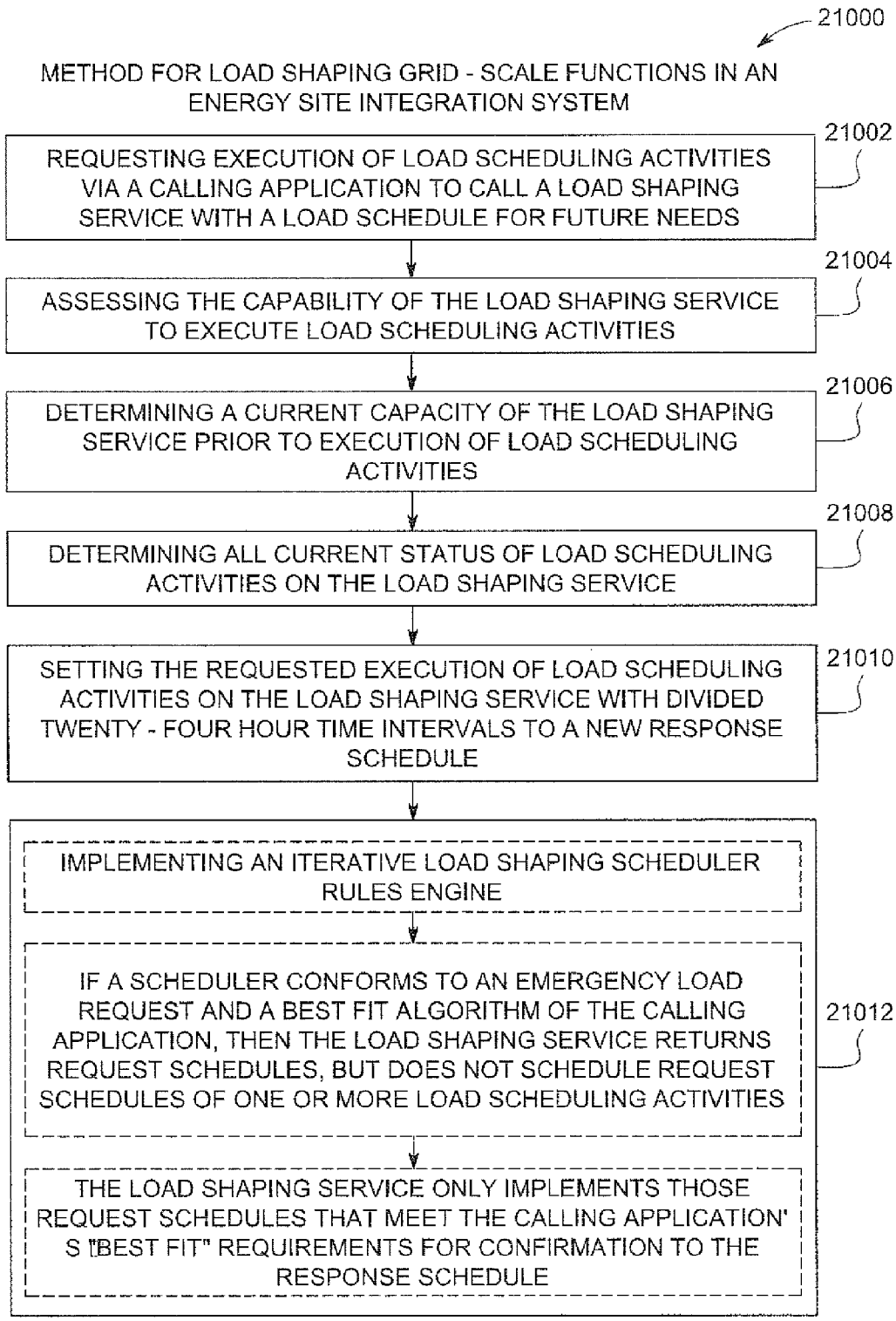

FIG. 21 is a flow chart for a method load shaping grid-scale functions in an energy site integration system.

Figure 22:
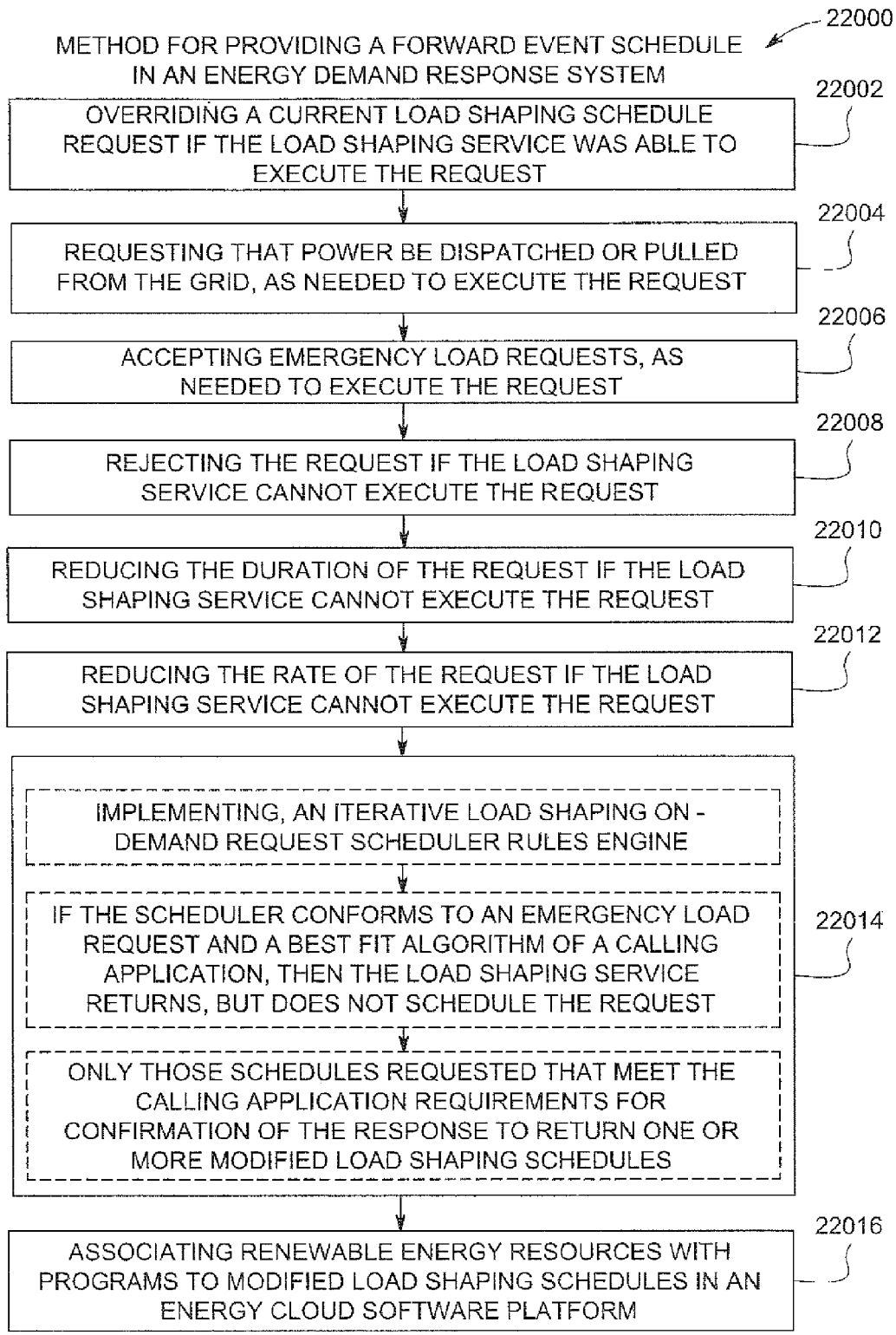

FIG. 22 is a flow chart for methods for providing a forward event schedule in an energy demand response system.

Figure 23:
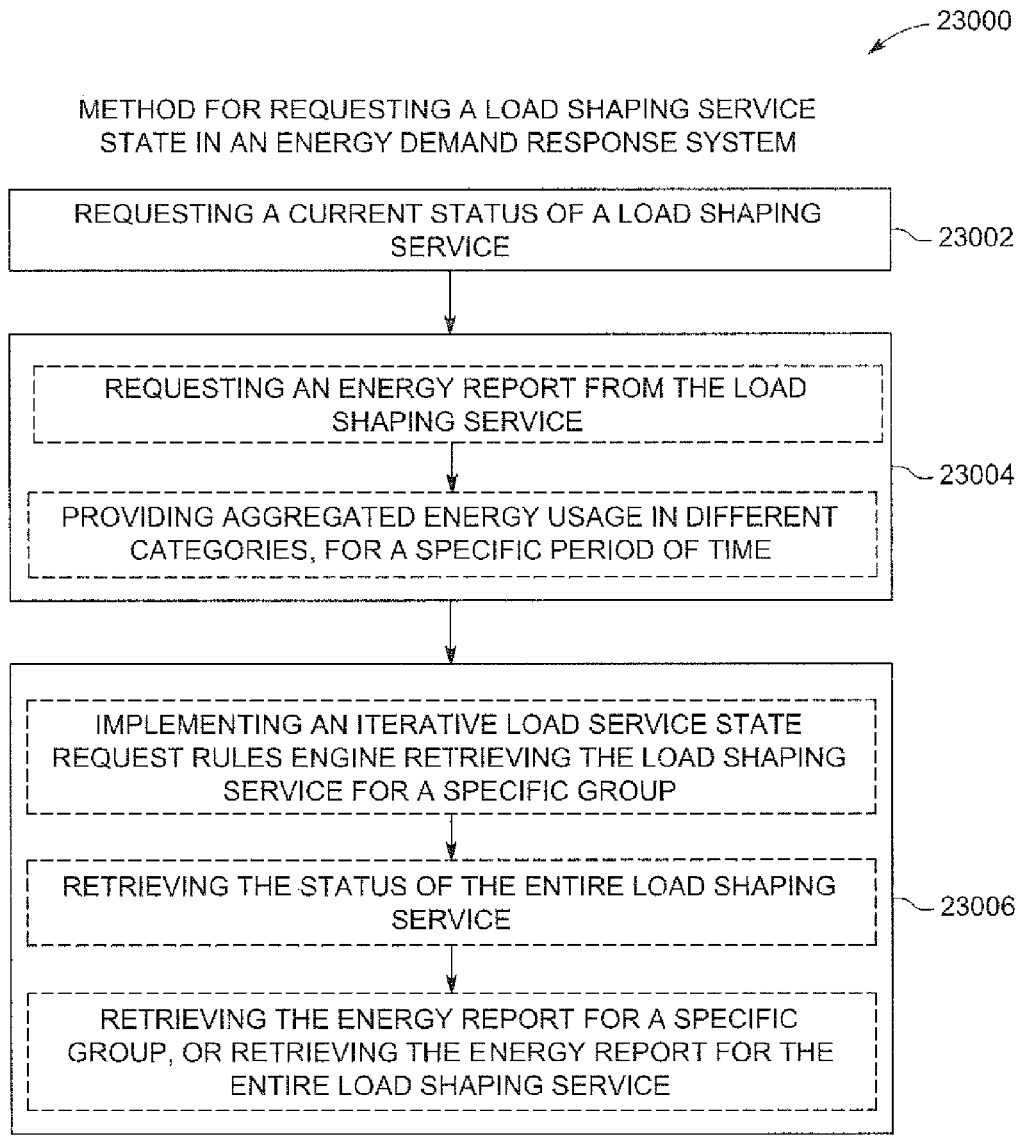

FIG. 23 is a flow chart for methods for requesting a load shaping service state in an energy demand response system.

Figure 24:
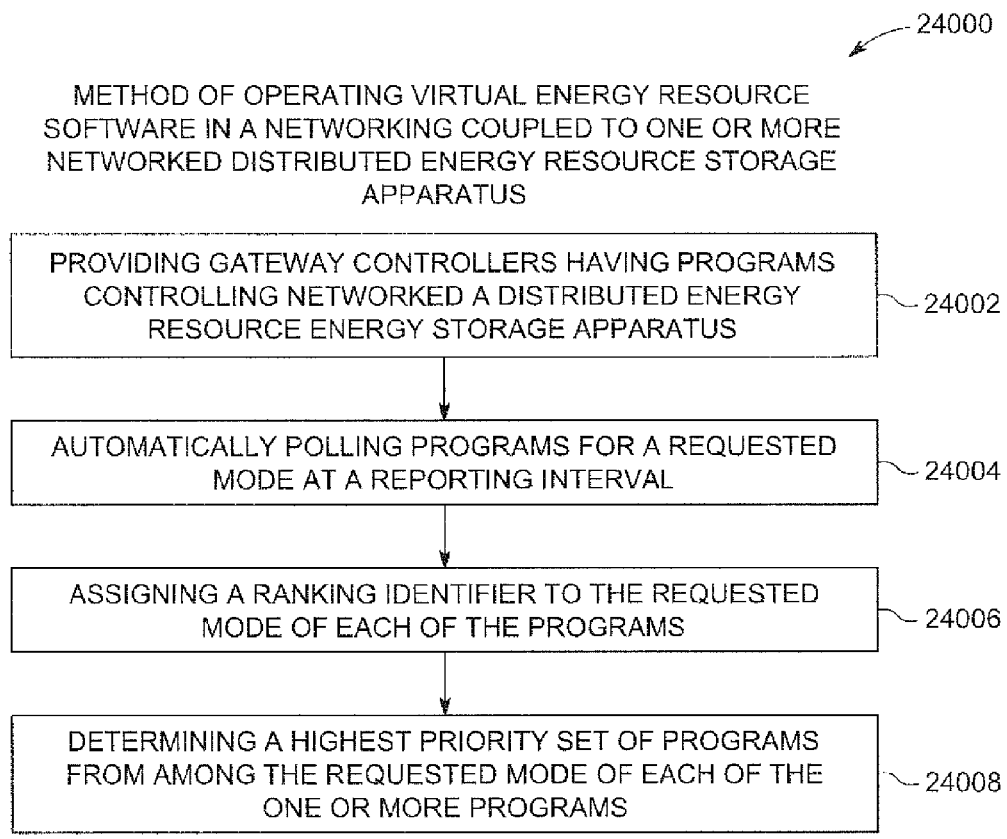

FIG. 24 is a flow chart for methods of operating virtual energy resource software in a network coupled to one or more networked DER-ES apparatus.

Figure 25:
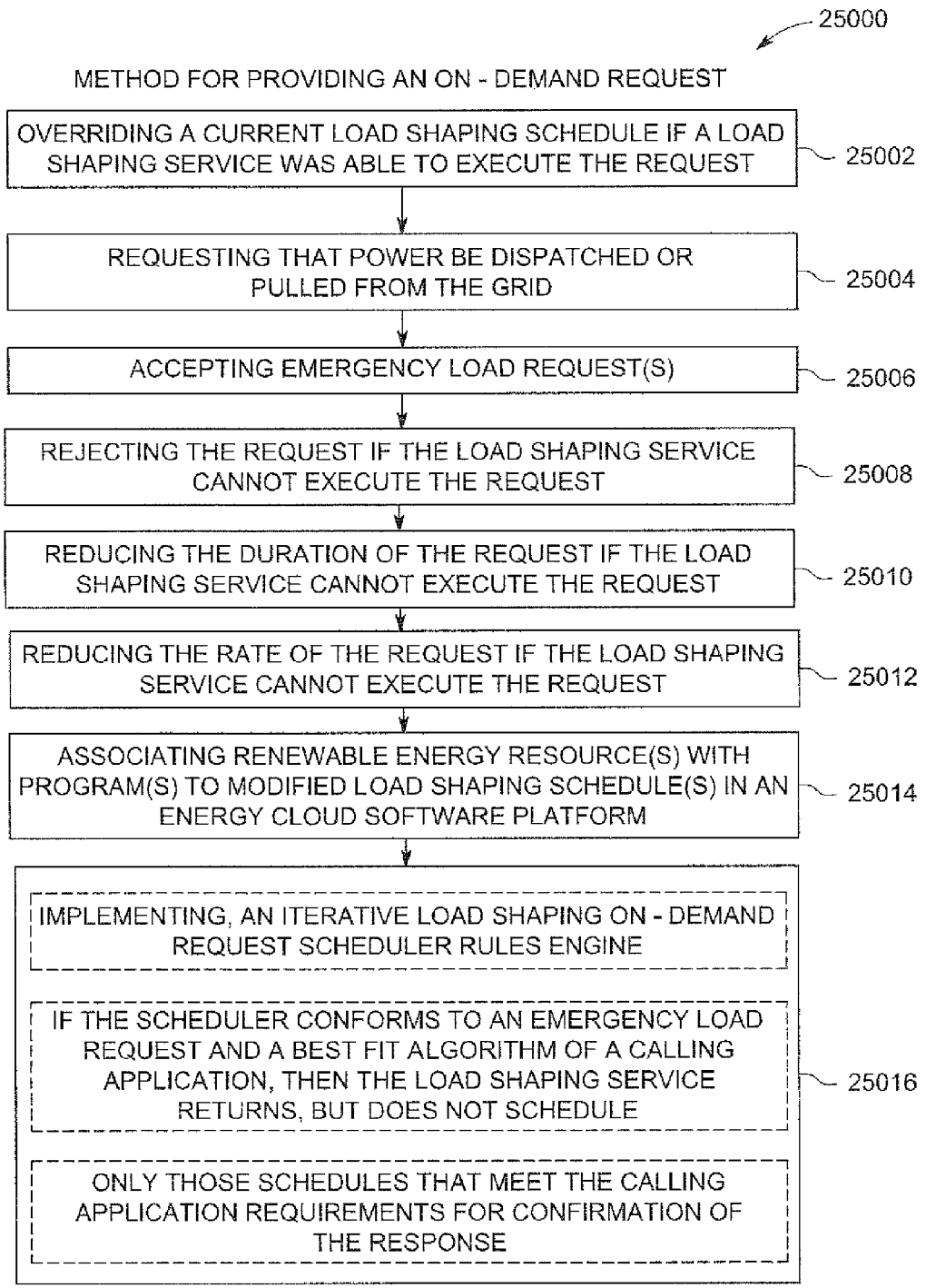

FIG. 25 is a flow chart for methods for providing an on-demand request.

Figure 26:
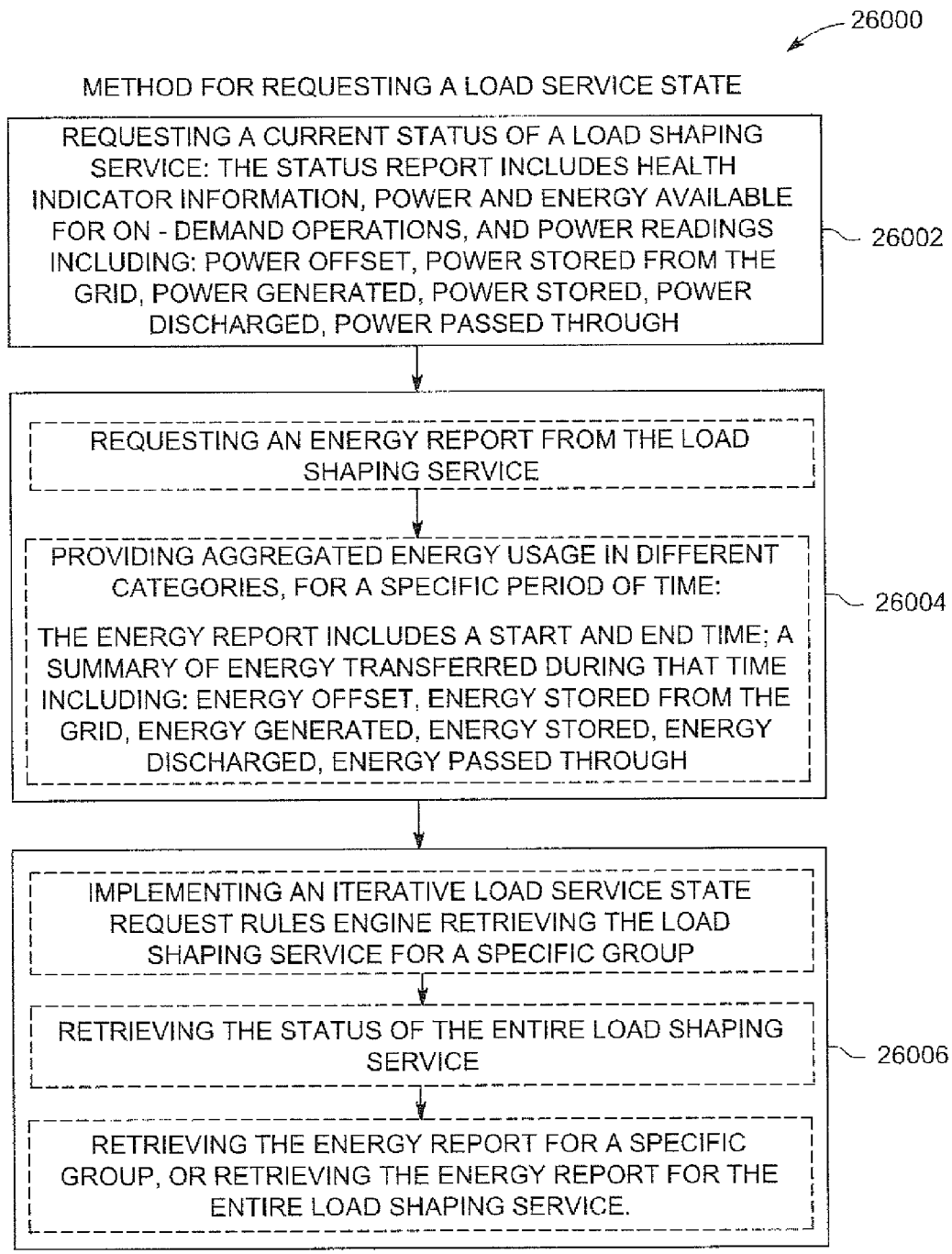

FIG. 26 is a flow chart for methods for requesting a load service state.

Figure 27B:
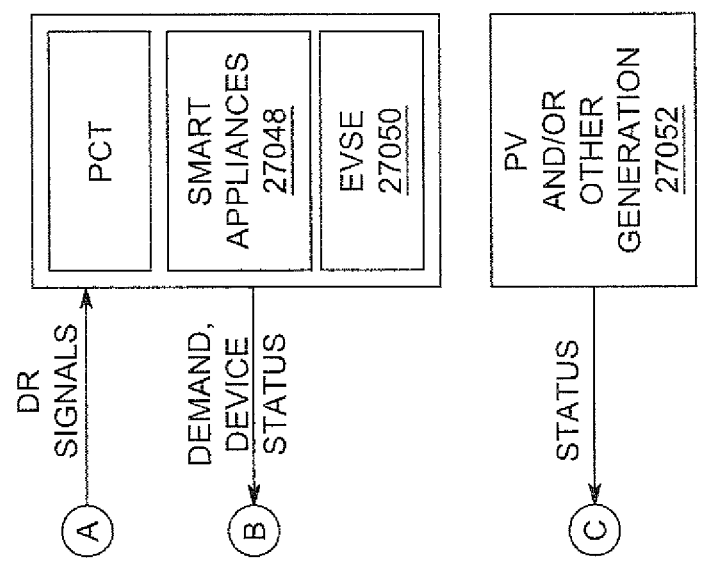
Figure 27C:
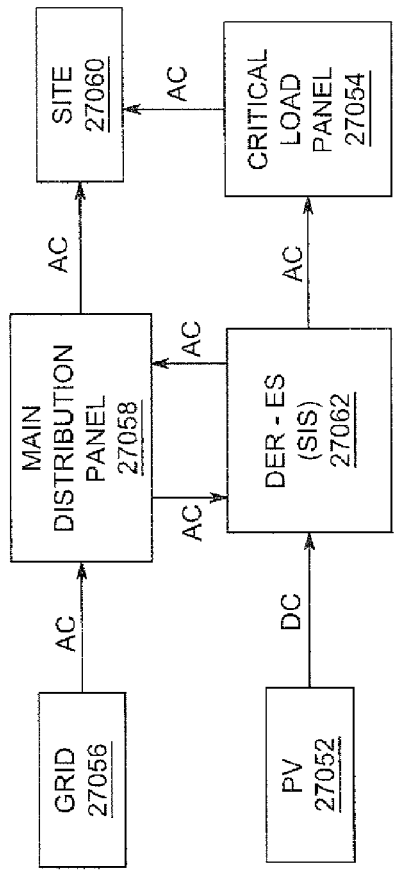
Figure 27C:
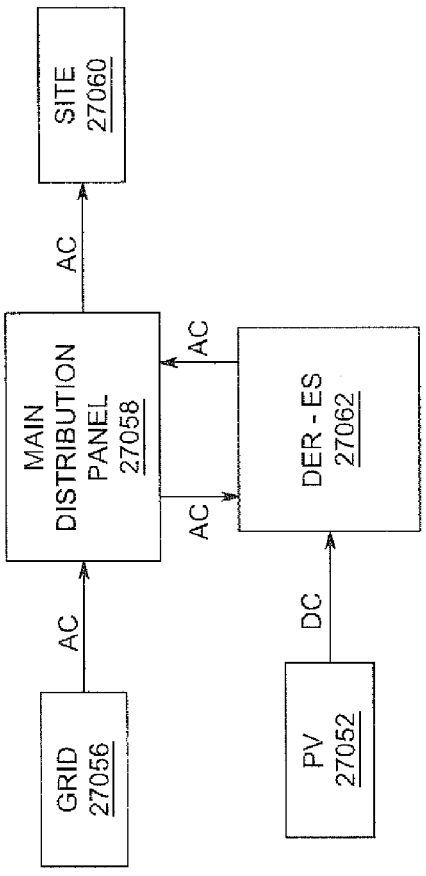

FIGS. 27A-C show system diagrams to illustrate an exemplary solution data architecture, a communication architecture, and a power architecture (with and without a critical load panel) for one or more networked DER-ES apparatus and DER-ES cloud systems and methods.

FIG. 27A is a system block diagram including one or more networked resources connected to one or more utility data center components, the Internet, and one or more user site components and resources.

FIG. 27B is an exemplary system block diagram showing details of one or more user site network components and resources including one or more demand response, demand status, and device status, signals from a home area network to one or more networked resources.

FIG. 27C shows an exemplary DER-ES apparatus network power architecture with a critical load panel and an exemplary power architecture without a critical load panel.

Figure 27D:
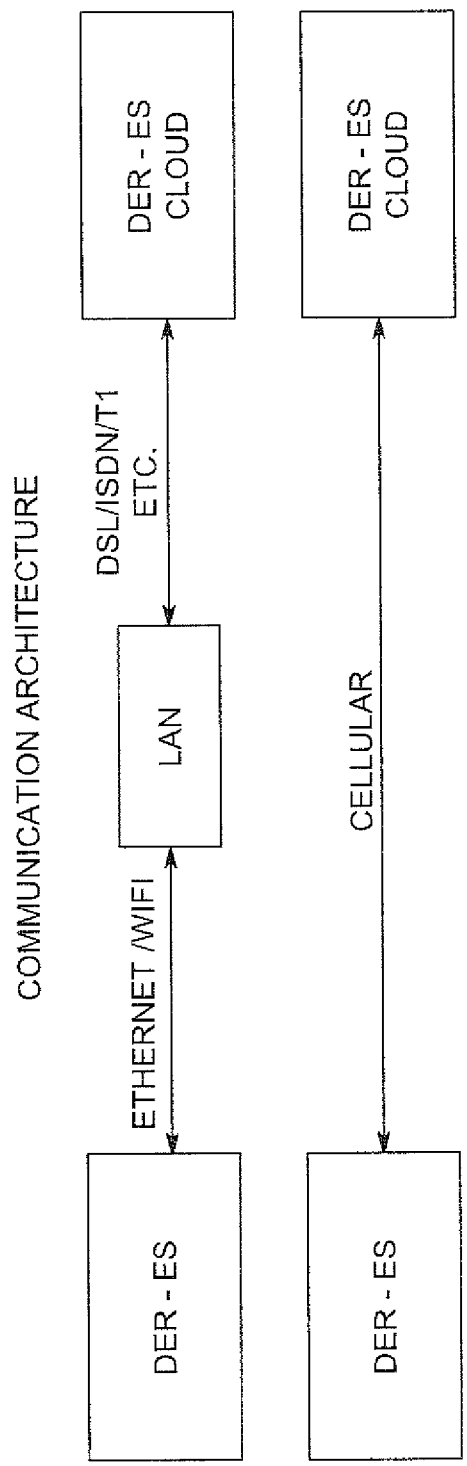

FIG. 27D is a system block diagram of an exemplary communication architecture for one or more networked DER-ES apparatus and DER-ES cloud systems.

Figure 28A:
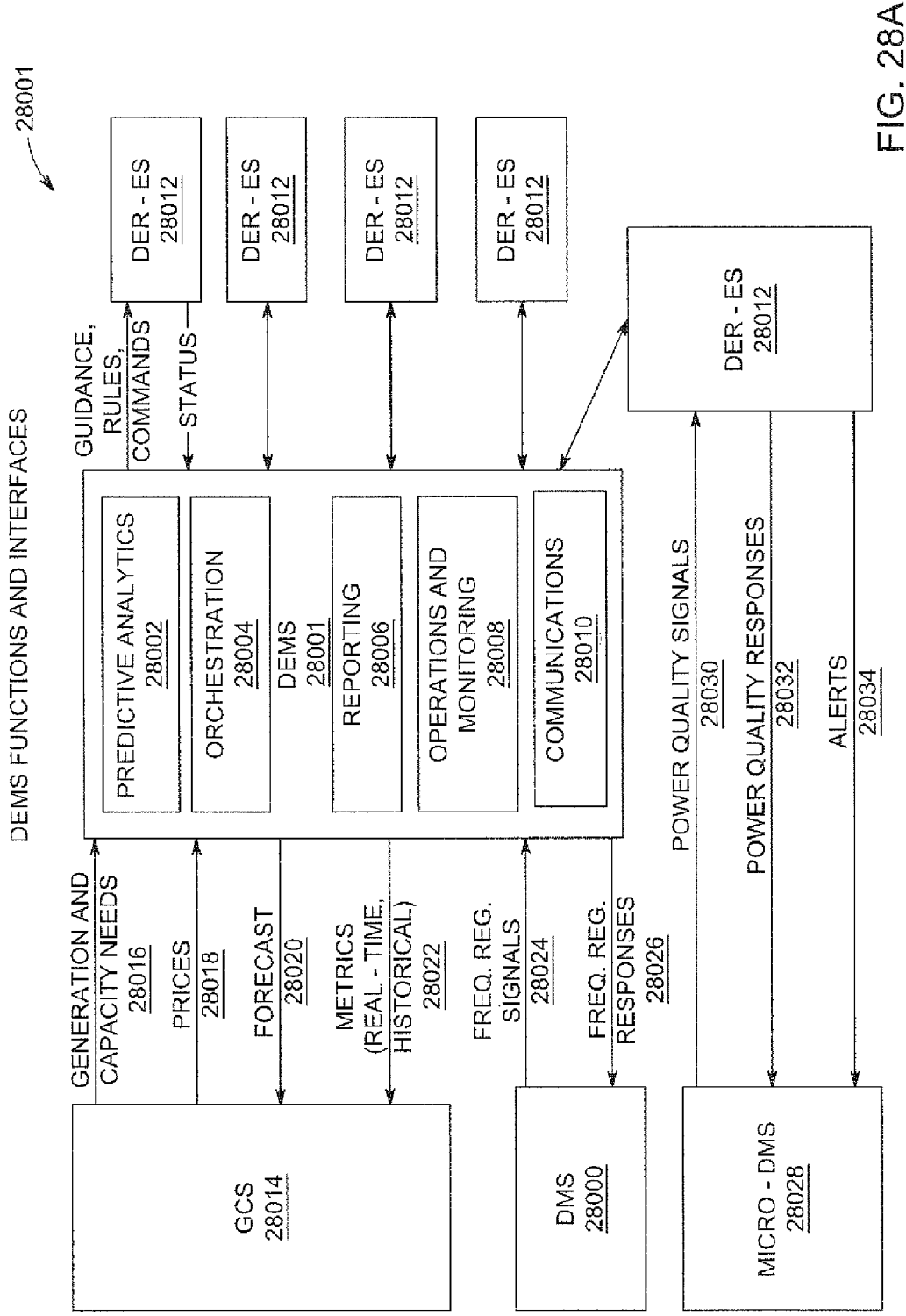
Figure 28B:
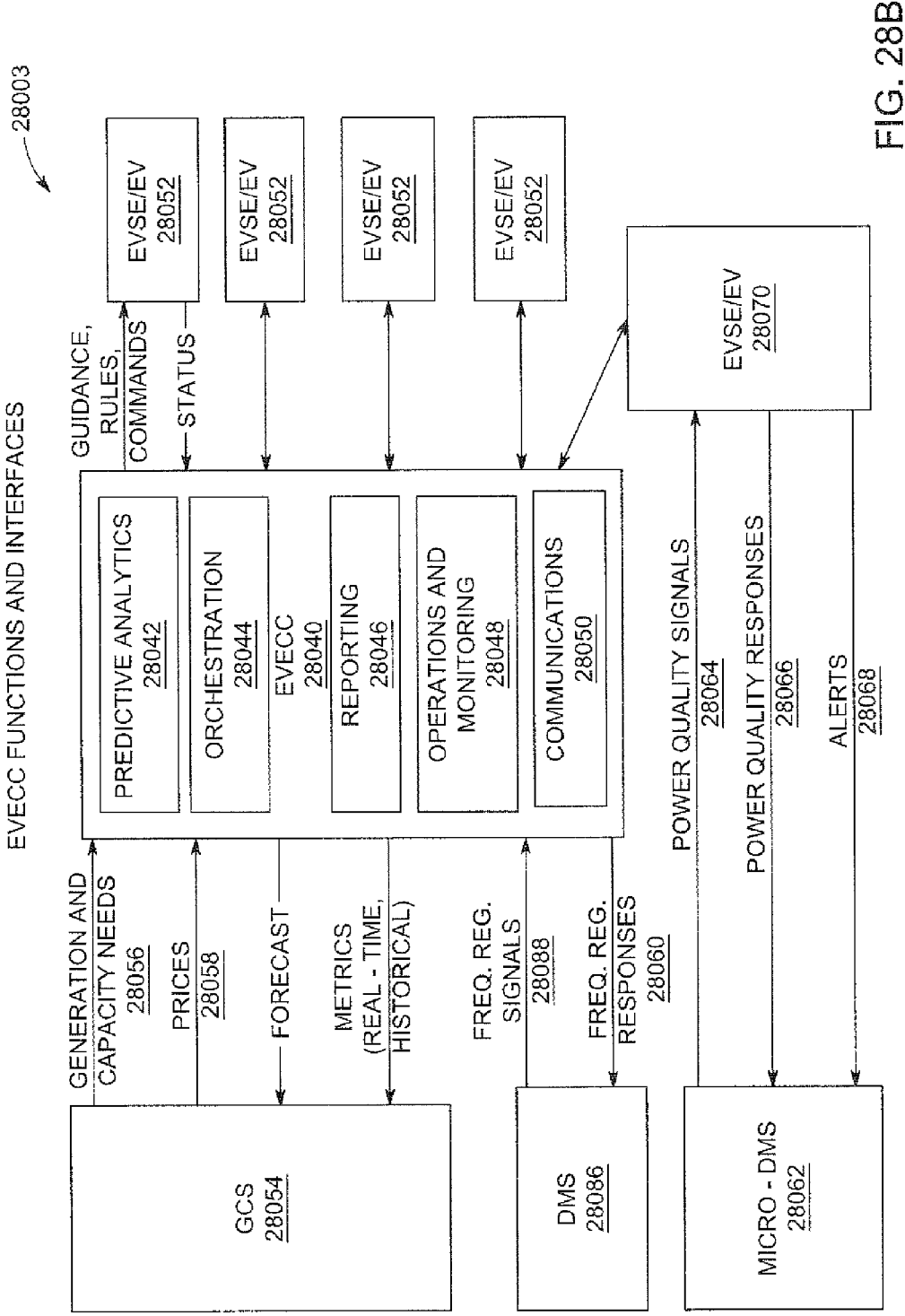
Figure 28C:
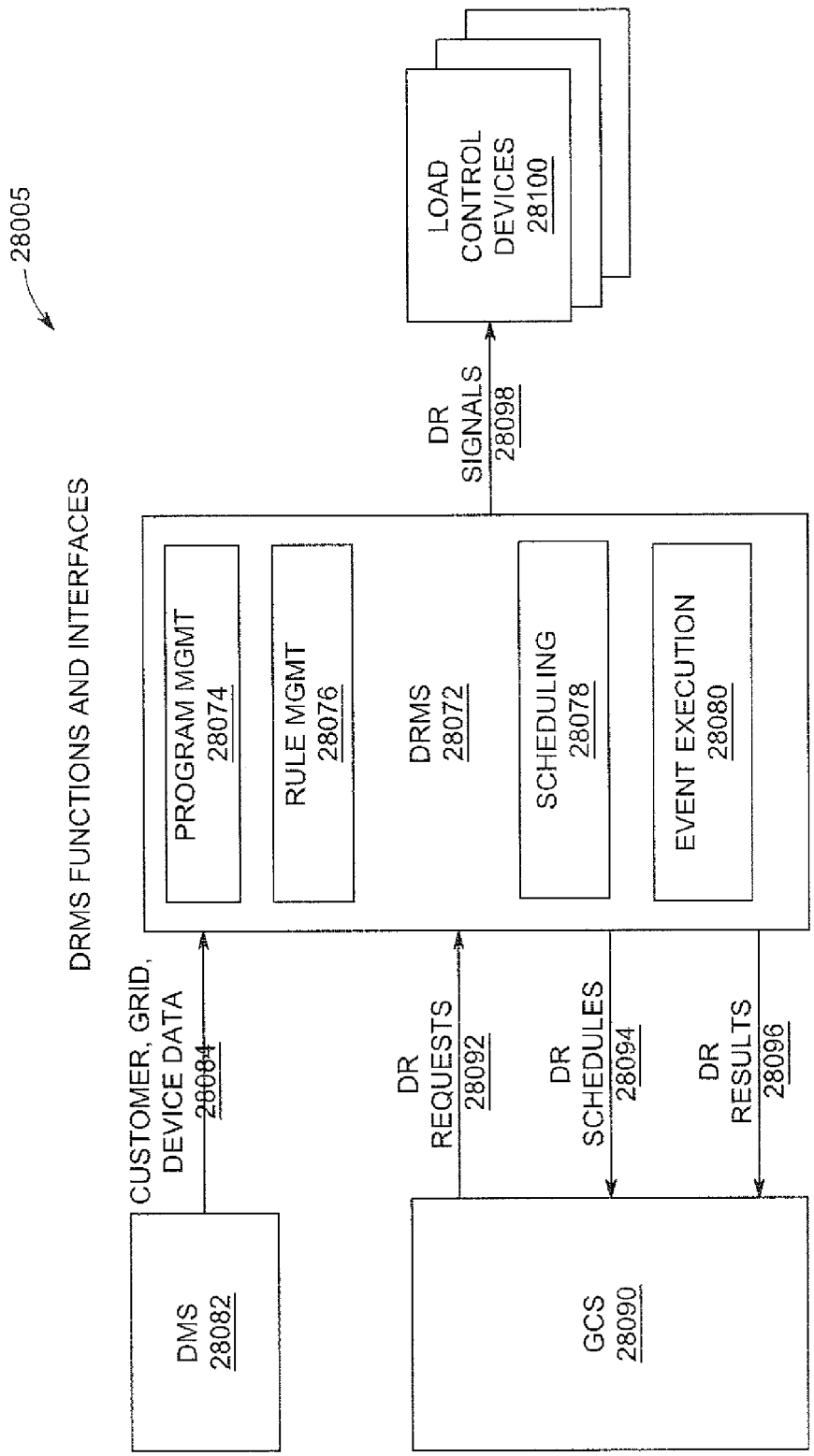

FIGS. 28A-C shows system block diagrams for exemplary distributed energy management systems, electric vehicle energy control center, and demand response management system, functions and interfaces of DER-ES apparatus cloud systems and methods.

FIG. 28A is a system block diagram for exemplary functions and interfaces of a distributed energy management system configuration of DER-ES apparatus network and DER-ES energy cloud software systems and methods.

FIG. 28B is a system block diagram for exemplary functions and interfaces of an electric vehicle energy control center EV-ECC system configuration of DER-ES apparatus network and DER-ES energy cloud software systems and methods.

FIG. 28C is a system block diagram for exemplary functions and interfaces of a demand response management system configuration of DER-ES apparatus network and DER-ES energy cloud software systems and methods.

Figure 29A:
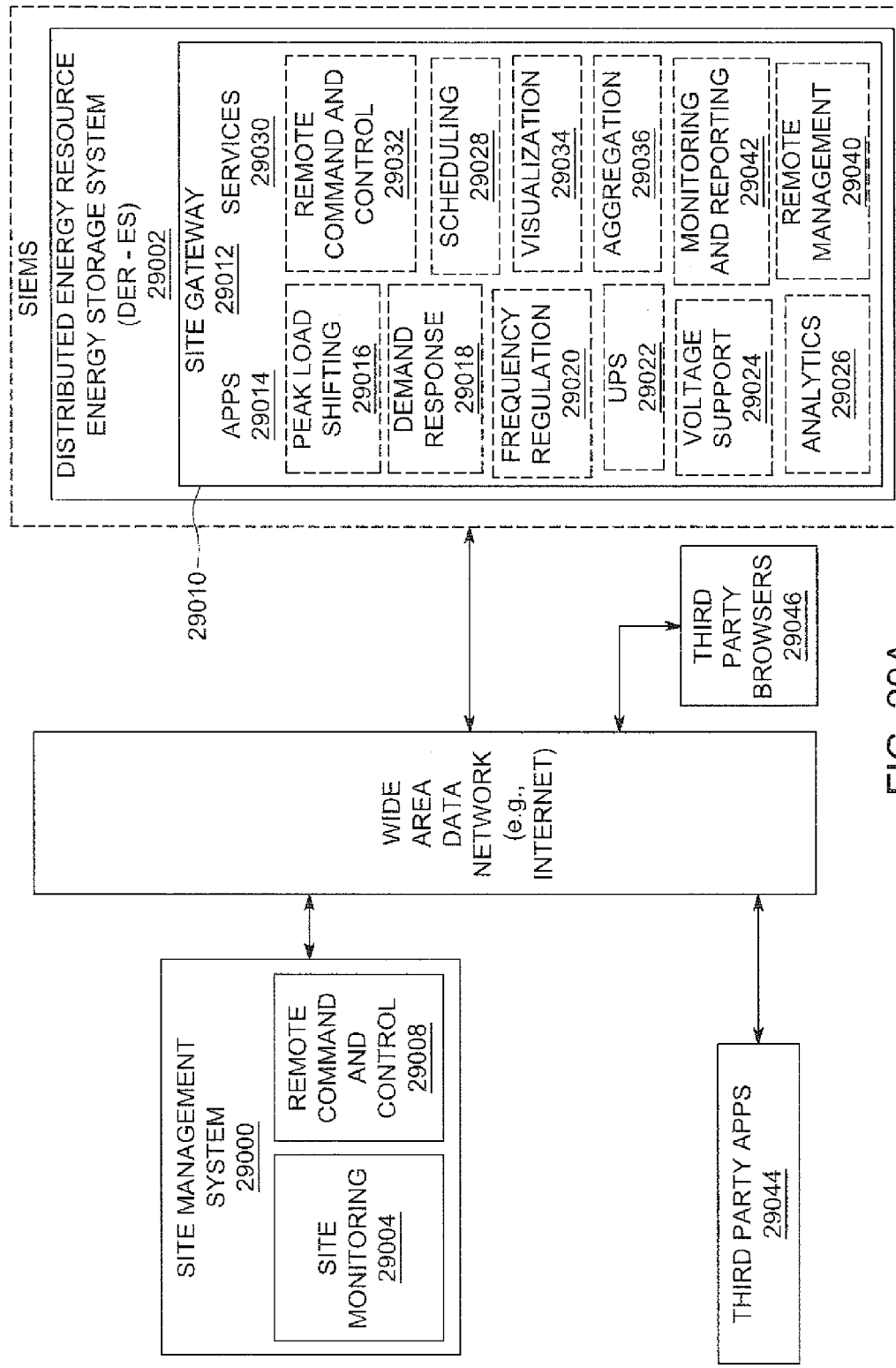
Figure 29B:
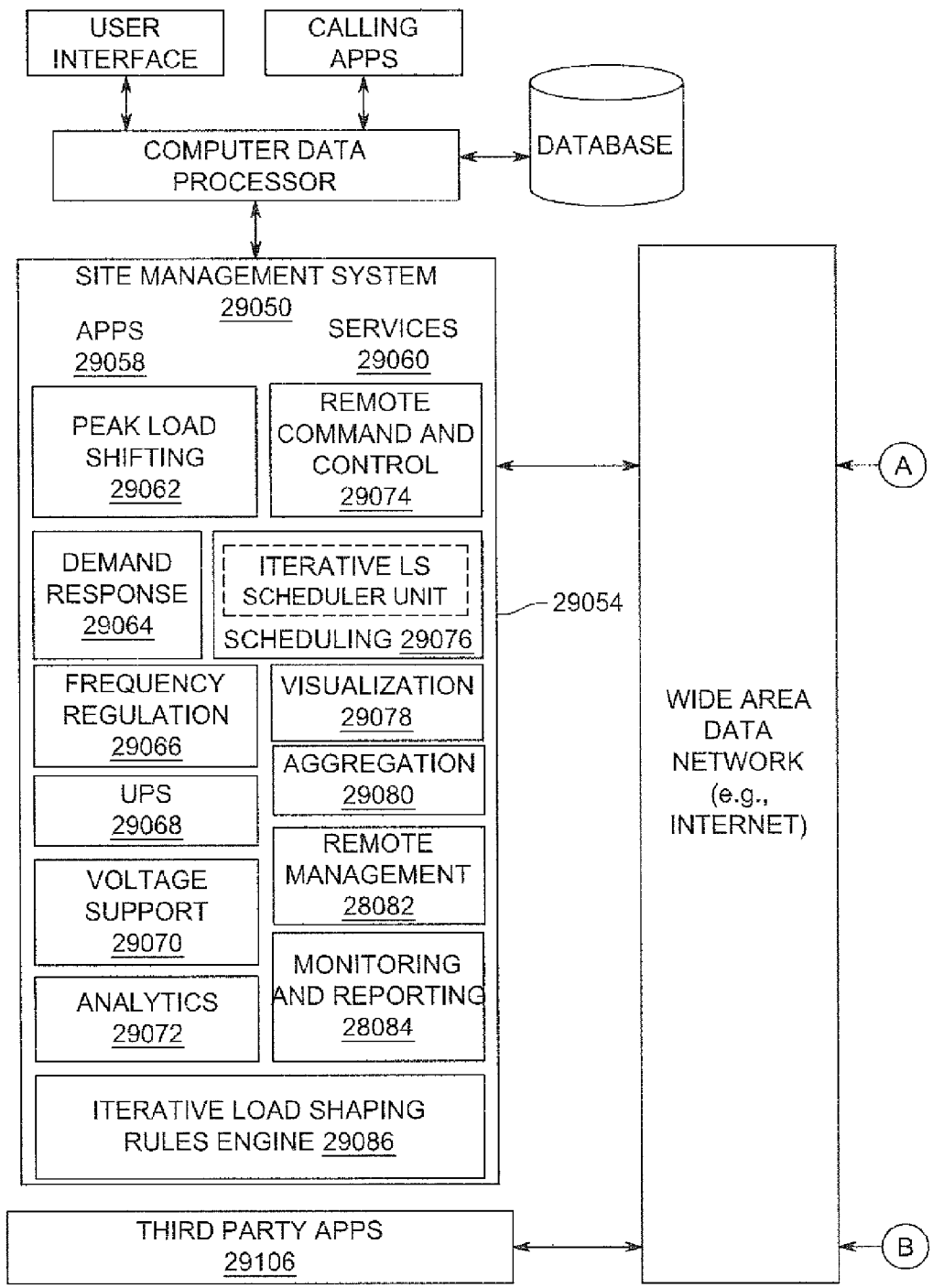
Figure 29C:
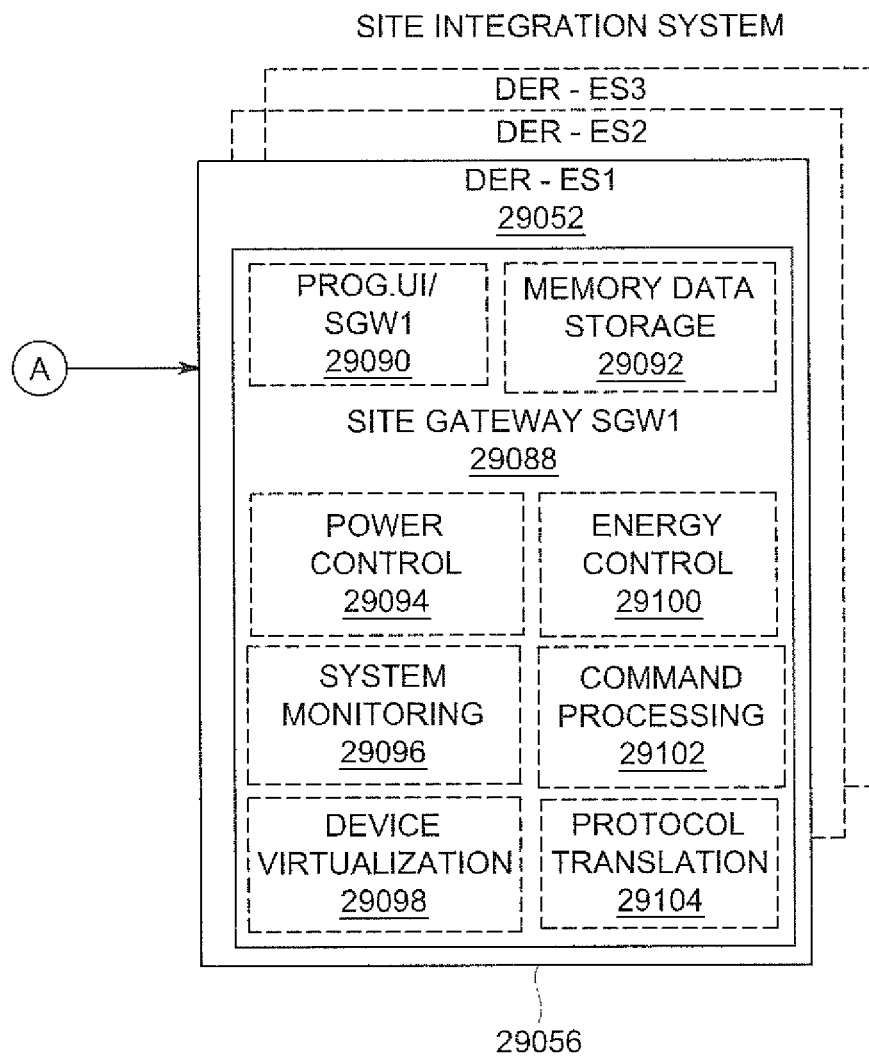

FIGS. 29A-C are system block diagrams of a site integrated energy management system, site management system, and various software modules within a site gateway system in a DER-ES system configuration that communicate via Internet with third party applications, to implement various energy monitoring, aggregation, command, and control methods according to one or more of the systems and methods described herein.

Figure 30:
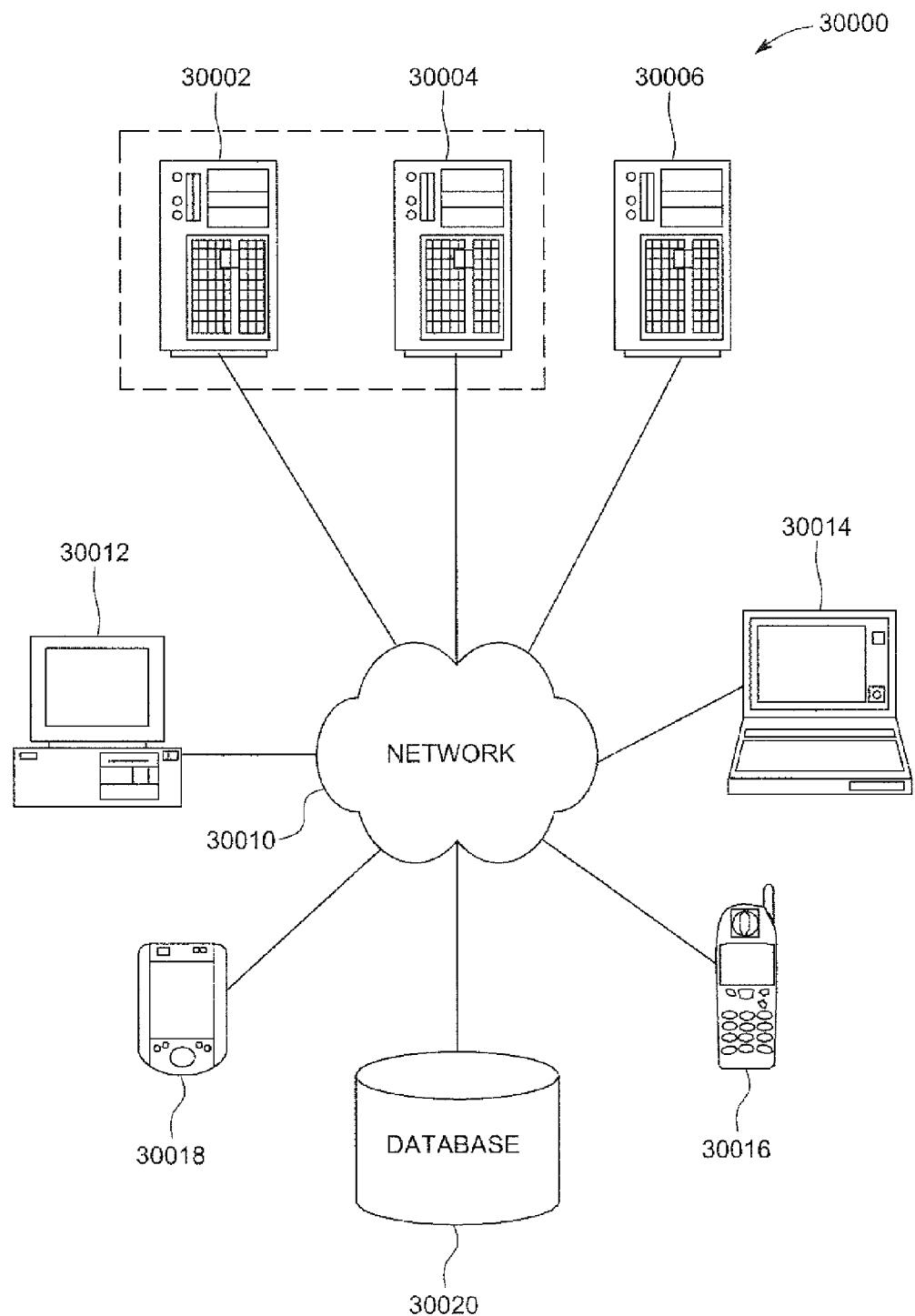

FIG. 30 is an illustration depicting an exemplary operating environment including one or more user computers, computing devices, or processing devices, which can be used to operate a client, such as a dedicated application, web browser is shown.

Figure 31:
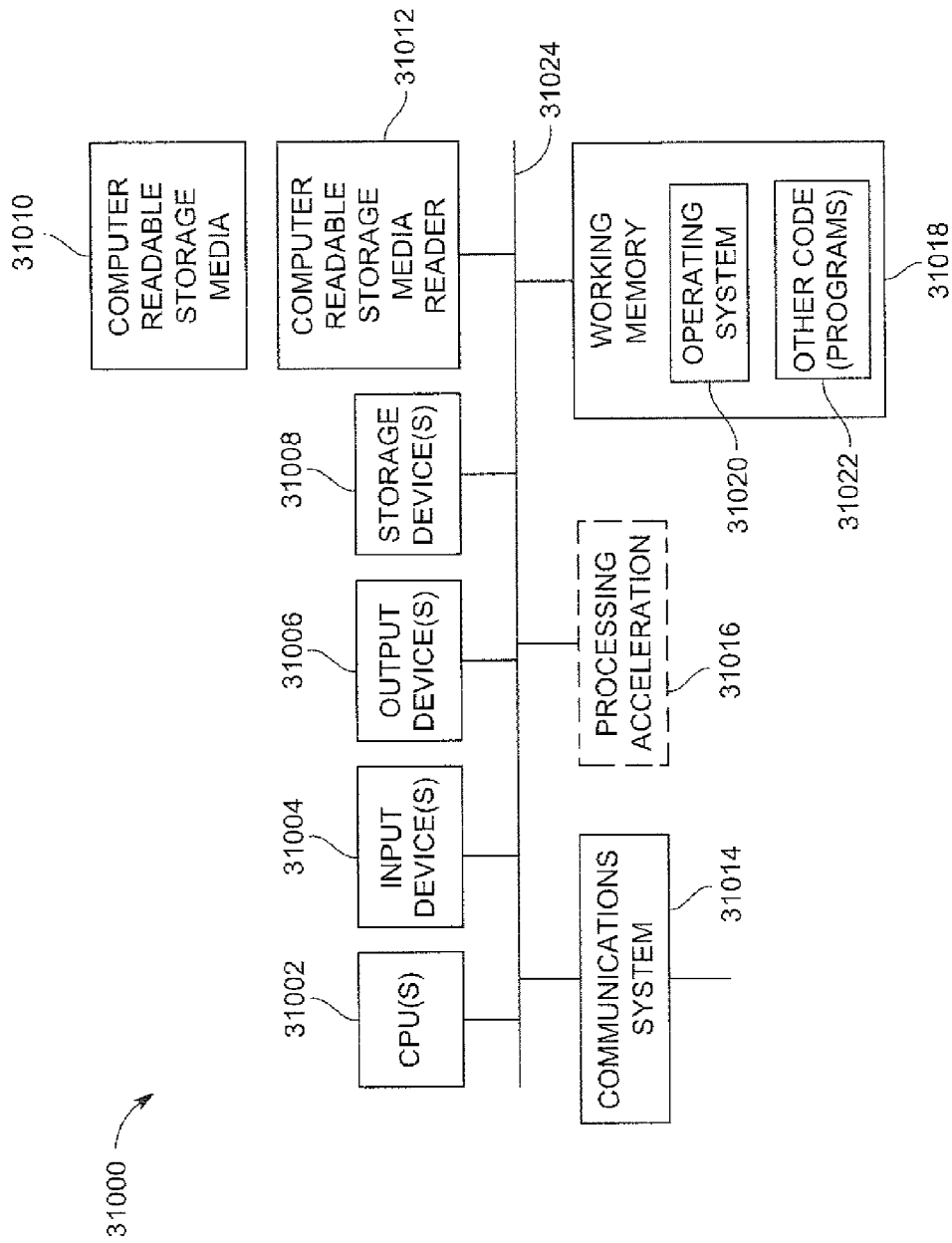

FIG. 31 is another illustration depicting an exemplary operating environment including a computer system with various elements as shown.

DETAILED DESCRIPTION OF THE INVENTION

The present invention is directed to a device the present invention is directed towards a system, method, and device for integrating distributed energy sources, energy storage, and balance of system components into a single device with systems and control for monitoring, measuring, and conserving power generated on the premise, the resale of power to a utility, power generated from distributed energy storage (e.g., batteries) and distributed energy sources (e.g., solar panels). Moreover, the device is minimally invasive, modular, and retains power-generating capacity, which is combined with load management and energy storage to provide energy at or near the point of consumption.

In some embodiments the disclosure herein can be further illustrated as a device that integrates necessary software, hardware and system components into a tamper resistant, utility grade, minimally invasive enclosure designed for outdoor applications, keeping unauthorized personnel from accessing the necessary components, and placed within the utility's service easement and set aside area of a residence or commercial building. The energy management cabinet contains essentially all necessary electrical components including charge controllers, inverters, relay circuitry, circuit breakers, energy storage modules (e.g., batteries), and balance of system circuitry for operating distributed energy sources (e.g., solar panels). From a communications and information management perspective, the device integrates the software, hardware and system components of a site distributed energy management system, a local gateway controller, an edge gateway controller, and an energy cloud controller, to implement methods of energy storage, management, and renewable energy generation relevant to the user site location in conjunction with a user partitioned virtual energy pool and other domain specific virtual energy pools, as well as one or more utility grids, and one or more third party independent service operators.

The present invention is described below with reference to block diagrams of systems, methods, apparatuses and computer program products according to embodiments of the invention. It will be understood that each block of the block diagrams and combinations of blocks in the block diagrams, respectively, can be implemented by means of analog or digital hardware and computer instructions or various physical and hardware, power electronics, control, and electrical apparatus components. One or more of the various components may include microprocessor embedded software, ASIC, mobile devices, or other means of implementing computer instructions to the components or machines. These computer instructions may be loaded onto a general purpose computer, special purpose computer, ASIC, or other programmable data processing apparatus to produce a machine, such that the instructions, which execute on the computer or other programmable data processing apparatus create means for implementing the functions/acts specified in the block or blocks.

The computer program instruction can be provided to a processor of a general purpose computer, special purpose computer, ASIC, or other programmable data processing apparatus, such that the instruction, which execute via the process of the computer or other programmable data processing apparatus, implements the function/acts specified in the block diagrams or operational block or blocks.

In some alternate implementations, the functions or acts noted in the blocks can occur out of the order noted in the operational illustration. For example, two blocks shown in succession can in fact be executed substantially concurrently or the blocks can sometimes be executed in the reverse order, depending upon the functionality or acts involved.

For the purpose of this disclosure the term "utility" should be referred to as an entity that provides or manages the supply of electrical power or gas or other energy related resources to one or more energy consumers. The term as used in the disclosure encompasses, without limitation, regional utility companies, regional transmission organizations, and any other load servicing entity or entities, which manage the electrical power grid or other similar energy related resource infrastructure or grid within a geographical area. Energy consumers may be an entity that uses electrical power for any purpose such as, without limitation, individual homeowners, commercial office buildings, or manufacturing operations.

For the purpose of this disclosure, the term "site integration system" (Sunverge Site Integration System or "SIS") should be understood to refer to one or more devices which measure and control the operation of power generating, power consuming, or power storage devices, or which measures and controls power supplied to one or more electrical circuits or other energy related network. Power generating devices may include, without limitation, renewable energy resources such as solar panels; household appliances such as refrigerators and stoves; climate control systems such as heating and air conditioning, and commercial or manufacturing devices, such as an automated assembly line. Power storage devices may include, without limitation, battery systems and capacitors which store and dispatch power.

The SIS may be capable of being connected to one or more networks, such as the Internet, a private WAN, AMI Network, GPRS, or a cellular communications network. Such network-connected SIS may be capable of transmitting measurements made by the SIS to remote locations (e.g., utility's). Network connected SIS devices may be further capable of receiving commands from remote locations, which control or modify the operation of the SIS.

For the purpose of this disclosure, and without limitation, the term "power storage and supply device" should be understood to refer to an SIS which is capable of managing substantially all electrical power generation, consumption, and storage by power generating, power consuming, and power storage devices within an area of control or individual site. The SIS may include a processor with associated communications, data storage and database facilities, one or more display device which may support a graphical user interface, as well as operating software and one or more database systems and applications software which support the services provided by the appliance. Area control of an SIS may be, without limitation a single home, or a group of homes, commercial building, or group of commercial buildings.

For the purpose of this disclosure, and without limitation, "module" is a software, hardware, or firmware (or combination thereof) system, process or functionality, or component thereof that performs or facilitates the processes, feature, and/or functions described herein the SIS (with or without human interaction or augmentation). A module can include sub-modules.

For the purpose of this disclosure, and without limitation, "utility grade enclosure" is designated as a cabinet hardware, or component thereof, which performs or facilitates the feature, and/or functions described herein the SIS (with or without human interaction or augmentation).

For the purpose of this disclosure, and without limitation, "certifications" are software, hardware, or firmware (or combination thereof) system, process or functionality, or component thereof, that performs or facilitates the processes, features, and/or functions described herein the SIS (with or without human interaction or augmentation) meeting UL 1742-2005; IEEE 1547; ETL Listed UL 1741; CSA C22.2 No. 107.1; FCC Class B; FCC Part 15 Class B; ANSI C37.90; CANBUS; DNP3; NIST approved; SE2 complaint. It is to be understood by one of ordinary skill that this is an exemplary list of standards that is current at the time of filing this application.

Reference will now be made in detail to illustrative embodiments of the present invention, examples of which are/may be shown in the accompanying drawings. These inventions may be embodied in different forms and should not be construed as limitations to the embodiments set forth herein; rather, these embodiments are provided so that the disclosure will satisfy applicable legal requirements, be thorough and complete, and will fully convey the scope of the invention to those skilled in the art.

In one embodiment of the present disclosure as shown in FIG. 1, a method of mode selection management in a distributed energy resource energy storage apparatus 01000 comprises steps for providing a one or more distributed energy resource energy storage apparatus each having a housing at each of the one or more site meters at a site location, each distributed energy resource energy storage apparatus further having one or more energy storage devices in an intelligent energy storage compartment, one or more inverters, one or more charge controllers, one or more gateway controllers, a common DC bus, and an integrated, engineered power and signal processing system 01002; automatically setting one or more distributed energy resource energy storage apparatus to charge one or more renewable energy storage devices 01004; providing one or more gateway controllers having one or more programs controlling one or more distributed energy resources associated with a user site 01006; automatically polling each of the one or more programs for a requested mode at a reporting interval 01008; assigning a ranking identifier to the requested mode of each of the one or more programs 01010; and determining a highest priority set of programs from among the requested mode of each of the one or more programs 01012.

In other aspects of the embodiment and continuing with FIG. 1, the method may further include steps for implementing one or more rule sets to further assign a second ranking identifier to each of the requested modes of the set of the highest priority programs 01014; monitoring a current state of storage and a current state of capacity reservations to identify whether a capacity reservation failure is present 01016; and selecting an active mode corresponding to the requested mode of the highest priority program 01018. In other various aspects of the embodiment in the paragraph above, further steps may include overriding the requested mode of the highest priority program with a capacity reservation failure mode whenever a capacity reservation failure is present 01020. In another configuration, the embodiment of previous paragraph may further include steps for reacting to demand conditions on a critical load panel and a user site demand requirement thereby reducing grid demand and avoiding grid power export from a user site location, 01022. The method from the previous paragraph may also include a configuration providing steps for calculating a site demand measurement, in a main load panel configuration, by identifying a minimum reading on the user site meter during a measurement period and may also in an another configuration also include steps for calculating a site demand measurement, in a main load panel configuration, by subtracting a maximum power dispatched from the grid side of a renewable energy site integration system from a minimum reading of the main load meter 01024.

In another configuration of mode selection methods and continuing with FIG. 1, steps may further include measuring a user site demand by reading one or more site loads 01026; selecting an active mode corresponding to the requested mode of the highest priority program 01028; implementing the active mode of the highest priority program to coordinate one or more energy resources in one or more local events 01030; housing an inverter in a common enclosure within the distributed energy resource energy storage apparatus 01032; reacting to demand conditions to match the site demand measurement with an inverter power output 01034; and controlling the inverter to dispatch the matching power output 01036. This configuration may further include steps for calculating one or more offset demand amounts associated with reducing one or more grid demand amounts 01038; calculating one or more offset demand amounts associated with avoiding one or more grid power export amounts 01040; and selecting one or more offset energy demand amounts via a consumer web portal 01042. In other certain aspects, the method may also further include steps for providing the one or more offset energy demand amounts to an Internet user interface including one or more application programming interfaces coupled to a database repository, a display, a utility enterprise database application 01044; communicating the one or more offset energy demand amounts with an energy area network that further connects the Internet user interface and utility enterprise database application to one or more user devices and appliances 01046; and aggregating one or more offset demand amounts of one or more distributed energy resource energy storage apparatus in a virtual energy pool 01048. Further steps may also include negotiating one or more programs of the one or more distributed energy resource energy storage apparatus to provide integrated demand management at one or more individual user sites 01050; and coordinating one or more energy resources with one or more local events 01052. Another configuration of the embodiment in this paragraph may include steps for providing one or more distributed energy resource energy storage apparatus each having a housing at each of the one or more site meters at a site location, each distributed energy resource energy storage apparatus further having one or more energy storage devices in an intelligent energy storage compartment, one or more inverters, one or more charge controllers, one or more gateway controllers, a common DC bus, and an integrated, engineered power and signal processing system 01054; automatically setting one or more distributed energy resource energy storage apparatus to charge one or more renewable energy storage devices 01056; providing one or more gateway controllers having one or more programs controlling one or more distributed energy resources associated with a user site 01058; automatically polling each of the one or more programs for a requested mode at a reporting interval 01060; assigning a ranking identifier to the requested mode of each of the one or more programs 01062; determining a highest priority set of programs from among the requested mode of each of the one or more program 01064; measuring a user site demand by reading one or more site loads 01066; selecting an active mode corresponding to the requested mode of the highest priority program 01068; implementing the active mode of the highest priority program to coordinate one or more energy resources in one or more local events 01070; housing an inverter in a common enclosure within the distributed energy resource energy storage apparatus 01072; reacting to demand conditions to match the site demand measurement with an inverter power output 01074; controlling the inverter to dispatch the matching power output 01076; calculating one or more offset demand amounts associated with reducing one or more grid demand amounts 01080; calculating one or more offset demand amounts associated with avoiding one or more grid power export amounts 01082; selecting one or more offset energy demand amounts via a consumer web portal; providing the one or more offset energy demand amounts to an Internet user interface including one or more application programming interfaces coupled to a database repository, a display, a utility enterprise database application 01084; communicating the one or more offset energy demand amounts with an energy area network that further connects the Internet user interface and utility enterprise database application to one or more user devices and appliances 01086; aggregating one or more offset demand amounts of one or more distributed energy resource energy storage apparatus in a virtual energy pool 01088; reading one or more site loads from one or more site meters wherein the site configuration is selected from one of a group consisting of a site with a main load panel only, a site with a main load panel plus a critical load panel, and a site with neither a load panel or a critical load panel 01090; and managing one or more offset demand amounts related to one or more distributed energy resources 01092.

In another configuration of the method in the previous paragraph and continuing with FIG. 1, steps may further include one or more distributed energy resources of the one or more distributed energy resource energy storage apparatus wherein the one or more distributed energy resources are one or more user loads that are controlled by one or more sets of instructions from a remote central server 01094; selecting one or more executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices 01096; receiving one or more command and control data command sets via one or more command channels from the remote central server or a third party external source API, wherein the one or more command sets control modes, actions, and device state in the one or more physical devices, to convert one or more formats and one or more protocols to one or more virtualized commands in a common command format 01098; utilizing the one or more virtualized commands by one or more executor modules running at a command virtualization layer to cause the execution of one or more virtual devices at the device virtualization layer to drive a corresponding physical device to a desired state 01100; and executing one or more virtual devices at the device virtualization layer with one or more other virtual devices in a hierarchical relationship 01102. This method in another configuration may also include one or more user loads wherein the one or more user loads are controlled by one or more sets of instructions from a distributed network database 01104. In another configuration, the methods in this paragraph may further include steps for providing one or more CANBUS protocols to allow one or more components to communicate with each other without one or more host computers 01106. Other configurations may alternately include steps for providing at least one NIST approved CIM model 01108. Another configuration includes the methods of this paragraph with steps for alternately communicating via at least one SE2 compliant platform 01110.

In another embodiment as shown in FIGS. 2A-2B, methods for offset demand monitoring are provided 02000, including, as shown in FIG. 2A, steps for providing one or more communications protocols to allow one or more components to communicate with each other without one or more host computers 02002 wherein in some embodiments the communications protocol is a CANBUS protocol 02003; implementing one or more steps for one or more mode selection management methods via a gateway controller computer system 02004; measuring a user site demand by reading one or more site loads; selecting an active mode corresponding to the requested mode of the highest priority program 02110; implementing the active mode of the highest priority program to coordinate one or more energy resources in one or more local events; housing an inverter in a common enclosure within the distributed energy resource energy storage apparatus; reacting to demand conditions to match the site demand measurement with an inverter power output 02112; controlling the inverter to dispatch the matching power output 02114; calculating one or more offset demand amounts associated with reducing one or more grid demand amounts 02116; calculating one or more offset demand amounts associated with avoiding one or more grid power export amounts 02118; selecting one or more offset energy demand amounts 02120; communicating with one or more network connected DER-ES apparatus 02122; creating one or more forward energy resource demand reservations for one or more of the DER-ES apparatus 02124; retrieving one or more predictive data elements from the energy cloud software platform or an external third party provider via an external API 02126; reading one or more site loads from one or more site meters wherein the site configuration is selected from one of a group consisting of a site with a main load panel only, a site with a main load panel plus a critical load panel, and a site with neither a load panel or a critical load panel 02128; managing one or more offset demand amounts related to one or more distributed energy resources 02130; charging one or more storage devices in a storage appliance from a renewable energy source charge controller, wherein the storage appliance and charge controller are integral to the distributed energy resource energy storage apparatus, and wherein charging the one or more storage devices continues until each of the one or more storage devices are fully charged, unless an amount of renewable energy power generated at the user site location is less than the required amount to charge the one or more storage devices, at which time the one or more storage devices receive power from the grid until fully charged 02006; and continuing on to FIG. 2B, steps for measuring demand on one or more load panels to determine a DC bus support load power requirement and an AC inverter grid side power requirement, wherein the difference in power requirements determines an amount of offset energy demand, and wherein limiting the export of renewable energy generation to the grid by measuring and storing renewable energy power generated in the DER-ES apparatus 02008; dispatching the renewable energy power in excess of site demand when the site demand measurement is more than or equal to a desired change amount 02010; and calling an internal InvertToAC function in a gateway controller associated with the DER-ES apparatus to increment power output of an inverter housed within the DER-ES apparatus 02012. The previous configuration may also include steps for controlling AC power output of the DER-ES apparatus by a minimum change amount to increase a DC to AC inverter lifespan 02014. The increment power output method described above may further include steps for dispatching the renewable energy power in excess of site demand when the site demand measurement is more than or equal to twice a minimum change amount 02016.

In other various aspects of the methods in the previous paragraph and continuing with FIGS. 2A-2B, steps may be further provided for calculating an offset demand amount value by selecting a step function above the measured load value of a load demand curve to determine an offset demand output wattage for the distributed energy resource energy storage apparatus 02018. In another aspect, steps are provided for calculating an offset demand amount value by selecting a step function below the measured load value of a load demand curve to determine an offset demand output wattage for the distributed energy resource energy storage apparatus 02020. Another variation includes steps for calculating an offset demand amount value by monitoring the measured load values in real time to determine a load demand curve 02022; and selecting an offset demand output wattage for the distributed energy resource energy storage apparatus 02024. Another aspect of the methods above include calculating an offset demand amount value by selecting a step function above the measured load value of a load demand curve and adding a translation delta to shift the entire step function upward from the load demand curve values in order to determine an offset demand output wattage for the distributed energy resource storage apparatus 02026. In other aspects, steps include calculating an offset demand amount value by selecting a step function below the measured load value of a load demand curve and adding a translation delta to shift the entire step function downward from the load demand curve values in order to determine an offset demand output wattage for the distributed energy resource energy storage apparatus 02028. The previous steps may also include instructing an inverter to invert an amount of output wattage equivalent to the offset demand amount 02030. In other various aspects, steps include providing one or more CANBUS protocols to allow one or more components to communicate with each other without one or more host computers 02032. In another configuration, communication protocols may be provided wherein the protocols to allow one or more components to communicate with each other without one or more host computers is selected from a group consisting of PLC and ModBus 02034. The methods above may further include steps for establishing that a critical load panel is present at the site 02036; measuring an energy demand and taking a site demand measurement where the site meter is placed, wherein a renewable energy module in the distributed energy resource energy storage apparatus converts an amount of DC power equal to demand on the critical load panel for the site as true 0 AC 02038; starting offset demand monitoring with true 0 AC, wherein the critical load panel is supported by DC power in the distributed energy resource energy storage apparatus 02040; measuring demand for approximately 30 seconds to determine if power is being sent to the grid, if so the distributed energy resource energy storage apparatus returns to true 0 AC 02042; determining whether the distributed energy resource energy storage apparatus is sending to the grid, power being consumed at the site, or is equal to demand at the site meter 02044; and determining site demand measurement by taking minimum reading on meter during a measurement period to determine offset demand for the site 02046. The prior configuration may further include steps for implementing one or more steps for demand management modes selection; providing the distributed energy resource energy storage apparatus at a site meter at a site; and configuring a target offset demand mode via a user preference 02048. In yet another configuration, this variation may further include additional steps for implementing one or more steps for demand management modes selection 02050; providing the distributed energy resource energy storage apparatus at a site meter at a site 02052; and configuring a target offset demand mode via a user preference configuring the target offset demand mode in the distributed energy resource energy storage apparatus via a virtual network 02054; and coupling the target offset demand mode in the distributed energy resource energy storage apparatus via a user interface to the virtual network 02056. In other various aspects, the offset demand monitoring methods may further include steps providing a plurality of renewable energy site integration systems that include one or more DER-ES apparatus at a plurality of site meters at a site location; providing a main load meter edge device virtually networked to each of the plurality of distributed energy resource energy storage apparatus at the one or more site meters, wherein the edge device can be located at the site location or at another location 02058; establishing that a critical load panel is present at the site location 02060; measuring an energy demand and taking one or more site demand measurements where the one or more site meters is placed, wherein the one or more distributed energy resource energy storage apparatus each convert DC power equal to a site demand measurement on the critical load panel for the site location as true 0 02062; starting offset demand monitoring with true 0, wherein the critical load panel is supported by DC power in each of the one or distributed energy resource energy storage apparatus 02064; and taking the site demand measurement via each of the one or more distributed energy resource energy storage apparatus at the one or more site meters, wherein taking the site demand measurement comprises subtracting the maximum power sent out to a grid side of the one or more distributed energy resource energy storage apparatus from the reading of the main load meter edge device to provide a "worst case" site demand measurement for the plurality of site meters 02066. In another aspect, the method may further include steps for inverting to AC at 0 watts if the site demand measurement on any of the one or more site meters is less than zero 02068; and waiting five seconds and start measuring the site demand measurement at the one or more site meters again 02070. Yet another aspect includes steps for taking no action if, the site demand measurement is equal to or more than 0, but less than twice a minimum change 02072; and taking the site demand measurement via the one or more distributed energy resource energy storage apparatus at the one or more site meters 02074. Another configuration includes further steps for inverting to AC with minimum change more watts than last site measurement when the site demand measurement is more than twice the minimum change 02076. Another variation alternately includes steps for configuring the offset demand via the virtual network, and coupling a main load meter edge device via a user interface coupled to the virtual network 02078.

In other certain aspects of the embodiments for offset demand monitoring in a DER-ES apparatus further includes steps for providing one or more distributed energy resource energy storage apparatus at one or more site meters at a site location 02080.

Another variation and continuing with FIGS. 2A-2B includes further steps for providing a main load meter edge device virtually networked to each of the one or more distributed energy resource energy storage apparatus at the one or more site meters, wherein the edge device can be located at the site location or at another location 02082.

Other variations and continuing with FIGS. 2A-2B includes further steps for measuring an energy demand and taking one or more site demand measurements where the one or more site meters are placed; and taking the site demand measurement via the one or more distributed energy resource energy storage apparatus at the one or more site meters, wherein taking the site demand measurement comprises subtracting the maximum power sent out to a grid side of the one or more distributed energy resource energy storage apparatus from the reading of the main load meter edge device to provide a "worst case" site demand measurement for the one or more site meters 02084. In other various aspects, steps further include inverting to AC at 0 watts if the site demand measurement on any of the one or more site meters is less than zero 02086; and waiting five seconds and start measuring the site demand measurement at the one or more site meters again 02088. Another method further include steps for taking no action if, the site demand measurement is equal to or more than 0, but less than twice a minimum change 02090; and taking the site demand measurement via the one or more distributed energy resource energy storage apparatus at the one or more site meters 02092. Another arrangement further includes steps for inverting to AC with minimum change more watts than last site measurement when the site demand measurement is more than twice the minimum change 02094.

In another configuration of offset demand monitoring methods in one or more DER-ES apparatus and continuing with FIGS. 2A-2B comprises further steps for linking one or more DNP3 platforms to facilitate communication between one or more data processing gateways and one or more components 02096. In other various aspects, further steps include reducing aggregate demand on one or more network connected distributed energy resource energy storage apparatus by calling one or more offset demand modes associated with each one of the one or more network connected apparatus 02098; communicating with one or more network connected distributed energy resource energy storage apparatus via an energy cloud software platform; creating one or more forward energy resource demand reservations for one or more of the distributed energy resource energy storage apparatus 02100; and retrieving one or more forecasting data elements from the energy cloud software platform or an external third party provider via an external API 02102. In an alternate arrangement, the prior method may further include steps for implementing a load shaping service model to reduce aggregate demand of one or more network connected apparatus to monitor offset demand on an aggregate basis 02104. Another configuration further includes additional steps from the prior method for reducing demand on an aggregated level of one or more network connected distributed energy resource energy storage apparatus 02106; and providing one or more gateway controllers in communication with an energy cloud controller linked to an electric vehicle energy control center (EV/ECC) linked to one or more electric vehicle resources and a distributed energy management system (DEMS) lined to one or more distributed energy resources and one or more energy storage objects 02108.

In another embodiment as shown in FIG. 3, a method of capacity reservation monitoring in a distributed energy resource energy storage apparatus 03000, includes steps for providing one or more distributed energy resource energy storage apparatus each having a housing at each of the one or more site meters at a site location, each distributed energy resource energy storage apparatus each further having one or more energy storage devices in an intelligent energy storage compartment, one or more inverters, one or more charge controllers, one or more gateway controllers, a common DC bus, and an integrated, engineered power and signal processing system 03002; automatically setting one or more distributed energy resource energy storage apparatus to charge one or more renewable energy storage devices 03004; monitoring a current state of storage and a current state of capacity reservations to identify whether a capacity reservation failure is present in the one or more renewable energy storage devices 03006; and overriding all programs and/or modes when capacity reservation failure is present in the one or more renewable energy storage devices 03008. In certain aspects, the method may further include steps for charging at least one of the one or more renewable energy storage devices from a renewable energy site integration system solar charge controller 03010. In another configuration, the method of capacity reservation monitoring may alternately include further steps for charging at least one of the one or more renewable energy storage devices from the grid 03012. In another configuration, the method may variously include steps for charging the one or more renewable energy storage devices from a renewable energy site integration system solar charge controller 03014; and minimally charging the one or more renewable energy storage devices from the grid, wherein charging the one or more renewable energy storage devices from the grid is only activated when attempts to charge the one or more renewable energy storage devices from a renewable energy site integration system solar charge controller fail, after a minimum time period the renewable energy site integration system reverts to charging the one or more renewable energy storage devices from the renewable energy site integration system solar charge controller 03016.

In an embodiment as shown in various aspects in FIGS. 4A-4I for providing virtual power plant (VPP) orchestration in a network of one or more distributed energy resource energy storage apparatus 04000, methods include steps for orchestrating one or more distributed energy resources and one or more energy storage objects each associated with an integrated device apparatus that together behave as a single energy entity when programmed and controlled by one or more common elements of one or more energy management software applications 04002. In certain aspects, the method further comprises steps for coordinating one or more energy resource local events each associated with a distributed energy resource energy storage apparatus (DER-ES) such that the one or more energy resource local events, when controlled by a common, remote cloud-based energy management software to program one or more processors to send instructions to a gateway controller in the DER-ES apparatus to perform virtual power plant orchestration steps that the one or more energy resource local events together, behave as a single energy entity, wherein each of the DER-ES apparatus encloses a system comprising an inverter-controller, storage appliance, and gateway controller that functions as a site integration system 04004. In various aspects, the method may include a network of one or more distributed energy resource energy storage apparatus wherein each of the integrated DER-ES apparatus is provided in an enclosure having a compact footprint 04006. In other certain respects, the one or more DER-ES apparatus are each a site integration system (SIS) 04008. In other aspects, the method may further include steps for coordinating one or more energy resource local events wherein a portion of the energy resource local events are associated with an electric vehicle energy resource 04010. In other aspects, steps for forward scheduling of one or more energy resource local events may be provided 04012. In other certain aspects, the one or more steps for providing one or more VPP orchestration methods includes at least one step for providing a load shaping service 04014. In other configurations, the load shaping service steps corresponds to one or more steps for providing event awareness services in an energy resources cloud 04016. In a further configuration, steps are provided wherein providing the virtual power plant orchestration includes iterative scheduling of one or more distributed demand sources that correspond to one or more energy services in an energy resources cloud 04018. In another configuration, the method further includes steps for providing one or more DER-ES collectively configured to behave as a single entity and as a micro-grid 04094. In other configurations, the method of providing one or more VPP orchestration in a network of one or more DER-ES apparatus behaves as a single entity but not as a micro-grid 04095. In other certain aspects, the VPP orchestration method behaves as a remotely controlled micro-grid by an energy cloud software application to form a remote community coordination model 04096. In other various aspects, the method further includes configurations for independent controlled remote community coordination model by devices dispatching power when the grid is down 04098.

In other variations of the method and continuing with FIGS. 4A-4I, steps are provided for prioritizing one or more programs of one or more DER-ES apparatus via a virtual energy pool in accordance to one or more schedules associated with the common, remote cloud-based energy management software; receiving signals from each one of the one or more programs to determine an active mode for each of the one or more programs 04020; and providing one or more gateway edge controllers in communication with the virtual energy pool and linked to an electric vehicle energy control center and a distributed energy management system 04022. In another aspect, the prior method one or more programs each receives a pricing signal 04024. Alternately, in the prior method, at least one of the one or more programs may receive a cost signal to identify one or more incremental storage cycles 04026. In other applications, each of the one or more programs of the method above may receive a cost signal to identify one or more incremental storage cycles 04028. In another arrangement, the one or more cost signals are provided wherein the cost signals to identify one or more incremental storage cycles are used to estimate cycle life degradation of one or more energy resources 04030. In yet another arrangement, the cost signals are provided wherein the cost signal estimates cycle life degradation of one or more energy resources to calculate a marginal cost of the one or more energy resources of the virtual energy pool 04032. A further variation of the method includes further steps for receiving one or more load shaping schedule requests 04034; accepting one or more load shaping schedule requests that each coordinate one or more energy resource local events each associated with a distributed energy resource energy storage apparatus (DER-ES) such that the one or more load shaping schedule requests coordinating the one or more energy resource local events, when controlled by the common, remote cloud-based energy management software, behave as a single energy entity in accordance to one or more orchestrated schedules associated with the common, remote cloud-based energy management software 04036; processing one or more accepted load shaping schedule requests 04038; rejecting one or more load shaping schedule requests 04040; modifying one or more rejected load shaping schedules; accepting one or more emergency load control requests 04042; returning one or more modified schedules 04044; executing one or more of the one or more modified schedules that are also accepted in an acceptance update identifier 04046; and associating one or more renewable energy resources with one or more programs to one or more modified load shaping schedules in an energy cloud software platform 04048. Another arrangement further comprises steps for providing an energy cloud controller to receive one or more load shaping request calls 04050; linking one or more networked, site integration systems capable of local storage of locally generated renewable energy to one or more requested schedules comprising any mix of mandatory and limit load shaping activities 04052; identifying the one or more requested schedules; creating a response schedule upon comparison to the request schedule 04054; storing the one or more response schedules for scheduled execution in a data repository 04056; sending one or more returned response schedules 04058; creating a returned response schedule acceptance status identifier 04060; and updating an execution response schedule upon acceptance of the one or more returned response schedules 04062. Yet another arrangement of the VPP orchestration methods further includes steps for monitoring a current stage of storage and a current state of capacity reservations to identify whether to identify whether a capacity reservation failure is present 04064; and updating the execution response schedule before sending the one or more returned response schedules 04066. In other configurations, the method further comprises steps for immediately overriding a current schedule in response to an on-demand event 04068; accepting one or more emergency load requests 04070; determining whether the load shaping service can execute the one or more emergency load requests 04072; modifying a load shaping service schedule if the current schedule cannot execute the requests 04074; and associating one or more renewable energy resources with one or more programs to one or more modified load shaping schedules in an energy cloud software platform 04076. Another configuration includes further steps for retrieving one or more load requests 04078; comparing the one or more load requests with one or more current load shaping service schedules 04080; creating a new schedule that takes into account the requested schedule, capabilities of the load shaping service, current capacity of the load shaping service, and other scheduled requests on the load shaping service 04082; setting the schedule for the appropriate time frame to the new schedule 04084; and returning a new schedule, although the new schedule may not match the requested schedule in all ways, wherein if the load shaping service cannot meet the entire schedule's requirements, the load shaping schedule will return a schedule that is a best fit, using the specified best fit algorithm indicated using the request 04086; requesting a status confirmation of the returned new schedule that identifies whether the returned new schedule is accepted 04088; receiving an alternative schedule request if the previously returned new schedule is rejected and creating an iterative new schedule based on the alternative schedule request 04090; repeating the alternative schedule request and iterative new schedule process until a match exists within a defined differential between the alternative schedule request and the iterative new schedule process 04092.

In another variation of the VPP orchestration method embodiment and as shown in FIGS. 5A and 5B, the one or more energy resource local events are each associated with a distributed energy resource energy storage apparatus (DER-ES) such that the one or more energy resource local events, when controlled by a common cloud-based energy management software, behave as a single energy entity, wherein each of the DER-ES apparatus encloses at least one each of each of the following, including but not limited to an inverter-controller, storage appliance, and gateway controller, that together function as a site integration system (SIS), and are collectively configured as a micro-grid 05002, as shown in FIG. 5C. In another variation of the micro-grid arrangement continuing with FIG. 5C, the micro-grid 05002 is remotely controlled by an energy cloud software application that does not require a central server 05008, to form a remote community coordination model 05004. In another micro-grid method variation, the remote community coordination model 05004 can be independently controlled by one or more devices 05010 dispatching power when the grid is down so that the micro-grid remote community coordination model allows the micro-grid related one or more energy resource to behave as a single entity independently from its related utility provider 05006. In other aspects, the common cloud-based energy management software may include a central server 05012 remote from the micro-grid remote community coordination model 05004 and coordinate with an energy cloud controller acting as a master controller 05014 to direct the micro-grid remote community coordination model 05004 to execute one or more steps for virtual power plant orchestration and governing of one or more energy management resources to behave as a single entity while the grid is down.

In an embodiment as shown in FIGS. 6A-6C, a solar integrated energy management system (SI-EMS) 06000 executes one or more of the computer implemented methods for monitoring energy described herein including computer-usable readable storage medium having computer-readable program code embodied therein for causing a computer system to perform methods for one or more programs of one or more networked distributed energy resource energy storage apparatus 06001, as shown in FIG. 6A, that each function as a renewable energy site integration system accessed via a virtual energy pool 06002, comprising hardware and software components and one or more data repositories, databases and dashboard indicators 06005, FIGS. 6A and 6C, including one or more processors associated with one or more networked distributed energy resource energy storage (DER-ES) apparatus 06001, each having a common enclosure housing at least one power storage supply device coupled to at least one isolation breaker and integrated with one or more renewable energy generation sources, one or more inverters, one or more charge controllers, one or more energy storage appliances, and one or more gateway controllers 06004; the virtual energy pool 06002 in remote communication with the one or more gateway controllers of the one or more DER-ES apparatus 06001; one or more software programs associated with an energy cloud software platform and the one or more processors associated with the one or more networked DER-ES apparatus and the virtual energy pool to monitor and manage one or more distributed energy resources 06008; one or more gateway controllers in communication with the energy cloud software platform and the virtual energy pool to invoke one or more programs and select one or more modes for each of the one or more programs of each of the one or more DER-ES apparatus 06010 as further shown in FIG. 6B; memory associated with the one or more gateway controllers to implement monitoring of one or more network resource data objects utilizing computer-usable readable storage medium having non-transient computer-readable program code embodied therein for causing a computer system to determine an active mode for each of the one or more software programs and method steps to prioritize the one or more software programs for programming and controlling one or more distributed energy resources associated with a user site 06012; a requested mode dialog box with one or more objects to indicate results for each one of one or more programs that are each automatically polled for a requested mode at a selected reporting interval and an assigned ranking identifier 06014; an execution module to calculate and display the priority of each requested mode of each set of programs and one or more objects to select one or more rule sets and a second ranking identifier 06016; a dashboard indicator coupling one or more objects to monitor and display a current state of storage, a current state of capacity reservations, and a capacity reservation failure status 06018; an active mode module associated with one or more objects indicating the requested mode of the highest priority program; one or more processors of the one or more gateway controllers sending one or more signals to the one or more DER-ES apparatus to allow at least one inverter, charger, and energy storage device to react to demand conditions on a critical load panel and a user site demand requirement thereby reducing grid demand and avoiding grid power export from a user site location, 06020 as shown in FIG. 6C. Continuing now with FIG. 6C, a site demand measurement module that calculates and displays a site demand measure by subtracting a maximum power dispatched from the grid side of a DER-ES apparatus from a minimum reading of one or more load meters 06022; a user site demand direct measurement module resulting from directly measuring and displaying one or more actual, present site loads 06024; an active mode module to display the requested mode of the highest priority program 06026; an execution engine to implement the active mode of the highest priority program to coordinate one or more energy resources in one or more local events 06028; a common enclosure associated with the distributed energy resource energy storage apparatus to house one or more inverters, energy storage devices, gateway controllers, and chargers, wherein the one or more inverters react to demand conditions to match the site demand measurement with each of the one or more inverters power output, and control the one or more inverters to dispatch the matching power output; an offset demand module to calculate one or more offset demand amounts associated with reducing one or more grid demand amounts and avoiding one or more grid power export amounts 06030; a consumer web portal for selecting one or more offset energy demand amounts 06032; one or more analog to digital interfaces to link one or more sets of instructions with one or more components of each of the one or more DER-ES apparatus 06034; and one or more database application software programs linked to one or more renewable energy resources so that each one of the one or more DER-ES apparatus can monitor and control an associated user site power system 06036. In certain aspects, the system may further include one or more electric vehicle energy control centers and one or more distributed energy management systems coupled to one or more energy controllers 06038. In another variation, the system one or more software programs are associated with an energy cloud software platform and the one or more processors associated with the one or more networked DER-ES apparatus and the virtual energy pool, wherein the SI-EMS monitors and manages one or more distributed energy resources, one or more electric vehicle energy resources and makes one or more static energy reservations 06040. In further configurations, the SI-EMS further comprises one or more renewable energy sources coupled to a user site power system; one or more user site power systems coupled to a utility power grid to distribute power 06042; a user power monitoring control management console wherein the solar integrated energy management system monitors user site user power consumption and demand with the user power monitoring control management console and stores excess alternate energy source power created at a local user generation site associated with each one of the one or more networked distributed energy resource energy storage apparatus, wherein the monitoring control management console sends instructions to each one of the one or more DER-ES apparatus via communication with the remote virtual energy pool and stores the excess alternate energy generated power into one or more energy storage modules in communication with the virtual energy pool to create a virtual energy pool of excess alternate energy generated power available to a common domain 06044; one or more selected executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices 06046; one or more command and control data command sets received via one or more command channels from the remote central server or a third party external source API, wherein the one or more command sets control modes, actions, and device state in the one or more physical devices, to convert one or more formats and one or more protocols to one or more virtualized commands in a common command format; one or more virtualized commands utilized by one or more executor modules running at a command virtualization layer to cause the execution of one or more virtual devices at the device virtualization layer to drive a corresponding physical device to a desired state 06048; and one or more virtual devices executed at the device virtualization layer with one or more other virtual devices in a hierarchical relationship 06050. In another configuration, the SI-EMS virtual excess alternate energy source of power is the difference between power provided by an alternate energy source prior generated power amount available in the virtual energy pool, a user site offset demand amount, a user site renewable energy generation amount, a consumer's energy power consumption loads, and a user site storage capacity 06052.

In yet another arrangement, the SI-EMS further comprises system components, not shown but relating to the configurations shown in FIGS. 6A-6C, including a consumer web portal to view data related to one or more user sites associated with each one of the one or more networked DER-ES apparatus 06054; an Internet user interface 06056 including one or more application programming interfaces to link to one or more programs associated with one or more users of the one or more grid site management systems and one or more user site management system associated with the one or more gateway controllers; an advanced meter infrastructure (AMI) 06058 coupled to said internet user interface 06056 and at least one utility power grid 06060; an energy area network (EAN) 06062 coupled to one or more local data processing gateways to monitor and control one or more distributed energy resources or one or more electric vehicle resources 06064; at least one utility power grid to dispatch power to the one or more user sites associated with each of the one or more DER-ES apparatus 06066; one or more independent service operators to dispatch requested power to the one or more user sites associated with each of the one or more DER-ES apparatus upon at least one user site invoking one or more user defined monitoring or one or more user defined control methods 06068; and a utility enterprise relational database application in communication with one or more consumer web portals, one or more Internet user interfaces, one or more advanced meter infrastructures associated with at least one grid, and one or more energy area networks 06070.

In another embodiment as shown in FIGS. 7A-7B, an energy management system for governing energy management resources 07000, 07005, comprises a one or more distributed energy resource energy storage apparatus 07002 which in some aspects, includes a tamper resistant enclosure housing 07002b, and in other aspects includes a sloped top panel wherein the rear edge height is greater than the front edge height 07002c; one or more power storage and energy generation storage devices for dispatching and storing locally generated energy wherein one or more termination points associated with the one or more energy storage modules such that the one or more termination points may facilitate solar array energy input and electric utility interconnection, in one or more intelligent storage appliances for storing and dispatching locally generated renewable energy in the housing 07004; one or more alternative energy generation sources coupled to a user power system having a DC bus, at least one inverter charger controller, one or more intelligent battery charge controllers providing multi-point solar panel or other renewable energy source tracking ability coupled to the one or more energy storage modules, an isolation switch panel board to protect the power electronics components from a fault or failure of any one of the other power electronics components, wherein the user power system is further coupled to a utility power grid to distribute the required consumer power needed, one or more gateway controllers having one or more processors for performing localized and remote control, storage and generation energy management wherein a portion of the one or more processors provide instructions to one or more computer programs having one or more networked distributed energy management systems to control one or more user site loads and to orchestrate one or more distributed resources to simultaneously negotiate user site and grid requirements 07006; one or more user interfaces to provide a local user grid access interface and a consumer portal, wherein the local user grid access interface provides access to a best mix selection from demand and supply data simultaneously communicated by the user site and grid requirements of the one or more distributed resources; a network of one or more aggregated apparatus acting as a fleet to behave as a single entity to automatically provide orchestrated plans in response to one or more commands 07008; one or more virtual power plant software modules to provide a best mix selection from demand and supply data simultaneously communicated by the user site and grid requirements of the one or more distributed resources, and one or more user interfaces to provide a local user grid access interface and a consumer portal, wherein the local user grid access interface provides access to a best mix selection from demand and supply data simultaneously communicated by the user site and grid requirements of the one or more distributed resources 07010. In certain aspects, alternative arrangements of the DER-ES apparatus are contemplated as power electronic, inverter-controller, and energy storage components become smaller and more powerful. In other aspects, the DER-ES apparatus housing may become substantially smaller than current sizes of designs. In other various aspects, the DER-ES apparatus may be configured as a blade or rack mount device in future designs as components become smaller and more powerful. In certain aspects, the blade or rack mount design is coupled to a DC bus; in various aspects, other methods of coupling the DER-ES apparatus may be deployed depending on the latest power electronics designs.

In further aspects as shown in FIGS. 7A-7B, the energy management system for governing energy management resources further comprises an energy cloud software platform communicating with the one or more intelligent edge gateway controllers to send and receive the user site and grid requirements of the one or more distributed resources; one or more predictive analytic software modules to improve performance of the one or more distributed resources 07012; a consumer web portal to view data related to one or more user sites associated with each one of the one or more networked DER-ES apparatus 07014; an Internet user interface including one or more application programming interfaces to link to one or more programs associated with one or more users of the one or more grid site management systems and one or more user site management system associated with the one or more gateway controllers 07016; and a network of one or more aggregated apparatus acting as a fleet wherein the network of one or more aggregated apparatus automatically provide orchestrated voltage control on a specified feeder or a specified circuit in response to one or more commands 07018.

In further aspects and continuing with FIG. 7, the energy management system for governing energy management resources further comprises one or more removable energy storage components coupled to a shunt switch for physically isolating remaining energy storage modules and further coupled to an isolation switch panel assembly via at least one unique safety connector mechanism and an electrical bus connecting the energy storage module terminals to a main bus which connects to a charge controller and one or more inverters through a unitized system in a common enclosure 07020; and one or more software module sending commands to one or more devices of one or more DER-ES/SIS apparatus that are co-located and directly control the power produced of the one or more renewable energy generating sources wherein the one or more site integration system apparatus time-shifts energy generated from one or more renewable energy generating sources and from the grid to maximize peak load reduction on a specified network location in accordance to one or more plans and the related commands from a remote central server 07022.

In further aspects and continuing with FIG. 7, the energy management system for governing energy management resources further comprises a utility enterprise relational database application in communication with one or more consumer web portals, one or more Internet user interfaces, one or more advanced meter infrastructures associated with at least one grid, and one or more energy area networks 07024; one or more networked distributed energy resource energy storage apparatus accessed via a virtual energy pool, receiving signals for one or more orchestration plans from each one of one or more programs to determine an active mode for each of the one or more programs 07026; and one or more gateway controllers in communication with the virtual energy pool and linked to an electric vehicle energy control center and a distributed energy management telemetry system embodying one or more sets of rules and one or more sets of constraints to provide a predictive analytics module and an orchestration module wherein said one or more sets of rules and said one or more sets of constraints allow a user to implement multiple sets of rules and constraints which govern various resources selected from the group consisting of power generation, power storage, power use, pricing signals, cost signals to identify one or more incremental storage cycles, marginal cost management of cycle life degradation, virtual power plant orchestration, iterative schedule development, forward event scheduling, event awareness, and load control 07028.

In further aspects and continuing with FIG. 7, the energy management system for governing energy management resources further comprises one or more sets of rules and said one or more sets of constraints that allow a user to implement one or more algorithms which dictate that if a price of power from a utility power grid reaches one or more price points then a pre-defined percentage of a maximum capacity of stored energy in one or more energy storage modules may be discharged in a single cycle, said pre-defined percentage of a maximum capacity corresponding to the one or more price points 07030. In another configuration, the energy management system for governing energy management resources includes a distributed energy management system comprising one or more processors to further execute a computer implemented method for governing energy management resources 07032; a calculation engine that calculates a marginal cost management of cycle life degradation, a comparator engine to compare a price of power from a utility power grid to one or more price points 07034; and a rules engine to execute one or more rule sets corresponding to the one or more price points 07036. In another configuration, the energy management system for governing energy management resources includes an advanced meter infrastructure (AMI) coupled to said internet user interface and at least one utility power grid 07038; one or more user site energy area networks (EAN) that are coupled to one or more local data processing gateways to monitor and control one or more distributed energy resources 07040; at least one utility power grid to dispatch power to the one or more user sites associated with each of the one or more DER-ES apparatus 07042; and one or more independent service operators to dispatch requested power to the one or more user sites associated with each of the one or more DER-ES apparatus upon at least one user site invoking one or more user defined monitoring or one or more user defined control methods 07044.

In an embodiment as shown in FIGS. 8A-8C, a distributed energy resource energy storage (DER-ES) apparatus for energy management services 08000, as shown in FIGS. 8A and 8B, comprises a distributed energy resource energy storage tamper resistant enclosure 08001 housing having at least one security feature, and an autonomous sensing module 08002; one or more power storage and energy generation storage devices for dispatching and storing locally generated energy wherein one or more termination points associated with the one or more energy storage modules such that the one or more termination points may facilitate solar array energy input and electric utility interconnection, in one or more intelligent storage appliances for storing and dispatching locally generated renewable energy in the housing 08004; one or more alternative energy generation sources coupled to a user power system having a DC bus 08006. Continuing now with FIG. 8C, an inverter charger controller 08008, one or more intelligent battery charge controllers providing multi-point solar panel tracking ability coupled to the one or more energy storage modules 08010, an isolation switch panel board 08012 to protect the power electronics components from a fault or failure of any one of the other power electronics components, wherein the user power system is further coupled to a utility power grid to distribute the required consumer power needed 08014, one or more networked distributed energy management systems coupled to the DER-ES apparatus to control one or more user site loads and to manage one or more distributed resources to simultaneously monitor user site and grid requirements 08016, one or more intelligent gateway controllers simultaneously managing the user site and grid requirements of the one or more distributed resources, wherein the one or more gateway controllers having one or more processors for performing localized and remote control 08018, storage and generation energy management 08020 wherein a portion of the one or more processors provide instructions to one or more computer programs having one or more networked distributed energy management systems to control one or more user site loads and to monitor one or more distributed resources to simultaneously negotiate user site and grid requirements wherein each of the DER-ES apparatus encloses a system having a common housing that comprises at least one inverter-controller 08022, at least one storage appliance 08024, and one or more gateway controllers 08026, that together function as a site integration system 08030, an energy cloud software platform 08032 communicating with the one or more intelligent gateway controllers to send and receive the user site and grid requirements of the one or more distributed resources, and one or more predictive analytic software modules 08034 to improve performance of the one or more distributed resources. In certain aspects, alternative arrangements of the DER-ES apparatus are contemplated as power electronic, inverter-controller, and energy storage components become smaller and more powerful. In other aspects, the DER-ES apparatus housing may become substantially smaller than current sizes and designs. In other various aspects, the DER-ES apparatus may be configured as a blade or rack mount device in future designs as components become smaller and more powerful. In certain aspects, the blade or rack mount design is coupled to a DC bus; in various aspects, other methods of coupling the DER-ES apparatus may be deployed depending on the latest power electronics designs.

In another aspect and continuing with FIGS. 8A-8C, the one or more predictive analytic software modules may each include one or more sets of rules and one or more sets of constraints to allow a user to implement multiple sets of rules and constraints which monitor or govern one or more resources selected from the group consisting of power generation, power storage, power use, pricing signals, cost signals to identify one or more incremental storage cycles, marginal cost management of cycle life degradation, virtual power plant orchestration, iterative schedule development, forward event scheduling, event awareness, and load control 08036.

In another apparatus configuration of the DER-ES for energy management services and continuing with FIGS. 8A-8C, the apparatus further comprises one or more virtual power plant modules to provide a best mix selection from demand and supply data simultaneously communicated by the user site and grid requirements of the one or more distributed resources, and one or more user interfaces to provide a local user grid access interface and a consumer portal, wherein the local user grid access interface provides access to a best mix selection from demand and supply data simultaneously communicated by the user site and grid requirements of the one or more distributed resources 08038.

An additional configuration of the apparatus and continuing with FIGS. 8A-8C, further comprises one or more inverters and one or more charger controllers wherein one or more devices of the one or more inverters and one or more charger controllers dispatches energy to the grid to satisfy grid control system requirements for voltage support 08040. Also, another configuration further comprises one or more electric vehicle energy control centers in communication with one or more edge gateway controllers and one or more electric vehicle resources 08042. The apparatus may be further configured to comprise a site integration system cloud controller aggregating one or more electric vehicle energy control centers in communication with one or more gateway controllers and one or more electric vehicle resources and aggregating one or more distributed energy management systems in communication with one or more distributed resources 08044. In the virtual power plant configuration, the one or more virtual power plants can be further configured to provide voltage support in response to a grid control system requirement responds to one or more demand response events with guaranteed dispatch of power to the grid 08046.

In another aspect and continuing with FIGS. 8A-8C, the DER-ES apparatus is configured wherein the apparatus, via one or more energy cloud software platforms communicates with the one or more intelligent edge gateway controllers to send and receive site and grid requirements of the one or more distributed resources, and is electrically and communicably connected to one or more site integration system apparatus to form a network, wherein the network is connected to one or more regional independent service operators (ISO), and is programmed to respond to signals from a provider on a per-second basis 08048.

In another aspect of the embodiment and continuing with FIGS. 8A-8C, the DER-ES apparatus further comprises at least one software module for matching a target inverter output with one or more up and down ramping step functions to convert demand requests into charge and dispatch commands 08050. This configuration of the apparatus may further provide the at least one software module for matching a target inverter output with one or more up and down ramping step functions to convert demand requests into charge and dispatch commands and that further comprises an additional user specified translation amount to shift the entire step function curve up or down by the additional user specified translation amount 08052.

In another configuration of the DER-ES apparatus and continuing with FIGS. 8A-8C, an uninterruptible power supply (UPS) unit that automatically isolates the apparatus for energy management services from the grid in the event of a loss of power, and then automatically delivers locally generated site power to the user site without an interruption in service and without a loss in power quality 08054.

In another configuration of the DER-ES apparatus and continuing with FIGS. 8A-8C, the apparatus is wired directly to one or more priority loads and communicates via one or more energy cloud software platforms communicating with the one or more intelligent edge gateway controllers to send and receive the site and grid requirements of the one or more distributed resources, and is electrically and communicably connected to one or more site integration system apparatus to form a network to provide energy reliability for one or more critical service loads 08056.

Continuing with FIGS. 8A-8C, the DER-ES apparatus may alternately be configured to comprise one or more grid power and renewable energy generation storage devices for dispatching and locally storing generated energy, include one or more batteries housed in a battery compartment within the DER-ES apparatus to facilitate draw-out removal of one or more of the one or more batteries in an un-energized position 08058. In another configuration of the DER-ES apparatus further comprises an active cooling module having a thermocouple in an I/O device to measure one or more internal housing temperatures and linked to one or more controllable fans receiving one or more signals from the energy management system, one or more autonomous sensing modules to receive one or more signals from one or more inputs, an enclosure access module having one or more access sensors, and at least one status output with a remote alarm, an I/O module to send and receive one or more signals from an external application 08060.

Continuing with FIGS. 8A-8C, the DER-ES apparatus may alternately be configured to comprise one or more mode selection modules to prioritize one or more programs associated with each one of the one or more DER-ES apparatus resources 08062. In another DER-ES apparatus configuration further comprises an autonomous sensing offset demand module to determine an offset demand amount according to one or more offset demand methods 08064. In another configuration, the apparatus further comprises an autonomous sensing offset demand assembly having one or more current transformers, one or more potential transformers, one or more analog inputs, and at least one analog protocol converter device, to make one or more site demand measurements, measure the total site load associated with the DER-ES apparatus, calculate an offset demand amount value according to one or more offset demand methods, and discharge the offset demand amount 08066. In an alternate to the prior method, the apparatus is provided wherein the at least one analog protocol converter device converts one or more CANBUS protocol inputs to TCP/IP protocol 08068. The CANBUS to TCP/IP protocol converter DER-ES apparatus further comprises one or more current transformers coupled with one or more site loads associated with one or more DER-ES apparatus resources to discharge one or more autonomously sensed offset demand amounts 08080. In another configuration the apparatus further comprises one or more current transformers coupled to one or more sensors associated with one or more electric vehicle charging stations to provide rapid charging from one or more inverters housed within one or more DER-ES apparatus 08082.

In other various aspects and continuing with FIGS. 8A-8C, the DER-ES apparatus further comprises one or more I/O device termination points coupling the A/C bus of a wind turbine or hydro turbine with one or more DER-ES apparatus 08084.

In another embodiment as shown in FIGS. 9A and 9B, an orchestrated virtual power plant 09000, comprises one or more distributed energy resources 09002 and one or more energy storage objects 09004 each associated with an integrated device apparatus 09006 that together behave as a single energy entity when controlled by one or more common elements 09009 of one or more energy management software applications 09010; one or more energy resource local events each associated with a distributed energy resource energy storage apparatus (DER-ES) such that the one or more energy resource local events, when controlled by a common cloud-based energy management software, behave as a single energy entity, wherein each of the DER-ES apparatus encloses a system comprising an inverter-controller, storage appliance, and gateway controller that function as a site integration system 09012; one or more gateway controllers having one or more processors for performing localized and remote control, storage and generation energy management wherein a portion of the one or more processors provide instructions to one or more computer programs having one or more networked distributed energy management systems to control one or more user site loads and to monitor one or more distributed resources to simultaneously negotiate user site and grid requirements 09014; an energy cloud software platform communicating with the one or more intelligent edge gateway controllers to send and receive the user site and grid requirements of the one or more distributed resources 09016; one or more predictive analytic software modules to improve performance of the one or more distributed resources 09019; a consumer web portal to view data related to one or more user sites associated with each one of the one or more networked DER-ES apparatus 09020; an Internet user interface including one or more application programming interfaces to link to one or more programs associated with one or more users of the one or more grid site management systems and one or more user site management system associated with the one or more gateway controllers 09022; one or more virtual power plant software modules to provide a best mix selection from demand and supply data simultaneously communicated by the user site and grid requirements of the one or more distributed resources 09024, and one or more user interfaces to provide a local user grid access interface and a consumer portal, wherein the local user grid access interface provides access to a best mix selection from demand and supply data simultaneously communicated by the user site and grid requirements of the one or more distributed resources 09026, and a network of one or more aggregated apparatus acting as a fleet to automatically provide orchestrated voltage control on a specified feeder or a specified circuit in response to one or more commands 09029.

In another aspect of the orchestrated virtual power plant and continuing with FIGS. 9A and 9B, the orchestrated VPP further comprises a voltage control software module sending commands to one or more devices of one or more DER-ES apparatus to inject or absorb power at a location nearest the load where it is required 09030. In another arrangement, the previous orchestrated VPP configuration of the previous paragraph further comprises a software module sending commands to one or more devices of one or more site integration system apparatus that are co-located and directly control the power produced of the one or more renewable energy generating sources 09032. In another configuration, the orchestrated VPP is provided wherein the one or more site integration system apparatus time-shifts energy generated from one or more renewable energy generating sources and from the grid to maximize peak load reduction on a specified network location 09034. Another configuration is provided wherein the orchestrated virtual power plant uses one or more rule sets to machine learn one or more features of one or more user sites 09036.

Continuing with FIGS. 9A and 9B, the orchestrated virtual power plant may also be provided wherein the orchestrated virtual power plant uses one or more rule sets to machine learn one or more features of one or more user sites and communicates via one or more energy cloud software platforms communicating with one or more intelligent edge gateway controllers to send and receive user site and grid requirements of one or more distributed resources, and is electrically and communicably connected to one or more site integration system apparatus to form a network, wherein the one or more features of the user site of the orchestrated virtual power plant using one or more rule sets to machine learn is selected from a group of attributes consisting of weather, distributed energy device load profiles, customer preferences, grid control system preferences, vendor preferences, and consumer usage preferences 09038.

In another configuration of the orchestrated VPP of the previous paragraph and continuing with FIGS. 9A and 9B, the one or more rule sets to machine learn one or more features of one or more user sites comprises a learning element including one or more input references from a related knowledge base coupled to a data repository to produce an actual output element, an expected output element from a standard input from the orchestrated virtual power plant, and a comparator module to calculate an error equaling the differences between the actual output element and the expected output element and wherein the orchestrated virtual power plant modifies one or more of the rule sets to automatically adapt via an artificial intelligence component, one or more features of the one or more user sites 09040. This configuration may further comprise a peak load reduction routine module including program code with instructions to cause a computer to perform steps for time shift reductions of energy generated from one or more user sites to correspond to a utility provider defined peak load time period 09042.

In another embodiment as shown in FIGS. 10A and 10B, an energy cloud controller method 10000 comprises steps for connecting one or more distributed energy management systems to one or more DER-ES apparatus each functioning as a site integration systems and one or more distributed energy resources 10002; connecting one or more electric vehicle energy control centers to one or more electric vehicle resources further connected to one or more edge gateway devices 10004; networking one or more edge controller devices connecting one or more edge devices, one or more electric vehicle energy control centers, and one or more distributed energy management systems 10006; and providing one or communications ports to send and receive signals from one or more grid control systems, one or more demand response management systems, and continuing on to FIG. 10B, an energy management system 10008 to implement one or more of the methods described herein to simultaneously control one or more energy resource first portions associated with energy providers and one or more energy resources remaining portions associated with one or more user site energy generation devices.

Continuing with FIGS. 10A and 10B, the energy cloud controller method may also be provided wherein the one or more electric vehicle resources includes one or more electric vehicle charging stations 10010. In an alternate method, the energy cloud controller method is provided wherein each site integration system apparatus serves as a supervisory control and data acquisition node for its location to provide telemetry data and user preferences to one or more edge gateway controllers and one or more energy gateway devices and to provide aggregated data in one or more virtual energy pools to customers, consumers, utilities and grid operators 10012 to implement one or more of the methods described herein.

In another embodiment as shown in FIGS. 11A-11C, an energy cloud software platform 11000 as shown in FIGS. 11A and 11C comprises a remote cloud software platform communicating with one or more intelligent gateway controllers to send and receive user site and grid requirements to at least one of one or more distributed energy resources, one or more electric vehicle resources, and one or more energy storage objects 11002; one or more predictive analytic software modules to improve performance of the one or more distributed resources and energy storage objects 11004; a consumer web portal to view data related to one or more user sites associated with each one of one or more networked distributed energy resource energy storage DER-ES apparatus 11006; an Internet user interface including one or more application programming interfaces to link to one or more programs associated with one or more users of the one or more grid site management systems and one or more user site management system associated with one or more gateway controllers 11008; one or more software programs wherein each of the one or more software programs implement one or more modes and one or more policies in a set of virtual devices 11010; one or more distributed energy resources and one or more energy storage objects each associated with an integrated device apparatus that behaves autonomously to meet user site demands but communicates and aggregates the one or more distributed energy resources, one or more electric vehicle resources and one or more energy storage objects with the remote cloud software platform to be monitored by one or more common elements of one or more energy management software applications 11012; one or more energy resource local events each associated with a distributed energy resource energy storage apparatus (DER-ES) such that the one or more energy resource local events, when controlled by a common cloud-based energy management software, provide one or more localized energy services to the one or more distributed energy resources and energy storage objects associated with the distributed energy storage apparatus (DER-ES), wherein each of the DER-ES apparatus encloses a system comprising an inverter-controller, storage appliance, and gateway controller that function as a site integration system 11014; and one or more gateway controllers having one or more processors for performing localized and remote control, storage and generation energy management, in communication with the cloud software platform, wherein a portion of the one or more processors provide instructions to one or more computer programs having one or more networked distributed energy management systems to aggregate one or more user site loads and to monitor one or more distributed resources to simultaneously negotiate user site and grid requirements 11016 to implement one or more of the methods described herein.

In certain aspects and continuing with FIGS. 11A-11C, the energy cloud software platform further comprises a cloud controller 11020 in communication with the cloud software platform 11000 and at least one of the one or more gateway controllers 11008 of each one of the one or more distributed energy resource energy storage apparatus 11006 or one or more electric vehicle energy control center gateways 11007 to aggregate distributed energy resources, energy storage, and electric vehicle resources and implement charge and discharge plans of the distributed energy, energy storage, and electric vehicle resources 11018 as shown in FIGS. 11A and 11B. In further aspects, the energy cloud software platform may additionally further include the cloud controller 11020 wherein the cloud controller 11020 is in communication with one or more gateway devices of one or more distributed energy resource energy storage apparatus 11002, 11006 that together may behave as a single entity 11029 that implements one or more orchestration methods to create charge and discharge plans of the one or more distributed energy resource energy storage apparatus and one or more electric vehicle energy control centers, wherein the one or more distributed energy storage apparatus and one or more electric vehicle energy control centers behave as a single entity, in response to one or more grid control systems 11020. In certain aspect, the energy cloud software platform is provided wherein the orchestration implements a virtual power plant 11022. In other aspects, the virtual power plant is a load shaping service 11024.

In another configuration and continuing with FIGS. 11A-11C, the energy cloud software platform further comprises one or more energy storage objects each associated with an integrated device apparatus that together behave as a single energy entity when controlled by one or more common elements of one or more energy management software applications 11026; one or more energy resource local events each associated with a distributed energy resource energy storage apparatus (DER-ES) such that the one or more energy resource local events, when controlled by a common cloud-based energy management software, behave as a single energy entity, wherein each of the DER-ES apparatus encloses a system comprising an inverter-controller, storage appliance, and gateway controller that function as a site integration system 11027; an energy cloud software platform communicating with the one or more intelligent gateway controllers to send and receive the user site and grid requirements of the one or more distributed resources 11028; one or more predictive analytic software modules to improve performance of the one or more distributed resources 11030; one or more virtual power plant software modules to provide a best mix selection from demand and supply data simultaneously communicated by the user site and grid requirements of the one or more distributed resources 11032; one or more user interfaces to provide a local user grid access interface and a consumer portal, wherein the local user grid access interface provides access to a best mix selection of demand and supply data simultaneously communicated by the user site and grid requirements of the one or more distributed resources 11034; and a network of one or more aggregated apparatus acting as a fleet to automatically provide orchestrated services to each one of the one or more distributed energy resources energy storage (DER-ES) apparatus coupled to a distributed energy management system and electric vehicle energy control center 11036.

In other aspects and continuing with FIGS. 11A-11C, the energy cloud software platform providing aggregation or orchestration modules may be provided for at least one of the one or more electric vehicle resources or one or more distributed energy resources, wherein the set of virtual devices are one or more device drivers to translate common format commands to control signals for driving one or more physical devices to a desired state 11038. In other aspects, the one or more programs associated with the energy cloud software platform and one or more DER-ES apparatus gateway controllers includes the set of virtual devices that collect status information from the one or more physical devices to a desired state 11040. In another configuration of the energy cloud software platform, the set of virtual devices collects status information from the one or more physical devices for transfer to a network cloud 11042. In another configuration of the prior method aspect, the set of virtual devices communicate with the one or more physical devices via a data communications interface 11044. Another aspect of the energy cloud software platform provides the set of virtual devices that can be executed in a hierarchical process 11046. In other aspects, at least one of the one or more software programs is an override process that sends one or more control commands to the set of virtual devices to transition immediately to a specified state 11048. In other aspects of the energy cloud software platform, the platform may be configured wherein each one of the virtual devices of the set of virtual devices can report state parameters, operational history, errors, configuration parameters, and telemetry data to a server and wherein the data from each virtual device may be aggregated in a device report delivered to a remote cloud computing platform 11050. In another option now referring to FIG. 11C, the energy cloud software platform is provided wherein the server includes a user interface (UI) and one or more application programming interfaces (API) to communicate one or more API messages with network system components wherein the commands associated with the one or more API messages are queued in a server command queue 11052. In further aspects, the platform is provided wherein the storage and energy resources and electric vehicle resources are remotely managed and controlled by a software-as-a-service (SAAS) platform that aggregates one or more systems together in real-time to deliver dynamically scaled energy and information resources across the grid on demand 11054.

In other certain aspects and continuing with FIG. 11C, the energy cloud software platform further comprises a load shaping service application programming interface having a load shaping scheduling module having one or more schedule requests and one or more schedule responses 11056; a scheduled request execution engine to evaluate the one or more schedule requests with the one or more schedule responses to calculate an initial load shaping schedule 11058; an emergency load control override routine module in communication with the initial load shaping schedule 11060; one or more group identifiers associated with one or more resources corresponding to one or more load shaping services 11062; an energy cloud software platform comprising one or more programs associated with one or more renewable energy resources 11064; one or more virtual power plant, load shaping service software modules to provide a best mix selection from demand and supply data simultaneously communicated by the user site and grid requirements of the one or more distributed resources 11066; an energy cloud controller 11066; and one or more networked, distributed energy resource energy storage (DER-ES) apparatus in communication with a remote energy cloud software platform, wherein each of the DER-ES apparatus is capable of local storage of locally generated renewable energy but acts together in a network as a single entity 11068.

Continuing with FIG. 11C, the energy cloud software platform may also further comprise a prioritization module to rank each of the one or more programs of one or more networked renewable energy DER-ES apparatus accessed via a remote virtual energy pool 11070; an evaluation engine to receive and store signals from each one of the one or more programs to determine an active mode for each of the one or more programs 11072; and one or more communication protocols 11074 to link one or more gateway controllers with the remote virtual energy pool 11076, with one or more electric vehicle energy control centers 11078, and one or more distributed energy management systems 11080 for controlling one or more distributed energy resources and one or more energy storage objects, each associated with the one or more DER-ES apparatus, and for controlling one or more electric vehicle energy resources associate with one or more electric vehicle energy control centers 11082. In certain aspects, the energy cloud software platform is provided wherein one or more gateway controllers of one or more DER-ES apparatus communicate with each other via one or more CANBUS protocols without one or more host computers 11084. In other various aspects, the energy cloud software platform is provided wherein at least one or more of the one or more programs receives a pricing signal 11088.

In an embodiment as shown in FIGS. 12A and 12B, an energy cloud method 12000 comprises steps for monitoring the operation of one or more power electronic components of one or more distributed energy resource energy storage (DER-ES) apparatus 12002; upgrading and managing software running on each storage appliance of the one or more distributed energy resource energy storage (DER-ES) apparatus 12004; managing and reporting in real-time the energy generated in one or more renewable energy generating sources linked to one or more distributed energy resource energy storage (DER-ES) apparatus 12006; responding to one or more pricing, demand, and ancillary services signals 12008; utilizing one or more predictive analytic algorithms to improve performance of distributed resources 12010; reading one or more site loads from one or more site meters wherein the site configuration is selected from one of a group consisting of a site with a main load panel only, a site with a main load panel plus a critical load panel, and a site with neither a load panel or a critical load panel 12014; managing one or more offset demand amounts related to one or more distributed energy resources 12016; selecting one or more distributed energy resources of the one or more distributed energy resource energy storage apparatus wherein the one or more distributed energy resources are one or more user loads that are controlled by one or more sets of instructions from a remote central server 12018; selecting one or more executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices 12020 as shown in FIG. 12B. Now continuing with FIG. 12B further steps show receiving one or more command and control data command sets via one or more command channels from the remote central server or a third party external source API, wherein the one or more command sets control modes, actions, and device state in the one or more physical devices, to convert one or more formats and one or more protocols to one or more virtualized commands in a common command format; utilizing the one or more virtualized commands by one or more executor modules running at a command virtualization layer to cause the execution of one or more virtual devices at the device virtualization layer to drive a corresponding physical device to a desired state 12022; and executing one or more virtual devices at the device virtualization layer with one or more other virtual devices in a hierarchical relationship 12024.

In certain aspects and continuing with FIGS. 12A and 12B, the energy cloud method is provided with certain aspects to perform steps not shown wherein the one or more distributed resources are comprised of one or more of energy, storage, and electric vehicle resources and further comprises steps for orchestrating one or more distributed resources to simultaneously serve site and grid needs in a virtual power plant to allow the one or more energy, storage, and electric vehicle resources and objects to behave as a single entity upon controls from a central server controlling the one or more DER-ES apparatus 12026.

In certain aspects and continuing with aspects of FIGS. 12A and 12B, the energy cloud method is provided wherein at least one of the one or more predictive analytic algorithms is a machine learning, feedback loop 12028 not shown.

In an embodiment as shown in FIGS. 13A and 13B, a method in an energy management system 13000 comprises steps for providing real-time tracking of one or more values of at least one or more of one or more distributed energy resources or one or more energy storage objects 13002; responding to pricing, demand, and ancillary services signals to produce one or more target outputs of one or more distributed energy resource energy storage (DER-ES) apparatus, each of the apparatus having an inverter-controller, storage appliance, and gateway controller housed in a common enclosure, that together each function as a site integration system and when networked together form an energy network 13004; dispatching and receiving power to one or more distributed resources to simultaneously serve site needs and grid needs by measuring one or more voltages with one or more potential transformers connecting one or more signals of the distributed energy resource energy storage apparatus and measuring one or more currents of one or more signals with one or more current transformers connected to an I/O board, a service load panel, and a utility meter of each of the DER-ES apparatus to calculate and store a voltage/VAR ratio for each of the user sites associated with each of the DER-ES apparatus associated with the energy management system, measuring one or more current loads associated with the one or more signals, calculating one or more forecasted loads using one or more demand response programs and one or more historical load data sets and one or more current load data sets, measuring one or more current PV generation amounts from the one or more PV generation devices, and comparing one or more forecasted PV generation amounts to the one or more current PV generation amounts 13006; using predictive analytics, and real-time reporting and data analysis from an energy cloud software platform in communication with each of the gateway controllers of the one or more DER-ES apparatus to improve performance of one or more distributed resources 13008 as shown in FIG. 13B. Continuing now with FIG. 13B, steps are shown for pushing decision-making to intelligent edge devices which can optimize performance based on real-time local conditions of the one or more distributed resources and one or more energy storage objects associated with the one or more networked DER-ES apparatus 13010; providing detailed data and analytics to a demand management system (DMS), grid control system (GCS) and associated systems 13012; and distributing resource configuration, upgrades, monitoring, management, and support to a network of distributed resources, energy storage objects and electric vehicle resources 13014.

Continuing with certain aspects of methods related to FIGS. 13A and 13B, the method in an energy management system in other aspects, further comprises steps for accepting pricing, demand, frequency regulation, and power quality signals from at least one system functioning as a grid control system GCS, demand management system DMS, or Micro-DMS 13016.

In other aspects and continuing with FIGS. 13A and 13B, the method in an energy management system further comprises steps (not shown but related to methods of FIGS. 13A and 13B) for accepting capacity and scheduling guidance from one or more grid control systems GCS 13018; directing guidance to and accepting feedback from at least one distributed energy system 13020; delivering metrics, capacity, and operational state to a GCS through one or more energy resources, one or more electric vehicle resources, and one or more storage objects 13022; reading one or more site loads from one or more site meters wherein the site configuration is selected from one of a group consisting of a site with a main load panel only, a site with a main load panel plus a critical load panel, and a site with neither a load panel or a critical load panel 13024; implementing one or more steps of one or more mode selection methods 13026; managing one or more offset demand amounts related to one or more distributed energy resources 13028; selecting one or more distributed energy resources of the one or more distributed energy resource energy storage apparatus wherein the one or more distributed energy resources are one or more user loads that are controlled by one or more sets of instructions from a remote central server 13030; selecting one or more executor modules running on a command virtualization layer of each of the one or more gateway controllers associated with the one or more distributed energy resource energy storage apparatus, to activate one or more virtual devices at a device virtualization layer, wherein the activated virtual devices control one or more physical devices 13032; receiving one or more command and control data command sets via one or more command channels from the remote central server or a third party external source API, wherein the one or more command sets control modes, actions, and device state in the one or more physical devices, to convert one or more formats and one or more protocols to one or more virtualized commands in a common command format 13034; utilizing the one or more virtualized commands by one or more executor modules running at a command virtualization layer to cause the execution of one or more virtual devices at the device virtualization layer to drive a corresponding physical device to a desired state 13036; and executing one or more virtual devices at the device virtualization layer with one or more other virtual devices in a hierarchical relationship 13038.

Continuing with FIGS. 13A and 13B but not shown, the previous energy management system method may variously be provided wherein the steps for accepting capacity and scheduling guidance from one or more grid control systems GCS is an orchestration method so that the one or more distributed energy resources, one or more electric vehicle resources, and one or more storage objects associated with each of the one or more DER-ES apparatus, behave as a single entity upon instructions from a remote central server 13040. In other aspects, the scheduling guidance is a load shaping schedule from one or more control systems 13042. In further aspects, the scheduling guidance creates a virtual power plant in response to commands from one or more control systems 13044.

Continuing with FIGS. 13A and 13B but not shown, the method in an energy management system providing scheduling guidance from one or more grid control systems may further comprise steps for providing real-time visibility into one or more electric vehicle, electric vehicle (EV/EVSE) energy resources 13046; responding to one or more pricing, one or more demand, and one or more ancillary services signals 13048; coordinating (EV/EVSE) resources to simultaneously serve site needs and grid needs 13050; using predictive analytics, and real-time reporting and data analysis, to improve performance of one or more EV/EVSE resources 13052; pushing decision-making to intelligent EV/EVSE resources related to one or more gateway controllers or one or more edge controllers to optimize performance of the one or more energy resources, one or more electric vehicle resources, and one or more storage objects based on real-time local conditions 13054; providing one or more data sources and one or more analytic modules to associated DMS, GCS, and micro-grid systems 13056; and configuring one or more EV/EVSE programs associated with the one or more electric vehicle resources to provide upgrades, monitoring, management, and support 13058. The prior method in some aspects further comprises steps for accepting pricing, demand, frequency regulation, and power quality signals from the GCS, DMS, and Micro-DMS 13060; accepting capacity and scheduling guidance from the GCS 13062; directing guidance to and accepting feedback from at least one EV/EVSE system 13064; and delivering metrics, capacity, and operational state commands to the GCS 13066.

In other various aspects of methods in an energy management system and continuing with FIGS. 13A and 13B but not shown, the method further comprises steps for providing one or more CANBUS protocols to allow one or more components to communicate with each other 13068. In other various aspects, the method further comprises steps for providing one or more DNP3 protocols to allow one or more components to communicate with each other 13070.

In an embodiment as shown in FIGS. 14A-C, an energy cloud controller 14000 comprises one or more distributed energy management systems connected to one or more site integration systems and one or more distributed energy resources 14002 as shown in combined block diagrams of FIGS. 14A and 14B. Referring now to FIGS. 14A and 14B, the energy cloud controller further comprises one or more edge controller devices connecting one or more edge devices and one or more distributed energy management systems 14004, and one or communications ports to send and receive signals from one or more grid control systems, one or more demand response management systems, and an energy management system 14006. In certain aspects, the energy cloud controller may be provided wherein each site integration system apparatus serves as a supervisory control and data acquisition (SCADA) node for its location to provide telemetry data and user preferences to one or more edge gateway controllers and one or more energy gateway devices and to provide aggregated data in one or more virtual energy pools 14008 to customers, consumers, utilities and grid operators 14008. In other aspects as shown in FIGS. 14A and 14B, the system may further comprise one or more electric vehicle energy control center systems connected to one or more site integration systems and one or more distributed energy resources, one or more electric vehicle energy control centers connected to one or more electric vehicle resources connected to one or more edge gateway devices, one or more edge controller devices connecting one or more edge devices, one or more electric vehicle energy control centers, and one or communications ports to send and receive signals from one or more grid control systems, one or more demand response management systems, and an energy management system 14008. In other various aspects, the energy cloud controller is provided wherein the one or more electric vehicle resources include one or more electric vehicle charging stations 14010. In another variation, the energy cloud controller 14012 is provided wherein the one or more electric vehicle energy control centers connected to the one or more electric vehicle charging stations dispatches energy to offset demand spikes while one or more electric vehicles are charging in the one or more electric vehicle charging stations to buffer grid energy requirements 14012. In another aspect, the energy cloud controller is provided wherein the one or more electric vehicle energy control centers connected to the one or more electric vehicle charging stations further includes a fast charging electric vehicle plug-in receptacle connected to a battery of a site integration system apparatus 14014. In another aspect, the prior configuration may further comprise one or more distributed energy management systems connected to one or more site integration systems and one or more distributed energy resources, one or more electric vehicle energy control centers connected to one or more electric vehicle resources connected to one or more edge gateway devices, one or more edge controller devices connecting one or more edge devices, one or more electric vehicle energy control centers, and one or more distributed energy management systems, and one or communications ports to send and receive signals from one or more grid control systems, one or more demand response management systems, and an energy management system 14016.

In other various aspects and continuing with FIGS. 14A-14C, the energy cloud controller 14012 is provided wherein the one or more electric vehicle resources includes one or more electric vehicle charging stations and in another aspect the energy cloud controller is provided wherein the one or more electric vehicle energy control centers connected to the one or more electric vehicle charging stations dispatches energy to offset demand spikes while one or more electric vehicles are charging in the one or more electric vehicle charging stations to buffer grid energy requirements 14018.

In other certain aspects, the prior configuration is provided wherein the one or more electric vehicle energy control centers connected to the one or more electric vehicle charging stations further includes a fast charging electric vehicle plug-in receptacle connected to a battery of a site integration system apparatus 14020. In certain aspects as shown in FIG. 14C, a system architecture with energy cloud controller 14022 includes an energy cloud controller 14012 comprising one or more software modules 14013 for predictive analysis, virtual power plant orchestration, reporting, operations and monitoring, and one or more communications protocols, together functioning in an energy cloud software platform, further coupled to an energy management system 14016 and a virtual energy pool 14008, via a demand management system 14024, web browser 14025 and other web applications 14026, further utilizing the multi-layer architecture 14023 including one or more command layers, one or more program layers, and one or more device abstraction layers of one or more distributed energy resource energy storage apparatus gateway controller, as shown in FIGS. 14A-C.

In another embodiment as shown in FIG. 15, a method for controlling network resources in an aggregated energy cloud 15000 comprises steps for networking one or more distributed energy management systems connected to one or more site integration system apparatus that includes one or more renewable energy local storage devices and linked to one or more renewable energy local generation devices, and one or more distributed energy resources 15002; linking one or more electric vehicle energy control centers connected to one or more electric vehicle resources connected to one or more edge gateway devices 15004; linking one or more edge controller devices connecting one or more edge devices, one or more electric vehicle energy control centers, and one or more distributed energy management systems in a common protocol 15006; and providing one or communications ports to send and receive signals from one or more grid control systems, one or more demand response management systems, and an energy management system wherein at least one portion of the energy management system is a cloud based virtual energy pool 15008. In certain aspects, one or more of the one or more site integration system apparatus may be a DER-ES apparatus. In other various aspects, a portion of the DER-ES apparatus may be networked together without a central server. In other various aspects, a portion of the DER-ES apparatus may function together as a micro-grid. In other aspects, a portion of the DER-ES apparatus functioning as a micro-grid may implement a remote coordination model. In other various aspects, a micro-grid may implement one or more of the methods described herein.

In another configuration of the method for controlling network resources in an aggregated energy cloud and continuing with FIG. 15, the method is alternately provided wherein the one or more electric vehicle energy control centers connected to the one or more electric vehicle charging stations dispatches energy to offset demand spikes while one or more electric vehicles are charging in the one or more electric vehicle charging stations to buffer grid energy requirements 15010.

In another configuration of the method for controlling network resources in an aggregated energy cloud and continuing with FIG. 15, the method is alternately provided wherein the one or more electric vehicle energy control centers connected to the one or more electric vehicle charging stations further includes a fast charging electric vehicle plug-in receptacle connected to a battery of a site integration system apparatus 15012.

In another embodiment as shown in FIGS. 16A and 16B, a renewable energy value-optimizing computer implemented method 16000 to be used in a computer-usable readable storage medium having computer-readable program code embodied therein for causing a computer system to perform one or more of the following steps in any order for prioritizing one or more programs of one or more gateway controllers associated with one or more networked distributed energy resource energy storage apparatus by assigning and storing a priority for each of the one or more programs in an energy management system linked to a remote virtual energy pool 16002; implementing one or more mode selection methods by receiving signals from each one of the one or more programs to determine an active mode for each of the one or more programs and by identifying the particular active mode of each one of the one or more programs in the energy management system linked to the remote virtual energy pool 16004; communicating between one or more gateway controllers with the energy management system and virtual energy pool, wherein the one or more gateway controllers are linked to at least one of the one or more electric vehicle energy control centers and one or more distributed energy management systems 16006; receiving one or more energy output amounts and one or more energy input amounts, and determining one or more offset demand amounts of a user site associated with one or more DER-ES apparatus, at least one grid, and one or more renewable energy generation sources, to measure and store each of the amounts of the user site in the energy management system linked to the remote virtual energy pool 16008 as shown in FIG. 16A. Now continuing to FIG. 16B, the method further comprises steps for calculating a battery cycle marginal cost from the cost and cycle life data of the one or more batteries associated with the one or more DER-ES apparatus associated with the energy management system linked to the remote virtual energy pool 16010; calculating an overall photo-voltaic to battery efficiency of each one of the one or more distributed energy resource energy storage (DER-ES) apparatus and an aggregated PV to battery efficiency of the networked (DER-ES) apparatus to store in the energy management system linked to the remote virtual energy pool 16012; calculating a battery to grid efficiency by measuring relative energy amounts of each one of the DER-ES apparatus associated with the energy management system linked to the remote virtual energy pool 16014; and calculating a photo-voltaic to grid efficiency by measuring relative energy amounts of each one of the DER-ES apparatus associated with the energy management system linked to the remote virtual energy pool 16016.

In another configuration and continuing with aspects of the methods not shown but related to FIGS. 16A and 16B, the value-optimizing computer implemented method further comprises steps for measuring one or more demand response values 16018; determining at least one demand response capacity of the one or more distributed energy resources and one or more energy storage objects associated with each of the one or more DER-ES apparatus 16020; calculating one or more demand charges avoidance totals by measuring a user site demand by reading one or more site loads, reacting to demand conditions to match the site demand measurement with an inverter power output, controlling the inverter to dispatch the matching power output, calculating one or more offset demand amounts associated with reducing one or more grid demand amounts, calculating one or more offset demand amounts associated with avoiding one or more grid power export amounts, and applying one or more associated energy charges to the one or more offset demand amounts 16022; implementing one or more demand charge tariff routines by selecting one or more TOU tariff routines and selecting one or more tariff schedules 16024; receiving one or more demand response requests; determining one or more demand response amounts committed 16026; and verifying one or more customer sites associated with one or more instances of committed demand response participation 16028.

In another configuration and continuing with aspects of the methods not shown but related to FIGS. 16A and 16B, the value-optimizing computer implemented method further comprises measuring one or more voltages with one or more potential transformers connecting one or more signals of the distributed energy resource energy storage apparatus and measuring one or more currents of one or more signals with one or more current transformers connected to an I/O board, a service load panel, and a utility meter to calculate and store a voltage/VAR ratio in the energy management system; measuring one or more current loads associated with the one or more signals 16030; calculating one or more forecasted loads using one or more demand response predictive algorithms and one or more historical load data sets and one or more current load data sets 16032; measuring one or more current PV generation amounts from the one or more PV generation devices 16034; comparing one or more forecasted PV generation amounts to the one or more current PV generation amounts 16036; calculating one or more maximum rate of power outputs from one or more instances of target site output wattage from one or more inverters matched to one or more instances of offset demands, one or more instances of PV local generation, and one or more instances of grid export avoidance 16038; calculating one or more maximum charge rates from one or more instances of site demand measurement, one or more instances of provider tariff rate schedules, and one or more instances of site offset demand in the distributed energy resource energy storage apparatus 16040; determining one or more maximum state of charge utilizing one or more mode selection methods 16042; and determining one or more minimum state of charge values utilizing one or more mode selection methods 16044.

Continuing with aspects of the methods not shown but related to FIGS. 16A and 16B, the value-optimizing computer implemented method is also provided wherein at least one of the one or more iterative processes is a machine learning process 16046. In another aspect of the embodiment the value-optimizing computer implemented method is provided wherein one or more machine iterative processes maximizes peak load reduction for one or more renewable energy DER-ES apparatus resources and in another configuration wherein at least one of the one or more DER-ES apparatus resources is a residential load 16048.

In a further aspect and continuing with aspects of the methods not shown but related to FIGS. 16A and 16B, the value-optimizing computer implemented method is provided wherein the one or more DER-ES apparatus resources and one or more EV-ECC resources are located at a commercial site and the value-optimizing computer implemented method is provided wherein at least one of the one of more DER-ES apparatus resources residential load is an appliance with one or more sensors linked to a home area network and in another configuration the method is provided wherein at least one of the one or more DER-ES apparatus resources or one of the EV-ECC resources are associated with one or more sensors linked to an energy area network 16050.

In another aspect of the value-optimizing computer implemented method is provided and continuing with aspects of the methods not shown but related to FIGS. 16A and 16B, further comprising steps for securing one or more energy storage devices in an intelligent energy storage compartment housed within the one or more DER-ES apparatus, wherein each of the DER-ES apparatus include one or more hybrid inverter/converters, one or more charge controllers, and one or more energy storage management systems; coupling the one or more energy storage devices to one or more DER-ES apparatus isolation switch panel 16052; and configuring, by the computer system, one or more processors of the one or more gateway controllers to monitor and control energy management processes associated with each of the DER-ES apparatus resources 16054. In other aspects, the method further comprises steps for selecting one or more methods to schedule time periods to sell locally stored and locally generated energy back to a utility power grid 16056; defining price points of power obtained from a utility power grid at which a user will discharge energy stored in the one or more energy storage devices of the one or more DER-ES apparatus 16058; defining a percentage of maximum capacity of stored energy in one or more of the energy storage devices of the one or more DER-ES apparatus that may be discharged in a single cycle 16060; correlating the price points of power with the percentage of maximum capacity of the one or more energy storage devices of the one or more DER-ES apparatus 16062; configuring the set of price points and maximum capacity percentages to store in the energy management system 16064; applying one or more preferences to the set of price points and maximum capacity percentages to make one or more selections 16066; and calculating the amount of available stored energy capacity by obtaining the product of the storage capacity and a price of power 16068. In other aspects, the method further comprises steps for conducting at least one energy buy-low, sell-high transaction, wherein energy is purchased from a utility at a low price and stored in at least one of the one or more energy storage devices of the one or more DER-ES apparatus associated with one or more user sites, and wherein the available stored energy is sold back to the utility or a third party at a price higher than the low price by an amount greater than the transaction costs 16070.

In other aspects and continuing with aspects of the methods not shown but related to FIGS. 16A and 16B, the method further comprises steps for selecting one or more steps for peak shaving at the one or more user sites; monitoring overall energy demand on the utility power grid to determine time periods correlating with maximum energy rates charged; calculating an amount of maximum energy that can be delivered by the utility power grid to one or more user sites associated with the one or more DER-ES apparatus 16072; determining a threshold energy demand on the grid for each of the one or more user sites associated with the one or more DER-ES apparatus, wherein the threshold energy demand of each of the user sites begins to stress one or more components of the utility power grid 16074; identifying one or more time periods when the threshold energy demand is met, wherein identification of the time period in the energy management system sends control and command instructions associated with each of the one or more energy storage devices housed in the one or more DER-ES apparatus for capable export of locally stored power to the utility power grid 16076; and dispatching and exporting locally stored energy at one or more of the user sites associated with the one or more DER-ES apparatus by one or more of the inverters in response to one or more instructions from the energy management system until the energy demand falls below the threshold energy demand 16078.

In other certain aspects and continuing with aspects of the methods not shown but related to FIGS. 16A and 16B, the computer implemented method is provided wherein implementing one or more weather forecast routines associated with one or more predictive algorithms and one or more weather data sets stored in the energy management system or retrieved from an external application includes forming a data set of historical meteorological values with historical energy demand values at one or more user sites to model future energy demand of the one or more user sites to be placed on the utility grid and to use model future energy demand to forecast when the threshold energy demand of the one or more user sites will be exceeded 16080. In other various aspects, the method is provided wherein the one or more amounts of available stored energy and the one or more calculated battery cycle marginal costs of each of the one or more energy storage devices housed in the one or more DER-ES apparatus may be utilized to reduce local energy generation marginal cost wherein the local energy generation marginal cost of the one or more user sites each comprises a cost of fuel, a cost for variable maintenance, and a cost for increasing capacity of the one or more renewal energy generating arrays 16082. In further various aspects of the method are provided wherein at least one of the one or more energy storage devices is a rapid response energy storage device that regulates the amount of available stored energy in the rapid response energy storage device while charging and discharging 16084.

In another embodiment as shown in FIG. 17, a computer program 17000 comprising computer-usable readable storage medium for implementing one or more steps of a renewable energy value-optimizing intelligent algorithm having computer-readable program code 17002 embodied therein for causing a computer system to perform a method of prioritizing one or more programs 17004 of one or more networked renewable energy site integration systems accessed via a virtual energy pool 17006, comprises program code for receiving signals 17008 from each one of the one or more programs 17004 to determine an active mode 17010 for each of the one or more programs 17004; program code for providing one or more gateway edge controllers in communication with the virtual energy pool and linked to an electric vehicle energy control center and a distributed energy management system in an application platform 17012; program code for adjusting one or more weighting constants of the one or more steps of the renewable energy value-optimizing intelligent algorithm to prioritize one or more programs of one or more networked renewable energy site integration systems accessible via a virtual energy pool 17014, wherein each of the one or more weighting constants is determined from one or more machine learning processes applicable to one or more steps, making adjustments to the algorithm to optimize one or more renewable energy site integration systems resources 17017.

In another embodiment and continuing with FIG. 17, a computer program comprising computer-usable readable storage medium for implementing one or more steps of a renewable energy management intelligent algorithm having computer-readable program code embodied therein for causing a computer system to perform a method of prioritizing one or more programs of one or more networked renewable energy site integration systems accessed energy management system, comprises one or more data processors 17018; a distributed energy management system comprising a computer implemented method for governing energy management resources, executable by the one or more data processors to provide steps to receive a calculation from a engine that calculates a marginal cost management of cycle life degradation 17020; compare a price of power from a utility power grid using a comparator engine a with one or more price points, and execute a rules engine wherein if the price of power from the utility power grid reaches the one or more price points, then a pre-defined percentage of a maximum capacity of stored energy in one or more remaining energy storage modules may be discharged in a single cycle, said pre-defined percentage of a maximum capacity corresponding to the one or more price points 17022.

In another embodiment as shown in FIGS. 18A and 18B, a method of load shaping management in a distributed energy resource energy storage apparatus 18000, comprises steps for providing a calling application, wherein the calling application composes a request schedule 18002; submitting the request schedule to a load shaping service application by the calling application 18004; creating a response by the load shaping service application based on the request schedule 18006. In another embodiment the method further comprises creating a "best fit" response schedule as close to the request schedule by the load shaping service application when the load shaping service application cannot satisfy all mandatory activities 18008. Another configuration of the method further comprises steps for satisfying all mandatory activities in the load shaping service application in the request schedule when the load shaping service application can replace limit activities with either no action or activities with a lower rate 18010. In other aspects, the method further comprises steps for satisfying all mandatory activities in the load shaping service application in the request schedule when the load shaping service application does not replace any limit activities 18012. In other certain aspects, the method further comprises steps for storing the response schedule of the load shaping service application for execution; and submitting a new request schedule with different values to the calling application if the load shaping service application cannot satisfy all mandatory activities in the request schedule 18014.

In an embodiment as shown in FIG. 18B, a computer program 18001 comprising computer-usable readable storage medium 18003 for implementing one or more steps of a renewable energy algorithm 18005 having computer-readable program code 18007 embodied therein for causing a computer system to perform a method of load shaping management 18009 in one or more networked renewable energy site integration systems 18011 accessed energy management system, comprises a request schedule execution engine 18013; a load shaping scheduling module virtually coupled to the request schedule execution engine 18015; one or more group identifiers associated with one or more resources corresponding to one or more load shaping services 18017, the one or more group identifiers corresponding to a request schedule processed through the request schedule engine that further comprises a virtual cloud software platform comprising one or more programs associated with one or more resources and coupled to the request schedule engine 18019; an energy cloud controller virtually coupled to the virtual cloud platform 18021; and one or more networked site integration systems 18011, capable of locally storing energy and, wherein the one or more networked, site integration systems capable of local storage of locally generating renewable energy 18023, wherein the site integration systems process the one or more group identifiers associated with one or more resources corresponding to one or more load shaping services and the request schedule via the request schedule execution engine 18025.

In an embodiment as shown in FIG. 19A, a method of iterative load shaping service management in a distributed energy resource energy storage apparatus 19000, the method comprises steps for providing a calling application that assembles one or more possible load shaping schedules having restrictive priorities and best fit algorithms, wherein each of the one or more possible load shaping schedules to the load shaping service with an asset command of set never 19002; returning one or more possible response schedules by the load shaping service of the one or more possible load shaping schedules for each requested schedules and does not store each requested schedule 19004; re-examining the one or more possible response schedules returned by the calling application 19006; looping back to providing the calling application that assembles one or more possible load shaping schedules having restrictive priorities and best fit algorithms making iterative changes looking for one or more schedules that match the calling applications' needs 19008; and submitting a command of set always, when the calling application is satisfied with one of the response schedules submitted to the load shaping service 19010. In other aspects, the method further comprises steps for specifying a set command a predetermined schedule to execute by the calling application to store for the load shaping service 19012. In other various aspects the method is provided wherein the set command is set always and the load shaping service stores the response schedule for later execution 19014. In further various aspects the method is provided wherein the a set command is set never and the load shaping service does not store the response schedule for later execution, wherein the calling application runs multiple schedule scenarios to select best possible response schedule 19016. In other various aspects the method is provided wherein the a set command is set if no downgrade, wherein the load shaping service stores response schedules for later execution when all requested mandatory activities are executed by the load shaping service 19018.

Continuing with FIG. 19A, in other certain aspects the method is provided wherein the a set command is set if no change, wherein the load shaping service stores response schedules for later execution when all requested mandatory activities are executed by the load shaping service and provides a reminder to the load shaping service not to schedule upgrades 19020. In other aspects the method is provided wherein one or more individual entries in the response schedule can be marked with a designated priority such that the load shaping service can prioritize which of one or more entries in the response schedule will get downgraded 19022. In yet other various aspects the method is provided wherein the one or more entries in the response schedule are ranked with one of high, medium or low priority 19024.

In another configuration and continuing with FIG. 19A, the method is provided wherein the calling application specifies a "best fit" algorithm to use when the load shaping services not able to execute all mandatory activities 19026. Other various aspects include the method wherein truncate specifies removing mandatory activities from the response schedule in low to high priority order until the response schedule can execute all remaining mandatory activities 19028. In other configuration, the method is provided wherein distribute specifies satisfying all mandatory activities with high priority, if not all high priority activities can be satisfied, distribute available capacity between all the high priority activities weighted by rank of activity 19030.

In another configuration, the method further comprises steps for distributing specific activities by satisfying all activities with medium priority, if not all medium priority activities can be satisfied, distribute available capacity between all the medium priority activities weighted by rank of activity 19032; and distributing specific activities by satisfying all activities with low priority, if not all low priority activities can be satisfied, distribute available capacity between all the low priority activities weighted by rank of activity 19034. The method in another configuration further comprises steps for changing all low priority activities to "any action"; repeating changing all medium priority activities to "any action" if schedule cannot fully execute; and repeating changing all high priority activities to "any action" if schedule cannot fully execute 19036.

In an embodiment as shown in FIG. 19B, an iterative load shaping service module in a distributed energy site integration system, the apparatus 19001 comprises an input, wherein the input is integral to the iterative load shaping service module 19003; a memory module configured to store distributed energy information on the iterative load shaping services module on an aggregate level for one or more site locations 19005; a mechanism for receiving the input from a calling application in one or more networked, site integration systems, the calling application configured to produce a requested schedule comprising any mix of mandatory and limit load shaping activities, wherein the input is coupled to the iterative load shaping service module, the memory and one or more virtual, networked, distributed energy site integration systems 19007; a unit for producing a response schedule created upon comparison to the request schedule, wherein the unit for producing the response schedule is coupled to the calling application 19009; a data processing system for a data repository of one or more response schedules for scheduled response execution, wherein the data processing system is coupled to the calling application and the unit for producing a response request 19011; an iterative load shaping scheduler rules engine coupled to the data processing system, the calling application and the unit for producing a response request, wherein if the returned response schedule conforms to a most restrictive priorities and a best fit algorithm of the calling application, then the load shaping service returns a response schedule, but does not schedule the response schedule, only those schedules that meet the most restrictive priorities and a best fit algorithm of the calling application requirements for confirmation of the calling application response schedules; an output configured to receive the output from the calling application response schedules and coupled to the iterative load shaping service module 19013; and a programmable user interface virtually or actually coupled to the output for viewing the results of returning the calling application response schedules, a returned response schedule acceptance status identifier; and a acceptance update identifier for the scheduled response execution 19015.

In certain aspects and continuing with FIG. 19B, the apparatus further comprises the calling application further configured to provide a calling application that assembles one or more possible load shaping schedules having restrictive priorities and best fit algorithms, wherein each of the one or more possible load shaping schedules provided to the load shaping service has an asset command of set never 19017; return the one or more possible response schedules to the load shaping service of one or more possible load shaping schedules for each requested schedules and the load shaping service does not store each requested schedule 19019; submit to the load shaping service to re-examine one or more possible response schedules returned by the calling application 19021; loop back to provide the calling application to assemble one or more possible load shaping schedules having restrictive priorities and best fit algorithms to make iterative changes to look for one or more schedules that match the calling applications' needs 19023; and submit a command of set always, when the calling application is satisfied with one of the response schedules submitted to the load shaping service 19025. In another configuration, the module further comprises an energy cloud software platform comprising one or more programs virtually coupled to one or more virtual, networked, distributed energy site integration systems each having one or more locally generated renewable energy resources 19027; and, one or more energy cloud edge controllers virtually coupled to one or more energy cloud platforms 19029.

In another embodiment as shown in FIG. 20A, a method of virtual load shaping service management in an energy site integration system including one or more distributed energy resource storage apparatus 20000, the method comprises steps for providing one or more network gateways 20002; coupling a network edge device to the one or more network gateway; joining the one or more network gateways to the network edge device via a virtual network cloud 20004; monitoring one or more units, wherein each unit has a distributed energy resource storage apparatus, capable of local storage of locally generated renewable energy, via a user portal 20006; and providing a load shaping application programming interface virtually coupled to at least one or more main units through the distributed energy resource storage apparatus, the load shaping application programming interface virtually coupled to the network edge device 20008. In certain aspects, the method further comprises steps for coupling one or more user interfaces to a load shaping application programming interface virtually coupled to the one or more virtual network edge device 20010. In other aspects, the method further comprises steps for providing at least one or more main unit coupled to one or more user interface 20012; coupling each of the one or more main unit to at least one or more subunits 20014; and aggregating in the cloud all the resources of each of the one or more main units and the one or more subunits for each main unit through forward energy and power reservation 20016. In another configuration, the method further comprises steps for coupling a critical load panel actually or virtually to one or more of main units a site 20018. In another configuration, the method additionally further comprises steps for creating a result schedule from one or more request schedules requiring best fit iterations to match the load shaping service management application matching capacity reservation capabilities with capacity reservation capacity 20020; and using the result schedules acquired from the one or more request schedules to forecast demand on an aggregate level 20022.

In another embodiment as shown in FIG. 20B, a computer program 20001 comprising computer-usable readable storage medium 20003 for implementing one or more steps of a renewable energy management intelligent algorithm 20005 having computer-readable program code 20007 embodied therein for causing a computer system to perform a method of prioritizing one or more programs of one or more networked renewable energy site integration systems 20009 accessed virtual power plant energy management system 20011, comprises a mechanism for coupling a network edge device to one or more network gateways 20013; permitting the one or more network gateways to virtually couple to the network edge device via a virtual network cloud 20015; configured to monitor through a distributed energy resource energy storage apparatus one or more units, wherein each unit has an attached distributed energy resource energy storage apparatus, capable of local storage of locally generated renewable energy, via a user portal 20017; a load shaping application programming interface virtually coupled to one or more units through the distributed energy resource energy storage apparatus, the load shaping application programming interface virtually coupled to the network edge device 20019; a data processing unit for determining power preservation rule sets 20023; and a module for memory coupled to the data processing unit and virtually coupled to the load shaping programming application interface 20025. In another configuration, the computer program further comprises one or more user interfaces coupled to the network edge device 20027. In other aspects, the computer program further comprises each unit that has one or more subunits 20029; and forward energy power reservation through aggregating in the cloud all the resources of one or more units and one or more subunits for each unit 20031. In other various aspects, the computer program further comprises a critical load panel is coupled via wire or wirelessly to one or more units a site 20033. In another configuration, the computer program further comprises program code for creating a result schedule from one or more request schedules requiring best fit iterations to match the load shaping service management application matching capacity reservation capabilities with capacity reservation capacity 20035; and using the result schedules acquired from one or more request schedules to forecast demand on an aggregate level 20037.

In another embodiment as shown in FIG. 20C, a method of providing a load shaping service in an energy site integration system 20039, comprises steps for receiving a first request to set a load shaping schedule and map a set command as set never, wherein a load shaping service would not store the request for later execution, even if the load shaping schedule could execute all mandatory activities 20041; sending a reply from the load shaping service indicating that the service could not execute the entire schedule, wherein a final response blocks identifying entries that were marked as downgraded 20043; modifying the first request yielding a second request, adapting the second request to allow the load shaping service to execute the entire schedule 20045; and sending a reply from the load shaping service indicating that the service could execute a new entire schedule, and upgrading a third result schedule 20047. In certain aspects, the method is provided wherein the load shaping service will retrieve the provided request and further comprises steps for creating a third request that takes into account the new requested schedule, capabilities of the load shaping service, current capacity of the load shaping service, and other scheduled requests on the load shaping service; setting the third request for the appropriate time frame to the new schedule 20049; and returning an entire new second schedule, although the entire new second schedule may not match the third request in all ways, wherein if the load shaping service cannot meet the third request's requirements, the load shaping schedule will return a schedule that is a best fit, using the specified best fit algorithm indicated using the third request's requirements 20051. In another variation, the method is provided wherein the load shaping service may not be able to handle the requested load shaping service because of inadequate PPV capacity, and a best fit algorithm identifying how the load shaping service should modify the request schedule to match its capabilities and PPV capacity with the requested schedule 20053. In other various aspects, the method is provided wherein the load shaping schedule includes a twenty-four hour period of load shaping activities, broken into time blocks of equal duration, wherein each time block has a Load Shaping Schedule Entry that defines the activity is taken during that period and capacity reservations for non-load shaping functionality 20055. In another aspect of the embodiment, the method is provided wherein an external application or calling service notifies the load shaping service to proceed with a load shaping schedule that includes blocks of time with to proceed with mandatory activities, blocks of time to proceed with optional activities to allow the load shaping service to manage for future needs, and blocks of time in which the load shaping service determines how proceed with discretionary activities 20057. In other certain aspects, the method further comprises an emergency load control device supporting instant demand response, rapid response operational reserve to allow engaging additional spinning reserve, frequency response, voltage sag correction, and any other functionality that requires rapidly injecting or removing power from the grid 20059. In other various aspects, the method further comprises steps for calculating capacity availability by taking a total current capacity and subtracting all reserved capacity reserved for one or more units and one or more subunits for each unit on-demand reserved capacity 20061.

In another embodiment as shown in FIG. 20D, a computer program 20063 comprising computer-usable readable storage medium 20065 for implementing one or more steps of a renewable energy algorithm 20067 having computer-readable program code 20069 embodied therein for causing a computer system to perform a method of iterative schedule development 20071 in one or more networked renewable energy site integration systems 20073 energy management system, comprises operably configuring one or more networked, site integration systems 20075 capable of local storage of one or more locally generated renewable energy resources 20077 to virtually link to one or more energy cloud edge controllers 20079; an element for a requested schedule comprising any mix of mandatory and limit load shaping activities capable of receiving an input from a calling application in the one or more networked, site integration systems 20081; a module for a response schedule created upon comparison to the request schedule 20083; a data processing system for a data repository of one or more response schedules for scheduled response execution 20085; a programmable means for a returning a response schedule, a returned response schedule acceptance status identifier 20087; and an acceptance update identifier for the scheduled response execution 20089; and an iterative load shaping scheduler rules engine wherein if the returned response schedule conforms to a most restrictive priorities and a best fit algorithm of the calling application, then the load shaping service returns, but does not schedule, only those schedules that 20091.

In other aspects and continuing with FIG. 20D, the computer program further comprises configuring an energy cloud software platform comprising one or more programs to associate with one or more locally generated renewable energy resources; and operably configure one or more energy cloud edge controllers to couple one or more energy cloud platforms 20093. In other various aspects, the computer program further comprises the calling application further configured to provide a calling application that assembles one or more possible load shaping schedules having restrictive priorities and best fit algorithms, wherein each of the one or more possible load shaping schedules provided to the load shaping service has an asset command of set never 20095; return the one or more possible response schedules to the load shaping service of one or more possible load shaping schedules for each requested schedules and the load shaping service does not store each requested schedule 20097; submit to the load shaping service to re-examine one or more possible response schedules returned by the calling application 20099; loop back to provide the calling application to assemble one or more possible load shaping schedules having restrictive priorities and best fit algorithms to make iterative changes to look for one or more schedules that match the calling applications' needs 20101; and submit a command of set always, when the calling application is satisfied with one of the response schedules submitted to the load shaping service 20103. In other various aspects, the computer program further comprises steps for requesting an execution of one or more load scheduling activities via the calling application to call a load shaping service with a load schedule for future energy and power reservation needs 20105; overriding a current status of one or more load scheduling activities if the load shaping service was able to execute one or more load scheduling activities 20107; rejecting the execution of one or more load scheduling activities if the load shaping service cannot execute of one or more load scheduling activities 20109; reducing the duration of the requested execution of one or more load scheduling activities if the load shaping service cannot execute the requested execution 20111; and implementing, by the computer system, an iterative load shaping scheduler rules engine wherein if a scheduler conforms to an emergency load request and a best fit algorithm of the calling application, then the load shaping service returns request schedules, but does not schedule request schedules of one or more load scheduling activities, the load shaping service only implements those request schedules that meet the calling application's requirements for confirmation to the response schedules 20113. In another variation, the computer program further comprises steps for implementing the response schedule from the request schedule in twenty-four hour periods 20115; and evenly dividing each twenty-four hour period, if a value is not provided the load shaping service provides for thirty minute time intervals 20117. In another configuration, the computer program further comprises steps for including time intervals with definite activities, including time intervals with optional activities, including time intervals when the load shaping service determines its own activities 20119. In other aspects the computer program is provided wherein definite activities include charge, discharge and no action 20121. In another configuration, the computer program is provided wherein optional activities allow the load shaping service to manage the services future energy and power reservation needs and include charge limit and discharge limit 20123. In other aspects, the computer program is provided wherein, each load service state energy site integration system is coupled to and integral to one or more renewable energy resources 20125. In other various aspects, the computer program is provided wherein, the load shaping service cannot execute the requested schedule due to inadequate capacity reservations of the one or more renewable energy resources 20127. In other certain aspects, the computer program is provided wherein, the load shaping service define requested schedule and alter it based on available capacity and forward capacity planning 20129. In another aspect, the computer program further comprises coupling one or more renewable energy resources with one or more programs to one or more requested load shaping schedules in an energy cloud software platform 20131. In another configuration, the computer program is provided wherein transformations applied from a requested schedule to a response schedule are specified by the load shaping service's capabilities and the load shaping services algorithm specified for handling mismatches between the requested schedule and the response schedule and, specified for handling the capacity reserved for non-load shaping functions for the twenty-four hour period 20133.

In other certain aspects and continuing with FIG. 20D, the computer program is provided wherein a charge activity requires the load shaping service request that power be pulled from the grid 20135. In other certain aspects, the computer program is provided wherein a discharge activity requires the load shaping service request that power be dispatched to the grid and other loads 20137. In another configuration, the computer program is provided wherein a no action activity requires the load shaping service does not have a net charge or discharge for the length of a scheduled time interval 20139. In yet another arrangement, the computer program further comprises program for to execute steps for accepting one or more emergency load requests if the load shaping service cannot execute the request 20141. In another arrangement, the computer program further comprises steps for reducing the rate of the requested execution of one or more load scheduling activities if the load shaping service cannot execute the request 20143.

In an embodiment as shown in FIG. 21, a method for load shaping grid-scale functions in an energy site integration system including one or more DER-ES apparatus 21000 comprises steps for requesting execution of one or more load scheduling activities via a calling application to call a load shaping service with a load schedule for future needs 21002; assessing the capability of the load shaping service to execute of one or more load scheduling activities 21004; determining a current capacity of the load shaping service prior to execution of one or more load scheduling activities 21006; determining all current status of one or more load scheduling activities on the load shaping service 21008; setting the requested execution of one or more load scheduling activities on the load shaping service with divided twenty-four hour time intervals to a new response schedule 21010; and implementing, by a computer system, an iterative load shaping scheduler rules engine wherein if a scheduler conforms to an emergency load request and a best fit algorithm of the calling application, then the load shaping service returns request schedules, but does not schedule request schedules of one or more load scheduling activities, the load shaping service only implements those request schedules that meet the calling application's "best fit" requirements for confirmation to the response schedule 21012.

In certain aspects and continuing with FIG. 21, the method for load shaping grid-scale functions in an energy site integration system comprises steps for providing a reservation mechanism to reserve power and energy for services additional to load shaping such as other on-demand functions 21014. In other various aspects, the prior method in this paragraph is provided wherein the reservation mechanism is an emergency load control to support reservations for aggregated grid-scale function 21016. In further various aspects, the method for load shaping grid-scale functions in an energy site integration system is provided wherein the reservations for aggregated grid-scale function is the amount of capacity reserved for discharging to the grid and/or local loads 21018; the amount of capacity reserved for charging from the grid for the specified reservation function 21020; and the on-demand request that for which reservation is required 21022. In another configuration, the methods of this paragraph are provided wherein the emergency load control supports instant demand response, rapid response operational reserve to allow additional spinning reserve, frequency response, voltage sag correction, and any other activity that requires rapidly injecting power to the grid or rapidly removing power from the grid 21024.

In other certain aspects and continuing with FIG. 21, the methods above for load shaping grid-scale functions in an energy site integration system further comprises steps for rejecting the requested execution of one or more load scheduling activities if the load shaping service cannot execute of one or more load scheduling activities 21026; reducing the rate of the requested execution of one or more load scheduling activities if the load shaping service cannot execute the request 21028; and reducing the duration of the requested execution of one or more load scheduling activities if the load shaping service cannot execute the request 21030.

In other certain aspects and continuing with FIG. 21, the methods above for load shaping grid-scale functions in an energy site integration system further comprises steps for implementing the response schedule from the request schedule in twenty-four hour periods 21032; and evenly dividing each twenty-four hour period, if a value is not provided the load shaping service provides for thirty minute time intervals 21034.

In other certain aspects and continuing with FIG. 21, the methods above for load shaping grid-scale functions in an energy site integration system further comprises steps for including time intervals with definite activities 21036; including time intervals with optional activities 21038; and including time intervals when the load shaping service determines its own activities 21040.

In another configuration and continuing with FIG. 21, the methods above for load shaping grid-scale functions in an energy site integration system are provided wherein definite activities include charge, discharge and no action 21042. In other aspects, these methods are provided wherein optional activities allow the load shaping service to manage the services future needs and include charge limit and discharge limit 21044. In yet other aspects, the methods are provided wherein each site integration system has one or more renewable energy resources 21046.

In another configuration and continuing with FIG. 21, the methods above for load shaping grid-scale functions in an energy site integration system are provided wherein the load shaping service cannot execute the requested schedule due to inadequate capacity reservations of the one or more renewable energy resources 21048.

In another configuration and continuing with FIG. 21, the methods above for load shaping grid-scale functions in an energy site integration system are provided wherein the load shaping service defines requested schedule and alter it based on available capacity and forward capacity planning 21050.

In other certain aspects and continuing with FIG. 21, the methods above for load shaping grid-scale functions in an energy site integration system further comprises associating one or more renewable energy resources with one or more programs to one or more requested load shaping schedules in an energy cloud software platform 21052.

In other certain aspects and continuing with FIG. 21, the methods above for load shaping grid-scale functions in an energy site integration system further comprises providing a network edge device having an application program interface virtually coupled to the energy cloud software platform 21054; and coupling one or more energy site integration systems including one or more DER-ES apparatus to one or more renewable energy resources with one or more programs and to one or more requested load shaping schedules in an energy cloud software platform, wherein the application program interface is coupled to one or more requested load shaping schedules in the energy cloud software platform 21056.

In other certain aspects and continuing with FIG. 21, the methods above for load shaping grid-scale functions in an energy site integration system further comprises controlling all of the one or more energy site integration systems having one or more renewable energy resources having one or more programs with the network edge device via the application program interface 21058.

In another configuration and continuing with FIG. 21, the methods above for load shaping grid-scale functions in an energy site integration system are provided wherein a charge activity requires the load shaping service request that power be pulled from the grid 21060.

In another configuration and continuing with FIG. 21, the methods above for load shaping grid-scale functions in an energy site integration system are provided wherein a discharge activity requires the load shaping service request that power be dispatched to the grid and other loads 21062.

In another configuration and continuing with FIG. 21, the methods above for load shaping grid-scale functions in an energy site integration system are provided wherein a no action activity requires the load shaping service does not have a net charge or discharge for the length of a scheduled time interval 21064. Overall, the methods described herein for load shaping grid-scale functions in an energy site integration system including one or more DER-ES apparatus are provided including one or more steps for associating one or more renewable energy resources with one or more programs to implement one or more services in an energy cloud software platform coupled to one or more networked distributed energy resource energy storage apparatus controlling one or more inverters to send charge and discharge instructions in response to one or more load shaping grid-scale functions.

In an embodiment as shown in FIG. 22, a method for providing a forward event schedule in an energy demand response system 22000 comprises overriding a current load shaping schedule request if the load shaping service was able to execute the request 22002; requesting that power be dispatched or pulled from the grid, as needed to execute the request 22004; accepting one or more emergency load requests, as needed to execute the request 22006; rejecting the request if the load shaping service cannot execute the request 22008; reducing the duration of the request if the load shaping service cannot execute the request 22010; reducing the rate of the request if the load shaping service cannot execute the request 22012; implementing, by a computer system, an iterative load shaping on-demand request scheduler rules engine wherein if the scheduler conforms to an emergency load request and a best fit algorithm of a calling application, then the load shaping service returns, but does not schedule the request, only those schedules requested that meet the calling application requirements for confirmation of the response to return one or more modified load shaping schedules 22014; and associating one or more renewable energy resources with one or more programs to one or more modified load shaping schedules in an energy cloud software platform 22016.

In certain aspects and continuing with FIG. 22, the method for providing a forward event schedule in an energy demand response system is provided wherein the load shaping service will retrieve the provided request and include steps for creating a new request schedule that takes into account the requested schedule, capabilities of the load shaping service, current capacity of the load shaping service, and other scheduled requests on the load shaping service 22018; setting the schedule for the appropriate time frame to the new schedule 22020; returning a new schedule, though the new schedule may not match the requested schedule in all ways, wherein if the load shaping service cannot meet the entire schedule's requirements, the load shaping schedule will return a schedule that is a best fit, using the specified best fit algorithm indicated using the request schedule 22022.

In other various aspects and continuing with FIG. 22, the method for providing a forward event schedule in an energy demand response system further comprises steps for identifying one or more requested loads wherein the load shaping service includes inadequate capacity 22024; creating a best fit algorithm to modify the request schedule to match the load shaping service's capabilities and the load shaping service's capacity with the requested schedule 22026.

In further certain aspects and continuing with FIG. 22, the method for providing a forward event schedule in an energy demand response system is provided wherein the load shaping schedule includes a twenty-four hour period of load shaping activities, broken into time blocks of equal duration, wherein each time block has a LoadShapingScheduleEntry routine that defines the activity that could be taken during that period, wherein the routine further defines capacity reservations for non-load shaping functionality, and other optional parameters 22028.

In other certain aspects and continuing with FIG. 22, the method for providing a forward event schedule in an energy demand response system further comprises steps for linking an external application or service with a load shaping service that includes a load shaping schedule with blocks of time for definite activities (CHARGE, DISCHARGE, NO_ACTION), blocks of time with optional activities to allow the load shaping service to manage for future needs (CHARGE_LIMIT, DISCHARGE_LIMIT), and blocks of time in which the load shaping service is free to decide for itself what it needs to do (ANY_ACTION) 22030.

In various aspects and continuing with FIG. 22, the method for providing a forward event schedule in an energy demand response system is provided wherein an activity can either be mandatory (CHARGE, DISCHARGE), or can represent an activity that the load shaping service could execute in order to prepare for future load shaping activities and system functions 22032.

In other certain aspects and continuing with FIG. 22, the method for providing a forward event schedule in an energy demand response system further comprises steps for providing an emergency load control supporting instant demand rapid response 22034. In other certain aspects, the method for providing a forward event schedule in an energy demand response system further comprises steps for allowing rapid response operational reserve functions to rapidly adjust power from the grid selected from the group consisting of additional spinning reserve, frequency response, and voltage sag correction 22036. In other certain aspects, the method for providing a forward event schedule in an energy demand response system further comprises steps for rejecting any Set On Demand Request that the load shaping service cannot commit to executing fully 22038.

In other certain aspects and continuing with FIG. 22, the method for providing a forward event schedule in an energy demand response system further comprises steps for setting a status identifier to indicate whether the load shaping service is experiencing serious issues and blocking its ability to satisfy both load shaping and other on-demand services 22040; setting a status identifier to indicate whether the load shaping service is experiencing issues that may block it from being able to satisfy some current or future load shaping, on-demand reservations; and setting a status identifier to indicate whether the load shaping service is healthy, although not all subsystems may be functional 22042. Overall, the methods described herein for providing a forward event schedule in an energy demand response system in an energy site integration system including one or more DER-ES apparatus are provided including one or more steps for associating one or more renewable energy resources with one or more programs to implement one or more services in an energy cloud software platform coupled to one or more networked distributed energy resource energy storage apparatus controlling one or more inverters to send charge and discharge instructions in response to one or more methods of providing a forward event schedule in an energy demand response system.

In an embodiment as shown in FIG. 23, a method for requesting a load shaping service state in an energy demand response system 23000, comprises steps for requesting a current status of a load shaping service 23002; requesting an energy report from the load shaping service, providing aggregated energy usage in different categories, for a specific period of time 23004; and implementing, by a computer system, an iterative load service state request rules engine retrieving the load shaping service for a specific group, retrieving the status of the entire load shaping service, retrieving the energy report for a specific group, or retrieving the energy report for the entire load shaping service 23006.

In another aspect of the embodiment of FIG. 23, the method for requesting a load shaping service state in an energy demand response system may alternately include steps for implementing an energy report that further comprises a start and end time 23008; providing a summary of energy transferred during that time including: Energy offset—an amount of energy (in kWh) output by the load shaping service during the requested time period, including energy that did not reach the grid because of local consumption, Energy stored from the grid—an amount of energy (in kWh) taken from the grid and placed into storage during the requested time period, Energy generated—an amount of energy (in kWh) generated by resources associated with the load shaping service during the requested time period, Energy stored—an amount of energy (in kWh) stored, both from generation resources and the grid, during the requested time period, Energy discharged—an amount of energy (in kWh) discharged from storage during the requested time period, Energy passed through—an amount of energy (in kWh) that passed through load shaping service subunits during the requested time period 23010.

In another aspect of the embodiment of FIG. 23, the method for requesting a load shaping service state in an energy demand response system may alternately include steps for providing a status report that further comprises health indicator information 23012; power and energy data available for on-demand operations 23014; and power readings including: Power offset—an amount of power (in kW) being output by the load shaping service, including power that does not reach the grid because of local consumption, Power stored from the grid—an amount of power (in kW) being taken from the grid and placed into storage, Power generated—an amount of power (in kW) being generated by resources associated with the load shaping service, Power stored—an amount of power (in kW) being stored, both from generation resources and the grid, Power discharged—an amount of power (in kW) being discharged from storage, and Power passed through—an amount of power (in kW) passing through load shaping service subunits 23016.

In another aspect of the embodiment of FIG. 23, the method for requesting a load shaping service state in an energy demand response system may alternately include steps wherein the load shaping service will retrieve the provided request and implement, by the computer system 23018 and further steps for creating a new schedule that takes into account the requested schedule, capabilities of the load shaping service, current capacity of the load shaping service, and other scheduled requests on the load shaping service 23020; setting the schedule for the appropriate time frame to the new schedule 23022; and returning a new schedule, although the new schedule may not match the requested schedule in all ways, wherein if the load shaping service cannot meet the entire new schedule's requirements, the load shaping schedule will return a schedule that is a best fit, using the specified best fit algorithm indicated using the request 23024.

In another aspect of the embodiment of FIG. 23, the method for requesting a load shaping service state in an energy demand response system may alternately include further steps for rejecting a requested load shaping service schedule due to inadequate capacity 23026; and creating a best fit algorithm identifying to determine how load shaping service will modify the request schedule to match the load shaping service's capabilities and the load shaping service's capacity with the requested schedule 23028.

In another aspect of the embodiment of FIG. 23, the method for requesting a load shaping service state in an energy demand response system may alternately include further steps wherein the load shaping schedule includes a twenty-four hour period of load shaping activities, broken into time blocks of equal duration, wherein each time block has a LoadShapingScheduleEntry that defines the activity that could be taken during that period, capacity reservations for non-load shaping functionality, and other parameters 23030. In other various aspects, the method may include steps wherein an external application or service calling the load shaping service with a load shaping schedule that includes blocks of time with definite activities (CHARGE, DISCHARGE, NO_ACTION), blocks of time with optional activities to allow the load shaping service to manage for future needs (CHARGE_LIMIT, DISCHARGE_LIMIT), and blocks of time in which the load shaping service is free to decide for itself what it needs to do (ANY_ACTION) 23032; and in other various aspects, the method may alternately include further steps wherein an activity can either be mandatory (CHARGE, DISCHARGE), or can represent an activity that the load shaping service could execute in order to prepare for either future load shaping activities, or for other system functions 23034. In yet other aspects, the method may further comprise steps for providing an emergency load control 23036. In other various aspects, the method may further comprise steps for setting a status identifier to indicate whether the load shaping service is experiencing serious issues, blocking its ability to satisfy both load shaping and other on-demand services 23038; setting a status identifier to indicate whether the load shaping service is experiencing issues that may block it from being able to satisfy some current or future load shaping or other on-demand reservations 23040; and setting a status identifier to indicate whether the load shaping service is healthy, although not all subsystems may be functional 23042. In other aspects of the methods of FIG. 23, steps may be included wherein the emergency load control supports instant demand response, rapid response operational reserve to allow engaging additional spinning reserve, frequency response, voltage sag correction, and any other functionality that requires rapidly injecting or removing power from the grid 23044.

In another aspect of the embodiment of FIG. 23, the method for requesting a load shaping service may further include steps wherein the load shaping service rejecting any SetOnDemandRequest that the load shaping service cannot commit to executing fully 23046. Overall, the methods described herein for requesting a load shaping service in an energy demand response system in an energy site integration system including one or more DER-ES apparatus are provided including one or more steps for associating one or more renewable energy resources with one or more programs to implement one or more services in an energy cloud software platform coupled to one or more networked distributed energy resource energy storage apparatus controlling one or more inverters to send charge and discharge instructions in response to one or more methods of requesting a load shaping service in an energy demand response system.

In an embodiment as shown in FIG. 24, a method of operating virtual energy resource software in a network coupled to one or more networked distributed energy resource storage apparatus 24000 comprises providing one or more gateway controllers having one or more programs controlling the one or more networked a distributed energy resource energy storage apparatus 24002; automatically polling one or more programs for a requested mode at a reporting interval 24004; assigning a ranking identifier to the requested mode of each of the one or more programs 24006; and determining a highest priority set of programs from among the requested mode of each of the one or more programs 24008.

In certain aspects and continuing with FIG. 24, the method of operating virtual energy resource software in a network coupled to one or more networked distributed energy resource storage apparatus further comprises steps for providing an energy cloud software platform communicating with the one or more intelligent edge gateway controllers to send and receive the aggregate site and grid requirements of the one or more networked distributed energy resources 24010; coupling one or more predictive analytic software modules to improve performance of the one or more distributed energy resources having one or more one or more removable energy storage modules 24012; viewing data related to one or more user sites associated with each of the one or more networked distributed energy resource storage apparatus through a consumer web portal 24014; linking one or more programs associated with one or more users of the one or more grid site management systems and aggregate-site management system associated with the one or more gateway controllers to an Internet user interface including one or more application programming interfaces 24016.

In other certain aspects and continuing with FIG. 24, the method of operating virtual energy resource software in a network coupled to one or more networked distributed energy resource storage apparatus further comprises steps for coupling a shunt switch for physically isolating one or more removable energy storage modules and coupling to an isolation switch panel assembly via at least one unique safety connector mechanism and an electrical bus to the energy storage module terminals to a main bus which connects to a charge controller and one or more inverters one or more removable energy storage modules 24018; communicating with one or more consumer web portals, one or more Internet user interfaces, one or more advanced meter infrastructures associated with at least one grid, and one or more energy area networks via a utility enterprise relational database application with at least one or more consumer web portals, one or more Internet user interfaces, one or more advanced meter infrastructures associated with at least one grid, and one or more energy area networks 24020; accessing via a virtual energy pool to receive signals from each one of one or more programs to determine an active mode for each of the one or more programs one or more networked renewable energy site integration systems 24022; virtually linking one or more gateway controllers to the grid control center, virtual energy pool and a distributed energy management system embodying one or more sets of rules and one or more sets of constraints to provide a fault tolerance analytics module, an virtualization module 24024; and allowing a user via one or more sets of rules and said one or more sets of constraints to implement multiple sets of rules and constraints which govern various resources selected from the group consisting of forward power reservation, forward energy reservation, power use, pricing signals, cost signals to identify one or more incremental storage cycles, marginal cost management of cycle life degradation, virtual power plant orchestration, iterative schedule 24026.

In further certain aspects and continuing with FIG. 24, the method of operating virtual energy resource software in a network coupled to one or more networked distributed energy resource storage apparatus further comprises steps for coupling an advanced meter infrastructure to the internet user interface and at least one utility power grid; coupling one or more user site energy area network's to one or more local data processing gateways to monitor and control one or more distributed energy resources 24028; dispatching power from at least one utility power grid to the one or more user sites associated with each of the one or more distributed energy management resources apparatus 24030; and requesting a scheduled request to dispatch power to the one or more sites associated with each of the one or more distributed energy resources apparatus upon at least one site invoking one or more defined monitoring or one or more defined control methods 24032.

In other various aspects and continuing with FIG. 24, the method of operating virtual energy resource software in a network coupled to one or more networked distributed energy resource storage apparatus further comprises steps for providing one or more energy resource local events each associated with a distributed energy resource energy storage apparatus such that the one or more energy resource local events, when controlled by a common cloud-based energy management software, provide one or more localized energy services to the one or more distributed energy resources and energy storage objects associated with the distributed energy storage apparatus wherein each of the distributed energy storage apparatus encloses a system comprising an inverter-controller, storage appliance, and gateway controller that function as a site integration system 24034; and providing one or more gateway controllers having one or more processors for performing localized and remote control, storage and generation energy management, in communication with the cloud software platform, wherein a portion of the one or more processors provide instructions to one or more computer programs having one or more networked distributed energy management systems to control one or more user site loads and to monitor one or more distributed resources to simultaneously negotiate user site and grid requirements 24036.

In further various aspects and continuing with FIG. 24, the method of operating virtual energy resource software in a network coupled to one or more networked distributed energy resource storage apparatus further comprises steps for coupling a cloud controller with the cloud software platform and at least one of the one or more gateway controllers of each one of the one or more distributed energy resource energy storage apparatus or one or more electric vehicle energy control center gateways to aggregate distributed energy resources, energy storage, and electric vehicle resources and implement charge and discharge plans of the distributed energy, energy storage, and electric vehicle resources 24038.

In other aspects and continuing with FIG. 24, the method of operating virtual energy resource software in a network coupled to one or more networked distributed energy resource storage apparatus is provided wherein the cloud controller coupled to one or more gateway devices of one or more distributed energy resource energy storage apparatus implements orchestration to create charge and discharge plans of the one or more distributed energy resource energy storage apparatus and one or more electric vehicle energy control centers, wherein the one or more distributed energy storage apparatus and one or more electric vehicle energy control centers behave as a single entity, in response to one or more grid control systems 24040.

In other aspects and continuing with FIG. 24, the method of operating virtual energy resource software in a network coupled to one or more networked distributed energy resource storage apparatus is provided wherein the orchestration implements a virtual power plant 24042. In other aspects, the method of operating virtual energy resource software in a networking coupled to one or more networked distributed energy resource storage apparatus is provided wherein the virtual power plant is a load shaping service 24044.

In further various aspects and continuing with FIG. 24, the method of operating virtual energy resource software in a network coupled to one or more networked distributed energy resource storage apparatus further comprises steps for associating one or more energy storage objects each with an integrated device apparatus that together behave as a single energy entity when controlled by one or more common elements of one or more energy management software applications 24046; associating one or more energy resource local events each with a distributed energy resource energy storage apparatus such that the one or more energy resource local events, when controlled by a common cloud-based energy management software, behave as a single energy entity, wherein each of the distributed energy resource energy storage apparatus encloses a system comprising an inverter-controller, storage appliance, and gateway controller that function as a site integration system 24048; communicating one or more intelligent gateway controllers to send and receive the user site and grid requirements of the one or more distributed resources with an energy cloud software platform 24050; improving performance of the one or more distributed resources by one or more predictive analytic software modules 24052; providing one or more virtual power plant software modules to provide a best mix selection from demand and supply data simultaneously communicated by the user site and grid requirements of the one or more distributed resources 24054; providing one or more user interfaces to access a local user grid interface and a consumer portal, wherein the local user grid access interface to access to a best mix selection of demand and supply data simultaneously communicated by the user site and grid requirements of the one or more distributed resources 24056; and automatically providing a network of one or more aggregated apparatus acting as a fleet to orchestrate services to each one of the one or distributed energy resource energy storage apparatus coupled to a distributed energy management system and electric vehicle energy control center 24058.

In other aspects and continuing with FIG. 24, the method of operating virtual energy resource software in a network coupled to one or more networked distributed energy resource storage apparatus is provided wherein the set of virtual devices are one or more device drivers to translate common format commands to control signals for driving one or more physical devices to a desired state 24060. In other aspects, the method of operating virtual energy resource software in a networking coupled to one or more networked distributed energy resource storage apparatus is provided wherein the set of virtual devices collects status information from the one or more physical devices for transfer to a network cloud 24062.

In other aspects and continuing with FIG. 24, the method of operating virtual energy resource software in a network coupled to one or more networked distributed energy resource storage apparatus is provided wherein the set of virtual devices communicate with the one or more physical devices via a data communications interface 24064. In other aspects, the method of operating virtual energy resource software in a networking coupled to one or more networked distributed energy resource storage apparatus is provided wherein the set of virtual devices can be executed in a hierarchical process 24066.

In other aspects and continuing with FIG. 24, the method of operating virtual energy resource software in a network coupled to one or more networked distributed energy resource storage apparatus is provided wherein at least one of the one or more software programs is an override process that sends one or more control commands to the set of virtual devices to transition immediately to a specified state 24068.

In other aspects and continuing with FIG. 24, the method of operating virtual energy resource software in a network coupled to one or more networked distributed energy resource storage apparatus is provided, wherein each one of the virtual devices of the set of virtual devices can report state parameters, operational history, errors, configuration parameters, and telemetry data to a server and wherein the data from each virtual device may be aggregated in a device report delivered to a remote cloud computing platform 24070.

In other aspects and continuing with FIG. 24, the method of operating virtual energy resource software in a network coupled to one or more networked distributed energy resource storage apparatus is provided wherein the server includes a user interface and one or more application programming interfaces to communicate one or more API messages with network system components wherein the commands associated with the one or more API messages are queued in a server command queue 24072.

In other aspects and continuing with FIG. 24, the method of operating virtual energy resource software in a network coupled to one or more networked distributed energy resource storage apparatus is provided wherein the storage and energy resources and electric vehicle resources are remotely managed and controlled by a software-as-a-service (SAAS) platform that aggregates one or more systems together in real-time to deliver dynamically scaled energy and information resources across the grid on demand 24074.

In further various aspects and continuing with FIG. 24, the method of operating virtual energy resource software in a network coupled to one or more networked distributed energy resource storage apparatus further comprises steps for providing a load shaping service application programming interface having a load shaping scheduling module having one or more schedule requests and one or more schedule responses 24076; evaluating the one or more schedule requests via a scheduled request execution engine with the one or more schedule responses to calculate an initial load shaping schedule 24078; coupling an emergency load control override routine module with the initial load shaping schedule 24080; associating one or more group identifiers with one or more resources that correspond to one or more load shaping services 24082; associating an energy cloud software platform comprising one or more programs with one or more distributed renewable energy resources 24084; providing one or more virtual power plant, load shaping service software modules with a best mix selection from demand and supply data simultaneously communicated by the user site and grid requirements of the one or more distributed renewable energy resources 24086; virtually coupling an energy cloud controller to the energy cloud software program 24088; and virtually coupling one or more networked, distributed energy resource energy storage apparatus with a remote energy cloud software platform, wherein each of the distributed energy resource energy apparatus is capable of local storage of locally generated renewable energy resources but acts together in a network as a single entity 24090.

In other aspects and continuing with FIG. 24, the method of operating virtual energy resource software in a network coupled to one or more networked distributed energy resource storage apparatus is provided wherein at least one or more of the one or more programs receives a pricing signal 24092.

In further various aspects and continuing with FIG. 24, the method of operating virtual energy resource software in a network coupled to one or more networked distributed energy resource storage apparatus further comprises steps for ranking each of the one or more programs of one or more networked renewable energy distributed energy resource storage apparatus via a prioritization module accessed via a remote virtual energy pool 24094; determining an active mode for each of the one or more programs via evaluation engine to receive and store signals from each one of the one or more programs 24096; and providing one or more communication protocols to link one or more gateway controllers with the remote virtual energy pool, with one or more electric vehicle energy control centers, and one or more distributed energy management systems for controlling one or more distributed energy resources and one or more energy storage objects, each associated with the one or more distributed energy resource storage apparatus, and for controlling one or more electric vehicle energy resources associate with one or more electric vehicle energy control centers 24098.

In another embodiment as shown in FIG. 25, a method for providing an on-demand request 25000, comprises steps for overriding a current load shaping schedule if a load shaping service was able to execute the request 25002; requesting that power be dispatched or pulled from the grid; accepting one or more emergency load requests 25004; rejecting the request if the load shaping service cannot execute the request 25006; reducing the duration of the request if the load shaping service cannot execute the request 25008; reducing the rate of the request if the load shaping service cannot execute the request 25010; associating one or more renewable energy resources with one or more programs to one or more modified load shaping schedules in an energy cloud software platform 25012; and implementing, by a computer system, an iterative load shaping on-demand request scheduler rules engine wherein if the scheduler conforms to an emergency load request and a best fit algorithm of a calling application, then the load shaping service returns, but does not schedule, only those schedules that meet the calling application requirements for confirmation of the response 25016.

In certain aspects and continuing with FIG. 25, the method for providing an on-demand request is provided wherein the load shaping service will retrieve the provided request and further includes steps for creating a new schedule that takes into account the requested schedule, capabilities of the load shaping service, current capacity of the load shaping service, and other scheduled requests on the load shaping service 25018; setting the schedule for the appropriate time frame to the new schedule 25020; returning a new schedule, although the new schedule may not match the requested schedule in all ways, wherein if the load shaping service cannot meet the entire schedule's requirements, the load shaping schedule will return a schedule that is a best fit, using the specified best fit algorithm indicated using the request 25022.

In other certain aspects and continuing with FIG. 25, the method for providing an on-demand request is provided wherein the load shaping service may not be able to handle the requested load shaping service because of inadequate capacity, and a best fit algorithm identifying how the load shaping service should modify the request schedule to match its capabilities and capacity with the requested schedule 25024.

In other certain aspects and continuing with FIG. 25, the method for providing an on-demand request is provided wherein the load shaping schedule includes a twenty-four hour period of load shaping activities, broken into time blocks of equal duration, wherein each time block has a LoadShapingScheduleEntry that defines the activity that could be taken during that period, capacity reservations for non-load shaping functionality, and other optional parameters 25026.

In other certain aspects and continuing with FIG. 25, the method for providing an on-demand request is provided wherein an external application or service calling the load shaping service with a load shaping schedule that includes blocks of time with definite activities (CHARGE, DISCHARGE, NO_ACTION), blocks of time with optional activities to allow the load shaping service to manage for future needs (CHARGE_LIMIT, DISCHARGE_LIMIT), and blocks of time in which the load shaping service is free to decide for itself what it needs to do (ANY_ACTION) 25028.

In other certain aspects and continuing with FIG. 25, the method for providing an on-demand request is provided wherein an activity can either be mandatory (CHARGE, DISCHARGE), or can represent an activity that the load shaping service could execute in order to prepare for either future load shaping activities, or for other system functions 25030.

In other certain aspects and continuing with FIG. 25, the method for providing an on-demand request is provided wherein an emergency load control supporting instant demand response, rapid response operational reserve to allow engaging additional spinning reserve, frequency response, voltage sag correction, and any other functionality that requires rapidly injecting or removing power from the grid 25032.

In other certain aspects and continuing with FIG. 25, the method for providing an on-demand request is provided wherein setting one or more status identifiers to display a load shaping service status wherein if the load shaping service is experiencing serious issues, the load shaping service sends a signal to prevent satisfying both load shaping and other on-demand services 25034; setting one or more status identifiers to display whether the load shaping service is experiencing issues that may block it from being able to satisfy some current or future load shaping or other on-demand reservations 25036; and setting one or more status identifiers to display whether the load shaping service is healthy, although not all subsystems may be functional 25038. In other aspects, the method for providing an on-demand request is provided including associating one or more renewable energy resources with one or more programs to implement one or more services in an energy cloud software platform coupled to one or more networked distributed energy resource energy storage apparatus functioning as a site integration system controlling one or more inverters to send charge and discharge instructions in response to an on-demand request.

In another embodiment as shown in FIG. 26, a method for requesting a load service state 26000, comprises steps for requesting a current status of a load shaping service 26002, wherein the status report includes health indicator information 26004, power and energy available for on-demand operations 26006, and power readings 26008 including: Power offset—an amount of power (in kW) being output by the load shaping service, including power that does not reach the grid because of local consumption, Power stored from the grid—an amount of power (in kW) being taken from the grid and placed into storage, Power generated—an amount of power (in kW) being generated by resources associated with the load shaping service, Power stored—an amount of power (in kW) being stored, both from generation resources and the grid, Power discharged—an amount of power (in kW) being discharged from storage, and Power passed through—an amount of power (in kW) passing through load shaping service subunits 26010; requesting an energy report from the load shaping service 26012, providing aggregated energy usage in different categories 26014, for a specific period of time, wherein the energy report includes a start and end time; a summary of energy transferred during that time including: Energy offset—an amount of energy (in kWh) output by the load shaping service during the requested time period, including energy that did not reach the grid because of local consumption, Energy stored from the grid—an amount of energy (in kWh) taken from the grid and placed into storage during the requested time period, Energy generated—an amount of energy (in kWh) generated by resources associated with the load shaping service during the requested time period, Energy stored—an amount of energy (in kWh) stored, both from generation resources and the grid, during the requested time period, Energy discharged—an amount of energy (in kWh) discharged from storage during the requested time period, Energy passed through—an amount of energy (in kWh) that passed through load shaping service subunits during the requested time period 26016; implementing, by a computer system, an iterative load service state request rules engine retrieving the load shaping service for a specific group, retrieving the status of the entire load shaping service, retrieving the energy report for a specific group, or retrieving the energy report for the entire load shaping service 26018.

In certain aspects and continuing with FIG. 26, the method for requesting a load service state comprises steps for requesting a current status of a load shaping service wherein the load shaping service will retrieve the provided request and includes steps for creating a new schedule that takes into account the requested schedule, capabilities of the load shaping service, current capacity of the load shaping service, and other scheduled requests on the load shaping service 26020; setting the schedule for the appropriate time frame to the new schedule 26022; returning a new schedule, although the new schedule may not match the requested schedule in all ways, wherein if the load shaping service cannot meet the entire schedule's requirements, the load shaping schedule will return a schedule that is a best fit, using the specified best fit algorithm indicated using the request 26024.

In other certain aspects and continuing with FIG. 26, the method for requesting a load service state comprises steps for requesting a current status of a load shaping service wherein the load shaping service may not be able to handle the requested load shaping service because of inadequate capacity, and a best fit algorithm identifying how the load shaping service should modify the request schedule to match its capabilities and capacity with the requested schedule 26026.

In other certain aspects and continuing with FIG. 26, the method for requesting a load service state comprises steps for requesting a current status of a load shaping service wherein the load shaping schedule includes a twenty-four hour period of load shaping activities, broken into time blocks of equal duration, wherein each time block has a LoadShapingScheduleEntry that defines the activity that could be taken during that period, capacity reservations for non-load shaping functionality, and other optional parameters 26028.

In other certain aspects and continuing with FIG. 26, the method for requesting a load service state comprises steps for requesting a current status of a load shaping service wherein an external application or service calling the load shaping service with a load shaping schedule that includes blocks of time with definite activities (CHARGE, DISCHARGE, NO_ACTION), blocks of time with optional activities to allow the load shaping service to manage for future needs (CHARGE_LIMIT, DISCHARGE_LIMIT), and blocks of time in which the load shaping service is free to decide for itself what it needs to do (ANY_ACTION) 26030.

In other certain aspects and continuing with FIG. 26, the method for requesting a load service state comprises steps for requesting a current status of a load shaping service wherein an activity can either be mandatory (CHARGE, DISCHARGE), or can represent an activity that the load shaping service could execute in order to prepare for either future load shaping activities, or for other system functions 26032.

In other certain aspects and continuing with FIG. 26, the method for requesting a load service state comprises steps for requesting a current status of a load shaping service wherein an emergency load control supporting instant demand response, rapid response operational reserve to allow engaging additional spinning reserve, frequency response, voltage sag correction, and any other functionality that requires rapidly injecting or removing power from the grid 26034. In other certain aspects, the method for requesting a load service state comprises steps for requesting a current status of a load shaping service wherein the load shaping service rejecting any SetOnDemandRequest that the load shaping service cannot commit to executing fully 26036.

In other certain aspects and continuing with FIG. 26, the method for requesting a load service state comprises steps for requesting a current status of a load shaping service further comprises setting one or more status identifiers if the load shaping service is experiencing serious issues, blocking its ability to satisfy both load shaping and other on-demand services 26038; setting one or more status identifiers if the load shaping service is experiencing issues that may block it from being able to satisfy some current or future load shaping or other on-demand reservations 26040; and setting one or more status identifiers if the load shaping service is healthy, although not all subsystems may be functional 26042. Overall, the methods described herein for requesting a load service state in an energy site integration system including one or more DER-ES apparatus are provided including one or more steps for associating one or more renewable energy resources with one or more programs to implement one or more services in an energy cloud software platform coupled to one or more networked distributed energy resource energy storage apparatus controlling one or more inverters to send charge and discharge instructions in response to one or more methods of requesting a load service state.

Now referring to FIGS. 27A, B and C, system diagrams are shown to illustrate other certain aspects of deployment architectures as described above in one or more embodiments, although variations of the deployments shown in FIGS. 27A, B and C are also contemplated. With respect to FIG. 27A, a solution data architecture 27000 is shown which can be thought of as three primary aspects, a utility data center 27002, the Internet 27004, and one or more corresponding user sites 27006, illustrated generally in FIG. 27A as three distinct columns, each containing various further aspects. With respect to the utility data center 27002, primary components related to embodiments and aspects of the disclosures hereunder include an AMI head end 27008, a Demand and Response Management System (DRMS) 27010, and a customer portal 27012. The AMI head end 27008 communicates with corresponding smart meters 27014 of the one or more corresponding user sites 27006 via an Internet connection. The DRMS 27010 receives status updates 27016 from a home area network software cloud application 27020 and aggregates at the utility data center 27002 with other user sites 27006 from other users and sends demand response price signals 27018 to the home area network cloud 27020. In addition, the DRMS 27010 receives status updates 27022 from a DER-ES cloud 27024 and aggregates at the utility data center 27002 with other user sites 27006 from other users and sends demand response pricing signals 27026 to the DER-ES cloud 27024. The customer portal 27012, located at the utility data center 27002 receives preferences and controls from one or more consumer user interfaces 27028 and sends demand, consumption, device status, billing, pricing, and events data 27030 to the one or more consumer user interfaces 27028.

Continuing with FIG. 27A, the home area network cloud 27020 may in certain aspects be resident in the DER-ES cloud 27024 or in other various aspects be remote from the DER-ES cloud 27024. In either case, the home area network (HAN) cloud application 27020 receives status updates from the DER-ES cloud 27024 along with one or more user load data 27030 and one or more Internet of Things (IOT) input/output (I/O) 27030 and sensor signals 27032. The HAN cloud 27020 also may receive device status, demand and consumption data and IOT input/output 27030 and sensor 27032 signals from a HAN gateway 27044 in certain aspects or a DER-ES gateway controller 27046 in other various aspects. The HAN cloud 27020 may aggregate or apply one or more algorithms to the data it receives from one or more user sites 27006 and send demand response and price signals to the HAN gateway 27044 or the DER-ES gateway controller 27046 in other various aspects. In yet other aspects, the DER-ES cloud 27024 receives status updates from one or more DER-ES apparatus 27034 and the one or more DER-ES apparatus 27034 corresponding gateway controllers 27036. The DER-ES cloud 27024 in certain aspects, aggregates monitoring data from one or more DER-ES apparatus 27034 and may be configured either as a central server or in other applications in a peer-to-peer network connection or a distributed network configuration. In other various aspects, the DER-ES cloud 27024 may be configured as an energy management system 27036 and send command and control instructions to the one or more DER-ES apparatus 27034 in certain aspects, or in other various aspects, may send virtual power plant orchestration signals 27038, and in other various aspects may send charge or dispatch commands 27040 to the one or more DER-ES apparatus 27034, such that the corresponding one or more DER-ES apparatus 27034, in certain aspects, may behave as a single energy entity 27042. Finally, the HAN gateway 27044 or the DER-ES gateway controller 27046, receives demand and device status signals from smart appliances 27048, electric vehicle resources 27050, and other loads and in response to the aggregation of the one or more user site data, sends demand response signals in return. Finally, the one or more DER-ES networked apparatus, configured in either a ring or star network configuration, receive status data from photo-voltaic (PV) and other generation devices 27052, depending on the user site generation configurations.

FIG. 27 B shows power architecture with Critical Load Panel 27055 and without Critical Load Panel 27057. A power grid 27056 supplies alternate current power (AC) to Main Distribution Panel 27058. Main Distribution Panel 27058 delivers AC power to DER-ES 27062. Main Distribution Panel supplies AC power to site 27060 or dispatch to a plurality of users. One or more Photo Voltaic (PV) panels and/or other power generations deliver power generated as direct current power (DC) to DER-ES 27062. DER-ES converts DC power to AC power. DER-ES 27062 can store the power, deliver to Main Distribution Panel 27058, or function in accordance to one or more method or system embodiments as described herein. DER-ES can also deliver AC power to Critical Load Panel 27054. Critical Load Panel supplies AC power to site 27060 as needed. The DER-ES apparatus can provide AC power to Main Distribution Panel 27058 which in turn can export a portion of AC power to Grid 27056 in some embodiments. Continuing with FIG. 27B, in certain aspect, power architecture can operate without Critical Load Panel. A power grid 27056 supplies alternate current power (AC) to Main Distribution Panel 27058. Main Distribution Panel 27058 delivers AC power to DER-ES 27062. Main Distribution Panel can also deliver AC power to site 27060. One or more Photo Voltaic (PV) or other power generation sources deliver direct current power (DC) to DER-ES 27062. DER-ES 27062 can store the power or load Main Distribution Panel 27058, but DER-ES does not have Critical Load Panel to discharge herein. Where DER-ES delivers AC power to Main Distribution Panel 27058, Main Distribution Panel 27058 can in turn export AC power to Grid 27056.

Referring to FIG. 27C, a system block diagram 27070 illustrates a Communication Architecture 27070 where information flows among DER-ES and DER-ES Cloud systems. One or more DER-ES 27064 can connect to a Local Area Network (LAN) 27066 through Ethernet, WiFi or other type communication. LAN 27066 and DER-ES Cloud 27068 relate information by DSL/ISDN/T1 etc. Also, DER-ES 27064 may upload or receive information from DER-ES Cloud 27068. Other types of transmitting or receiving information between DER-ES and DES-ES Could may work as well.

FIGS. 28 A, B, and C describe the software functions and interfaces of Distributed Energy Management System (DEMS) 28001, Electrical Vehicle Energy Control Center (EVECC) 28003, and Demand Response Management System (DRMS) 28005. Referring to FIG. 28A, DEMS includes, but is not limited to, software modules to implement steps for Predictive Analytics (PA) 28002, Orchestration 27004, Reporting 28006, Operations and Monitoring 28008, and Communications 28010. One or more DER-ES 28012 software modules report energy status to DEMS. Grid Control System (GCS) 28014 transmits information including Generation and Capacity Needs 28016 and Prices 28018 to DEMS. DEMS returns the Forecast 28020 and real-time and/or historical Metrics 28022 to GCS. DEMS in response performs the Predictive Analysis 28002 and Orchestration 28004. DEMS feeds additional forecast and metrics back to GCS. DEMS through internal and external links can generate Reports 28006, Operation and Monitoring 28008 and Communications 28010. Distribution Management System (DMS) 28000 sends Frequency Regulation Signals 28024 to DEMS. DEMS integrates the signals with Predictive Analysis or other algorithms and send back Frequency Regulation Responses 28026. DEMS responds by instructing DER-ES to dispatch, charge, or discharge power. In certain embodiments, Micro-DMS 28028 can be a separate system. Micro-DMS 28028 dispatches Power Quality Signals 28030 to DER-ES and receives Power Quality Responses 28032 or Alerts 28034 from DER-ES. If Grid Control System shut down, Micro-DMS can operate independently and functions with DEMS to and from DER-ES.

System diagram in FIG. 28B illustrates functions and interfaces of an exemplary embodiment of Electric Vehicle Energy Control Center (EVECC). EVECC 28040 functions as a center for software modules to implement Predictive Analysis 28042, Orchestration 28044, Reporting 28046, Operation and Monitoring 28048, and Communication 28050. One or more Electric Vehicle Stored Energy (EVSE), such as charging station, (EVSE) dispatches power to users such as Electric Vehicle (EV). EVSE/EV 28052 (hardware and software) uploads the energy status to EVECC 28040 software program which uploads the forecast and real-time and/or historical metrics to GCS 28054. GCS 28054 returns Generation and Capacity Needs 28056 and Prices 28058 back to EVECC 28040. Separate quality control Distribution Management System may be installed into the system. Distribution Management System (DMS) 28076 Frequency Regulation signals 28078 to EVECC and EVECC responds with Frequency Regulation Responses 28060 to DMS 28076. EVECC 28040 in turn discharge power to EVSE/EV 28052. Micro-DMS 28062 can receive from EVE/EV 28070 Power Quality Responses 28066 or Alerts 28068 when power quality is below certain indices or certain alert criteria. Micro-DMS 28062 relates Power Quality Signals 28064 to EVSE/EV 28070 and discharge to EVSE/EV 28070 according to predetermined indices.

Referring to FIG. 28C, a system block diagram illustrates function and interfaces of Demand Response Management System 28005. Herein, Demand Response Management System (DRMS) 28072 operates as software modules for Program Management 28074, Rule Management 28076, and other management systems. DRMS receives DMS 28082 input from Customer, Grid, Device Data, 28084 etc. Grid Control System (GCS) 28090 relates Demand Response Requests 28092 to DRMS 28072. DRMS software module does the scheduling 28078 and in turn dispatches Demand Response Schedule 28094 to GCS. DRMS 28072 sends Demand Response Signals 28098 to load one or more Control Devices 28100. DMS completes the Event Execution 28080 and send Demand Response Results 28096 to GCS 28090.

FIGS. 29 A and B illustrate implementations of Site Management System (SMS) in the cloud and Site Gateway System in Distributed Energy Resource Energy Storage System (DER-ES) that communicate via wide area of data network (e.g., internet). For Example, FIG. 29 A illustrates an offsite SMS 29000 which does site monitoring 29004 and remote command and control 29008. SMS 29000 communicates its data through internet to DER-ES onsite 29002. Block diagram 29010 shows Site Gateway 29012 DER-ES controlling modules. Applications modules 29014 can shift power load away from peak period by Peak Load Shifting Module 29016. Demand Response Module 29018 responds to demand. Frequency Regulation Module 29020 receives and dispatches frequency regulation signals. Uninterruptible Power Supply Module (UPS) 29022 ensures uninterrupted supply of power. Voltage Support Module 29024 modifies unclean power into clean power. Analytics Module 29026 performs algorithms. Service Modules 29030 deliver services including Remote Command and Control 29032 described herein. Scheduling Module 29054 performs iterative load shaping scheduler function. Visualization Module 29034 gathers sources and actuates multi-layer individual software. Aggregation Module 29036 collects and share information among individual control system. Aggregation Module 29036 does Monitoring and Reporting 29042 and/or/executes individual site decisions. Remote Management Module 29040 manages through distributed data base such as peer-to-peer, or server etc. Third Party Applications 29044 and Third Party Browsers 29046 can interact with DER-ES 29002 and Site Management System 29000 through internet.

FIG. 29B shows another embodiment of Site Management System (SMS) 29050 and DER-ES 29052. Block Diagram 29054 shows SMS 29050 comprises Applications Software Modules 29058 and Service Software Modules 29060. As described in FIG. 29A, SMS Application 29050 performs functions offsite as software modules for Peak Load Shifting 29062, Demand Response 29064, Frequency Regulation 29066, UPS 29068, Voltage Support 29070 and Analytics 29072. Service Modules 29060 perform functions offsite as software modules for Remote Command and Control 29074, Scheduling 29076, Visualization 29078, Aggregation 29080, Remote Management 29082, and Monitoring and Reporting 29084. Service Modules 29060 can also operate as Iterative Load Shaping Rules Engine (IL-SRE) 29086. ILSRE 29086 calculates data and executes user engines. Continuing with FIG. 29 B, Block Diagram 29056 shows a plurality of DER-ES 29052. At each site, Site Gateway System (SGW) software 29088 manages DER-ES hardware through software implementation in DER-ES. For example, SGW1 manages DER-ES1, SGW2 for DER-ES2 and so on. SGW 29088 comprises User Interface Program 29090 and Memory Data Storage 29092. In SWG, Power Control Module 29094 load and discharge power from different sources. System Monitoring Module 2096 monitors predetermined system indices. Device Virtualization Module 29098 displays DER-ES operations in virtual configuration. Energy Control Module 29100 controls the consumption of the energy. Command Processing Module 29102 executes command after data processing. Protocol Translation Module 29104 incorporates hardware and software and calculates algorithms for inputs and outputs. Third Party Applications 29106 and Third Party Browsers 29108 can interact with the SMS 29050 and DER-ES 29052 through Internet.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents. Exemplary Operating Environments, Components, and Technology.

FIG. 30 is a block diagram illustrating components of an exemplary operating environment in which embodiments of the present invention may be implemented. The system 3000 can include one or more user computers, computing devices, or processing devices 30012, 30014, 30016, 30018, which can be used to operate a client, such as a dedicated application, web browser, etc. The user computers 30012, 30014, 30016, 30018 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 30012, 30014, 30016, 30018 may also have any of a variety of applications, including one or more development systems, database client and/or server applications, and Web browser applications. Alternatively, the user computers 30012, 30014, 30016, 30018 may be any other electronic device, such as a thin-client computer, Internet-enabled gaming system, and/or personal messaging device, capable of communicating via a network (e.g., the network 3010 described below) and/or displaying and navigating Web pages or other types of electronic documents. Although the exemplary system 30000 is shown with four user computers, any number of user computers may be supported.

In most embodiments, the system 30000 includes some type of network 30010. The network can be any type of network familiar to those skilled in the art that can support data communications using any of a variety of commercially-available protocols, including without limitation TCP/IP, SNA, IPX, AppleTalk, and the like. Merely by way of example, the network 30010 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, und/or any other wireless protocol); and/or any combination of these and/or other networks.

The system may also include one or more server computers 30002, 30004, 30006 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 30006) may be dedicated to running applications, such as a business application, a Web server, application server, etc. Such servers may be used to process requests from user computers 30012, 30014, 30016, 30018. The applications can also include any number of applications for controlling access to resources of the servers 30002, 30004, 30006.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 30012, 30014, 30016, 30018. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 30012, 30014, 30016, 30018.

The system 30000 may also include one or more databases 30020. The database(s) 30020 may reside in a variety of locations. By way of example, a database 30020 may reside on a storage medium local to (and/or resident in) one or more of the computers 30002, 30004, 30006, 30012, 30014, 30016, 30018. Alternatively, it may be remote from any or all of the computers 30002, 30004, 30006, 30012, 30014, 30016, 30018, and/or in communication (e.g., via the network 30010) with one or more of these. In a particular set of embodiments, the database 30020 may reside in a storage-area network ("SAN") familiar to those skilled in the art. Similarly, any necessary files for performing the functions attributed to the computers 30002, 30004, 30006, 30012, 30014, 30016, 30018 may be stored locally on the respective computer and/or remotely, as appropriate. In one set of embodiments, the database 30020 may be a relational database, such as Oracle 10g, that is adapted to store, update, and retrieve data in response to SQL-formatted commands.

FIG. 31 illustrates an exemplary computer system 31000, in which embodiments of the present invention may be implemented. The system 31000 may be used to implement any of the computer systems described above. The computer system 31000 is shown comprising hardware elements that may be electrically coupled via a bus 31001. The hardware elements may include one or more central processing units (CPUs) 31002, one or more input devices 31004 (e.g., a mouse, a keyboard, etc.), and one or more output devices 31006 (e.g., a display device, a printer, etc.). The computer system 31000 may also include one or more storage devices 3008. By way of example, the storage device(s) 31008 can include devices such as disk drives, optical storage devices, solid-state storage device such as a random access memory ("RAM") and/or a read-only memory ("ROM"), which can be programmable, flash-updateable and/or the like.

The computer system 31000 may additionally include a computer-readable storage media reader 31012, a communications system 31014 (e.g., a modem, a network card (wireless or wired), an infra-red communication device, etc.), and working memory 31016, which may include RAM and ROM devices as described above. In some embodiments, the computer system 31000 may also include a processing acceleration unit 31018, which can include a digital signal processor DSP, a special-purpose processor, and/or the like.

The computer-readable storage media reader 31012 can further be connected to a computer-readable storage medium 31010, together (and, optionally, in combination with storage device(s) 31008) comprehensively representing remote, local, fixed, and/or removable storage devices plus storage media for temporarily and/or more permanently containing, storing, transmitting, and retrieving computer-readable information. The communications system 31014 may permit data to be exchanged with the network and/or any other computer described above with respect to the system 31000.

The computer system 31000 may also comprise software elements, shown as being currently located within a working memory 31018, including an operating system 31020 and/or other code 31022, such as an application program (which may be a client application; Web browser, mid-tier application, RDBMS, etc.). It should be appreciated that alternate embodiments of a computer system 31000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

FIG. 31 further illustrates an environment where an on-demand distributed database service might be used. As illustrated in FIG. 31 user systems might interact via a network with an on-demand database. Some on-demand databases may store information from one or more records stored into tables of one or more distributed database images to form a database management system (DBMS). Accordingly, on-demand database and system will be used interchangeably herein. A database image may include one or more database objects. A relational database management system (RDMS) or the equivalent may execute storage and retrieval of information against the database object(s). Some on-demand database services may include an application platform that enables creation, managing and executing one or more applications developed by the provider of the on-demand database service, wherein users accesses the on-demand database service via user systems, or third party application developers access the on-demand database service via user systems.

The security of a particular user system might be entirely determined by permissions (permission levels) for the current user. For example, where a user account identification transaction may involve a portable identification alphanumeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level, use other common Internet protocols to communicate, such as HTTP, FTP, AFS, WAP, etc. In an example where HTTP is used, a user system might include an HTTP client commonly referred to as a "browser" for sending and receiving HTTP messages to and from an HTTP server at System. Such HTTP server might be implemented as the sole network interface between a system and network, but other techniques might be used as well or instead. In some implementations, the interface between a system and network includes load sharing functionality, such as round-robin HTTP request distributors to balance loads and distribute incoming HTTP requests evenly over a plurality of servers. At least as for the users that are accessing that server, each of one or more servers has access to at least one third party entity system data schema; however, other alternative configurations are contemplated.

According to one arrangement, each user system and all of its components are operator configurable using applications, such as a browser, including computer code run using a central processing unit such as an Intel Pentium® processor or the like. Similarly, a computer system (and additional instances of an enterprise database, where more than one is present) and all of their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring systems to intercommunicate and to process web pages, applications and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

The above illustrations provide many different embodiments for implementing different features of the invention. Specific embodiments of components and processes are described to help clarify the invention. These are, of course, merely embodiments and are not intended to limit the invention from that described in the claims.

What is claimed is:

1. A method of offset demand monitoring in a distributed energy resource energy storage (DER-ES) apparatus, comprising steps for:
   providing one or more communication protocols to allow one or more components of one or more DER-ES apparatus to communicate with each other without a host computer;
   implementing one or more steps for one or more mode selection management methods via a gateway controller computer system associated with one or more DER-ES apparatus at a user site;
   measuring a user site demand by reading one or more site loads;
   selecting an active mode corresponding to the requested mode of the highest priority program;
   implementing the active mode of the highest priority program to coordinate one or more energy resources in one or more local events;
   housing an inverter in a common enclosure within the distributed energy resource energy storage apparatus;
   reacting to demand conditions to match the site demand measurement with an inverter power output;
   controlling the inverter to dispatch the matching power output calculating one or more offset demand amounts associated with reducing one or more grid demand amounts;
   calculating one or more offset demand amounts associated with avoiding one or more grid power export amounts;
   selecting one or more offset energy demand amounts;
   communicating with one or more network connected DER-ES apparatus;
   reading one or more site loads from one or more site meters wherein the site configuration is selected from one of a group consisting of a site with a main load panel only, a site with a main load panel plus a critical load panel, and a site with neither a load panel or a critical load panel;
   managing one or more offset demand amounts related to one or more distributed energy resources;
   charging one or more storage devices in a storage appliance from one or more renewable energy source charge controllers, wherein the storage appliance and charge controllers are integral to an associated DER-ES apparatus, and wherein charging the one or more storage devices continues until each of the one or more storage devices are fully charged, unless an amount of renewable energy power generated at the user site location is less than the required amount to charge the one or more storage devices, at which time the one or more storage devices receive power from the grid until fully charged;
   measuring demand on one or more load panels to determine a DC bus support load power requirement and an AC inverter grid side power requirement, wherein the difference in power requirements determines an amount of offset energy demand, and limiting the export of renewable energy generation to the grid by measuring and storing renewable energy power generated in the DER-ES apparatus;
   dispatching the renewable energy power in excess of site demand when the site demand measurement is more than or equal to a desired change amount;
   calling an internal InvertToAC function in a gateway controller associated with the DER-ES apparatus to increment power output of an inverter housed within the DER-ES apparatus.

2. The method of offset demand monitoring in a distributed energy resource energy storage apparatus of claim 1, further comprising:
   controlling AC power output of the DER-ES apparatus by a minimum change amount to increase a DC to AC inverter lifespan.

3. The method of offset demand monitoring in a distributed energy resource energy storage apparatus of claim 2, further comprising:
   dispatching the renewable energy power in excess of site demand when the site demand measurement is more than or equal to twice a minimum change amount.

4. The method of offset demand monitoring in a distributed energy resource energy storage apparatus of claim 1, further comprising:
   calculating an offset demand amount value by selecting a step function above the measured load value of a load demand curve to determine an offset demand output wattage for the distributed energy resource energy storage apparatus.

5. The method of offset demand monitoring in a distributed energy resource energy storage apparatus of claim 1, further comprising:

calculating an offset demand amount value by selecting a step function below the measured load value of a load demand curve to determine an offset demand output wattage for the distributed energy resource energy storage apparatus.

6. The method of offset demand monitoring in a distributed energy resource energy storage apparatus of claim 1, further comprising:
   calculating an offset demand amount value by monitoring the measured load values in real time to determine a load demand curve; and
   selecting an offset demand output wattage for the distributed energy resource energy storage apparatus.

7. The method of offset demand monitoring in a distributed energy resource energy storage apparatus of claim 1, further comprising:
   calculating an offset demand amount value by selecting a step function above the measured load value of a load demand curve and adding a translation delta to shift the entire step function upward from the load demand curve values in order to determine an offset demand output wattage for the distributed energy resource storage apparatus.

8. The method of offset demand monitoring in a distributed energy resource energy storage apparatus of claim 1, further comprising:
   calculating an offset demand amount value by selecting a step function below the measured load value of a load demand curve and adding a translation delta to shift the entire step function downward from the load demand curve values in order to determine an offset demand output wattage for the distributed energy resource energy storage apparatus.

9. The method of offset demand monitoring in a distributed energy resource energy storage apparatus of claim 1, further comprising:
   instructing an inverter to invert an amount of output wattage equivalent to the offset demand amount.

10. The method of offset demand monitoring in a distributed energy resource energy storage apparatus of claim 1, further comprising:
    providing one or more CANBUS protocols to allow one or more components to communicate with each other without one or more host computers.

11. The method of offset demand monitoring in a distributed energy resource energy storage apparatus of claim 1 wherein the protocols to allow one or more components to communicate with each other without one or more host computers is selected from a group consisting of PLC and ModBus.

12. The method of offset demand monitoring in a distributed energy resource energy storage apparatus of claim 1, further comprising:
    establishing that a critical load panel is present at the site;
    measuring an energy demand and taking a site demand measurement where the site meter is placed, wherein a renewable energy module in the distributed energy resource energy storage apparatus converts an amount of DC power equal to demand on the critical load panel for the site as true 0 AC;
    starting offset demand monitoring with true 0 AC, wherein the critical load panel is supported by DC power in the distributed energy resource energy storage apparatus;
    measuring demand for a waiting period to determine if power is being sent to the grid, and if so the distributed energy resource energy storage apparatus returns to true 0 AC;
    determining whether the distributed energy resource energy storage apparatus is sending to the grid, power being consumed at the site, or is equal to demand at the site meter; and
    determining site demand measurement by taking minimum reading on meter during a measurement period to determine offset demand for the site.

13. The method of offset demand monitoring in a distributed energy resource energy storage apparatus of claim 12, further comprising:
    implementing one or more steps for demand management modes selection;
    providing at least one of the DER-ES apparatus at a site meter at a user site;
    configuring a target offset demand mode via a user preference of a gateway controller associated with the at least one DER-ES apparatus;
    communicating with one or more network connected DER-ES apparatus via an energy cloud software platform;
    creating one or more forward energy resource demand reservations for one or more of the distributed energy resource energy storage apparatus; and
    retrieving one or more predictive data elements from the energy cloud software platform or an external third party provider via an external API to configure one or more user preferences.

14. The method of offset demand monitoring in a distributed energy resource energy storage apparatus of claim 13, further comprising:
    implementing one or more steps for demand management modes selection;
    configuring a target offset demand mode via one or more user preferences configuring the target offset demand mode in the DER-ES apparatus via a virtual network; and
    coupling the target offset demand mode in the DER-ES apparatus via a user interface to the virtual network.

15. The method of offset demand monitoring in a distributed energy resource energy storage apparatus of claim 1, further comprising:
    providing a plurality of renewable energy site integration systems that include one or more DER-ES apparatus at a plurality of site meters at a site location;
    providing a main load meter edge device virtually networked to each of the plurality of distributed energy resource energy storage apparatus at the one or more site meters, wherein the edge device can be located at the site location or at another location;
    establishing that a critical load panel is present at the site location;
    measuring an energy demand and taking one or more site demand measurements where the one or more site meters is placed, wherein the one or more distributed energy resource energy storage apparatus each convert DC power equal to a site demand measurement on the critical load panel for the site location as true 0;
    starting offset demand monitoring with true 0, wherein the critical load panel is supported by DC power in each of the one or distributed energy resource energy storage apparatus; and
    taking the site demand measurement via each of the one or more distributed energy resource energy storage apparatus at the one or more site meters, wherein taking the site demand measurement comprises subtracting the maximum power sent out to a grid side of the one or more distributed energy resource energy storage apparatus from the reading of the main load meter edge device to provide a "worst case" site demand measurement for the plurality of site meters.

16. The method of offset demand monitoring in a distributed energy resource energy storage apparatus of claim 15, further comprising:
inverting to AC at 0 watts if the site demand measurement on any of the one or more site meters is less than zero; and;
waiting five seconds and start measuring the site demand measurement at the one or more site meters again.

17. The method of offset demand monitoring in a distributed energy resource energy storage apparatus of claim 16, further comprising:
taking no action if, the site demand measurement is equal to or more than 0, but less than twice a minimum change; and
taking the site demand measurement via the one or more distributed energy resource energy storage apparatus at the one or more site meters.

18. The method of offset demand monitoring in a distributed energy resource energy storage apparatus of claim 17, further comprising:
inverting to AC with minimum change more watts than last site measurement when the site demand measurement is more than twice the minimum change.

19. The method of offset demand monitoring in a distributed energy resource energy storage apparatus of claim 18, further comprising;
configuring the offset demand via the virtual network, and coupling a main load meter edge device via a user interface coupled to the virtual network.

20. The method of offset demand monitoring in a distributed energy resource energy storage apparatus of claim 1, further comprising:
providing one or more DER-ES apparatus at one or more site meters at a site location;
providing a main load meter edge device virtually networked to each of the one or more distributed energy resource energy storage apparatus at the one or more site meters, wherein the edge device can be located at the site location or at another location;
measuring an energy demand and taking one or more site demand measurements where the one or more site meters are placed; and
taking the site demand measurement via the one or more distributed energy resource energy storage apparatus at the one or more site meters, wherein taking the site demand measurement comprises subtracting the maximum power sent out to a grid side of the one or more distributed energy resource energy storage apparatus from the reading of the main load meter edge device to provide a "worst case" site demand measurement for the one or more site meters.

21. The method of offset demand monitoring in a distributed energy resource energy storage apparatus of claim 20, further comprising:
inverting to AC at 0 watts if the site demand measurement on any of the one or more site meters is less than zero; and;
waiting five seconds and start measuring the site demand measurement at the one or more site meters again.

22. The method of offset demand monitoring in a distributed energy resource energy storage apparatus of claim 21, further comprising:
taking no action if, the site demand measurement is equal to or more than 0, but less than twice a minimum change; and
taking the site demand measurement via the one or more DER-ES apparatus at the one or more site meters.

23. The method of offset demand monitoring in a distributed energy resource energy storage apparatus of claim 22, further comprising:
inverting to AC with minimum change more watts than last site measurement when the site demand measurement is more than twice the minimum change.

24. The method of offset demand monitoring in a distributed energy resource energy storage apparatus of claim 1, further comprising:
linking one or more DNP3 platforms to facilitate communication between one or more data processing gateways and one or more components.

25. The method of offset demand monitoring in a distributed energy resource energy storage apparatus of claim 1, further comprising:
reducing aggregate demand on one or more network connected DER-ES apparatus by calling one or more offset demand modes associated with each one of the one or more network connected apparatus;
communicating with one or more network connected DER-ES apparatus via an energy cloud software platform;
creating one or more forward energy resource demand reservations for one or more of the distributed energy resource energy storage apparatus; and
retrieving one or more predictive data elements from the energy cloud software platform or an external third party provider via an external API.

26. The method of offset demand monitoring in a distributed energy resource energy storage apparatus of claim 25, further comprising:
orchestrating a virtual power plant of one or more aggregated user sites to act as a single entity to minimize the one or more forward energy resource demand reservations.

27. The method of offset demand monitoring in a distributed energy resource energy storage apparatus of claim 26, further comprising:
implementing a load shaping service model to reduce aggregate demand of one or more network connected apparatus.

28. The method of offset demand monitoring in a distributed energy resource energy storage apparatus of claim 25, further comprising:
reducing demand on an aggregated level of one or more network connected distributed energy resource energy storage apparatus;
providing one or more gateway controllers in communication with an energy cloud controller linked to an electric vehicle energy control center and a distributed energy management system.

\* \* \* \* \*